Feb. 28, 1956 J. C. JORGENSEN 2,736,046

MACHINES FOR SHAPING UPPERS OVER LASTS

Filed Jan. 21, 1953 42 Sheets-Sheet 1

Inventor
Jacob C. Jorgensen
By his Attorney

Feb. 28, 1956 J. C. JORGENSEN 2,736,046

MACHINES FOR SHAPING UPPERS OVER LASTS

Filed Jan. 21, 1953 42 Sheets-Sheet 2

Inventor
Jacob C. Jorgensen
By his Attorney

Feb. 28, 1956 J. C. JORGENSEN 2,736,046

MACHINES FOR SHAPING UPPERS OVER LASTS

Filed Jan. 21, 1953 42 Sheets-Sheet 3

Inventor
Jacob C. Jorgensen
By his Attorney

MACHINES FOR SHAPING UPPERS OVER LASTS

Filed Jan. 21, 1953 42 Sheets-Sheet 4

Inventor
Jacob C. Jorgensen
By his Attorney

Feb. 28, 1956 J. C. JORGENSEN 2,736,046

MACHINES FOR SHAPING UPPERS OVER LASTS

Filed Jan. 21, 1953 42 Sheets-Sheet 5

Inventor

Jacob C. Jorgensen

By his Attorney

Feb. 28, 1956 J. C. JORGENSEN 2,736,046

MACHINES FOR SHAPING UPPERS OVER LASTS

Filed Jan. 21, 1953 42 Sheets-Sheet 6

Inventor
Jacob C. Jorgensen
By his Attorney

Feb. 28, 1956 J. C. JORGENSEN 2,736,046

MACHINES FOR SHAPING UPPERS OVER LASTS

Filed Jan. 21, 1953 42 Sheets-Sheet 7

Inventor
Jacob C. Jorgensen
By his Attorney

Feb. 28, 1956 J. C. JORGENSEN 2,736,046

MACHINES FOR SHAPING UPPERS OVER LASTS

Filed Jan. 21, 1953 42 Sheets-Sheet 8

Inventor
Jacob C. Jorgensen
By his Attorney

MACHINES FOR SHAPING UPPERS OVER LASTS

Filed Jan. 21, 1953

Inventor
Jacob C. Jorgensen
By his Attorney

Feb. 28, 1956 J. C. JORGENSEN 2,736,046

MACHINES FOR SHAPING UPPERS OVER LASTS

Filed Jan. 21, 1953 42 Sheets-Sheet 10

Inventor
Jacob C. Jorgensen
By his Attorney

Inventor
Jacob C. Jorgensen
By his Attorney

Inventor
*Jacob C. Jorgensen*
*By his Attorney*

MACHINES FOR SHAPING UPPERS OVER LASTS

Filed Jan. 21, 1953 42 Sheets-Sheet 13

Inventor
Jacob C. Jorgensen
By his Attorney

MACHINES FOR SHAPING UPPERS OVER LASTS

Filed Jan. 21, 1953 42 Sheets-Sheet 14

Inventor
Jacob C. Jorgensen
By his Attorney

Feb. 28, 1956 J. C. JORGENSEN 2,736,046

MACHINES FOR SHAPING UPPERS OVER LASTS

Filed Jan. 21, 1953 42 Sheets-Sheet 15

Inventor
Jacob C. Jorgensen
By his Attorney

Inventor
Jacob C. Jorgensen
By his Attorney

Feb. 28, 1956 J. C. JORGENSEN 2,736,046

MACHINES FOR SHAPING UPPERS OVER LASTS

Filed Jan. 21, 1953 42 Sheets-Sheet 17

Inventor
Jacob C. Jorgensen
By his Attorney

Feb. 28, 1956 J. C. JORGENSEN 2,736,046

MACHINES FOR SHAPING UPPERS OVER LASTS

Filed Jan. 21, 1953 42 Sheets-Sheet 18

*Inventor*

Jacob C. Jorgensen

By his Attorney

MACHINES FOR SHAPING UPPERS OVER LASTS

Filed Jan. 21, 1953 42 Sheets-Sheet 19

Inventor
Jacob C. Jorgensen
By his Attorney

Feb. 28, 1956 J. C. JORGENSEN 2,736,046

MACHINES FOR SHAPING UPPERS OVER LASTS

Filed Jan. 21, 1953 42 Sheets-Sheet 20

Inventor
Jacob C. Jorgersen
By his Attorney

MACHINES FOR SHAPING UPPERS OVER LASTS

Filed Jan. 21, 1953 42 Sheets-Sheet 21

Inventor
Jacob C. Jorgensen
By his Attorney

MACHINES FOR SHAPING UPPERS OVER LASTS

Filed Jan. 21, 1953 42 Sheets-Sheet 22

Inventor
Jacob C. Jorgensen
By his Attorney

MACHINES FOR SHAPING UPPERS OVER LASTS

Filed Jan. 21, 1953 42 Sheets-Sheet 23

Inventor
Jacob C. Jorgensen
By his Attorney

MACHINES FOR SHAPING UPPERS OVER LASTS

Filed Jan. 21, 1953 42 Sheets-Sheet 24

Inventor
Jacob C. Jorgensen
By his Attorney

MACHINES FOR SHAPING UPPERS OVER LASTS

Filed Jan. 21, 1953 42 Sheets-Sheet 25

Inventor
Jacob C. Jorgensen
By his Attorney
[signature]

Feb. 28, 1956 J. C. JORGENSEN 2,736,046

MACHINES FOR SHAPING UPPERS OVER LASTS

Filed Jan. 21, 1953 42 Sheets-Sheet 26

Inventor
Jacob C. Jorgensen
By his Attorney

MACHINES FOR SHAPING UPPERS OVER LASTS

Filed Jan. 21, 1953

Inventor
Jacob C. Jorgensen
By his Attorney

MACHINES FOR SHAPING UPPERS OVER LASTS

Filed Jan. 21, 1953 42 Sheets-Sheet 28

Inventor
Jacob C. Jorgensen
By his Attorney
[signature]

MACHINES FOR SHAPING UPPERS OVER LASTS

Inventor
Jacob C. Jorgensen
By his Attorney

Feb. 28, 1956 J. C. JORGENSEN 2,736,046

MACHINES FOR SHAPING UPPERS OVER LASTS

Filed Jan. 21, 1953 42 Sheets-Sheet 30

Inventor
Jacob C. Jorgensen
By his Attorney

Feb. 28, 1956 J. C. JORGENSEN 2,736,046

MACHINES FOR SHAPING UPPERS OVER LASTS

Filed Jan. 21, 1953 42 Sheets-Sheet 31

Inventor
Jacob C. Jorgensen
By his Attorney

Inventor
Jacob C. Jorgensen
By his Attorney

Feb. 28, 1956 J. C. JORGENSEN 2,736,046

MACHINES FOR SHAPING UPPERS OVER LASTS

Filed Jan. 21, 1953 42 Sheets-Sheet 33

Inventor
Jacob C. Jorgensen
By his Attorney

MACHINES FOR SHAPING UPPERS OVER LASTS

Filed Jan. 21, 1953

42 Sheets-Sheet 34

Inventor
Jacob C. Jorgensen
By his Attorney

Inventor
Jacob C. Jorgensen
By his Attorney

MACHINES FOR SHAPING UPPERS OVER LASTS

Filed Jan. 21, 1953 42 Sheets-Sheet 36

Inventor
Jacob C. Jorgensen
By his Attorney

Inventor
Jacob C. Jorgensen
By his Attorney
[signature]

MACHINES FOR SHAPING UPPERS OVER LASTS

Filed Jan. 21, 1953 42 Sheets-Sheet 38

Inventor
Jacob C. Jorgensen
By his Attorney

Inventor
Jacob C. Jorgensen
By his Attorney

MACHINES FOR SHAPING UPPERS OVER LASTS

Filed Jan. 21, 1953 42 Sheets-Sheet 40

Inventor
Jacob C. Jorgensen
By his Attorney

MACHINES FOR SHAPING UPPERS OVER LASTS

Inventor
Jacob C. Jorgensen
By his Attorney

MACHINES FOR SHAPING UPPERS OVER LASTS

Filed Jan. 21, 1953 42 Sheets-Sheet 42

Inventor
Jacob C. Jorgensen
By his Attorney

United States Patent Office 2,736,046

Patented Feb. 28, 1956

2,736,046

MACHINES FOR SHAPING UPPERS OVER LASTS

Jacob C. Jorgensen, Beverly, Mass., assignor to United Shoe Machinery Corporation, Flemington, N. J., a corporation of New Jersey Application January 21, 1953, Serial No. 332,238

154 Claims. (Cl. 12—10.4)

This invention relates to machines for shaping uppers over lasts and is herein illustrated as embodied in a pulling-over machine of the so-called "inverted" type. It will be understood, however, that in its broader aspects this invention is not limited to use in a pulling-over machine or to embodiment in the exact mechanical construction disclosed.

A principal object of this invention is to provide a novel and improved machine for shaping uppers over lasts, or pulling-over machine, which is easy to operate and capable of handling, in a satisfactory manner, a wide variety of shoes having upper materials of different characters, while, at the same time, affording the operator a maximum ability to manipulate the upper materials, relatively to the last over which they are to be shaped, with a minimum amount of effort on his part, and assuring most satisfactory and dependable operation under all conditions. To this end, the herein illustrated machine has a relatively fixed support for the last over which the upper is to be shaped which is inclined upwardly and rearwardly in such a way that the upper materials are easily viewed by an operator standing in front of the machine, while the various hand levers utilized for manipulating the upper materials to position them relatively to the last, as well as other control members for controlling the operation of the machine, are located adjacent to the front of the machine within easy reach of the operator.

In common with prior machines of this type, the herein illustrated machine has a toe gripper for tensioning the upper materials in a location adjacent to the toe end of a last on the support and a pair of side grippers for tensioning the upper materials in different locations at the opposite sides of the forepart of the last, the side grippers being arranged to apply a pull for tensioning the upper materials in a direction extending lengthwise of the last as well as in a direction heightwise of the last. Associated with each of these grippers is an overlaying and fastening-inserting device adapted to wipe the lasting margin of the tensioned upper materials inwardly over the bottom of an insole on the last and to drive one or more fastenings therethrough for securing the upper materials to the insole in each of said locations. To assist in supporting the last during the operation of the overlaying and fastening-inserting devices, the herein illustrated machine, in common with other machines of this type, is provided with two side clamp members, arranged on the opposite sides of the last support and adapted to be moved into pressing engagement with the upper materials on the opposite sides of the forepart of the last and a heel rest adapted to be brought into supporting engagement with the heel end of the upper on the last.

With the view of facilitating the operation of the machine, and also of rendering it capable of operating, in a satisfactory manner, on a wide variety of shoes having upper materials of different characters, the several grippers of the herein illustrated machine are arranged to be operated by means of fluid under pressure and independently of mechanical drive mechanism which is utilized to actuate the overlaying and fastening-inserting devices. Thus, novel features of the invention, reside in the provision of fluid-pressure means for operating the toe and side grippers, together with improved means, under the direct control of the operator, for varying the pressure of the operating fluid to increase or decrease the intensity of the pull applied by the toe gripper and/or side grippers in order to assure that the upper materials, regardless of their character, are properly pulled over and shaped to the last without, however, subjecting them to excessive stress which might be damaging in its effect thereon. Preferably, and in the herein illustrated machine, such varying of the pressure of the operating fluid is effected by means of pressure-reducing valves having balanced valve members for controlling the pressure of the fluid admitted, respectively, to power cylinders having therein pistons arranged to operate the toe and side grippers, together with means, including hand levers readily accessible to the operator, for varying the action of these balanced valve members to increase or decrease the pressure of the operating fluid admitted to the power cylinders. Thus, without the exercise of any appreciable effort on his part, the operator may very accurately determine the intensity of the pull applied to the upper materials by the toe gripper and/or side grippers. In order to extend the range of intensity of the pull of the side grippers, means are also provided, in accordance with another feature of the invention, for rendering an auxiliary power cylinder effective for operating these grippers at the will of the operator.

As suggested above, the side grippers are arranged to exert a pull for tensioning the upper in a direction extending lengthwise of the last, and in accordance with another feature of the invention, fluid-pressure-operated means are provided for operating the side grippers to exert such a lengthwise pull on the upper materials. Preferably, and in the herein illustrated machine, the intensity of the lengthwise pull may be increased or decreased to suit different operating conditions, by varying the pressure of the operating fluid admitted to the power cylinders which are provided for operating the side grippers to impart such lengthwise pull. For thus varying the pressure of the operating fluid admitted to these cylinders, a pressure-regulator valve is utilized, and means readily accessible to the operator are provided for varying the action of this valve to increase or decrease the intensity of the lengthwise pull applied to the upper materials by the side grippers.

After the upper materials have been tensioned by the pull applied thereto by the grippers and just before the overlaying and fastening-inserting devices are operated to wipe the upper materials inwardly over and to secure them to the insole, the jaws of the several grippers are opened and the grippers are moved quickly to retracted positions out of the way of the incoming overlaying and fastening-inserting devices. To insure such rapid retraction of the grippers, in the machine herein shown, there is associated with each of the grippers a power cylinder, and means are provided which operate in predetermined time relation to the opening of the gripper jaws for admitting fluid under pressure to these cylinders for thus retracting the grippers. Inasmuch as these power cylinders are independent of the power cylinders which operate the grippers to tension the upper materials, the desired rapidity of gripper retraction is assured regardless of the intensity of the upper-tensioning pull which is applied by the grippers. Preferably, and in the herein illustrated machine, means are provided for elevating the grippers to their initial or starting positions, relatively to the last support, at the conclusion of an operating cycle of the machine, and certain other novel aspects of the invention are to be recognized in the control of these means as well as in manually adjustable means for varying the heightwise positions to which the several grippers are thus returned, and for varying the angular positions of the side grippers, relatively to the longitudinal center line of the last support, in order to accommodate various types of shoes.

In common with prior machines of this type, the herein illustrated machine is arranged to operate in a cycle having two definite stages, the upper materials being tensioned during the first stage of the cycle at the conclusion of which the machine comes to rest with the upper materials under tension. After the machine is again started, the overlaying and fastening-inserting devices are operated and, during this second stage of the operating cycle, the grippers are opened, retracted and eventually returned to their initial positions. The side clamps are brought in against the upper materials, on the opposite sides of the forepart of the last, prior to the operation of the overlaying and fastening-inserting devices, and near the conclusion of this second stage of the cycle these clamp members and the heel rest are retracted to release the pulled-over shoe. When the machine comes to a stop at the end of the first stage of the operating cycle, the operator has an opportunity to inspect the upper materials as they are held under tension by the several grippers. Before again starting the machine the operator may wish to manipulate the grippers in order to vary the position of the upper materials relatively to the last as, for example, to center the throat opening or to vary the lengthwise or angular position of the tip line of the upper materials, relatively to the last. In addition, the operator may wish to increase or decrease the intensity of the pull applied by the toe gripper and/or side grippers, which he may readily do merely by varying the pressure of the fluid admitted to the respective power cylinders, as explained above.

In order to facilitate manipulation of the upper materials, relatively to the last, the illustrated machine is provided with improved means for shifting the several grippers, in directions extending lengthwise and heightwise of the last support, together with novel means for controlling the action of the several grippers on the upper materials, during such manipulative movement thereof. Thus, in the herein illustrated machine, manually operated means, located within the reach of an operator, are provided for moving the toe gripper in a direction extending heightwise of the last support, together with auxiliary control means for selectively causing the jaws of the toe gripper to open and for relieving the force of the pull applied by the toe gripper. Hence, the operator may readily cause the toe gripper to release the upper materials at the toe end of the shoe and, after repositioning the toe gripper in a heightwise direction, he may cause it again to seize the upper materials in another desired heightwise location. Similarly, manually operated means, located within the reach of the operator, are provided for moving the side grippers heightwise and/or lengthwise of the last support for centering the throat opening of the upper materials or for properly locating the tip line in a lengthwise direction, or angularly, relatively to the last. In order to facilitate such manipulative movements of the upper by the side grippers, the pull of the toe gripper may be relieved, as above suggested, and in accordance with another feature of the invention, means are provided, under the control of one of the hand levers referred to above, for selectively relieving the force of the heightwise pull applied by the side grippers and for eliminating entirely the lengthwise pull of these grippers. After the upper materials have been properly positioned, the pull of the several grippers is restored upon return of this hand lever to its original position. In some cases, it may be desirable to shift the throat opening laterally of the last without disturbing the location of the tip line of the upper. To permit such manipulation, the side grippers are each provided with two sets of gripper jaws, one set being adapted to seize the upper materials at, or adjacent to, the tip line, and the other set adapted to seize them in a location somewhat rearwardly of the tip line. These two sets of jaws on each side gripper are connected together through an equalizing mechanism and fluid-pressure-operated means, under control of the operator, are provided for locking the tip line jaws of each side gripper against movement during the manual manipulation of the side grippers to center the throat opening of the upper on the last.

As already suggested, the toe and side grippers of the illustrated machine are operated to close on the upper materials and then to exert a pull thereon by fluid-pressure-operated means. Hence, the first stage in the operating cycle of the machine is initiated by admitting fluid under pressure to the several cylinders provided for closing the jaws of the grippers and for causing the grippers to apply their pull. For thus admitting fluid under pressure to these cylinders, the herein illustrated machine is provided with a valve device including a first valve member which is adapted to be moved to open position by means of an initial depression of a foot treadle. In response to opening of this valve, the several grippers are first closed on the upper materials and then operated to apply their pull. In accordance with a feature of the invention, manually adjustable control valves are provided for varying the sequence of operations of the toe and side grippers, respectively, as well as the rate of movement of these grippers in applying their pull, together with a timing valve for delaying operation of the side grippers to exert a lengthwise pull until after they have been operated to apply their heightwise pull on the upper materials. The aforementioned valve device is provided with a latch for holding the first valve member in its open position, to which it is moved by the starting treadle, and means under the control of the operator are provided for tripping this latch to release the valve member for return to its closed position. Thus, if the operator is not entirely satisfied with the condition of the upper materials after they have been initially put under tension, he can cause the grippers to return to their initial starting positions, thus releasing the upper materials, by tripping this latch. Otherwise, the second stage of the operating cycle is initiated by a second depression of the starting treadle.

During this second stage in the operating cycle of the machine, the side clamp members are moved into engagement with the tensioned upper materials on the opposite sides of the forepart of the last and, thereafter, the overlaying and fastening-inserting devices are operated to wipe the lasting margin of the upper materials inwardly over the insole and to secure said lasting margin to the insole. In the machine herein shown, the side clamp members are arranged to be thus moved into engagement with the upper materials by fluid-pressure-operated means, and in accordance with another feature of the invention, a manually adjustable pressure-regulator valve of the balanced valve member type, referred to above, is provided for varying the pressure of the operating fluid to increase or decrease the force applied by these clamp members on the upper materials. The overlaying and fastening-inserting devices are actuated by means of a mechanical drive mechanism including a clutch device which is arranged to be actuated, to initiate action of the overlaying and fastening-inserting devices, in response to the operation of the side clamp members. The operation of the side clamp members is controlled by means of a second valve member in the treadle-operated valve device, referred to above, which is arranged to be moved to, and latched in, open position for admitting fluid under pressure to the fluid-pressure-operated means for actuating the side clamp members in response to a second depression of the starting treadle. In order to assure that the first stage of the operating cycle of the machine will certainly be completed before the second stage of the cycle is initiated, the treadle-operated valve device is provided with means, rendered effective by the last operation in the first stage of the cycle, for operatively connecting this second valve member for movement by the starting treadle. At an intermediate point in this second stage of the operating cycle, both of the valve members of this treadle-operated valve device are unlatched for return to initial positions in which the various pressure lines are connected to exhaust.

As suggested above, the last over which the upper materials are being shaped in supported on a shoe rest and is held against lenghtwise displacement by means of a heel rest which engages the heel end of the upper on the last. In order to accommodate lasts of different sizes, the shoe rest of the machine of this invention is provided with a relatively stationary finger for engaging an insole on the last adjacent to the toe end of the last and with two expansible fingers for engaging the insole at two points adjacent to the marginal edge thereof on the opposite sides of the forepart of the last. Fluid-pressure means are provided for moving outwardly these expansible fingers of the shoe rest and for also advancing the heel rest into engagement with the heel end of the upper on the last at an early point in the first stage of the operating cycle in response to the initial depression of the starting treadle. With the view of assuring that the expansible fingers of the shoe rest will be moved outwardly to the proper positions on insoles of different sizes, means are provided for limiting the movement of the fluid-pressure means for expanding these fingers in accordance with the positions of the side grippers which are adjustable to accommodate lasts of different widths.

The overlaying and fastening-inserting devices each comprise a wiper for laying the lasting margin of the upper materials inwardly over the bottom of an insole on the last and mechanism for driving fastenings, such as tacks, through openings in these wipers for securing the upper materials to the insole. In order to accommodate upper materials of different thicknesses, these overlaying devices are adapted to yield in a direction extending heightwise of the fixed shoe support and thus to apply a yielding wiping pressure on the upper materials. With the view of assuring a proper wiping action regardless of the thickness of the upper materials and insole, as well as when operating on lasts having different transverse curvatures, means are provided for varying the heightwise positions of these overlaying devices, relatively to the shoe support, and also for varying the force of the yielding pressure applied by these devices as they wipe the upper materials inwardly over the insole. In addition, means are provided for locking these overlaying devices against yielding movement during the subsequent operation of the fastening-inserting mechanism. The herein illustrated machine also has a fastening-distributing mechanism for supplying fastenings, i. e., tacks, to the overlaying and fastening-inserting devices and certain other novel aspects of this invention are to be recognized in particular features of this fastening-distributing mechanism.

The above and other objects and features of the invention will appear in the following detailed description of the preferred embodiment of the invention which is illustrated in the accompanying drawings and will be pointed out in the claims.

Figure 2:
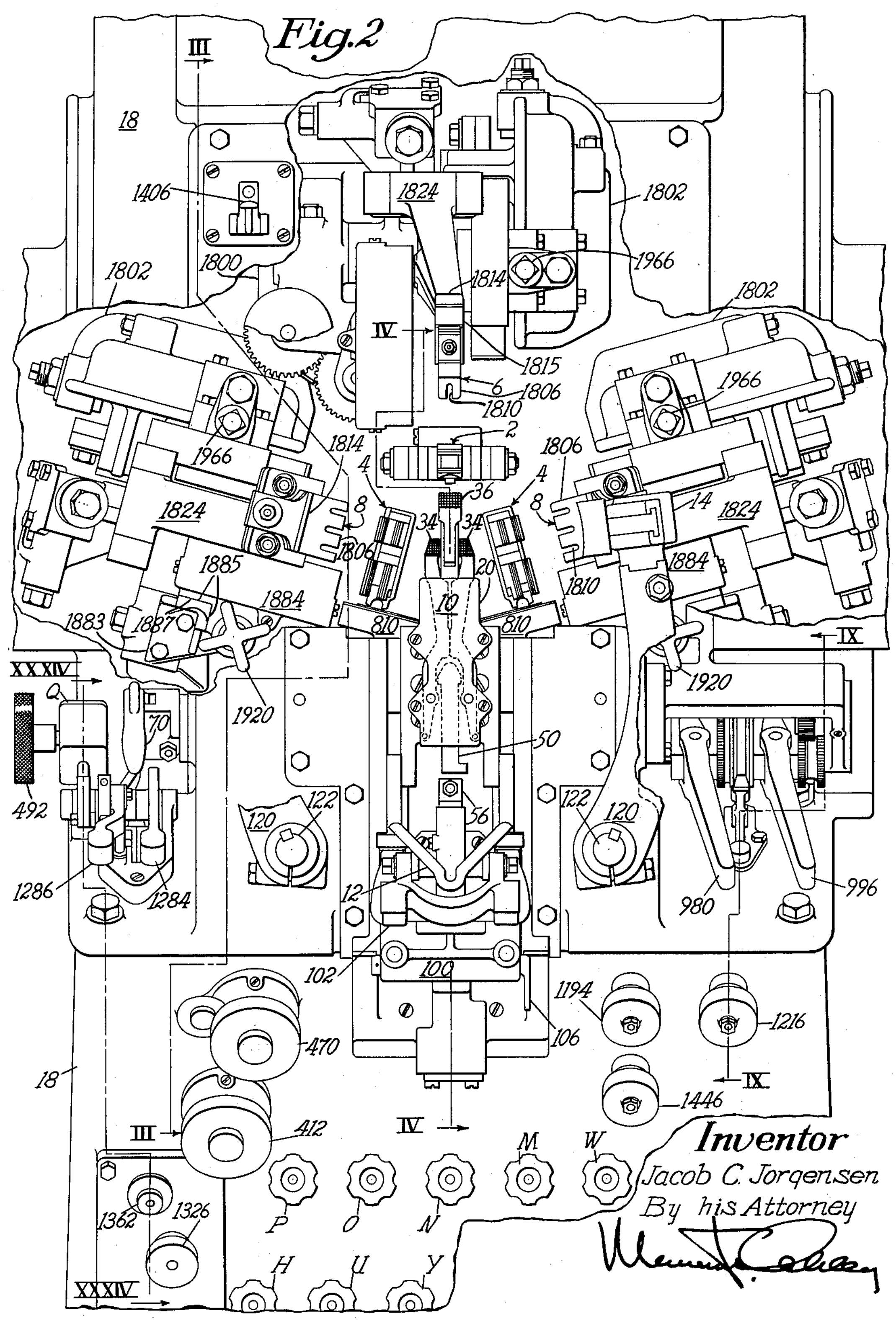
Fig. 2 is a view of a portion of the machine illustrated in Fig. 1 and showing the operating elements of the machine as viewed in plan.
Figure 23:
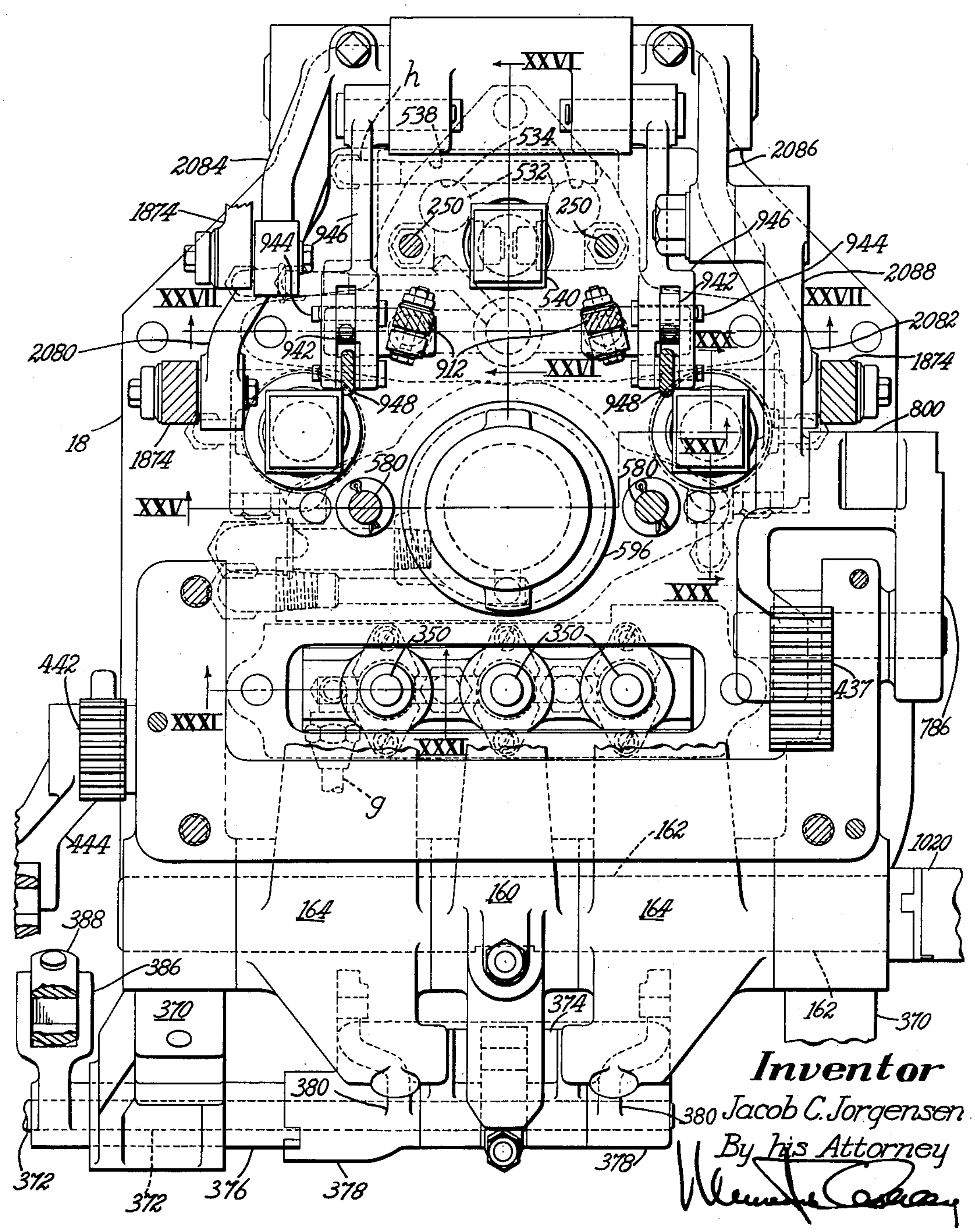
Fig. 23 is a view of certain of the operating parts of the machine as viewed on a plane parallel to, but somewhat below, the plane indicated by line XXII—XXII of Fig. 3 and with these operating parts shown at an enlarged scale.
Figures 24, 32, 33:
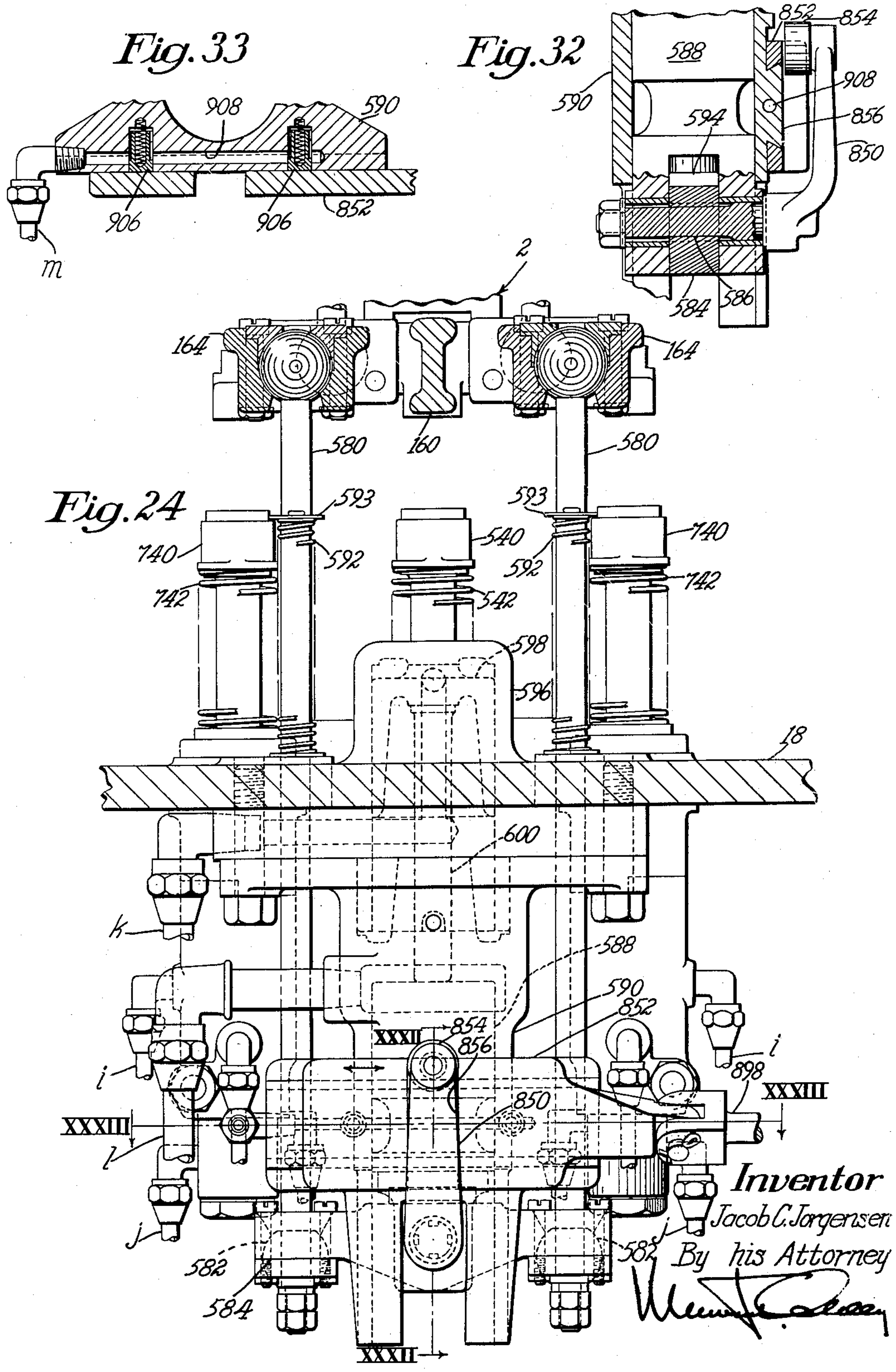
Fig. 24 is a view of another portion of the machine as seen from a plane indicated by line XXIV—XXIV of Fig. 3 and looking in the direction of the arrows.
Figures 25, 30, 31:
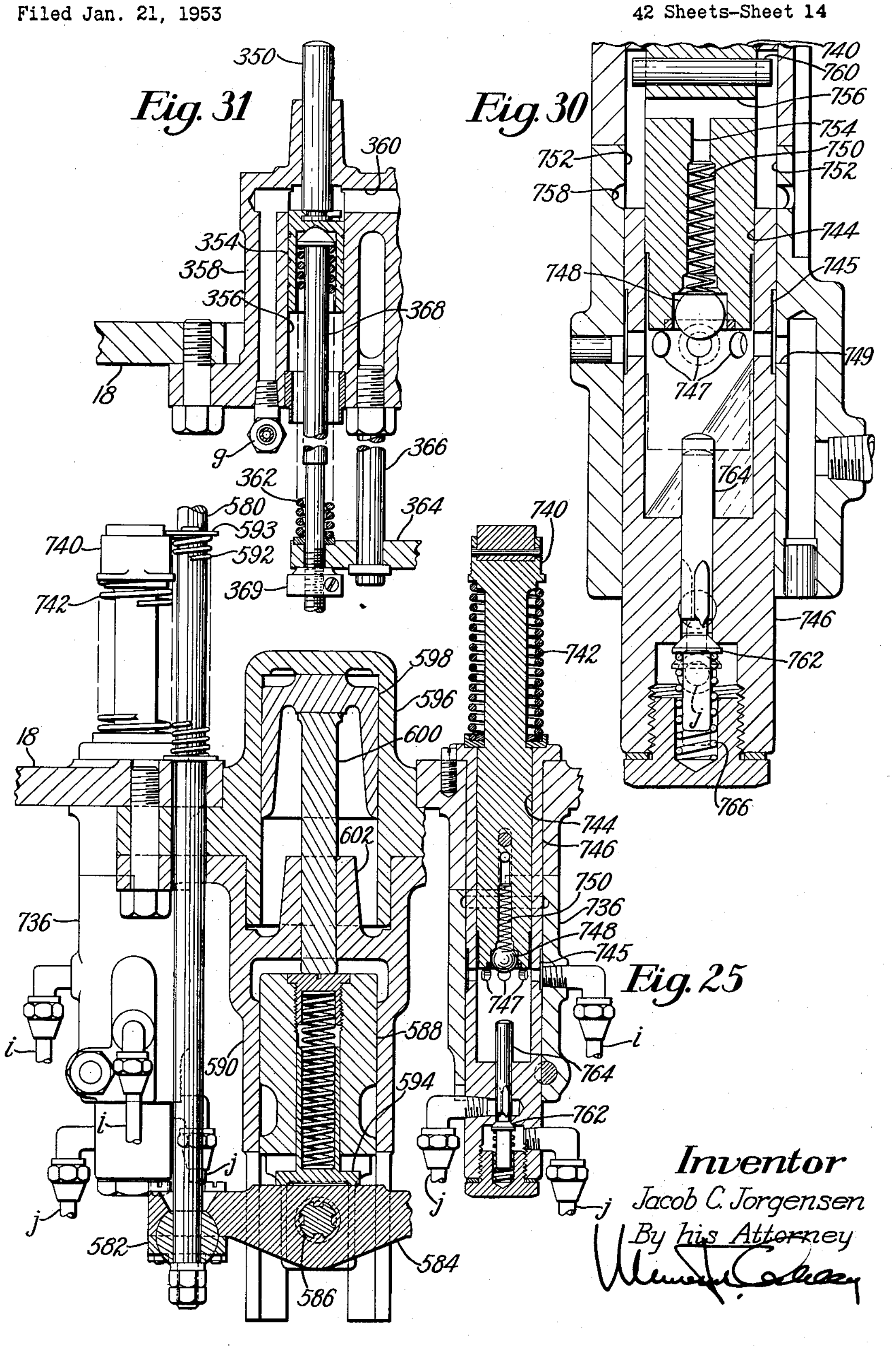
Fig. 25 is a view of that portion of the machine which is illustrated in Fig. 24 with the parts in section substantially on line XXV—XXV of Fig. 23 and looking in the direction of the arrows.
Figures 26, 27, 28, 29:
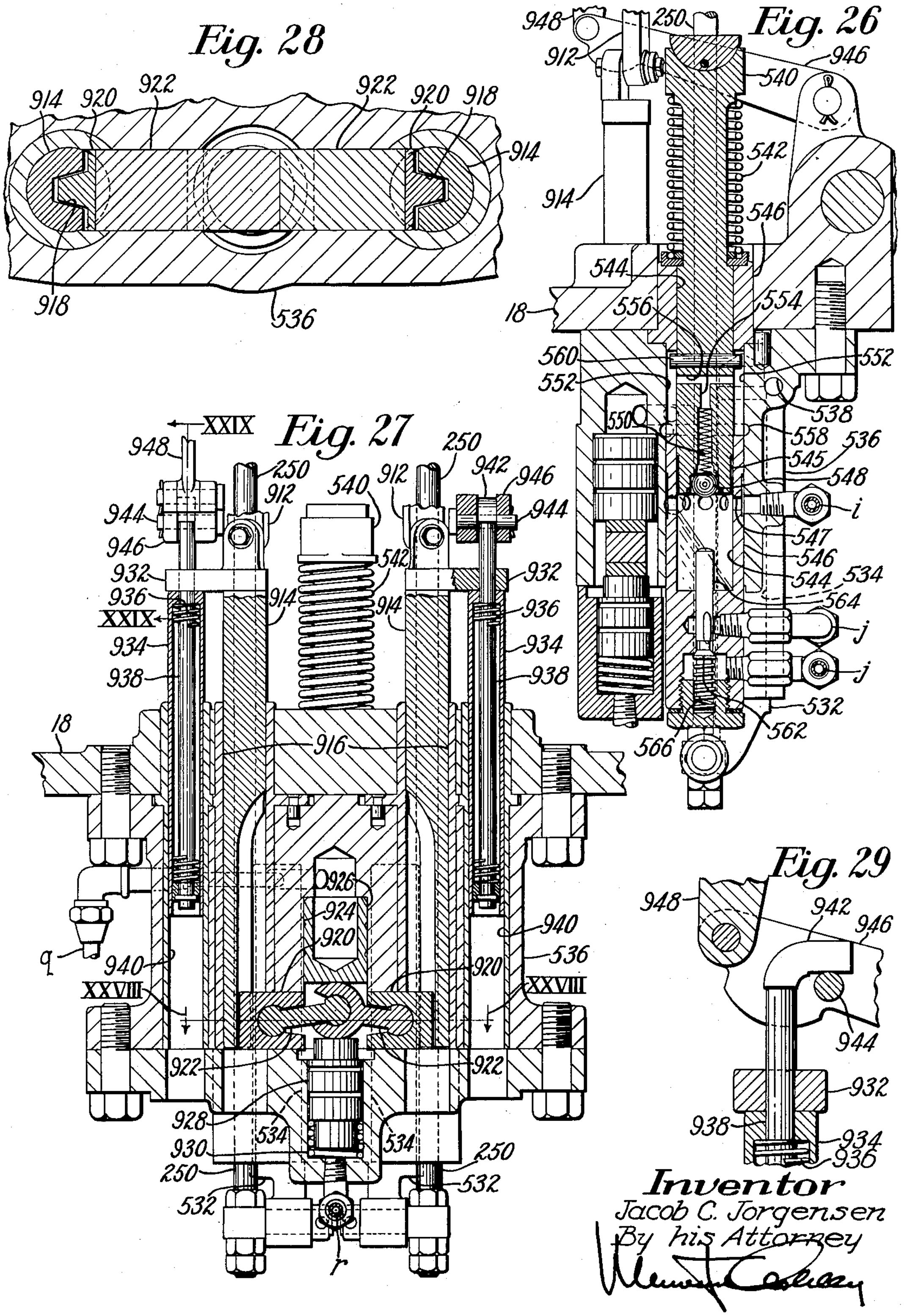
Fig. 26 is a view in section, substantially on line XXVI—XXVI of Fig. 23 and looking in the direction of the arrows.
Fig. 27 is a view in section, substantially on line
Figure 34:
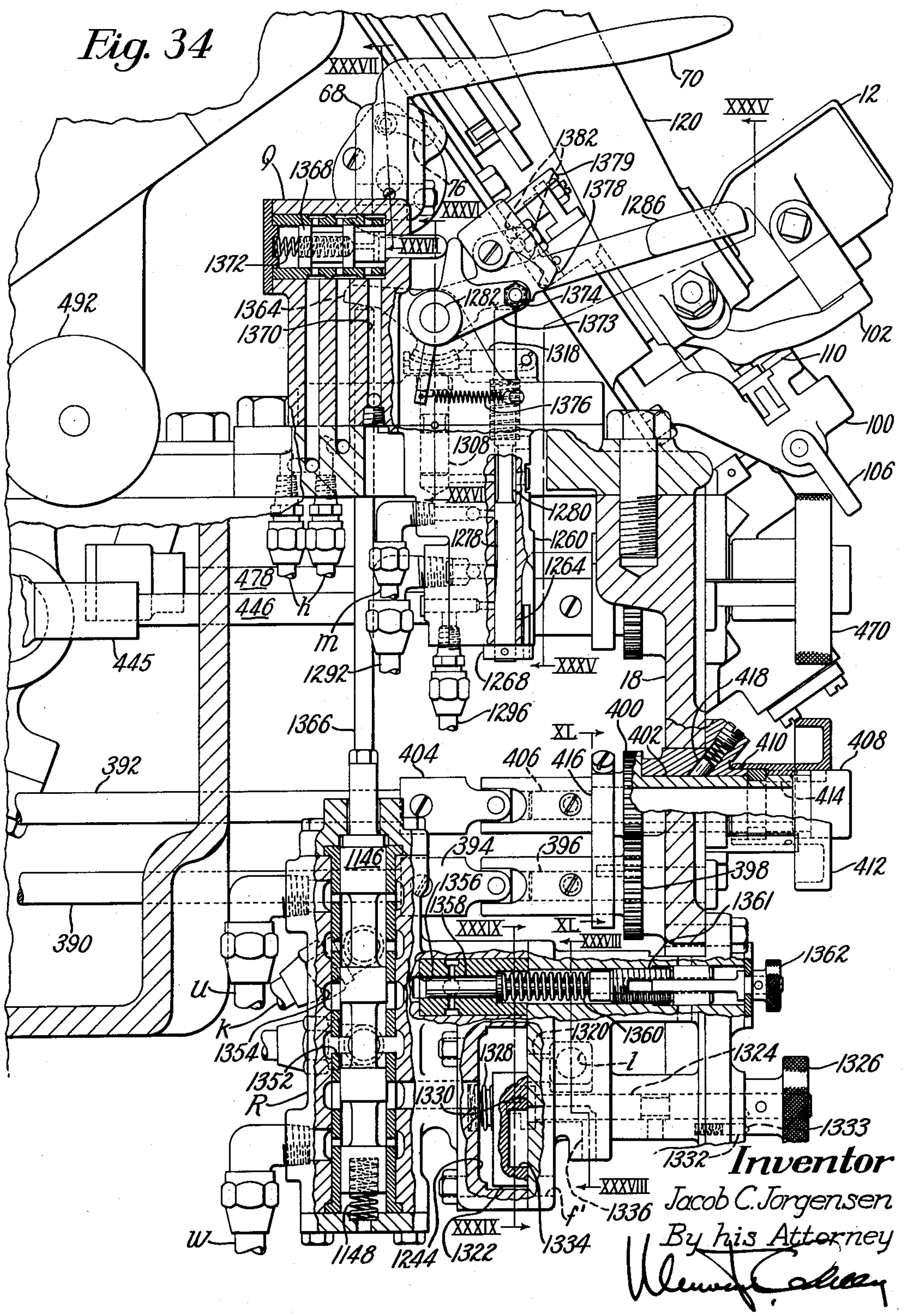
Figure 35:
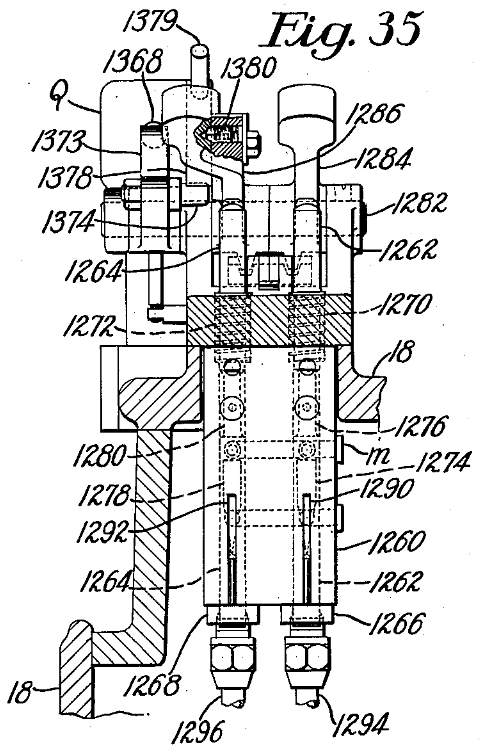
Figure 36:
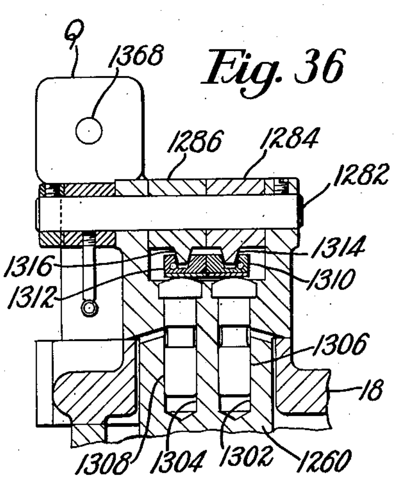
Figure 37:
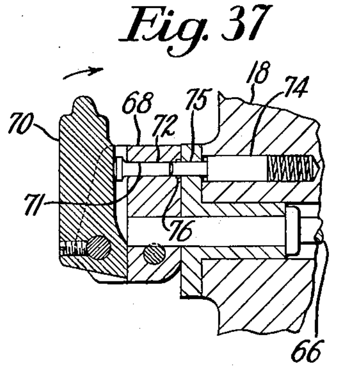
Figure 38:
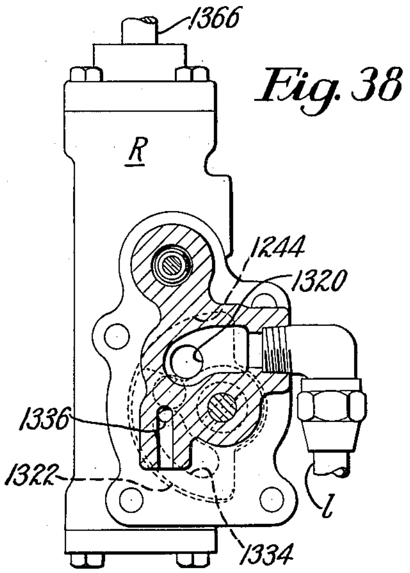
Figure 39:
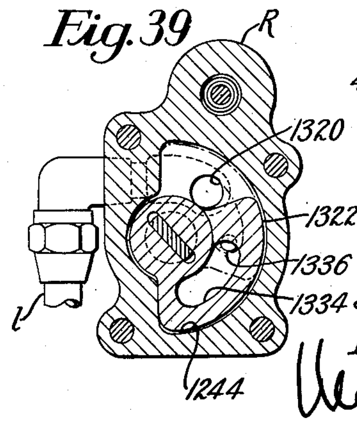
Figure 40:
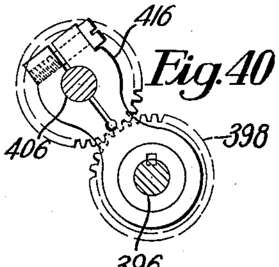
Figure 41:
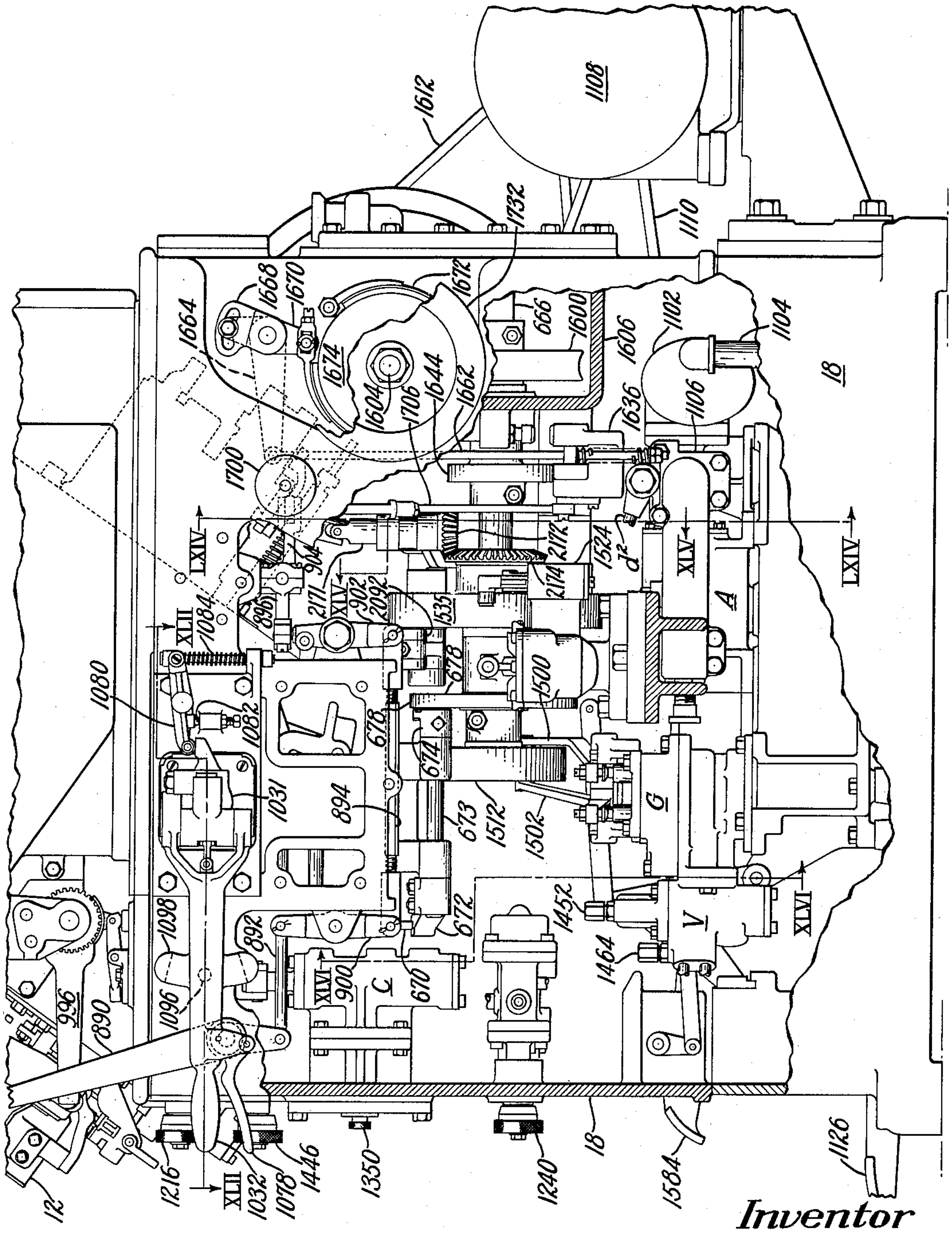
Figures 42, 43, 44:
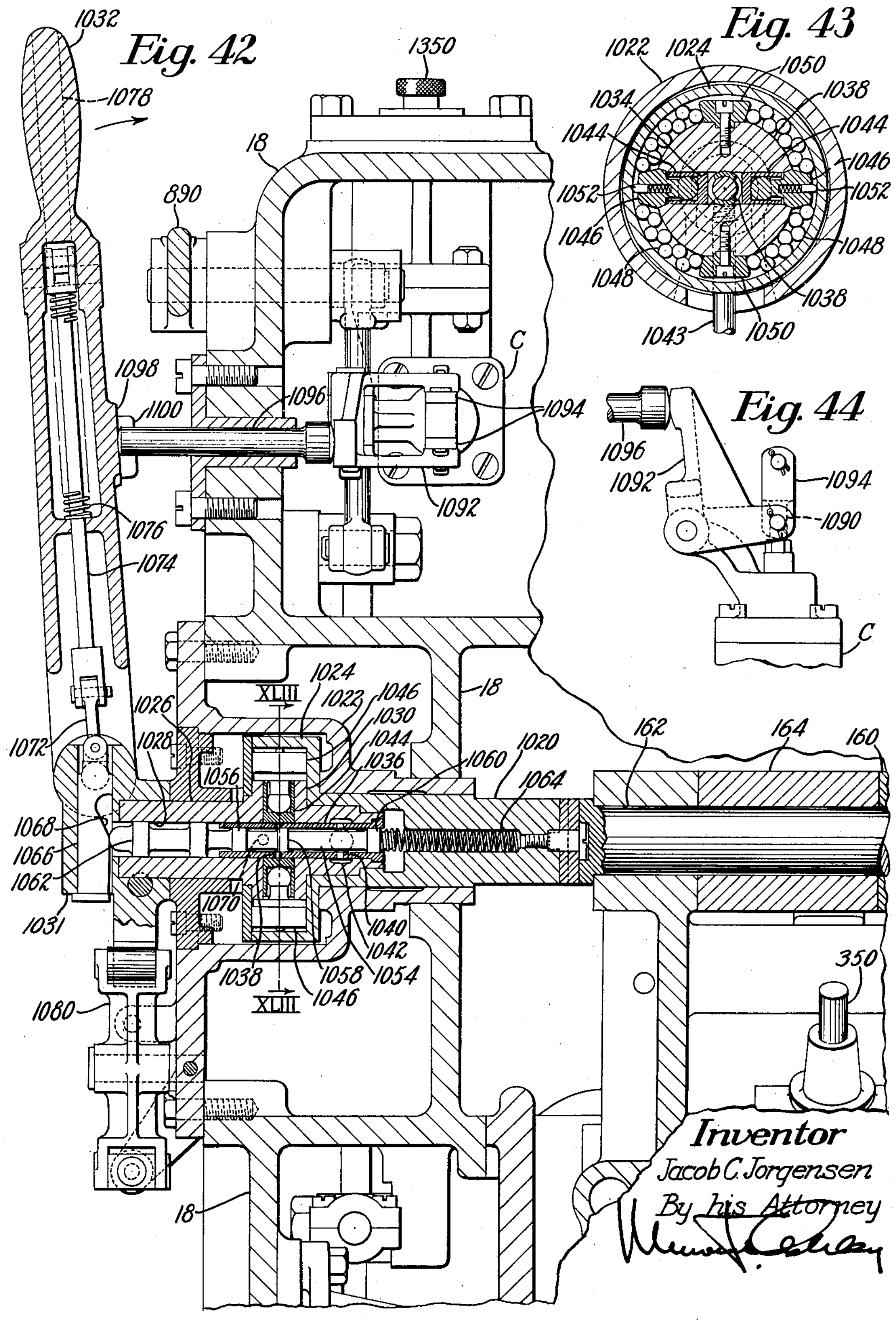
Figure 45:
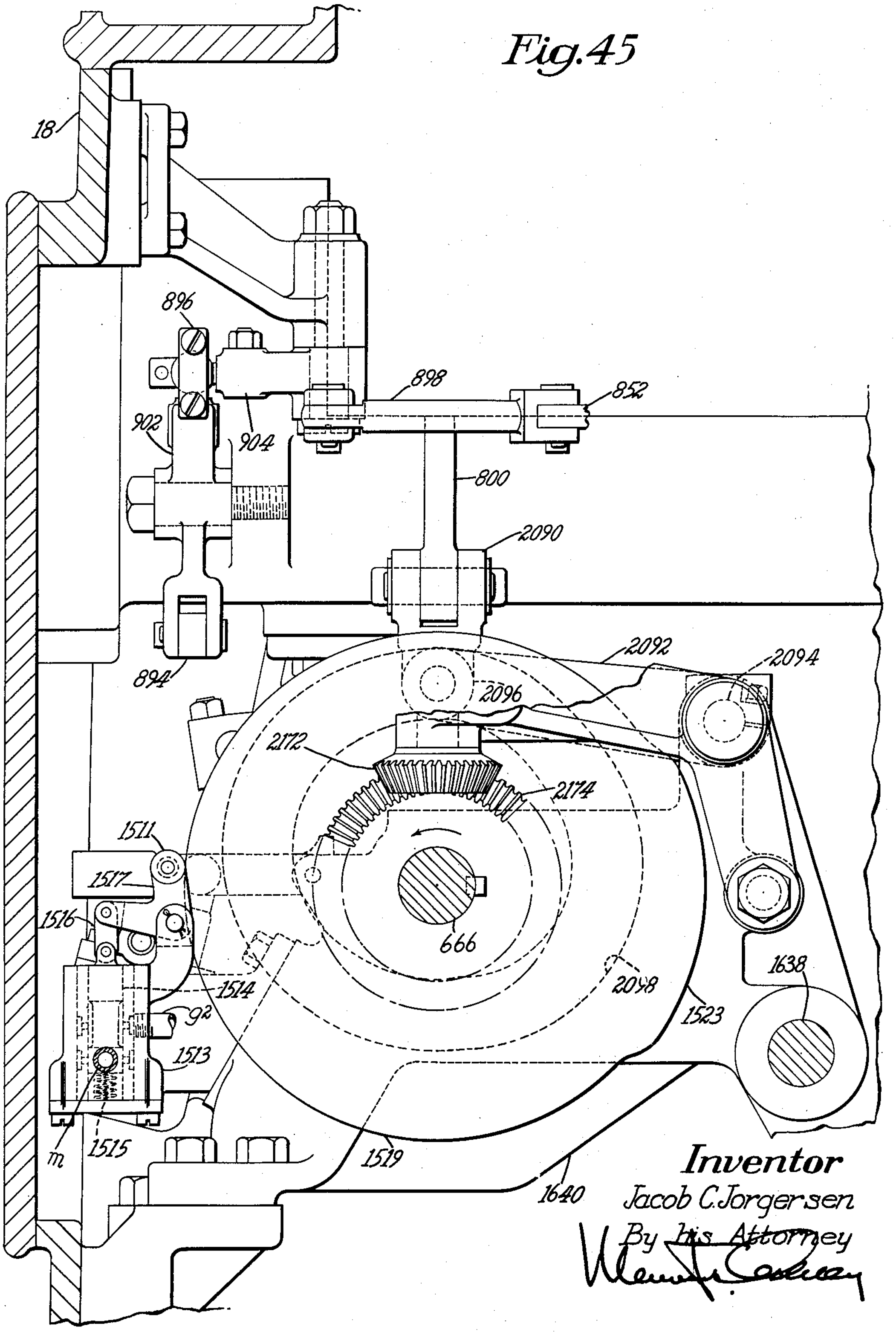
Figures 46, 47:
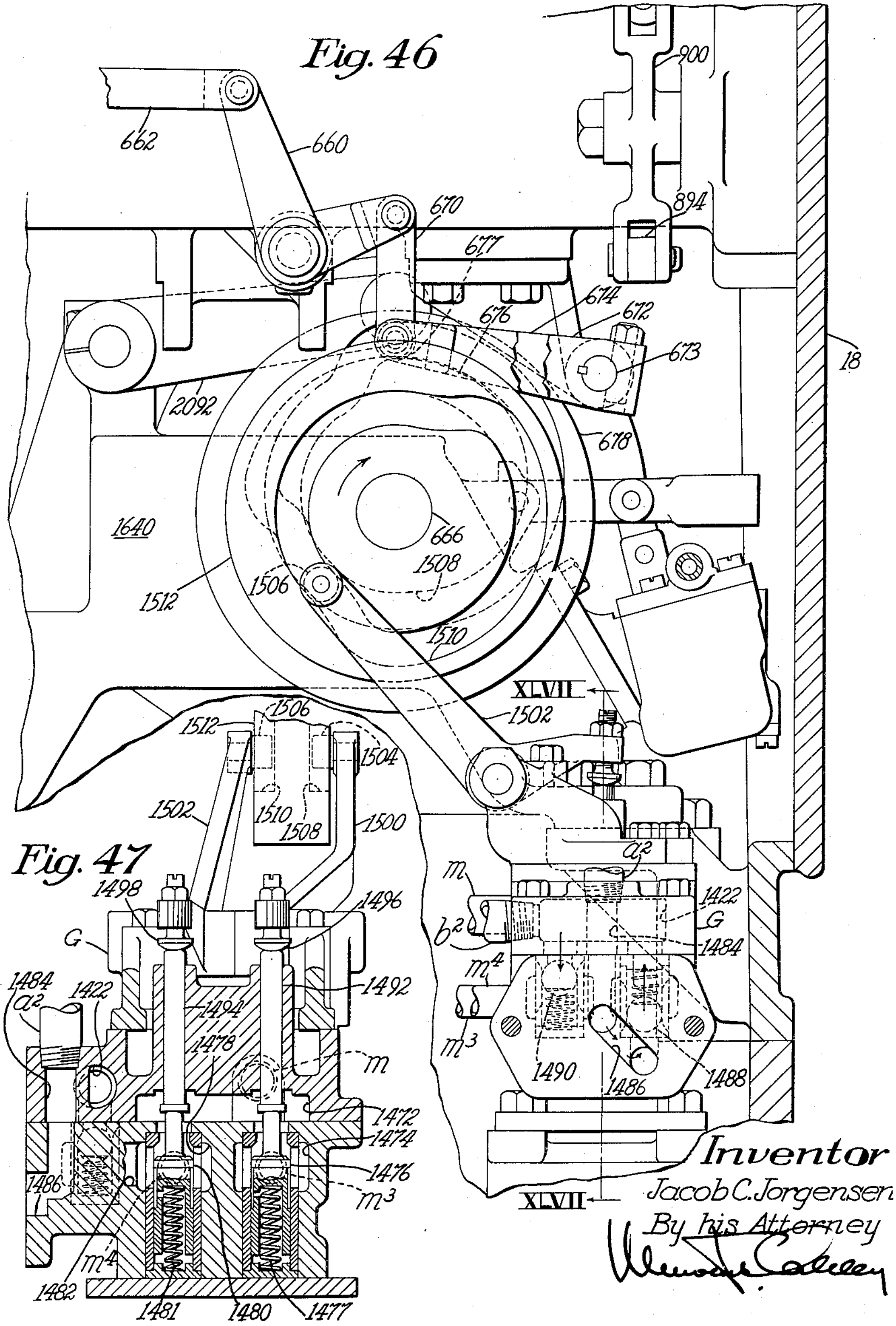
Figure 48:
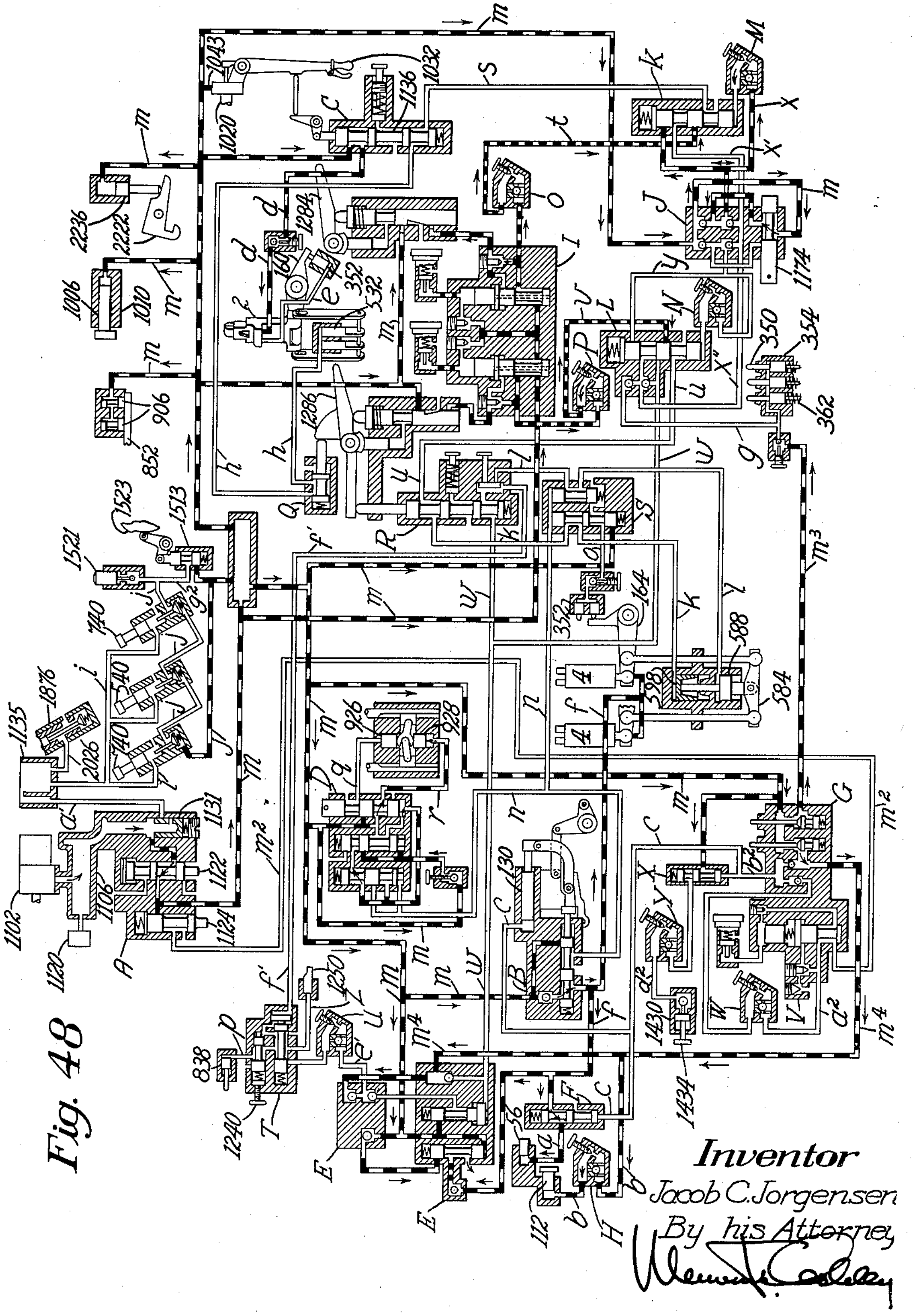
Figure 49:
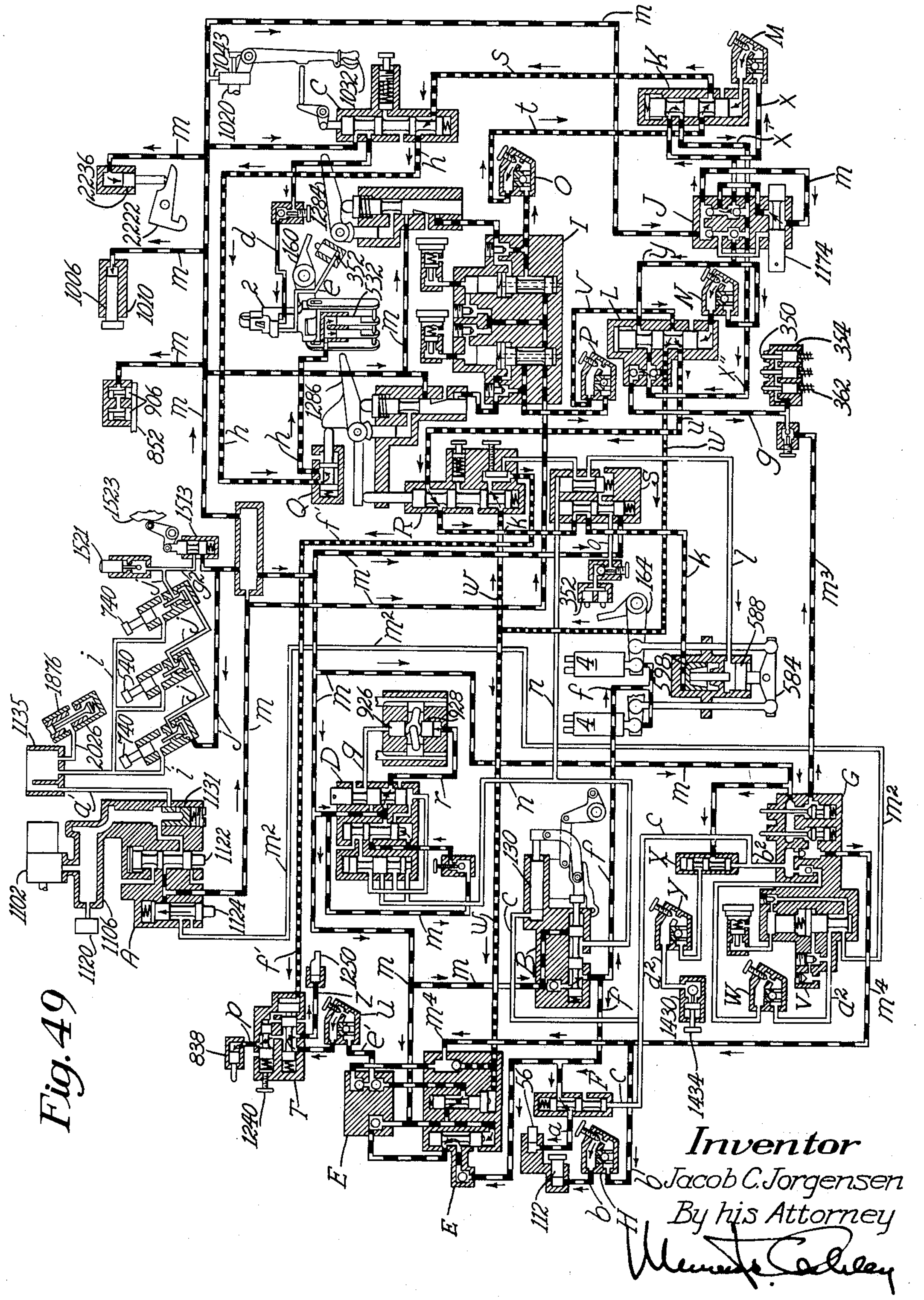
Figure 50:
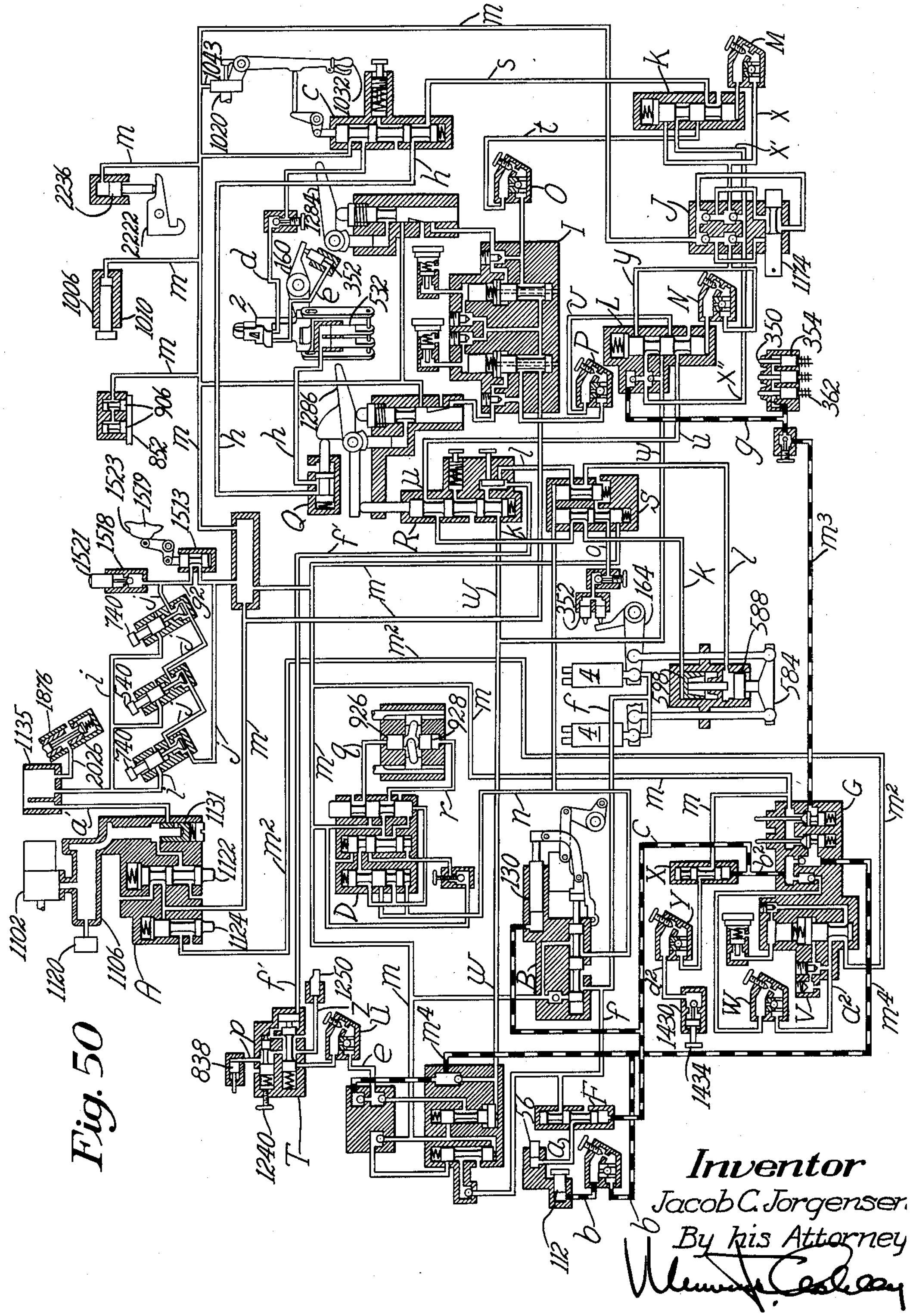
Figure 51:
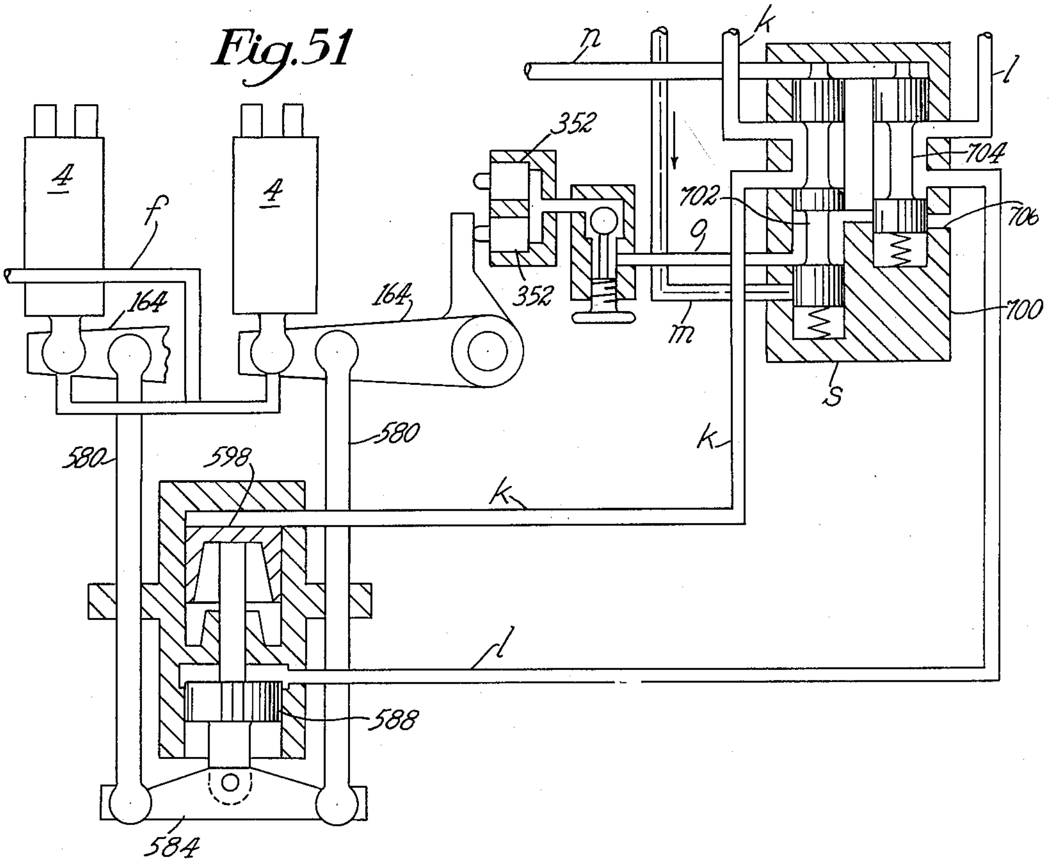
Figure 52:
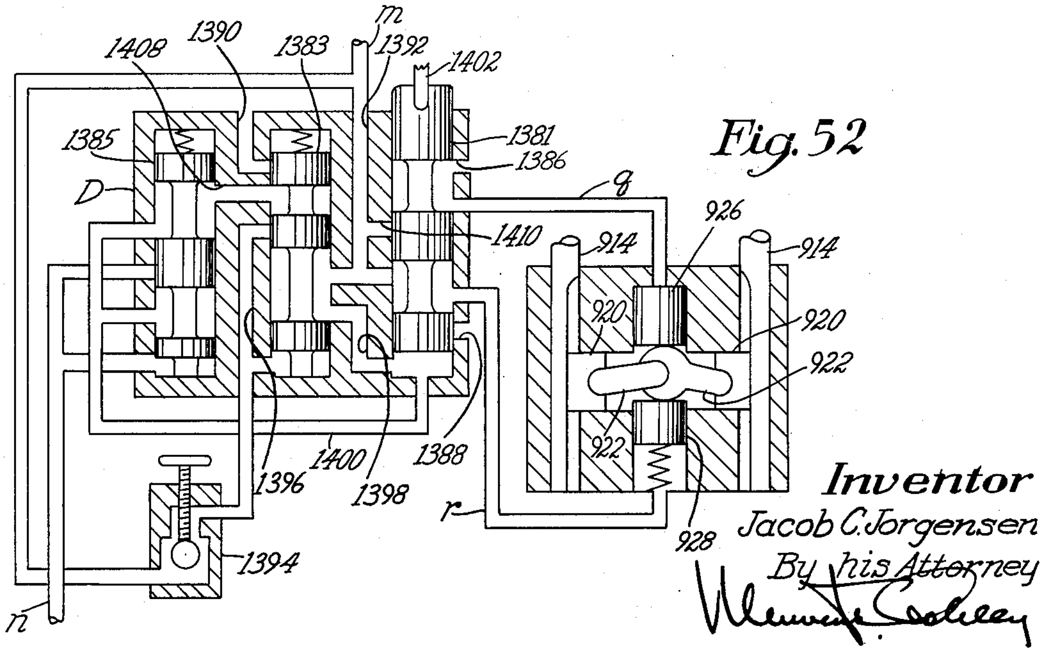
Figure 53:
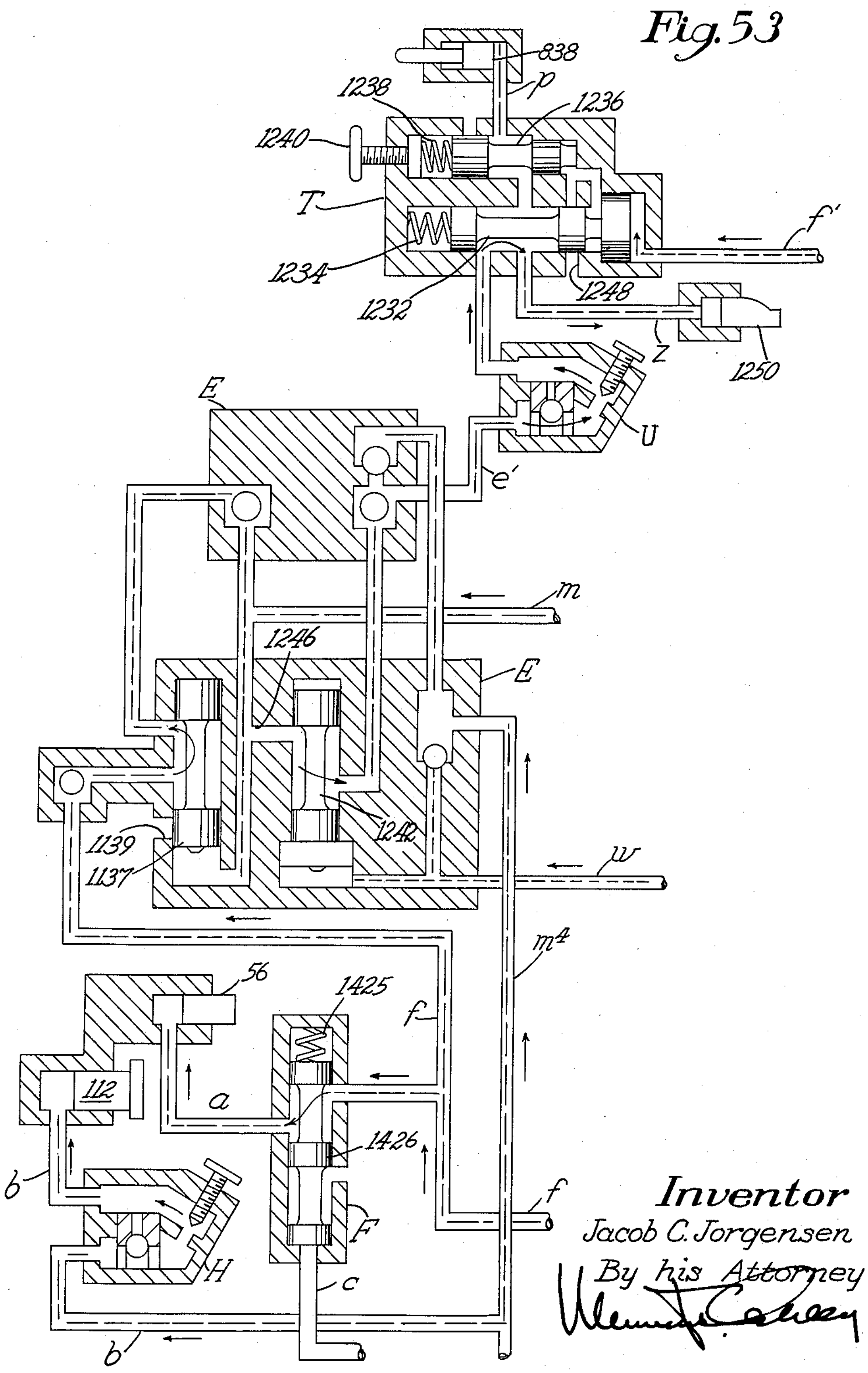
Figure 58:
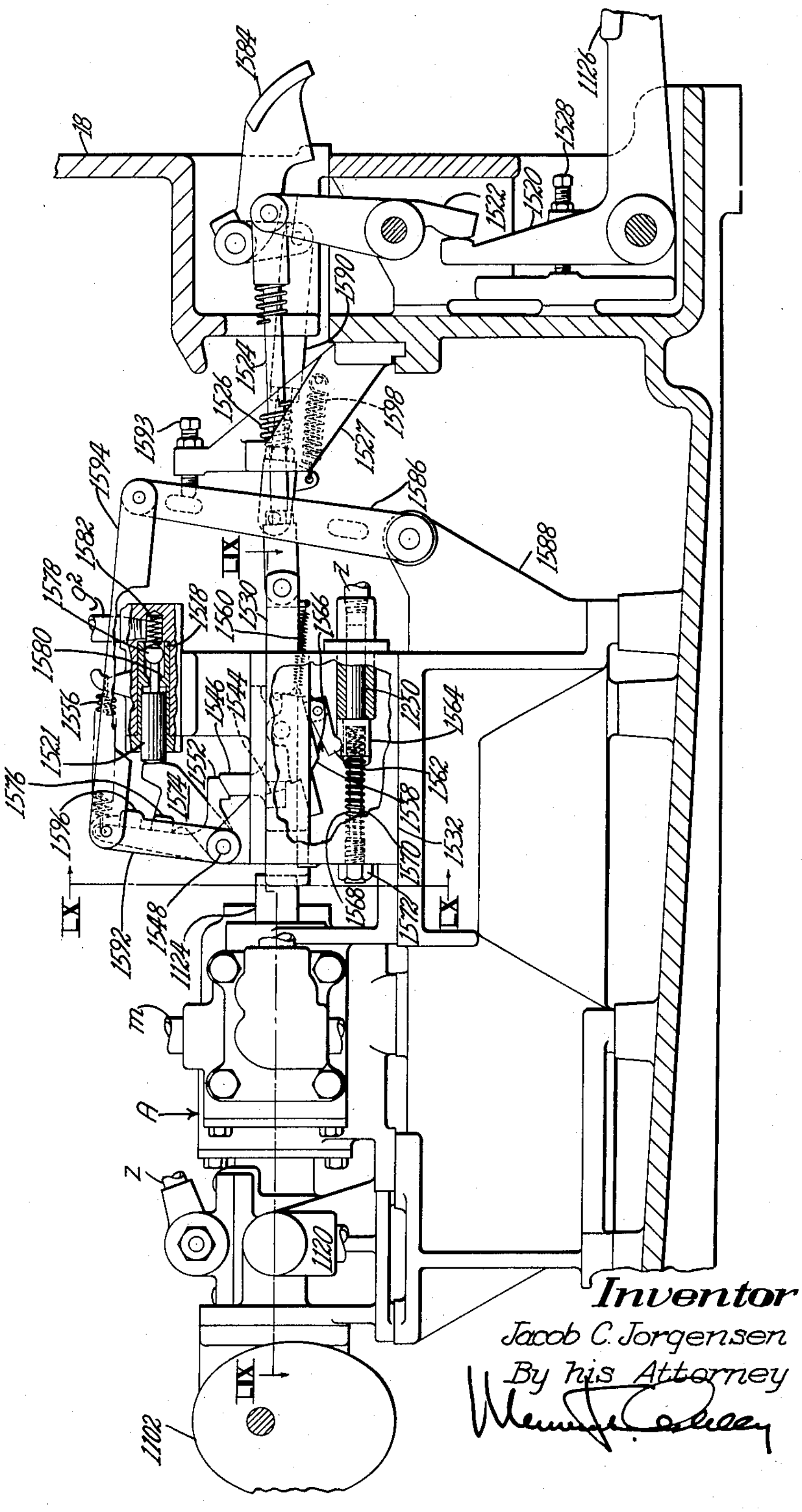
Figures 59, 60, 61, 62, 63:
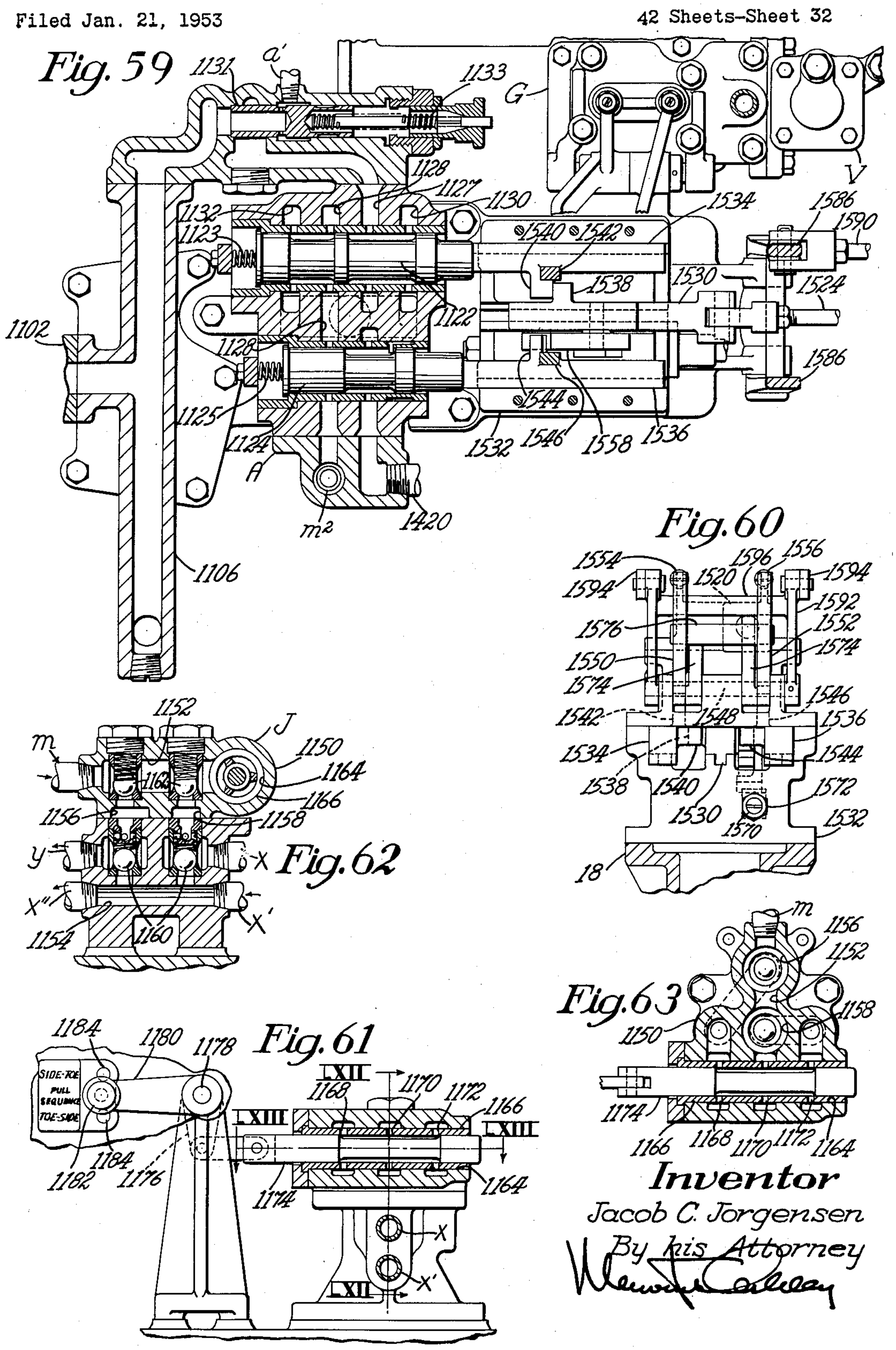
Figure 64:
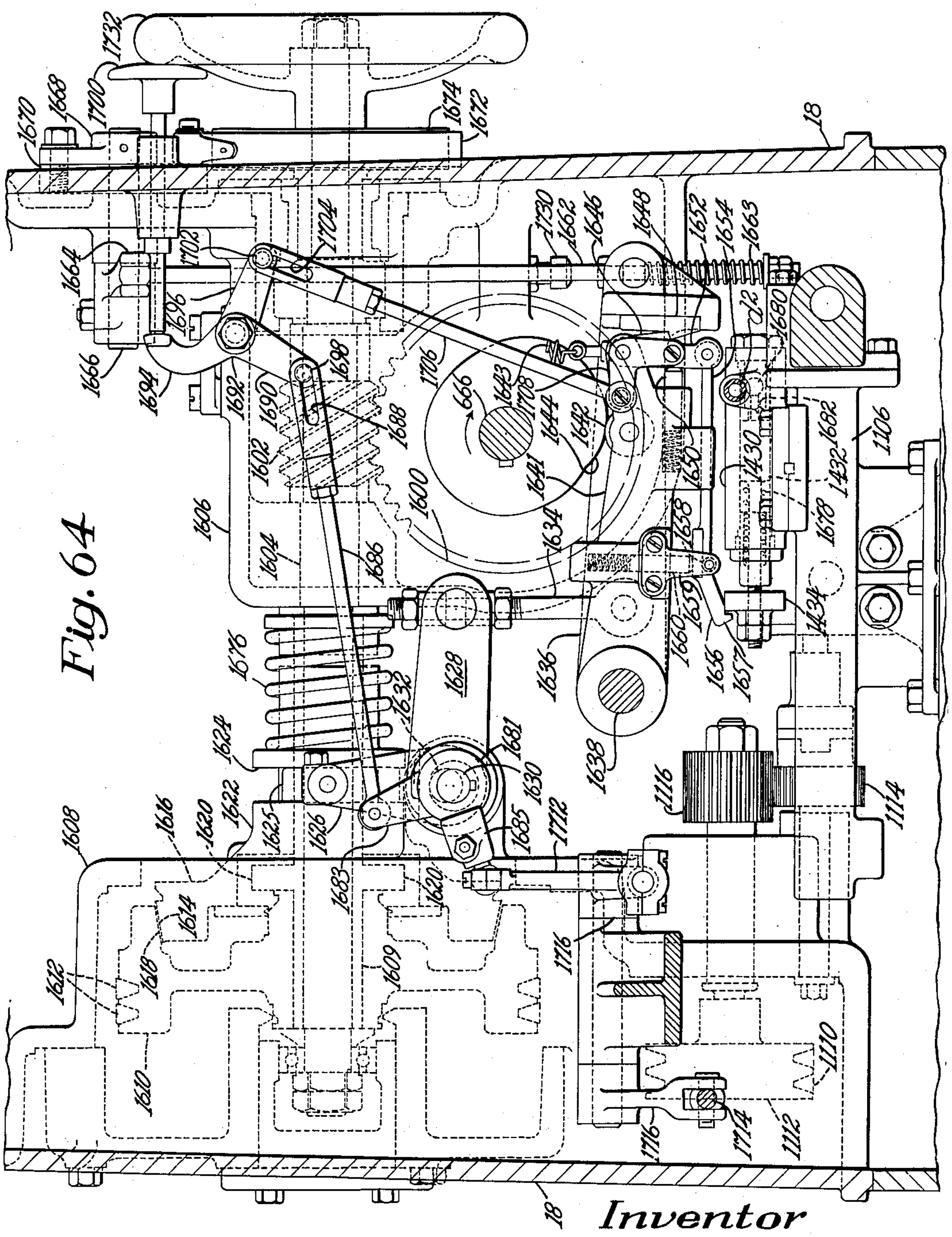
Figure 65:
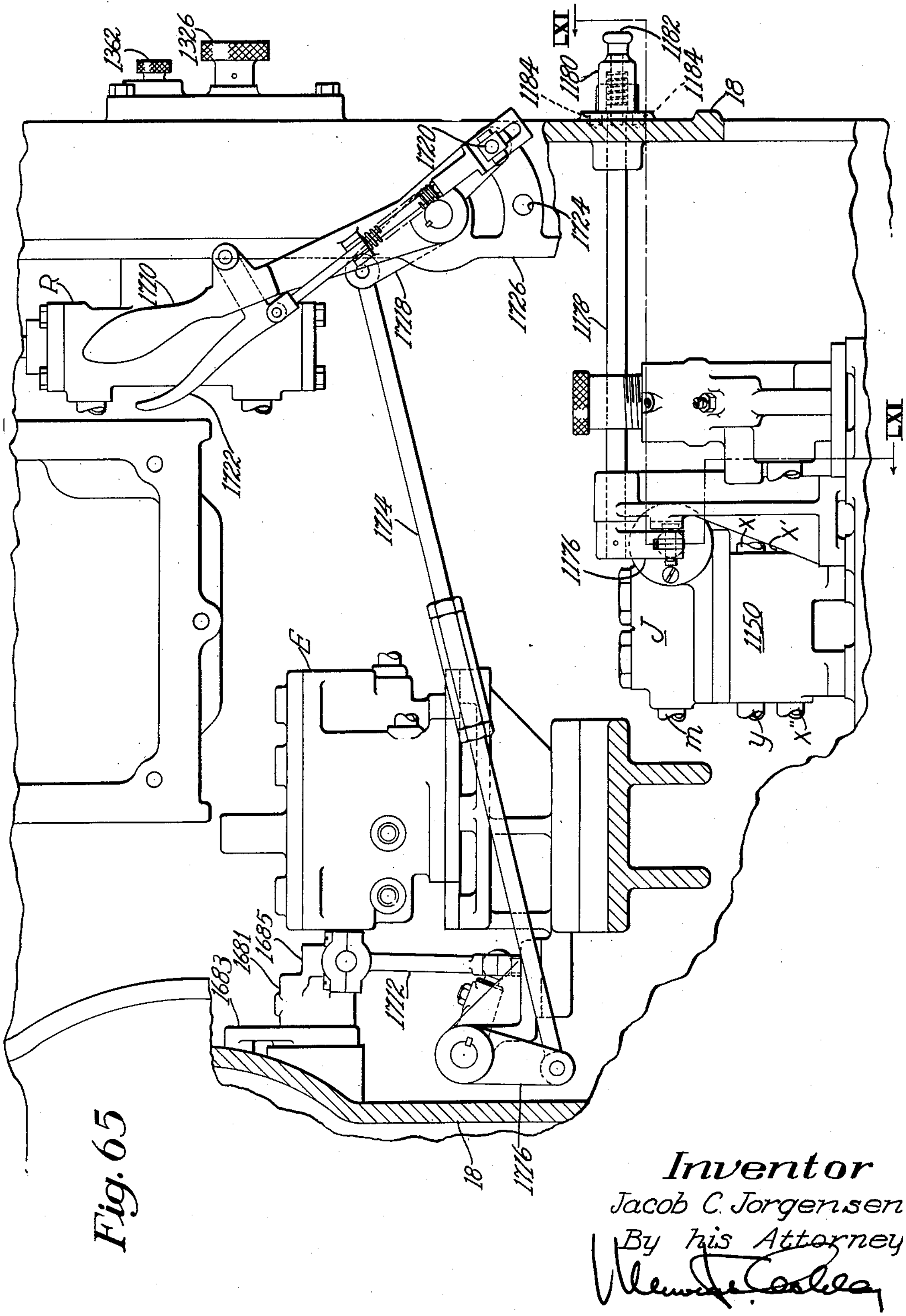
Figure 66:
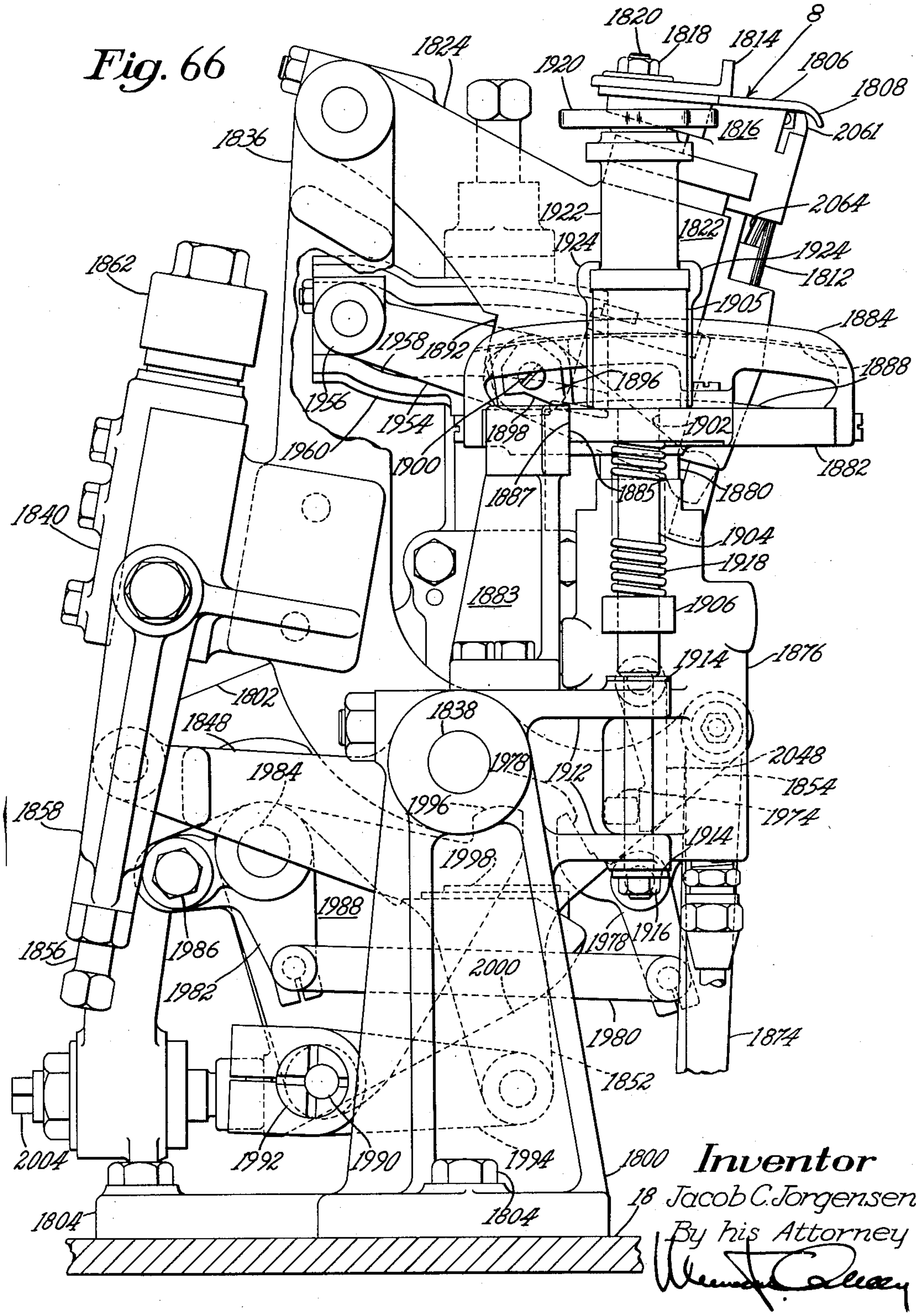
Figure 67:
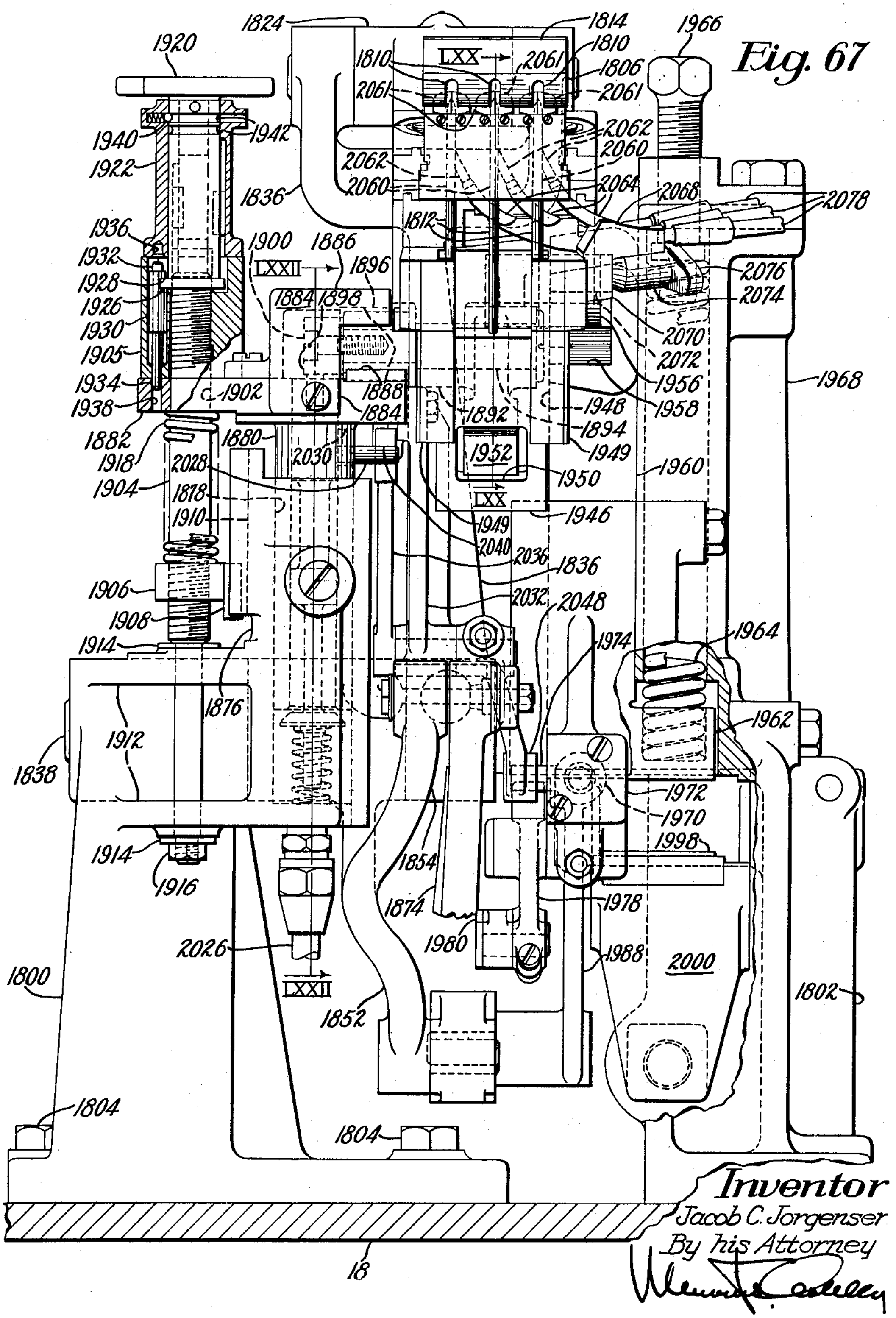
Figure 68:
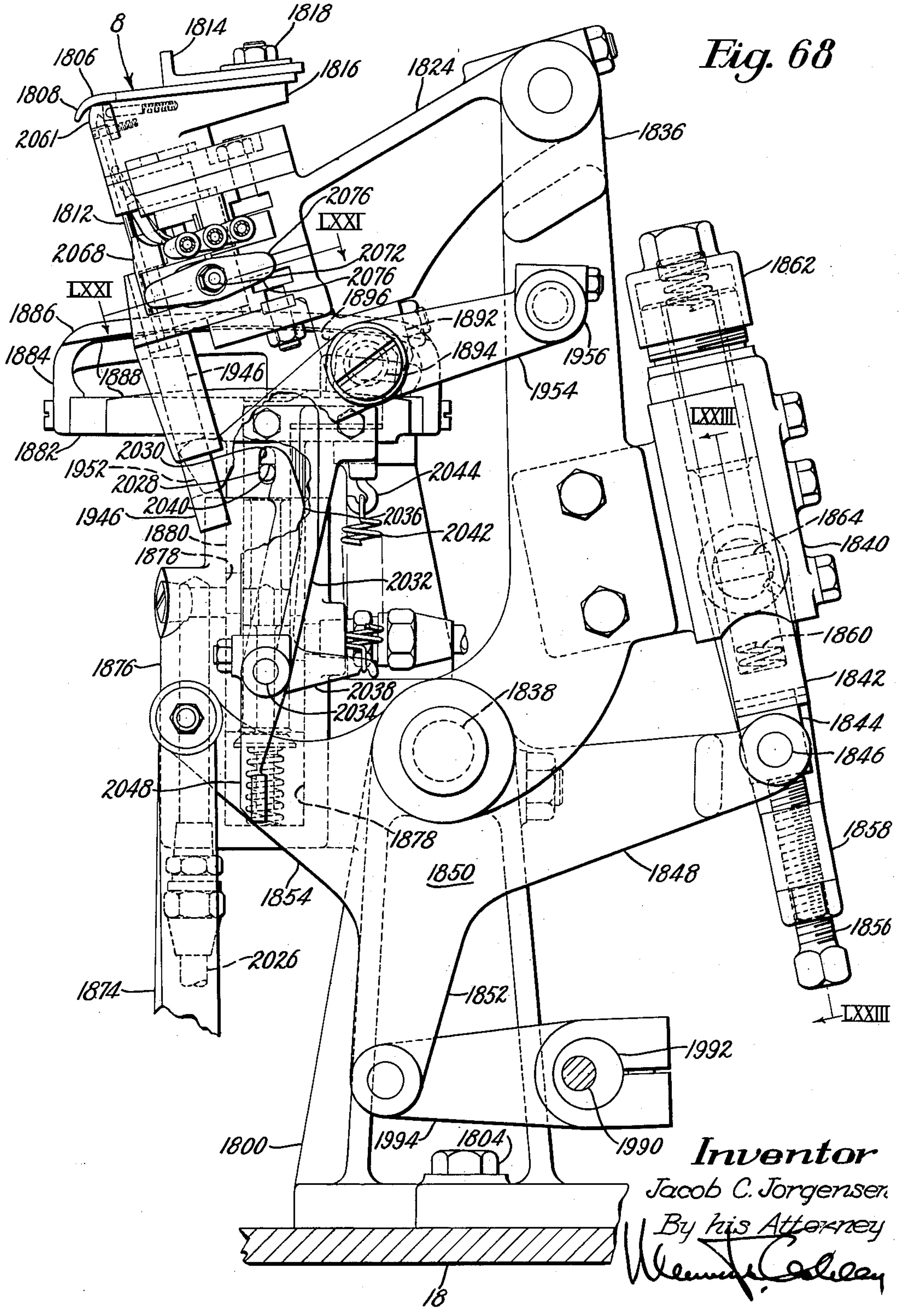
Figure 69:
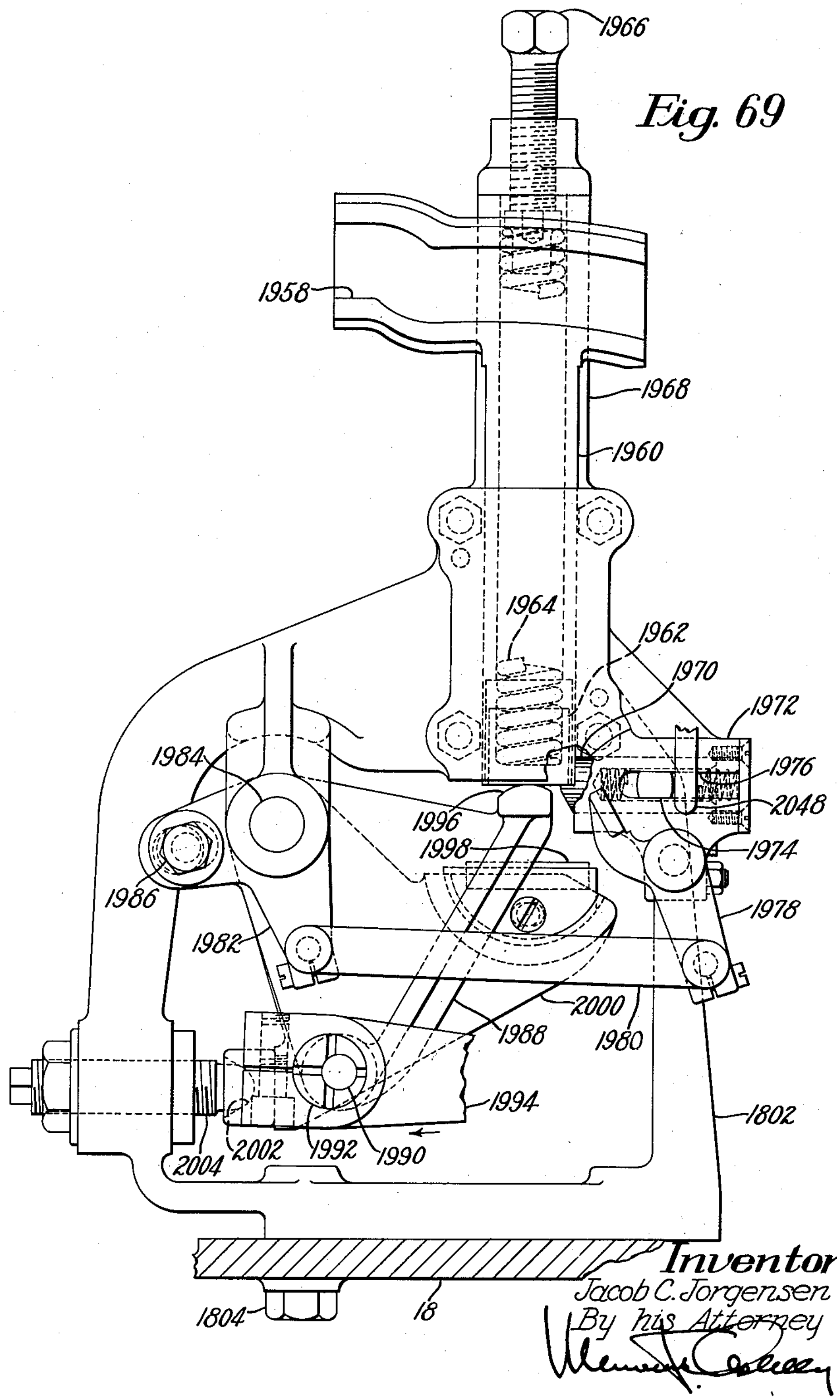
Figures 70, 71, 72, 73:
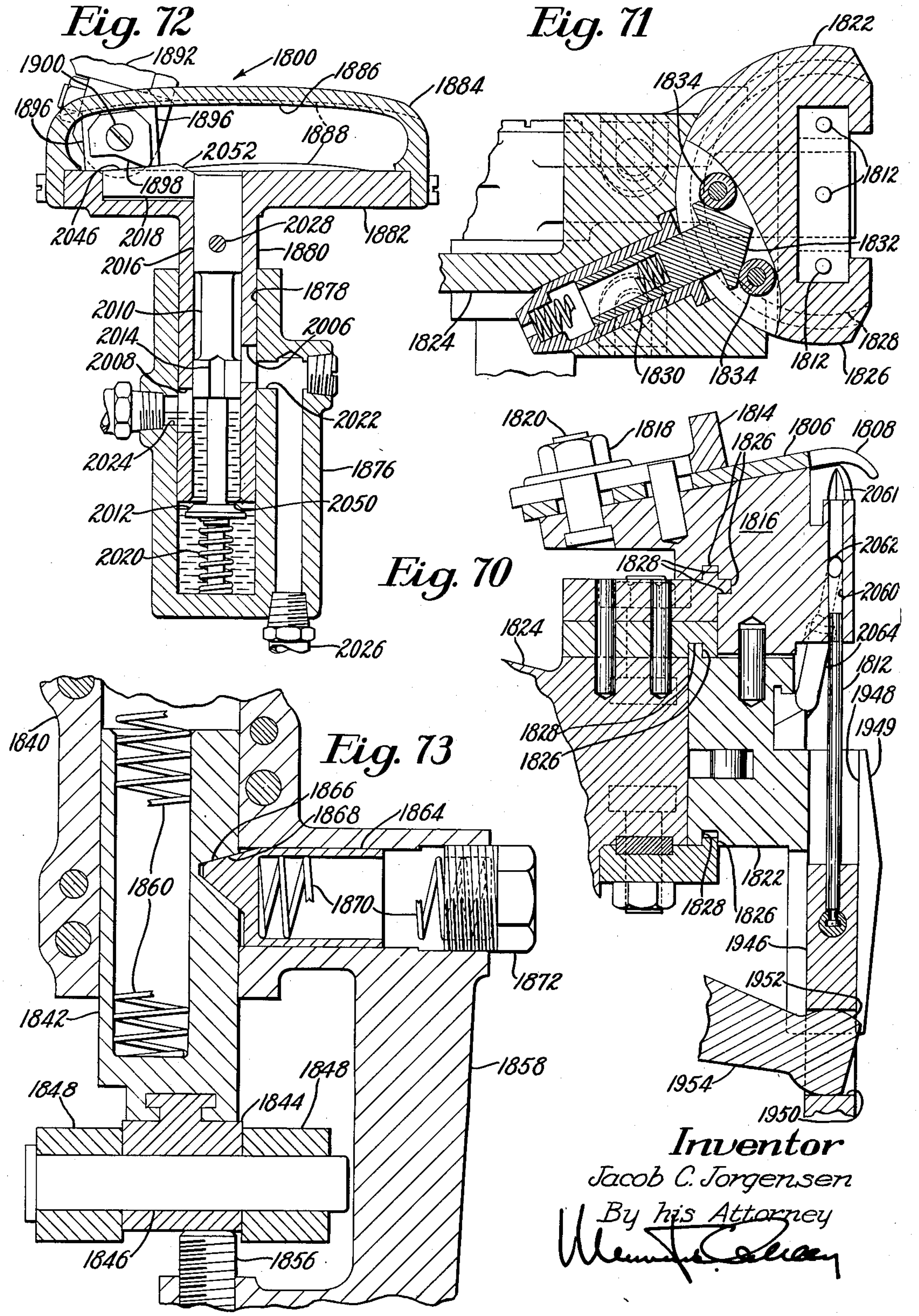
Figures 74, 77:
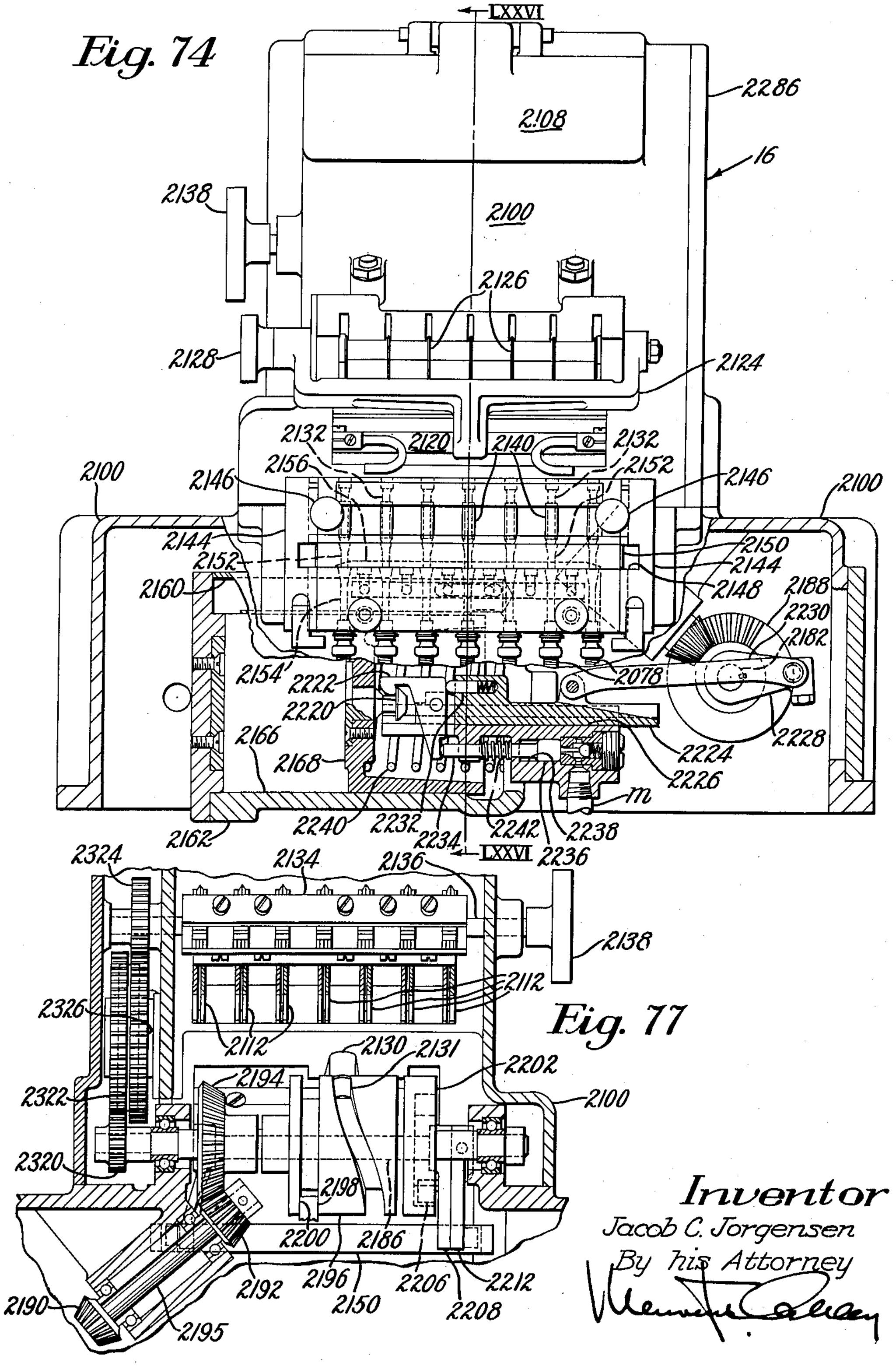
Figures 75, 80:
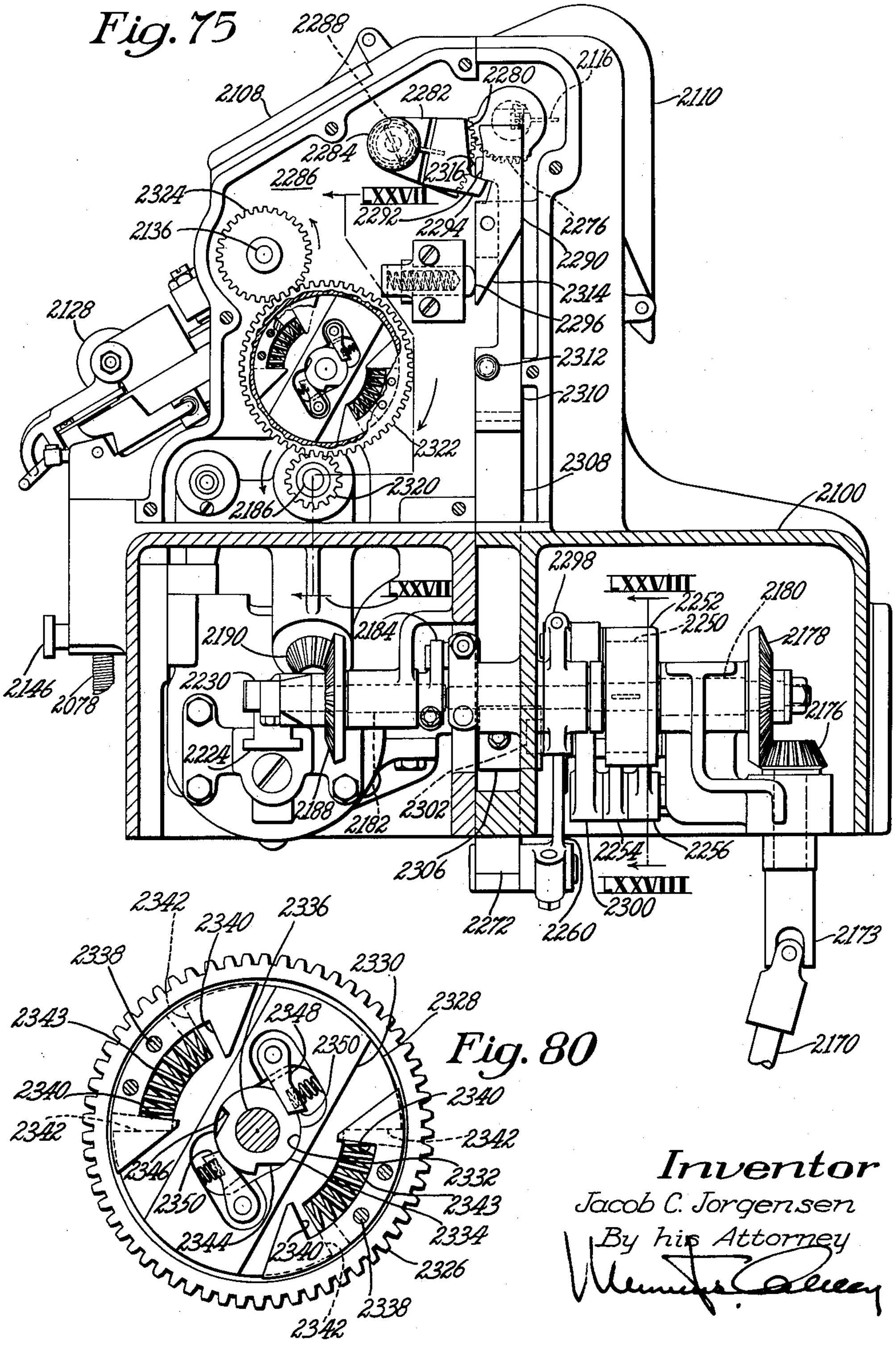
Figures 76, 78, 79:
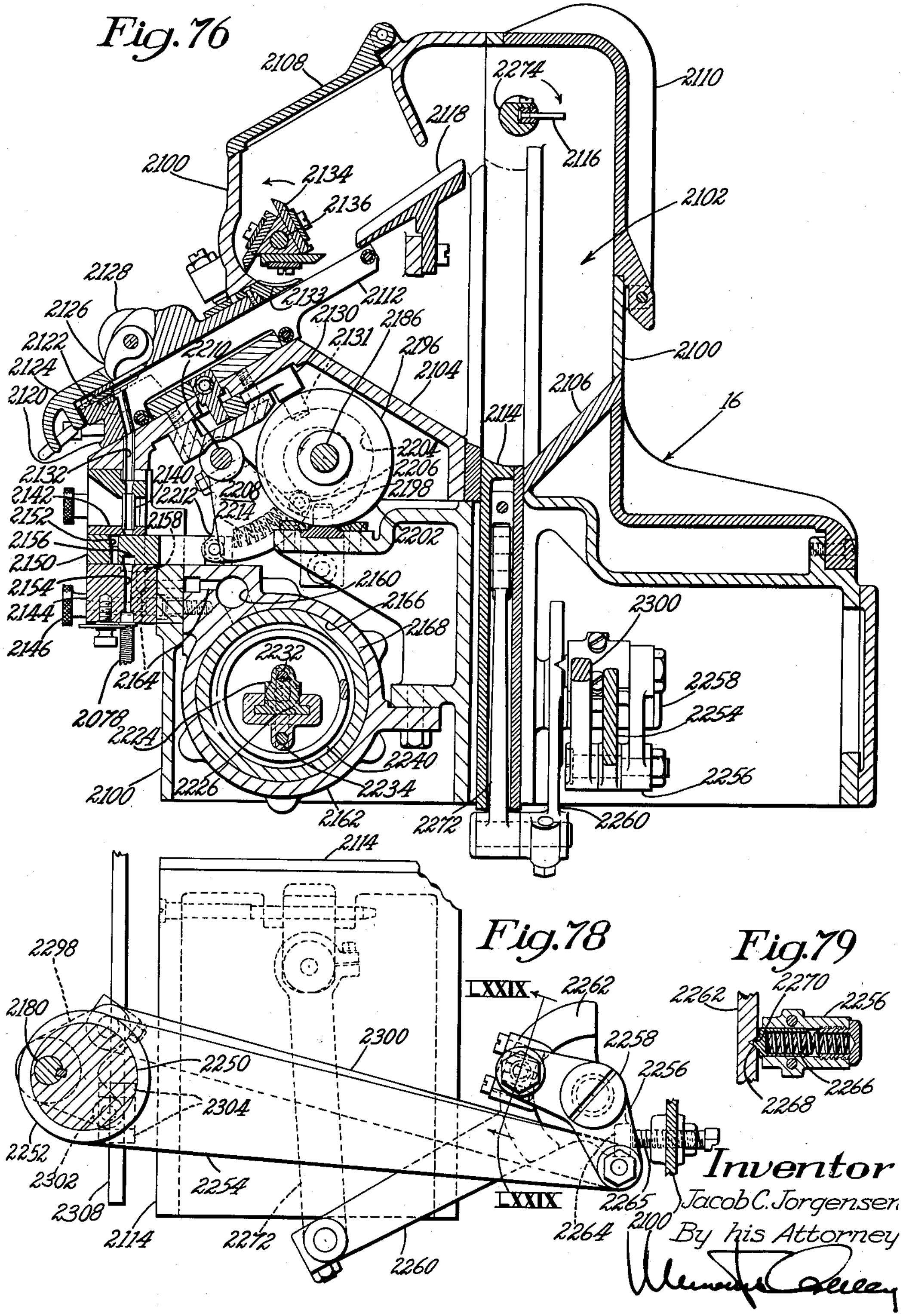

XXVII—XXVII of Fig. 23 and looking in the direction of the arrows;

Fig. 28 is a view in section, substantially on line XXVIII—XXVIII of Fig. 27 looking in the direction of the arrows;

Fig. 29 is a view in section, substantially on line XXIX—XXIX of Fig. 27 and looking in the direction of the arrows;

Fig. 30 is a view in section, substantially on line XXX—XXX of Fig. 23 and looking in the direction of the arrows;

Fig. 31 is a view in section, substantially on line XXXI—XXXI of Fig. 23 and looking in the direction of the arrows;

Fig. 32 is a view in section, substantially on line XXXII—XXXII of Fig. 24 and looking in the direction of the arrows;

Fig. 33 is a view in section, substantially on line XXXIII—XXXIII of Fig. 24 and looking in the direction of the arrows;

Fig. 34 is a view of another portion of the machine in section, substantially on line XXXIV—XXXIV of Fig. 2 and looking in the direction of the arrows;

Fig. 35 is a view in section, substantially on line XXXV—XXXV of Fig. 34 and looking in the direction of the arrows;

Fig. 36 is a view in section substantially on line XXXVI—XXXVI of Fig. 34 and looking in the direction of the arrows;

Fig. 37 is a view in section, substantially on line XXXVII—XXXVII of Fig. 34 and looking in the direction of the arrows;

Fig. 38 is a view in section, substantially on line XXXVIII—XXXVIII of Fig. 34 and looking in the direction of the arrows;

Fig. 39 is a view section, substantially on the line XXXIX—XXXIX of Fig. 34 looking in the direction of the arrows;

Fig. 40 is a view in section, substantially on line XL—XL of Fig. 34 and looking in the direction of the arrows;

Fig. 41 is a view in side elevation of the lower portion of the right-hand side of the machine with a part of the frame construction broken away;

Fig. 42 is a view at an enlarged scale and in section, substantially on line XLII—XLII of Fig. 41 and looking in the direction of the arrows;

Fig. 43 is a view in section substantially on line XLIII—XLIII of Fig. 42 and looking in the direction of the arrows;

Fig. 44 is a view in elevation of a portion of the mechanism that is shown in Fig. 42;

Fig. 45 is a view of a portion of the machine shown in section, substantially on line XLV—XLV of Fig. 41 and looking in the direction of the arrows;

Fig. 46 is a view of another portion of the machine shown in section, substantially in line XLVI—XLVI of Fig. 41 and looking in the direction of the arrows;

Fig. 47 is a view in section, substantially on line XLVII—XLVII of Fig. 46 and looking in the direction of the arrows;

Figs. 48, 49 and 50 are schematic drawings showing the various elements of the machine which are actuated by fluid under pressure, together with valves for controlling the operation of these elements;

Figs. 51 to 57 are schematic drawings consisting of different portions of the schematic drawings of Figs. 48, 49 and 50 shown at an enlarged scale, Figs. 51, 54, 56 and 57 corresponding to Fig. 48; Fig. 53 corresponding to Fig. 49; and Figs. 52 and 55 corresponding to Fig. 50;

Fig. 58 is a view in side elevation of mechanism contained within the lower part of the machine frame and associated with an operating treadle;

Fig. 59 is a view in section, substantially on line LIX—LIX of Fig. 58 and looking in the direction of the arrows;

Fig. 60 is a view in section, substantially on line LX—LX of Fig. 58 and looking in the direction of the arrows;

Fig. 61 is a view in section, substantially on line LXI—LXI of Fig. 65 and looking in the direction of the arrows;

Fig. 62 is a view in section substantially on line LXII—LXII of Fig. 61 and looking in the direction of the arrows;

Fig. 63 is a view in section substantially on line LXIII—LXIII of Fig. 61 and looking in the direction of the arrows;

Fig. 64 is a view of still another portion of the machine shown in section substantially on line LXIV—LXIV of Fig. 41 and looking in the direction of the arrows;

Fig. 65 is a view in side elevation of a portion of the machine as viewed from the left-hand side and with a part of the machine frame broken away;

Fig. 66 is a view in side elevation of a wiper-tacker unit forming part of the machine;

Fig. 67 is a view in front elevation of the wiper-tacker unit that is shown in Fig. 66;

Fig. 68 is a view in side elevation of the wiper-tacker unit shown in Fig. 66 but viewed from the opposite side and with a portion of the unit removed;

Fig. 69 is a view in side elevation of that portion of the wiper-tacker unit which is removed in Fig. 68;

Fig. 70 is a view of a portion of the wiper-tacker unit shown in section substantially on line LXX—LXX of Fig. 67 and looking in the direction of the arrows;

Fig. 71 is a view of a portion of the wiper-tacker unit shown in section, substantially on line LXXI—LXXI of Fig. 68 and looking in the direction of the arrows;

Fig. 72 is a view of a portion of the wiper-tacker unit shown in section, substantially on line LXXII—LXXII of Fig. 67 and looking in the direction of the arrows;

Fig. 73 is a view of another portion of the wiper-tacker unit shown in section substantially on line LXXIII—LXXIII of Fig. 68 and looking in the direction of the arrows;

Fig. 74 is a view in front elevation of the tack-supplying mechanism of the machine, with certain parts shown in vertical section;

Fig. 75 is a view in side elevation of the tack-supplying mechanism with some parts removed and others shown in section;

Fig. 76 is a view in section, substantially on line LXXVI—LXXVI of Fig. 74 and looking in the direction of the arrows;

Fig. 77 is a view in section substantially on line LXXVII—LXXVII of Fig. 75 and looking in the direction of the arrows;

Fig. 78 is a view in elevation of a portion of the tack-supplying mechanism with certain parts shown in section substantially on line LXXVIII—LXXVIII of Fig. 75 and looking in the direction of the arrows;

Fig. 79 is a view in section substantially on line LXXIX—LXXIX of Fig. 78; and

Fig. 80 is a view in side elevation and at an enlarged scale of a part of the mechanism shown in Fig. 75.

Figure 1:
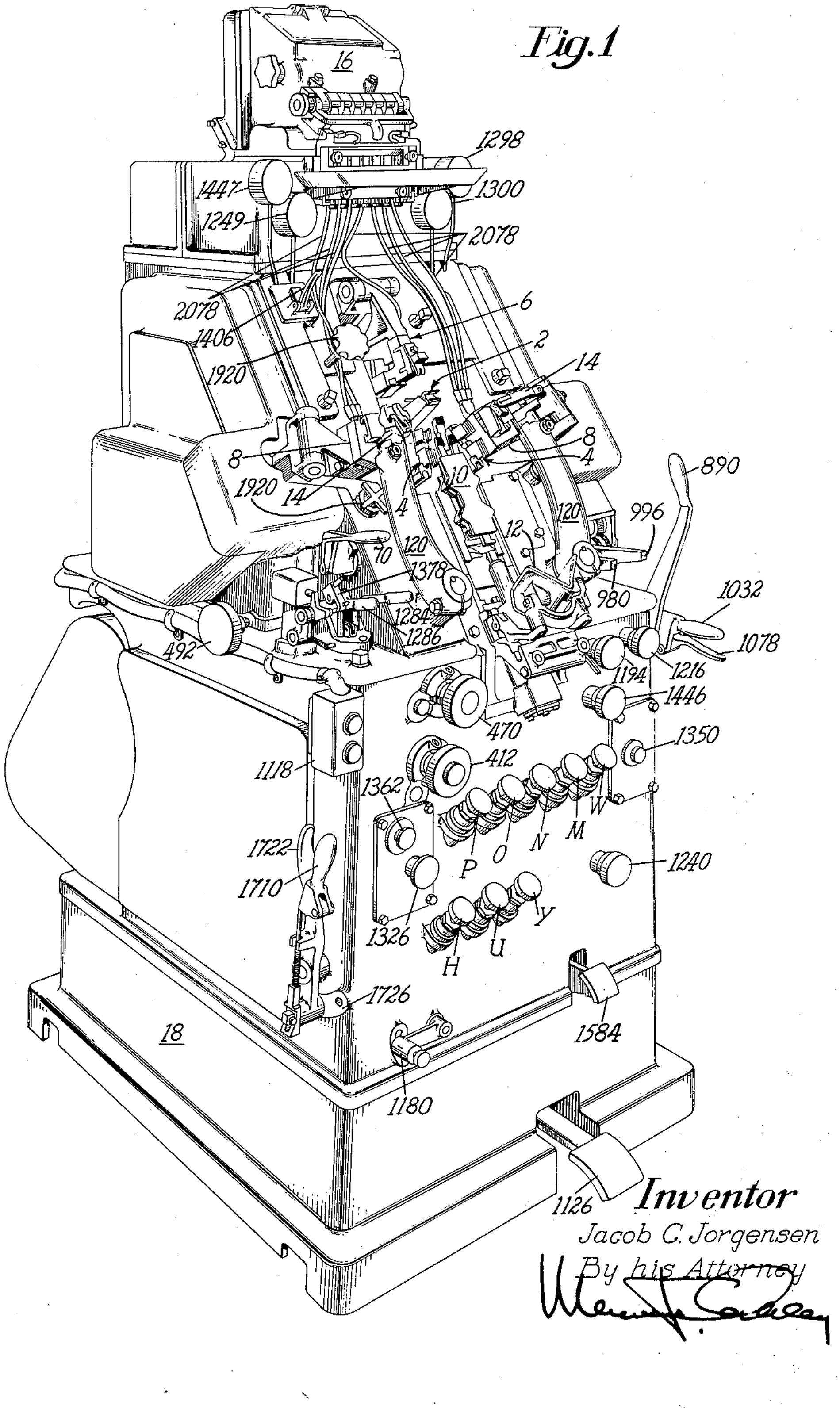
Fig. 1 is a view in perspective of a machine embodying the features of this invention.

Referring to these drawings and particularly to Figs. 1 to 4 thereof, the machine therein illustrated has a toe gripper 2, side grippers 4, 4 for pulling the upper over the toe and at the opposite sides of the forepart of a last, overlaying and fastening-inserting, or tacking devices 6, 8, 8 for securing the margin of the upper to an insole, at the end of the toe and at the sides of the forepart respectively, a shoe rest, indicated generally by the reference character 10, a heel rest 12 and a pair of side clamps 14, 14. The aforementioned elements, together with apparatus for supplying tacks, indicated generally by the reference character 16, Fig. 1, are mounted on an upright, hollow frame construction 18 which also contains the various operating mechanisms of the machine. As will be apparent from an inspection of Figs. 1 to 4, the toe gripper and side grippers, tacking devices and side clamps are grouped around the shoe rest which is so positioned, Fig. 4, as to support a shoe *Sh* with its bottom down and inclined upwardly and away from an operator standing at the front of the machine. The various foot treadles, hand levers, adjusting wheels, fluid-pressure regulating and controlling knobs, levers and handles, to be described in detail below, are mounted on the front of the frame construction or conveniently adjacent thereto, as will be apparent from Fig. 1.

*Shoe supporting mechanism*

Figure 4:
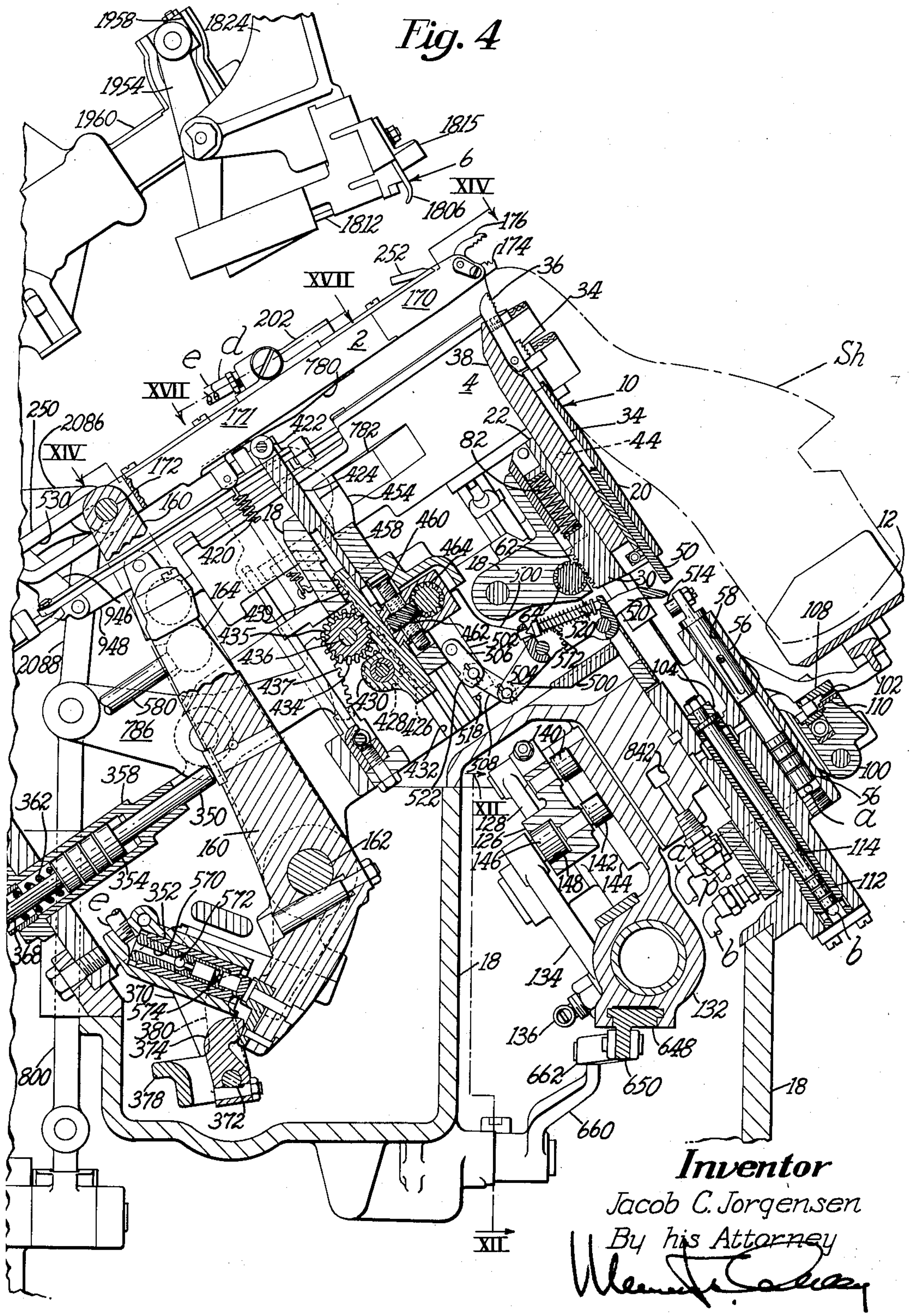
Fig. 4 is a view at an enlarged scale and in vertical section, substantially in line IV—IV of Fig. 2 and looking in the direction of the arrows.
Figure 5:
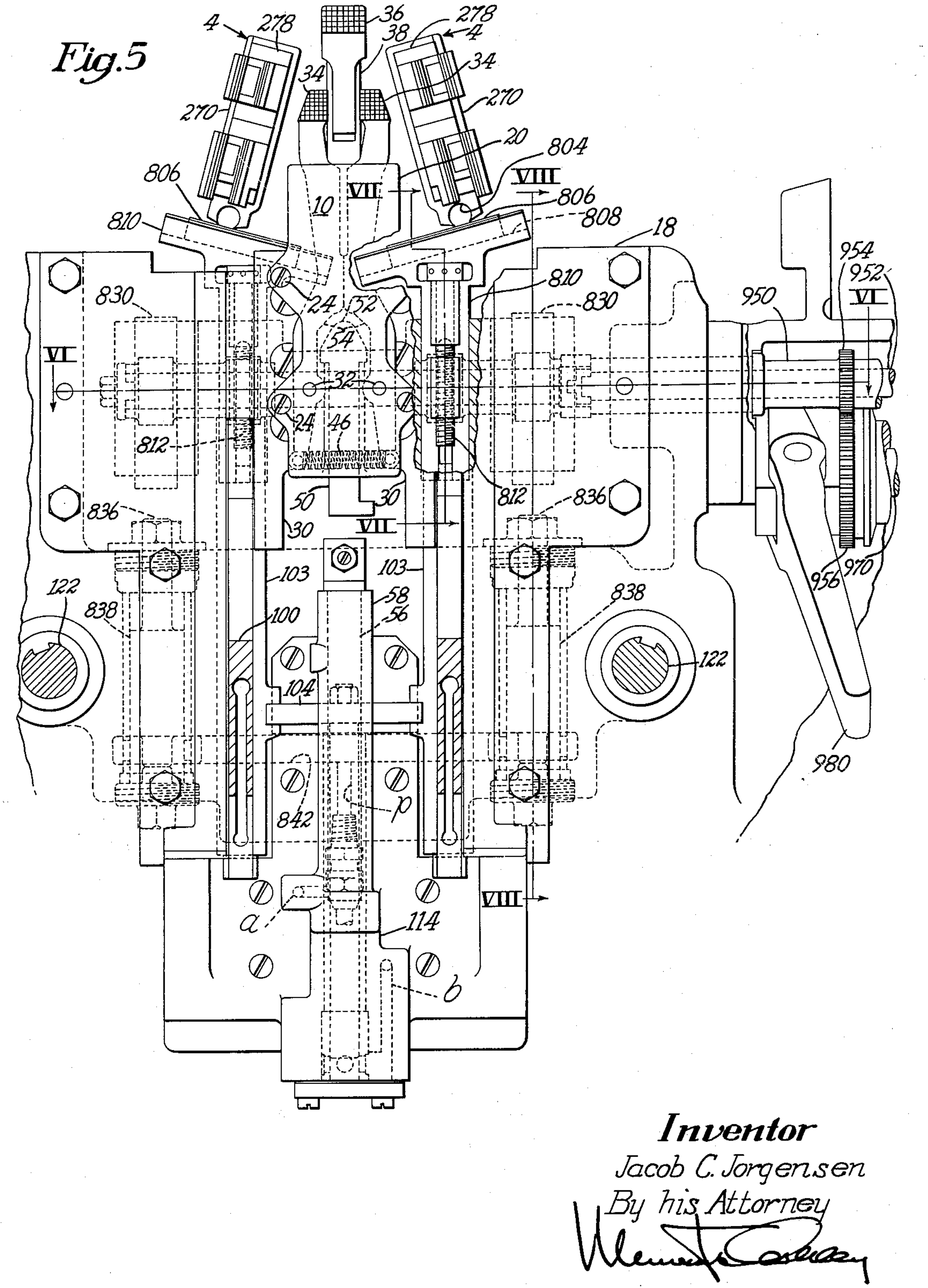
Fig. 5 is a plan view, at an enlarged scale, of certain of the operating elements shown in Fig. 2.
Figures 6, 7, 8:
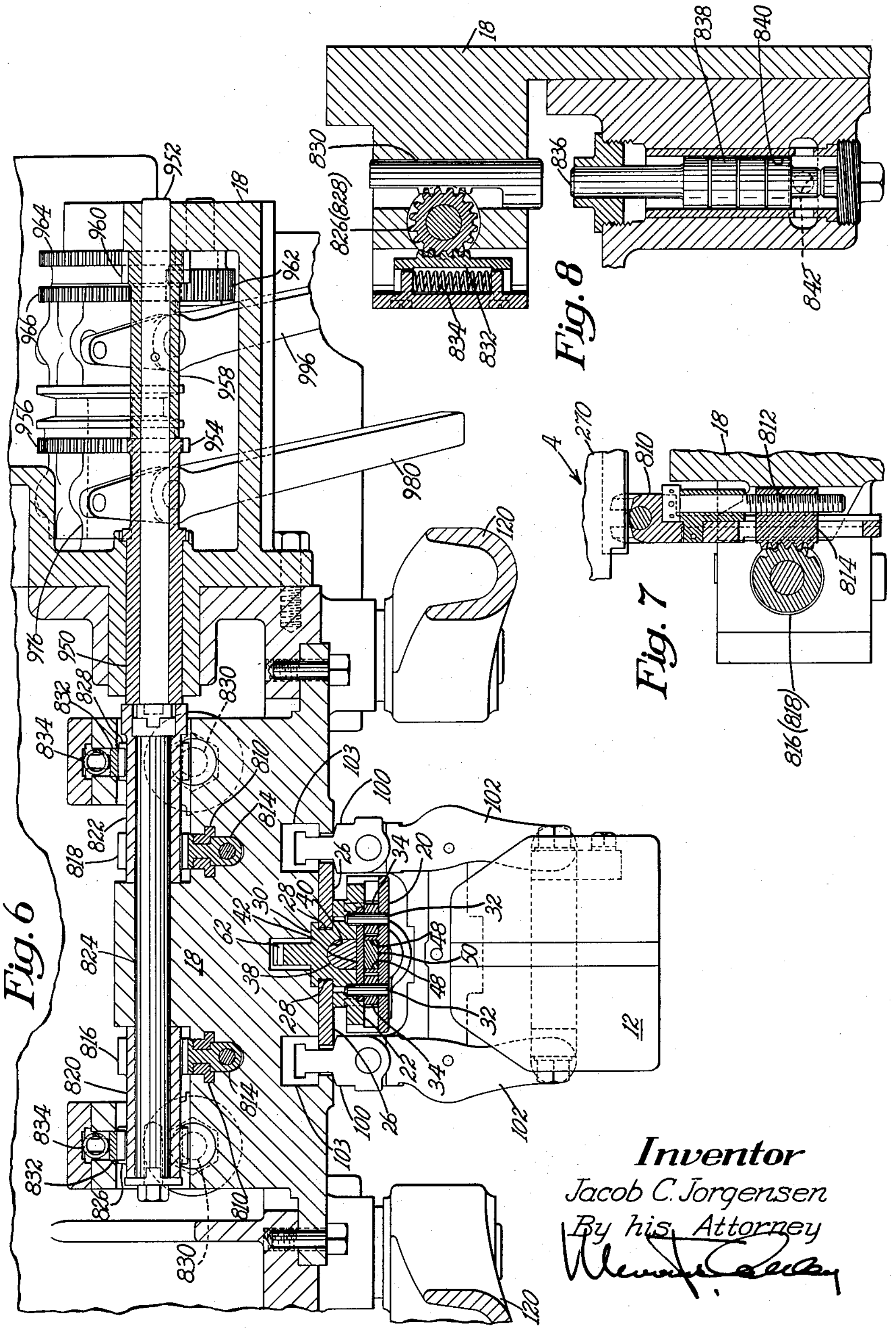
Fig. 6 is a view in horizontal section, substantially on line VI—VI of Fig. 5 and looking in the direction of the arrows.
Fig. 7 is a view in vertical section substantially on line VII—VII of Fig. 5 and looking in the direction of the arrows.
Fig. 8 is a view in vertical section, substantially on line VIII—VIII of Fig. 5 and looking in the direction of the arrows.

The shoe rest 10, Figs. 4, 5 and 6, comprises a fabricated assembly including an upper plate 20 which is secured, by means of screws 24, 24, Fig. 5, in spaced relation to a lower member 22, Fig. 4. This assembly is slidably mounted on a portion of the frame construction by means of a pair of plates 26, 26 which enter cooperating grooves 28, 28 formed in a downwardly extending portion 30 of the lower member 22, Fig. 6. Loosely fitted between the upper plate 20 and the lower member 22, and pivotally mounted thereon by means of pins 32, 32, are a pair of supporting fingers 34, 34, Figs. 5 and 6. A third supporting finger 36 is mounted on an elongated member 38, shaped to fit in a recess 40, formed in the member 22, and secured in place in this recess by means of a keeper plate 42, Fig. 6, and a setscrew 44, Fig. 4. The supporting fingers 34, 34 are held in the collapsed positions shown in Figs. 2 and 5 by means of a compression spring 46 which is interposed between opposed ends of these fingers, as shown in Fig. 5. During an early part of the operating cycle of the machine, these fingers are expanded, to an extent determined by the width of the shoe being pulled over, as will presently appear. Slidably mounted between webs 48, 48 formed on the plate 20, Fig. 6, is a cam bar 50 that is provided at one end with a spear-shaped cam portion 52, Fig. 5. The fingers 34, 34 are each provided with an inclined surface 54 and, when the cam bar 50 is moved forwardly, upwardly as viewed in Fig. 5, these fingers will be expanded by the action of the cam portion 52 on these inclined surfaces. For thus moving the cam bar 50, a piston 56 is mounted in a cylinder 58, Fig. 4, formed in a part of the frame construction, and as will be explained below, at an appropriate time in the operating cycle, fluid under pressure is admitted to the cylinder, behind the piston 56 through a duct *a*.

The shoe-rest assembly is normally held in the position shown in Figs. 1 to 5 in the following manner. The downwardly extending portion 30 of the lower member 22 of the shoe-rest assembly is formed with a rack 62 which meshes with a pinion 64, Fig. 4. This pinion is carried by a shaft 66, journaled in the frame construction, Figs. 3 and 37. Pinned to an end of this shaft is a hub member 68 to which a handle 70, Figs. 1, 2 and 34 is pivoted as shown in Fig. 37. The hub member 68 is bored at 71 to receive a pin 72 which bears, at one end, against the handle 70 and at its other end against a spring-pressed plunger 74 that is mounted in a part of the frame construction 18. This plunger has an end portion 75 of reduced diameter which normally projects through a shallow arcuate slot 76, formed in the hub member 68, and into the bore 71, thus locking the shaft 66 against rotation. However, when the handle 70 is rocked in a clockwise direction, see arrow, Fig. 37, the end 75 of the plunger 74 will be moved out of this bore and into the arcuate slot 76. The handle 70 may now be manipulated, within the limits of the slot 76, for shifting the position of the shoe-rest assembly through the action of the pinion 64 and the rack 62. Such movements of the shoe-rest assembly, in either direction, are resisted by a compression spring 82, Fig. 4, which is interposed between suitable abutments carried by the lower member 22 and the frame construction 18. Therefore, unless otherwise prevented from movement, the shoe-rest assembly will be returned to the position shown in Figs. 1 to 6 by the spring 82 when the handle 70 is released.

The heel-rest construction is shown more clearly in Figs. 1 to 6, 9 and 34, in which the heel rest proper is designated by the reference character 12. Except for the manner in which the heel rest 12 is moved from the inoperative position shown in Figs. 1, 2, 3, 9 and 34, to a position where it engages the heel end of a shoe supported on the shoe rest, as shown in Fig. 4, the heel-rest construction herein illustrated is the same as that shown and described in United States Letters Patent No. 1,029,387, issued on June 11, 1912, in the name of R. F. McFeely, to which reference may be made for details not herein described. Thus, the heel rest proper is mounted on a block 100 for limited pivotal movements in directions widthwise and lengthwise of a shoe by means of a pair of arms 102, 102, Figs. 2, 3, 4, 6, 9 and 34. The block 100, in turn, is slidably mounted upon a pair of slides 103, 103 which are connected by a crossbar 104, Fig. 5, and locking mechanism, not shown, for holding the block 100 in a selected position of adjustment, relative to these slides, is provided which is the same as that disclosed in Patent No. 1,029,387 and which includes a locking lever 106, Figs. 2, 3, 9 and 34. As in the patented construction, the heel rest 12 is held yieldingly in the position shown in Figs. 1, 2, 3, 9 and 34 and there is associated with the arms 102, 102 and the block 100, a pair of locking plates 108, 110, Fig. 4. Accordingly, when the heel rest is moved into engagement with the heel end of a shoe, supported on the shoe rest, it will at first be free to move widthwise of the shoe, to find the heel end of the shoe, and then it will be moved rearwardly to bring the locking plates 108, 110 into engagement and thus become locked in position against further movement widthwise of the shoe. For moving the heel rest into operative position in engagement with the heel end of a shoe, the crossbar 104 is secured to the forward end of a piston 112 that is mounted in a cylinder 114, carried by the frame construction, Figs. 4 and 5. As will be explained in detail below, at an appropriate time in the operating cycle of the machine, fluid under pressure is admitted into the cylinder 114 behind the piston 112, by means of a duct *b*, Figs. 4 and 5. At a later stage in the operating cycle, this fluid is trapped within this cylinder to hold the heel rest positively in its operative position.

During that portion of the operating cycle of the machine when the tacking units are operated, the shoe is supported against movements laterally and away from the shoe rest 10, and the upper is clamped against the last, by means of a pair of so-called side clamps, indicated generally by the reference character 14, 14, Fig. 1. These side clamps, each of which comprises a pair of resilient shoe-engaging members that are connected together by means of an equalizing mechanism, not shown, but similar to that disclosed in United States Letters Patent No. 1,135,954, issued on April 13, 1915, in the name of R. F. McFeely, are carried on the outer ends of a pair of clamp arms 120, 120, Figs. 1 to 3, 6 and 9. The clamp arms are each secured to a shaft 122, Figs. 2 and 5, journaled on, and extending within, the frame construction 18, and secured to the inner ends of these two shafts are a pair of lever arms 124, 124, Fig. 12. The lever arms 124, 124 are connected to the opposite ends of an equalizing block 126 by means of links 128, 128. The equalizing block 126, in turn, is connected to a piston 130, slidable within a cylinder 132 that is associated with the frame construction, Figs. 4 and 12, by means of a bell-crank lever 134, Figs. 4, 9 and 12. A coil spring 136, stretched between one arm of the bell-crank lever 134 and a pin 138, carried by a part of the cylinder assembly, tends to hold the piston 130 in the position shown in Fig. 12 and with the clamp arms separated, see Figs. 1 and 2. At a predetermined time during the operating cycle of the machine, fluid under pressure is admitted to the right-hand end of the cylinder 132, behind the piston 130, through a duct *c*, thereby urging the piston to the left, see dotted arrow Fig. 12. As a result of movement of the piston in this direction, the clamp arms 120, 120 will be swung toward each other and the side clamps 14, 14 pressed against the opposite sides of the forepart of a shoe supported on the shoe rest 10 in a manner which will be apparent from an inspection of Fig. 12. When the fluid under pressure is exhausted from the cylinder 132, the clamp arms will be separated by means of the action of the spring 136. As will presently appear, the pressure of the fluid admitted to the cylinder 132 may be varied to provide the desired force exerted on the upper materials by the side clamps. Also, during a later stage in the operating cycle, the fluid is trapped in this cylinder so that the side clamps are held rigidly in position while the overlaying and fastening-inserting or tacking devices are operated.

Figure 12:
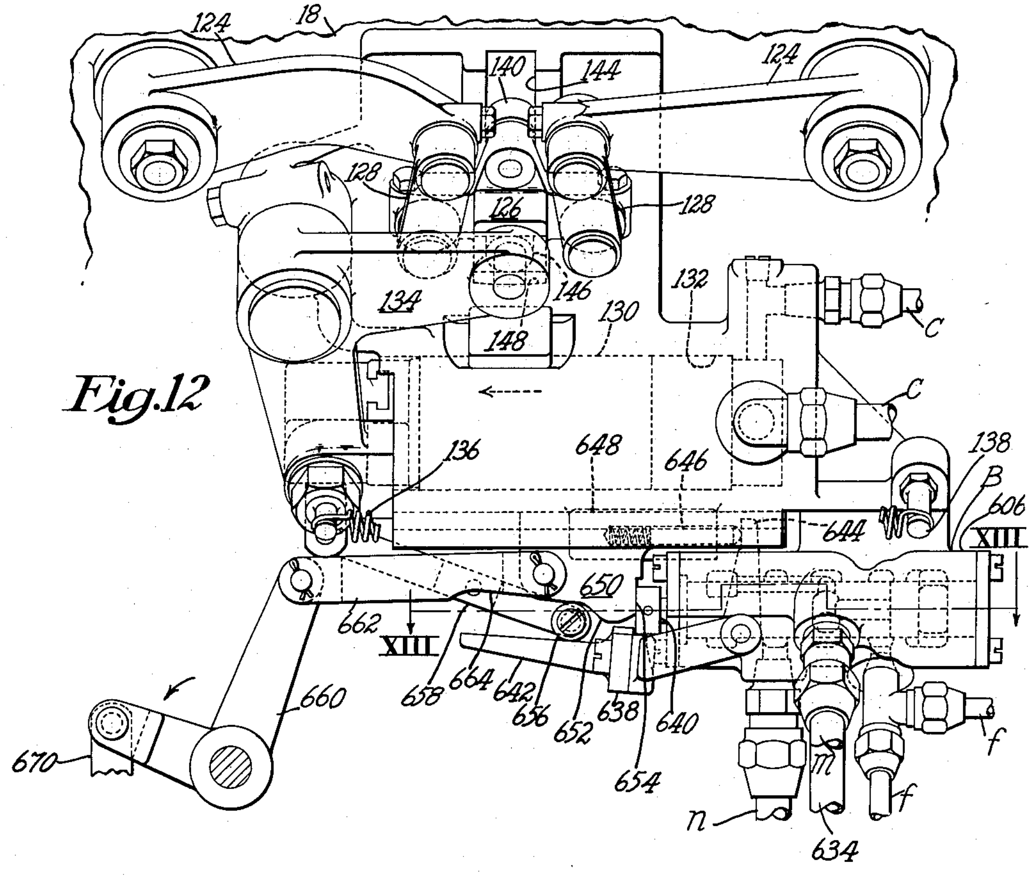
Fig. 12 is a view in elevation of another portion of the machine as viewed substantially on a plane indicated by the line XII—XII of Fig. 4 and looking in the direction of the arrows.

The equalizing block 126 is provided in order that the action of the side clamps 14, 14 may be equalized on the opposite sides of the shoe. It is, however, desirable that this equalizing action be limited to an amount sufficient to accomplish the aforementioned result without permitting undue freedom of independent movement of the clamp arms as they are swung toward, or away from, each other. Referring particularly to Figs. 4 and 12, the equalizing block 126 carries two rolls 140, 142 which ride along a groove 144, formed in a portion of the cylinder assembly, and the bell-crank lever 134 is connected to this block by means of a roll 146 which slides in a groove 148, cut in the block 126. The roll 142, which is substantially in alinement with the groove 148 in the equalizing block, is snugly fitted in the groove 144, while the other roll 140 is of a diameter somewhat less than the width of this groove. The clearance thus provided between the roll 140 and the slot 144 permits a limited amount of equalizing movement of the block 126, and hence the clamp arms, yet the clamp arms are constrained to move generally in unison.

*Gripper construction and adjustment*

The general arrangement of the toe gripper 2 and the two side grippers 4, 4, by means of which the upper of a shoe is tensioned and shaped to the contour of its last, is shown more clearly in Figs. 1, 2, 3, 4 and 5 of the drawings. The toe gripper is connected to one end of, and is actuated in part by, a lever 160, that is secured to a cross shaft 162, journaled in a part of the frame construction 18, Figs. 4, 22 and 23, while the side grippers are connected to, and actuated by, a pair of levers 164, 164, mounted for rotation freely on the shaft 162, one on each side of the lever 160. As will be explained below in detail, these three levers are operated by means including fluid pressure actuated pistons to cause the grippers to exert a pull on portions of the upper, to move quickly away from the path of the incoming tacking devices, after they have released the upper, and finally to return to a predetermined starting position at the conclusion of the operating cycle of the machine.

Figures 14, 15, 16, 17, 18:
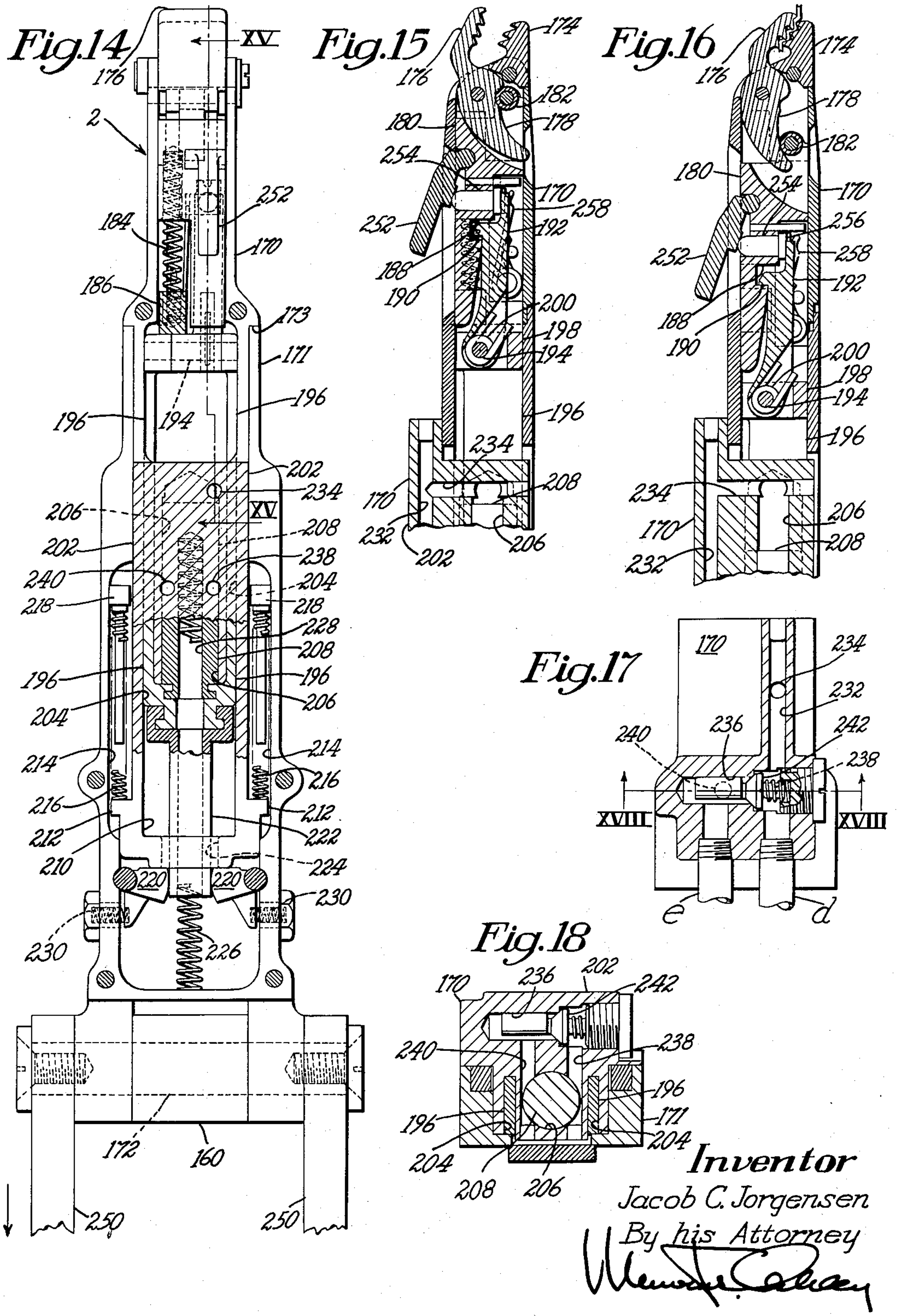
Fig. 14 is a view showing the toe gripper of the machine with certain parts removed and others shown in section substantially on line XIV—XIV of Fig. 4 and looking in the direction of the arrows.
Fig. 15 is a view of a portion of the gripper shown in Fig. 14, in section, substantially on line XV—XV of Fig. 14 and looking in the direction of the arrows.
Fig. 16 is a view similar to that of Fig. 15 but showing certain operating parts of the gripper in different positions.
Fig. 17 is a view of a portion of the toe gripper shown in section, substantially on line XVII—XVII of Fig. 4 and looking in the direction of the arrows.
Fig. 18 is a sectional view of a portion of the gripper substantially on line XVIII—XVIII of Fig. 17 and looking in the direction of the arrows.

Referring particularly to Figs. 4, 14–18, the toe gripper comprises an elongated casing, formed of an upper member 170 and a lower member 171 which is connected at its lower end, to the lever 160 by means of a pin 172. Mounted on the upper end of the casing member 170 is a fixed gripper jaw 174 and a pivoted gripper jaw 176, the latter having a downwardly extending tail 178, Figs. 15 and 16. Slidably mounted in the upper end of the casing member 170 is a control block or jaw closing cam 180 which is cut away to embrace the tail 178 of the gripper jaw 176 and carries a gripper closing roll 182. This control block is held in the elevated position in which it is shown in Fig. 15 by means of a compression spring 184, which rests at its lower end on a cross member 186, fixed to the casing member 170, Fig. 14. As in prior constructions of this kind, when the control block 180 is moved downwardly, against the action of the spring 184, the pivoted jaw 176 will be closed against material inserted between it and the fixed jaw 174, see Fig. 16, by the action of the gripper closing roll 182 on the tail 178 of the pivoted jaw 176.

For moving the control block 180 downwardly, to close the jaw 176, the following arrangement is provided. Formed in a downwardly extending part of the control block is a notch 188 in which is received a projection 190 formed on a latch member 192. This latch member is pivotally mounted on a pin 194, that is carried by a pair of upwardly extending slides 196, 196, Fig. 14. These slides are joined together at their upper ends by means of a web portion 198, and a coil spring 200, surrounding the pin 194, is adapted to bear on this web and on the latch member 192 so as to urge the latch member to the position shown in Figs. 15 and 16. The casing member 170 is shaped to provide a cylinder block 202 which is slotted at 204, 204 to receive the lower ends of the slides 196, 196, and bored at 206 to receive a piston 208, Figs. 14 and 18. The casing member 170 is cut away at 210, Fig. 14, and has a pair of ears 212, 212, fitted in grooves 214, 214 formed in the casing member 171. Coil springs 216, 216, interposed between the ears 212, 212 and a pair of blocks 218, 218, secured to the casing member 171 within the grooves 214, 214, tend to hold the casing members in the positions shown in Figs. 14 and 15 and with the upper part of the casing member 171 held against shoulders 173, 173 formed on the member 170.

At their lower ends, the slides 196, 196 are joined together and connected to the piston 208. Also connected to the joined-together lower ends of these slides is a hollow rectangularly shaped plunger 222 which extends downwardly through a clearance hole 224 in the casing member 170 and between a pair of friction detents 220, 220. A coil spring 226 rests on the lower part of the casing member 171 and this spring extends upwardly through the hollow plunger 222 and into a bore 228 formed in the piston 208. The friction detents 220, 220 are pivotally mounted on the casing member 171 and backed up by compression springs 230, 230, as shown in Fig. 14.

The cylinder block 202 is traversed by a plurality of bores 232, 234, 236, 238 and 240, Figs. 17 and 18. The bores 232, 234 connect a duct *d* with the space in the cylinder 206 above the piston 208, while the bore 236 is connected to a second duct *e*. A check valve 242 is so arranged as to permit flow of fluid under pressure from the bore 236 into the bore 232 while preventing flow in a reverse direction. At an appropriate time in the operation of the machine, fluid under pressure is admitted into the cylinder 206 by means of the duct *d*, bores 232, 234, causing the piston to move downwardly and carry with it the slides 196 and the block 180, thus closing the gripper jaws as shown in Fig. 16. At a later time in the operation of the machine, the entire gripper assembly is moved in a direction to tension the upper stock gripped between the jaws by means including a pair of links 250, 250 associated with the pin 172 and lever 160. As force is thus applied to the upper stock, the springs 216, 216 will yield and permit a separation between the upper end of the casing member 171 and the shoulder 173 on the casing member 170, Fig. 14. As this separation occurs, the plunger 222 will be gripped by the friction detents 220, 220, which were previously held out of engagement with this plunger by the lower part of casing 170, Fig. 14, thus locking the piston 208, slides 196, 196, and control block 180 to the casing member 171. Now, the continued application of downward pull on the casing member 171 will first increase the gripping force which is applied by the jaw 176, and then will be transmitted directly to the upper stock through the positively closed jaws 174, 176.

The gripper jaws 174, 176, are released by the engagement of a portion of the incoming toe tacking device 6 with a latch release lever 252. This latch release lever is pivotally mounted on the control block 180, and rests against the outer end of a pin 254. This pin has a head 256 which is in engagement with the upper end of the latch member 192 and also with a leaf spring 258, mounted on the block 180. When the latch release lever 252 is swung in a counterclockwise direction, Figs. 15 and 16, by the incoming toe tacking device, the latch member 192 will be disengaged from the block 180, thus freeing this block for upward movement by the spring 184 to return the gripper jaw 176 to the position shown in Fig. 15. Immediately upon release of the block 180, the casing members 170, 171 will be returned to the position shown in Fig. 14, by springs 216, 216, and the piston 208 will be moved downwardly, by the fluid under pressure in the cylinder 206, until brought to rest by engagement of the plunger 222 with a lower part of the casing member 171. Such movement of the piston carries it beyond the bores 238 and 240 so that fluid under pressure is admitted to the duct *e* from the duct *d* by means of the bores 238, 240, and cylinder 206. As will be explained below, pressure fluid in the duct *e* causes a sudden downward movement of the whole gripper assembly to a position well out of the way of the incoming tacking device. When, at the conclusion of the operating cycle of the machine, the duct *d* is connected to exhaust, the piston 208 will be elevated by the spring 226 so that the latch member 192 will again connect the slides 196, 196 to the control block 180, as shown in Fig. 16. Pressure of the fluid now trapped in the duct *e* will be relieved to duct *d* through the action of the check valve 242.

Figures 19, 20, 21:
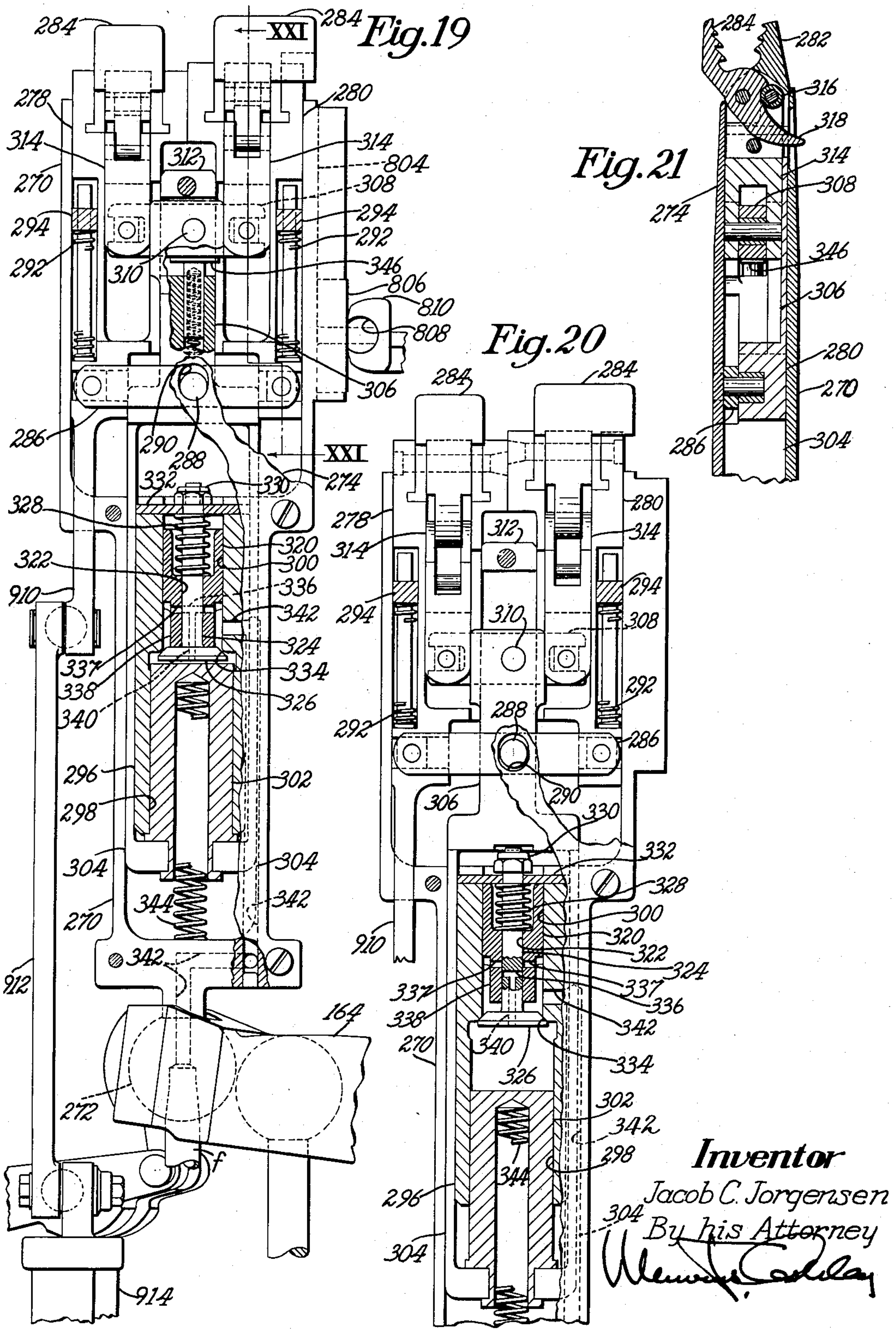
Fig. 19 is a view in side elevation of one of the side gripper units of the machine, with certain parts broken away and others shown in section.
Fig. 20 is a view similar to that of Fig. 19 but with certain operating parts in different positions.
Fig. 21 is a view in section, substantially on line XXI—XXI of Fig. 19 and looking in the direction of the arrows.

The two side grippers are of identical construction and are each provided with two sets of gripper jaws. One of these side grippers is shown in detail in Figs. 19–21 and this gripper comprises a hollow casing member 270 which is connected, by means of a ball joint 272, to one of the two operating levers 164. The casing member 270 is closed by means of a cover plate 274, Fig. 21, and mounted in the upper part of the casing member are a pair of substantially U-shaped gripper carriers 278, 280, Fig. 19, on each of which is mounted a fixed jaw 282 and a pivoted jaw 284, Fig. 21. These gripper carriers are connected together by means of an equalizing lever 286 which carries a centrally located pin 288 that extends outwardly into a clearance hole 290 formed in the cover plate 274, Fig. 19. The gripper carriers are normally urged downwardly so as to hold the pin 288 in engagement with the cover plate 274 at the lower side of the hole 290, Fig. 19, by means of a pair of compression springs 292, 292 which are interposed between a pair of lugs 294, 294, carried by the cover plate 274, and shoulders formed on the carriers 278, 280. The cover plate 274 is formed with a downwardly extending cylinder portion 296 which is received in the lower part of the casing member 270, and in this cylinder portion are a pair of alined bores 298, 300. Received in the bore 298, which is of larger diameter than the bore 300, is a piston 302 to the lower end of which are attached a pair of slides 304, 304. These two slides are joined together, at their upper ends, and provided with an upwardly extending portion 306. This upwardly extending portion is slotted to receive a second equalizing lever 308, pivoted thereon by means of a pin 310, and is fitted between the carriers 278, 280. Also fitted between the carriers is a spacer block 312 secured to the cover plate 274. Connected to each end of the equalizing lever 308 is a gripper control block 314 which carries a roll 316 and one of these control blocks is associated with each of the pivoted jaws 284, as illustrated in Fig. 21. These rolls are adapted to cooperate with tails 318, formed on the pivoted jaws 284, so that each jaw is closed when its associated control block is moved downwardly.

The control blocks 314, 314 are moved downwardly to close the jaws 284, 284, by the piston 302 in the following manner. Slidable in the smaller bore 300 of the cylinder portion 296 is a sleeve 320 which is formed with a longitudinal bore 322 in which is fitted the stem 324 of a conical valve member 326. A coil spring 328 normally holds this sleeve in the lowered position shown in Fig. 19 and with a stop nut 330, threaded on the stem 324, resting against an abutment plate 332 which is supported on the cylinder portion 296. When in this position, the sleeve 320 holds the valve member 326 away from a seat portion 334, formed between the bores 298, 300, and alines a cross bore 336 in the valve stem 324 with ports 337, 337 which communicate with an annular recess 338, formed in the lower end of the sleeve 320. The cross bore 336 is connected to an axial bore 340 that extends out through the valve member 326 and the annular recess 338 is in communication with a passageway 342 that extends downwardly in the casing member to the ball joint 272 where it is connected with a duct *f*, Fig. 19. At a predetermined point in the operation of the machine, fluid under pressure is admitted to the duct *f* and, through the passageway 342, into the annular recess 338. This fluid under pressure now has free access into the cylinder bore 298, above the piston 302, around the valve member 326 and through the bores 336, 340 in the valve stem, and thus forces the piston 302 downwardly against the resistance of a return spring 344. Such downward movement of the piston, acting through the slides 304, 304, and the equalizing lever 308, operates the gripper control blocks 314, 314 to close the pivoted jaws 284, 284 against the fixed jaws 282, 282. As these jaws close on stock inserted between them, pressure of the fluid in the cylinder bore 298 eventually builds up sufficiently to move the sleeve 320 to the position shown in Fig. 20 and to close the valve 326, thus trapping fluid in the cylinder bore 298 above the piston 302.

After the gripper jaws have been closed on the stock, in the manner just explained, the whole gripper assembly is moved downwardly by the operating lever 164. As the gripper assembly is moved downwardly a tensioning pull is applied to the stock which is equalized between the two sets of gripper jaws by the action of the equalizing lever 286, the jaws being held closed through the action of piston 302 and the other equalizing lever 308, which is normally held in the centered position shown in Fig. 19 by means of a spring-pressed plunger 346. When further downward movement of the gripper jaws and their carriers 278, 280 is prevented by resistance of the stock, the springs 292, 292 will yield and permit a slight additional downward movement of the control blocks 314, 314 relatively to the gripper carriers 278, 280, thus increasing the closing force of the jaws 284, 284. As these springs yield, the cover 274 moves downwardly, relatively to the equalizing lever 286 until the parts reach the positions shown in Fig. 20 with the pin 288 substantially centered in the clearance hole 290 and with the jaws 282, 284 of the gripper held positively in closed position. When, at a later part of the operating cycle of the machine, the duct *f* is connected to exhaust, the parts are returned to the positions shown in Fig. 19 with the gripper jaws opened by the spring 344.

The toe gripper 2 and side grippers 4, 4 are held in the heightwise positions shown, Figs. 1, 2, 3 and 4, when the machine is at rest in the following manner. As has already been pointed out, the toe gripper is secured to an operating lever 160 and each side gripper is secured to an operating lever 164. Associated with the lever 160 is a gripper-supporting plunger 350 and a gripper-retracting piston 352, Fig. 4, and similar supporting plungers and retracting pistons are provided for the side gripper-operating levers 164, 164. As is illustrated in connection with the supporting plunger 350 for one of the operating levers 164 in Fig. 31, each of these plungers is connected to a piston 354 which is mounted in a cylinder 356 formed in a cylinder block 358. This cylinder block is supported on a part of the frame construction 18 so that the supporting plungers are arranged directly beneath their respective gripper-operating levers, Fig. 23. The cylinders 356 open into a passageway 360 which is in communication with a duct *g* and, when pressure fluid is exhausted from this duct, the pistons 358 are elevated by compression springs 362, one of which is shown in Fig. 31. These springs are each interposed between an abutment member 364, supported on studs 366 secured to the cylinder block, and surround headed rods 368 which extend up into the pistons 358, Fig. 31. The rods 368 also extend down through clearance holes in the abutment member 364 and carry stop collars 369 for limiting the maximum amount of upward movement that may be imparted to the pistons 358, and hence to the plungers 350, by the springs 362.

For limiting swinging movements of the operating levers 160, 164, 164, by their respective gripper-supporting plungers 350, in a clockwise direction as viewed in Fig. 4, and thereby determining the heightwise position of the grippers relatively to the shoe rest 10, the following arrangement is provided. Referring first to the toe gripper 2 and its operating lever 160, there is journaled in a bracket member 370, carried on the frame construction 18, Figs. 3, 4, 22 and 23, a rockshaft 372. On this rockshaft there is pinned a stop arm 374 which engages one end of the operating lever 160, Fig. 4. Surrounding this rockshaft and also journaled in the bracket 370 is a sleeve 376 which is connected to one end of a U-shaped lever 378, Figs. 3, 4, 22 and 23.

Figure 22:
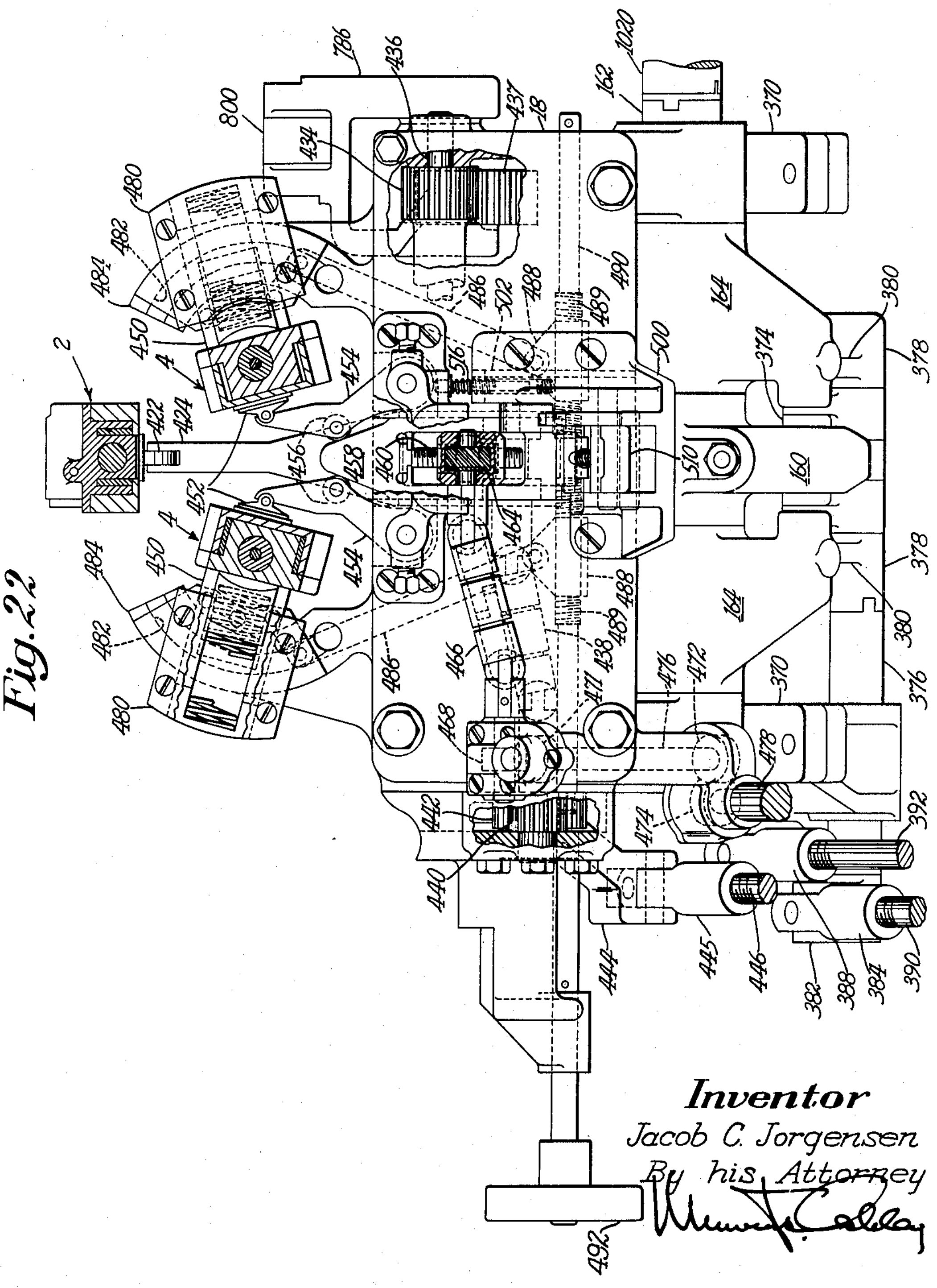
Fig. 22 is a view, at an enlarged scale, of a portion of the machine as viewed on a plane indicated by line XXII—XXII of Fig. 3 and looking in the direction of the arrows, with certain parts broken away and others shown in section.

This U-shaped lever is rotatably mounted on the rockshaft 372 and carries two stop arms 380, 380 for engaging the side gripper-operating levers 164, 164, Figs. 4, 22 and 23. Secured to the rockshaft 372 is an arm 382, Fig. 22, to which is connected a threaded block 384 and secured to the sleeve 376 is an arm 386, Fig. 23, to which is connected a threaded block 388, Fig. 22. Shafts 390, 392 are threaded, respectively, into the blocks 384, 388, Figs. 3 and 22. The shaft 390 is connected by means of a universal joint 394 to a stub shaft 396 which is journaled in a part of the machine frame 18, Fig. 34. Keyed to the shaft 396 is a pinion gear 398 which meshes with a pinion 400 that is formed integrally with a sleeve 402. The shaft 392 is connected, by a universal joint 404 to a second stub shaft 406 which is journaled in, and extends outwardly through the sleeve 402. Rotatably mounted on an enlargement 408 on the shaft 406 and also on a boss 410, carried by a bushing, secured to the front of the machine frame, in which the sleeve 402 is journaled, is a hand wheel 412. This hand wheel has a key 414 which fits keyways cut in the sleeve 402 and shaft 406. By moving the hand wheel axially, it may be brought selectively into different positions where the key 414 engages either one or both of the keyways in the sleeve 402 and shaft 406. Hence, by suitably manipulating and rotating the hand wheel 412, the toe gripper 2 and/or the side grippers 4, 4 may be adjusted, in a heightwise direction, either independently or at the same time. Friction devices 416, Figs. 34 and 40, and 418, Fig. 34, are provided to prevent accidental rotation of either the shaft 396 or the shaft 406 by the other of these shafts.

The toe grippers and side grippers are also adjustable in directions toward and away from the shoe-bottom rest 10 to vary the so-called "spread" of the grippers. Referring to Fig. 4, the toe gripper 2, which as already explained, is pivotally connected to its operating lever 160, is held in the position shown in Figs. 2 and 22 by means of a tension spring 420 and a roll 422 that is carried by a positioning bar 424, Fig. 22. This positioning bar is formed with a rack portion 426, which meshes with a pinion 428, mounted in a carriage 430, Fig. 4. This carriage is mounted for sliding movement along guideways, formed in a part of the frame construction 18, one of these guideways being shown at 432 in Fig. 4. The carriage 430 is held in the position shown in Fig. 4, when the machine is at rest, by means of pinions 434, 435, which are interconnected and journaled on a shaft 436 mounted in a part of the machine frame, Fig. 22. The pinion 434 meshes with a gear quadrant 437, Fig. 22, while the pinion 435 meshes with teeth 439 on the carriage 430, Fig. 4. The pinion 428 is connected, by means of a flexible shaft 438, to a second pinion 440, Fig. 22, and this second pinion meshes with a gear quadrant 442. The gear quadrant 442 is formed on one arm of a lever 444 which is pivotally mounted on a part of the machine frame, Figs. 3 and 22. As will be apparent, when the lever 444 is oscillated, the positioning bar 424 will be shifted, relatively to the carriage 430, thereby changing the position of the toe gripper 2. Connected to the lever 444 is a block 445 and threaded into this block is an adjusting shaft 446, Figs. 3, 22 and 34.

The side grippers 4, 4 are held in the positions shown in Figs. 2 and 22 and are guided in their heightwise movements by means of spring-pressed plungers 450, 450 which urge the grippers against pads 452, 452 carried by stop arms 454, 454. These stop arms are pivotally mounted on a part of the machine frame and carry cam rolls 456, 456 that are held against a cam member 458 by the plungers 450, 450, Fig. 22. This cam member is slidably mounted on the carriage 430, and connected thereto is a screw 460. This screw is threaded through a nut 462, formed as a helical gear which meshes with another helical gear 464, mounted on a part of the carriage 430, Figs. 4 and 22. The gear 464 is connected by a flexible shaft 466, helical gears 468, 471, 472 and 474, and an intermediate shaft 476 to an adjusting shaft 478, Fig. 22. The adjusting shafts 446, 478 are operatively connected to a hand wheel 470 by means of mechanism which is not shown in detail but is exactly the same as that used to connect the shafts 390, 392 to the hand wheel 412, Figs. 3 and 34. Accordingly, by suitably manipulating and rotating the hand wheel 470, which like the hand wheel 412 is mounted on the front of the machine frame, the spread of the toe gripper 2 and/or the side grippers 4, 4 may be varied to suit different operating conditions.

In addition to the adjustments of the grippers which have just been described, it is desirable, at times, to vary the angular relationship between the side grippers 4, 4 and the longitudinal center line of the shoe rest 10. Such angular adjustment of the side grippers is effected in the following manner. Referring to Fig. 22, the spring-pressed plungers 450, 450 are slidable in supporting members 480, 480 which are mounted in arcuate guideways 482, 482 formed in arms 484, 484 that extend outwardly from a part of the frame construction 18. These supporting members are connected, by means of links 486, 486, to a pair of nuts 488, 488 which are mounted on right and left hand threaded portions 489, 489 on a shaft 490. This shaft is journaled in portions of the frame construction and extends outwardly therethrough on the left-hand side of the machine where it is provided with a hand wheel 492, Figs. 1 and 22. As will be apparent, by rotating the hand wheel 492 the supporting members 480, 480 may be moved along the guideways 482, 482. Inasmuch as the center of curvature of each of these guideways substantially bisects a line drawn between the two sets of gripper jaws on its associated side gripper, it follows that rotation of the hand wheel 492 will result in angular adjustment of the side grippers, relatively to the longitudinal center line of the shoe rest and about axes extending through the ball joints 272, 272, without any substantial displacement of these grippers in directions extending longitudinally or laterally of the shoe rest.

As suggested above, the extent to which the supporting fingers 34, 34 are expanded is determined by the width of the shoe being pulled over. This result is obtained by limiting the forward movement of the piston 56 in accordance with the so-called "spread," or width, setting of the side grippers 4, 4 which, as has just been explained, is effected by movements of the cam member 458 relatively to a carriage member 430, Figs. 4 and 22. Slidably mounted in a bracket member 500, which is supported on a portion of the frame construction 18, is a block 502. This block is connected to one end of a lever 504, pivoted on the bracket member 500, by means of a pair of links 506, 508, Fig. 4. This lever is connected to another lever 510, also pivoted on the bracket member 500, by means of intermeshing gear teeth 512, and one arm of the lever 510 extends upwardly into the path of movement of a pin 514, carried by the piston 56. A coil spring 516, Fig. 22, normally urges the block 502 to the position shown in Fig. 4 and against a stop pin 518, on the bracket 500, while the levers 504, 510 are held in the positions shown by a compression spring 520. As will be apparent, when the piston 56 is moved upwardly and to the left, as viewed in Fig. 4, by fluid under pressure admitted to the cylinder 58 from the duct *a*, the block 502 will be moved away from the stop pin 518 until a hook portion 522, formed on the link 506, Fig. 4, engages the end of the cam member 458. Further movement of the piston 56, and hence of the cam bar 50, Fig. 5, by means of which the supporting fingers 34, 34 are expanded, will now be prevented. Hence, the extent to which these supporting fingers are expanded, by the cam member 50, will be determined by the setting of the cam bar 458, which setting is, of course, varied in accordance with the width of the shoe. When, at a later time during the operation of the machine, pressure fluid is exhausted from the cylinder 58, the parts will be returned to the positions shown in Fig. 4 by the actions of springs 516 and 520, with the hook portion 522 of the link 506 elevated to clear the cam member 458, for a purpose which will appear below.

*Gripper operation and manipulation*

The toe gripper 2 and side grippers 4, 4 are operated, by means of fluid under pressure, to apply a pull on the upper, in a direction substantially perpendicular to the bottom of the last, and the side grippers are further operated to exert a pull on the upper in a direction extending generally lengthwise of the last. The machine is also arranged to come to rest, with the upper held under tension by the aforementioned gripper pulls, so as to permit the operator to adjust the position of the upper on the last by suitable manual manipulations of the grippers. Thereafter, when the machine is again started, the tacking devices are operated to secure the margin of the tensioned upper to the bottom of the shoe, after it is released by the gripper jaws which are opened at predetermined times in the inward movements of the tacking devices, as will be explained below. Upon release of the upper, the grippers are moved quickly out of the way of the incoming tacking devices which travel inwardly over the bottom of the shoe to predetermined positions before they are operated. As the operation of the machine is completed, the tacking devices are retracted and the grippers are elevated to their starting positions, shown in Figs. 1, 3 and 4, in a manner that will soon appear.

Referring first to the toe gripper 2, as has been pointed out above, this gripper is secured to its operating lever 160 by means of a pin 172 and this pin is connected to a pair of links 250, 250, Fig. 14. These links, which are slotted at 530, Figs. 3 and 4, and which extend downwardly through a part of the frame construction 18, Fig. 23, are each connected to a piston 532, Figs. 3, 26 and 27. These pistons are mounted in cylinders 534, formed in a housing member 536 which is secured to the frame construction 18. The cylinders 534, 534 open into a transverse passageway 538, in the housing 536, which is connected to a duct *h*, Fig. 23. As will be apparent, when fluid under pressure is admitted to the passageway 538 from the duct *h* the pistons 532, 532 will be moved downwardly, Figs. 3, 26 and 27, thus rotating the operating lever 160 in a counterclockwise direction, Figs. 3 and 4, through the action of the links 250, 250, and moving the toe gripper downwardly and to the left, as viewed in Fig. 4. In order to permit such movement of the operating lever 160 and toe gripper 2, the duct *g*, Fig. 31, is connected to a source of fluid under pressure so that the gripper-supporting plungers 350 are moved downwardly and out of the way of the gripper-operating levers, against the action of the springs 362 by the pressure of fluid acting on pistons 354, Fig. 31. Such downward movement of the pistons 532, 532 and toe gripper 2 continues until prevented by the resistance of the upper, gripped between the toe gripper jaws 174, 176 which it will be understood were closed prior to the admission of fluid under pressure to the passageway 538. The magnitude of the pull that is thus applied to the upper by the toe gripper, is, of course, determined by the intensity of the pressure of the fluid acting on the pistons 532, 532 and, hence, may be altered by varying the pressure of the fluid in a manner to be explained below.

As has already been pointed out, when the jaws 174, 176 of the toe gripper 2 are opened, as a result of the engagement of the incoming toe-tacking device 6 with the latch release lever 252, Fig. 16, fluid under pressure will be admitted to the duct *e*, Figs. 17 and 18, and hence to the toe-gripper retracting piston 352, Fig. 4. The pressure of the fluid now acting on the piston 352 will rotate the operating lever 160 in a counterclockwise direction, Fig. 4, and quickly retract the toe gripper to a position well out of the way of the incoming toe-tacking device. Because of the release of the upper, the pistons 532, 532 and the links 250, 250 will continue to move downwardly but at a relatively slower rate, the more rapid movement of the operating lever and toe gripper by the gripper-retracting piston 352 being permitted by the slots 530, 530 in the upper ends of the links 250, 250. This rapid retracting movement of the toe gripper is cushioned, and ultimately fully checked, in the following manner.

Figure 3:
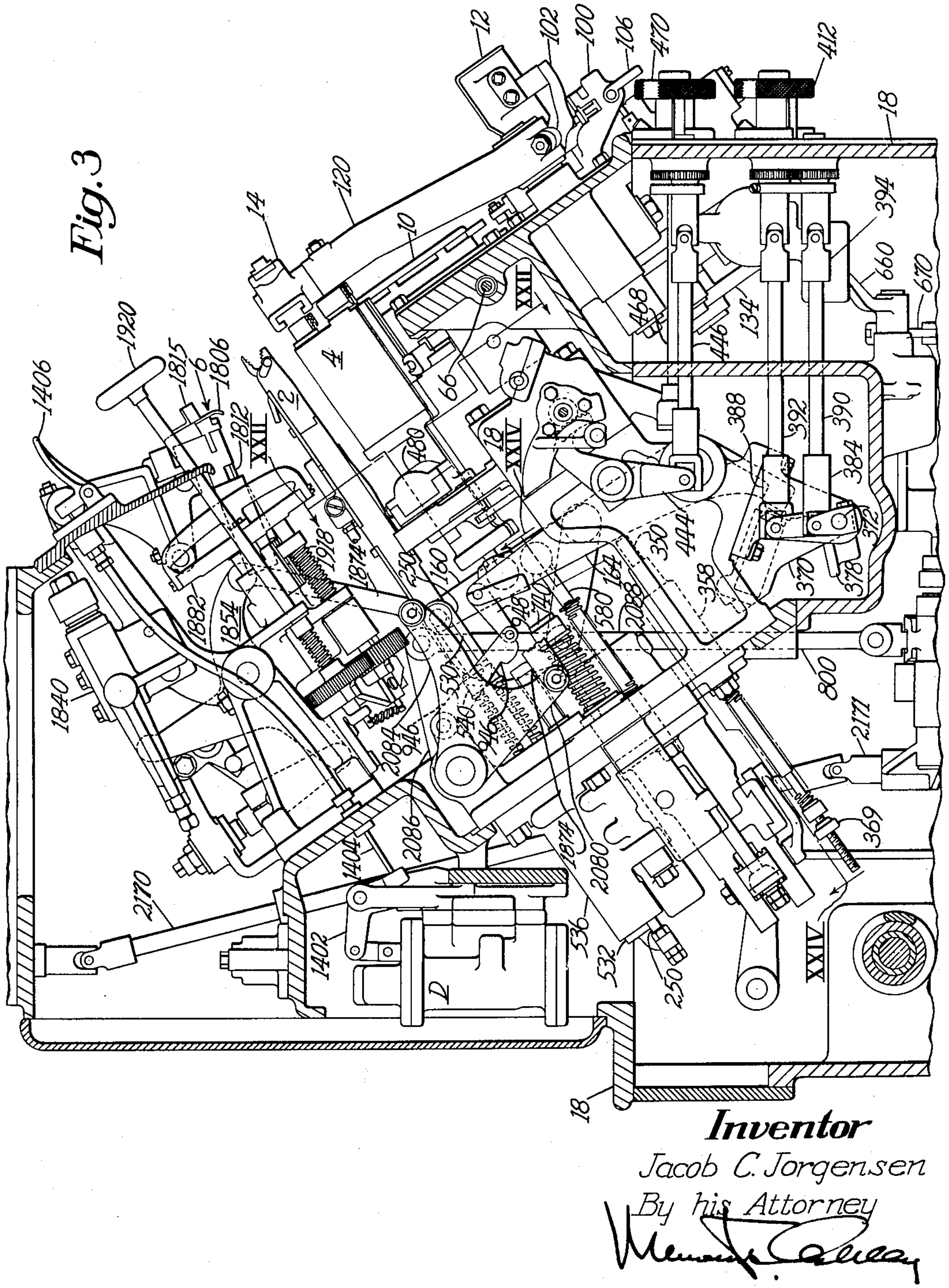
Fig. 3 is a view in side elevation of a portion of the machine with certain parts shown in vertical section, substantially on line III—III of Fig. 2 and looking in the direction of the arrows, and with others parts broken away.

Directly beneath the end of the operating lever 160 to which the toe gripper 2 is attached there is a dashpot piston 540, Figs. 3, 24, 26 and 27. This piston is elevated to the position shown in these figures, by means of a spring 542, and is slidable in a cylinder bore 544, formed in a sleeve 546 which is fitted in the housing member 536 and in a portion of the frame construction 18, Fig. 26. This cylinder bore is connected to an annular recess 545, formed on the outside of the sleeve 546, by means of a plurality of radial holes 547, and the recess 545 is connected, at one side of the sleeve 546, to a duct *i* and, at the opposite side of the sleeve, to a drain passage, not shown. Referring to Fig. 3, it will be seen that the housing member 536 is disposed at an angle to the vertical so that oil, fed by gravity from the duct *i* and into the space in the cylinder bore below the piston 540 will assume the level indicated in Fig. 26, excess oil spilling out through one of the holes 547, groove 545 and the drain passage. Mounted in the lower end of the piston 540 is a ball valve 548 which is normally held away from its seat, by means of a spring 550, so as to permit communication between the space beneath the piston and a pair of axially extending slots 552, 552, cut in the sleeve 546, by way of passageways 554, 556 in the piston. The lower ends of these slots open into an annular groove 558 which is connected to the atmosphere, the sleeve 546 serving as an abutment for limiting downward movement of the piston 540 by the engagement therewith of a stop pin 560, carried by the piston at the lower ends of the slots 552, 552.

Fitted in the lower part of the sleeve 546 is a conical valve member 562 having a stem 564 which extends up into the cylinder bore 544, in line with the ball valve 548. This conical valve is normally held against its seat by means of a spring 566 and, when opened, affords communication between different portions of a duct *j*. During the initial downward movement of the dashpot piston 540, by the rapidly moving gripper-operating lever 160, air is evacuated from the space beneath the piston and above the level of the fluid in this space, this air escaping upwardly around the ball valve 548, through passageways 554, 556, slots 552 and annular groove 558 to the atmosphere. Eventually, however, the ball valve 548 is closed by engagement with the valve stem 564 so that oil, and any remaining air, are trapped beneath the piston 540. This piston is fitted somewhat loosely in the cylinder bore 544 and the trapped oil and air will be forced upwardly between the piston and the cylinder bore thus producing a dashpot, or checking action, which slows down, and nearly stops, the movement of the piston just before the pin 560 engages the sleeve 546 at lower ends of the slots 552, 552. When the downward movement of the dashpot piston 540 is finally stopped, in the foregoing manner, the conical valve 562 will be moved away from its seat, as a result of the engagement of the ball valve 548 with the valve stem 564, thus opening up communication between the two portions of the duct *j*, for a purpose which will presently appear.

As explained above, the toe-gripper operating lever 160 is rotated in a direction to retract the toe gripper by means of a gripper-retracting piston 352, to which fluid under pressure is supplied through the duct *e* when the toe gripper jaws are opened and the piston 208, Fig. 14, moved to a position to connect the duct *e* to the duct *d*. During the tensioning action of the toe gripper, however, it is possible that there may be a slight leakage of pressure fluid from the duct *d* around the piston 208, to the duct *e*, Fig. 18. As will be obvious, if such fluid under pressure were permitted to accumulate in the duct *e* and act on the toe-gripper retracting piston 352, an additional pulling force would be applied to the upper, over and above that provided by the toe-gripper pulling pistons 532, 532. Inasmuch as it is desired to regulate the amount of pull that is applied to the upper by the toe gripper by varying the intensity of the pressure of the fluid acting on the pistons 532, 532, the following arrangement is provided to prevent the pressure of the fluid which may leak around the piston 208 from building up behind the piston 352. To this end, the piston 352 is provided with an axial bore 570, Fig. 4 which is interrupted by means of a ball valve 572. This ball valve is normally held away from its seat by means of a relatively light spring 574. As leakage of pressure fluid into the duct *e* occurs, this fluid will flow through the bore 570 and around the ball valve 572. However, when direct communication is established between the ducts *d* and *e*, upon the opening of the gripper jaws and movement of the piston 208, as already explained, the rapid flow of fluid under pressure through the duct *e* will move the ball valve to the right and against its seat, thus rendering the piston 352 effective to actuate the operating lever 160 and retract the toe gripper. Inasmuch as the flow of fluid under pressure to the other pistons 352, 352, which are arranged to retract the side grippers 4, 4, is controlled in a different manner, these two gripper-retracting pistons, not shown, are of solid construction and are not provided with an axial bore and ball check valve.

Just before the completion of the operation of the machine, the duct *d*, leading to the toe gripper 2, Fig. 17, duct *g*, leading to the gripper-supporting pistons 354, Fig. 31, and duct *h* leading to the toe gripper-pulling pistons, 532, 532, Fig. 23, are connected to exhaust. The toe gripper parts are immediately restored to the positions shown in Figs. 14 and 15, by the action of the spring 226, and the gripper-operating lever 160 is rotated, in a clockwise direction, by the gripper-supporting plunger 350 and springs 362, thus returning the toe gripper to the starting position shown in Figs. 3 and 4. As the lever 160 is thus rotated, the pin 172 first travels along the slots formed in the upper ends of the links 250, 250 and then, acting through these links, elevates the pistons 532, 532 to the positions shown in Figs. 26 and 27.

Each of the two side grippers 4, 4 is, as has already been explained, connected to an operating lever 164, freely rotatable on the cross shaft 162 to which the toe-gripper operating lever 160 is secured. Associated with each of the side-gripper operating levers is a gripper-supporting plunger 350 and a gripper-retracting piston 352. When the machine is at rest, as in the case of the toe gripper, these gripper-supporting plungers are elevated by the springs 362, Fig. 31, so that the operating levers 164, 164, and the side grippers 4, 4 are held in the vertical positions shown in Figs. 3 and 4, as determined by the settings of the stop arms 380, 380, Figs. 22 and 23. After the two sets of jaws 282, 284, on each of the side grippers, have been closed on the upper, in the manner described above, and the gripper-supporting plungers 350 depressed, by admission of fluid under pressure into the duct *g*, Fig. 23, the operating levers 164, 164 are rotated, in a counterclockwise direction, Figs. 3 and 4, so as to apply a pull on the upper, by means of fluid under pressure, in the following manner. Connected to each one of the side-gripper operating levers 164 is a rod 580, Figs. 3, 4, 23, 24 and 25. These rods extend downwardly through a portion of the machine frame construction 18, Figs. 3, 4, 23 and 24, where they are connected, by ball joints 582, to an equalizing lever 584, Figs. 24 and 25. This equalizing lever is splined to a shaft 586, which is journaled in the lower end of a piston 588, Figs. 25 and 32, and this piston is slidable in a cylinder 590 which is secured to a part of the machine frame construction 18, Fig. 25. The rods 580, 580 are surrounded by compression springs 592, 592 which bear against the frame construction and thrust washers 593, 593 on these rods, thus tending to hold the parts in the positions shown in Figs. 24 and 25 and with the side grippers elevated as shown in Figs. 3 and 4. A spring-pressed plunger 594, carried by the piston 588, bears against the equalizing lever and tends to hold it in the mid-position shown in Fig. 25. The cylinder 590 is connected to a duct *l*, Fig. 24, and, as will be apparent, when fluid under pressure is supplied to the duct *l*, the piston 588 will be forced downwardly, thus rotating the operating levers 164, 164 in a counterclockwise direction, Figs. 3 and 4, and applying a pull on the upper that is gripped between the jaws of the side grippers. The pull which is thus applied to the upper will be equalized, between the two side grippers, by the action of the lever 584 and its magnitude will be determined by the intensity of the pressure of the fluid acting on the piston 588.

Secured to the frame construction 18 with, and located directly above, the cylinder 590 is a second cylinder 596 in which there is received a piston 598. Interposed between the pistons 588 and 598 is a thrust rod 600 that passes through a gland portion 602, formed in the upper end of the cylinder 590. The cylinder 596 is connected to a duct *k*, Fig. 24, to which fluid under pressure may be admitted. Since the pistons 588, 598 are of substantially the same diameter, when fluid under the same pressure as that supplied to the duct *l* is admitted also to the duct *k*, the resulting pull on the upper will be doubled in magnitude. As will appear below, pressure fluid from a common controlled source may be admitted either to the duct *k* alone, or to both of the ducts *k* and *l*, as desired. Ordinarily only the duct *k* is connected to the source of fluid under the controlled pressure and, if small changes in the side-gripper pull are desired, they may be obtained by varying the pressure of the fluid supplied to the duct *k* in a manner to be explained below. However, when a considerably stronger pull is required, the duct *l* may also be connected to the source of fluid under pressure.

Figure 13:
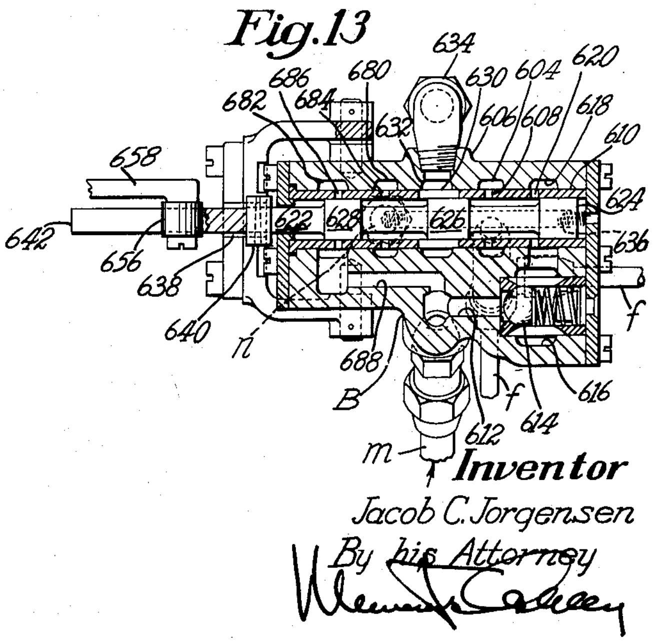
Fig. 13 is a view in section. substantially on line XIII—XIII of Fig. 12 and looking in the direction of the arrows.

At a later stage in the operation of the machine, and as the side tacking devices 8, 8 are advancing, the side-gripper jaws are opened by connecting the ducts *f* to exhaust, Fig. 19, instead of by engagement of the incoming side tacking devices with a latch-release member, as was the case with the toe gripper. It is, however, necessary that the side grippers open and release the upper, and move quickly out of the way of the incoming side tacking devices, when the side tacking devices have moved inwardly to predetermined positions, relative to the opposite side portions of the forepart of a shoe. To this end, the supply of fluid under pressure to, and exhaust from, the ducts $f$, are controlled by a side gripper release valve B, Figs. 12 and 13, which is actuated by mechanism including a cam, associated with the main drive shaft of the machine, and a timing device which is set by the inward movements of the side clamps 14, 14 as they are brought into engagement with the opposite sides of the forepart of a shoe. Referring to Figs. 12 and 13, the ducts $f$ are connected to an annular groove 604, formed in the casing 606 of the valve B. This groove is in communication, at all times, with a series of ports 608, formed in a sleeve 610 which is fitted into the valve casing. Also associated with this valve casing is a duct $m$ which is in communication, by way of a passageway 612, check valve 614 and grooves 616, 618, with a second series of ports 620, formed in the sleeve 610. Slidable withing the sleeve 610 is a valve plunger 622 provided with three spools 624, 626 and 628. The sleeve member also is provided with another series of ports 630 which communicate with a groove 632 and this groove is connected to an exhaust pipe 634. When the machine is at rest, the valve plunger 622 is held in the position shown in Fig. 13, against the resistance of a coil spring 636, by the engagement of a latch member 638 with a collar 640, carried by the valve plunger, Fig. 12. This latch member, which is generally U-shaped and pivotally mounted on the valve casing 606, is provided with a longitudinally extending finger 642 and an upstanding arm 644 against which a spring-pressed plunger 646 bears, Fig. 12. Slidably mounted in a guideway formed in the lower part of the cylinder 132, is a slide member 648 that is provided with a downwardly extending web 650, Figs. 4 and 12. The web 650 is shaped with a cam portion 652 and a shoulder 654. Inserted between the cam portion 652 and the finger 642 is a roller 656 that is journaled on the end of a link 658, connected to one arm of the bell-crank lever 134. The slide 648 is connected to a bell-crank lever 660 by means of a link 662 which is cut away at 664, Fig. 12.

At the beginning of the operation of the machine, the parts just described are in the positions shown in Figs. 12 and 13 so that when fluid under pressure is admitted to the duct $m$ it will be transmitted to the ducts $f$ and thence to the side gripper jaw-closing cylinders 298, Figs. 19 and 20. After the side gripper jaws have been closed on the upper, these grippers are operated to apply a pull to the upper in a manner which has already been described. At a later time in the operation of the machine, while the side tacking devices 8, 8 are being advanced and subsequently to the operation of the side clamps 14, 14, the bell-crank lever 660 is rocked, in a counterclockwise direction, Fig. 12, so as to move the slide 648 to the left. During such movement of the slide 648, the cam portion 652 thereon will eventually come into contact with the roller 656 and, acting through this roller, will operate the latch member 638 to release the valve plunger 622. This valve plunger will be immediately moved, to the left, Fig. 12, by means of the spring 636, so that the valve spools 624 and 626 will cut off the supply of fluid under pressure from the duct $m$ to the ducts $f$ and connect the last-named ducts to exhaust, thereby causing the side gripper jaws to open and release the upper.

As will appear below, the side tacking devices 8, 8 are advanced and retracted by mechanism including a main drive shaft 666, Fig. 46. The bell-crank lever 660 is actuated from a cam, mounted on this main drive shaft, in the following manner. A link 670 connects the bell-crank lever 660 to an arm 672 which is secured to a shaft 673 journaled in a part of the frame construction 18, Figs. 41 and 46. Also secured to the shaft 673 is a second arm 674, carrying a cam roll 677 that rides in a cam path 676, formed in a cam member 678 which is secured to the drive shaft 666, Fig. 46. The cam path 676 is so shaped as to effect movement of the slide 648, to the left, Fig. 12, in predetermined time relation to the inward movements of the side tacking devices. However, since the tripping of the latch member 638 is effected through the roller 656, the exact time in the inward movements of the side tacking devices at which the side gripper jaws are opened will be determined by the location of the roller 656. Inasmuch as this roller is positioned by the bell-crank lever 134, which operates the side clamps 14, 14, it follows that the position of this roll, and hence the timing of the opening of the side gripper jaws, will be varied, automatically, in accordance with the width of the shoe being pulled over as determined by the extent of inward movement of the side clamps.

Upon release of the upper, as a result of the opening of the jaws of the side grippers 4, 4, in the manner just explained, these grippers are quickly moved downwardly, and out of the way of the incoming tacking devices, by the retracting pistons 352 which are associated with the side-gripper operating levers. For controlling the flow of fluid under pressure to these pistons, the valve casing 606 of valve B, Fig. 13, is provided with two annular grooves 680, 682 which communicate with the interior of the sleeve member 610 by means of radial ports 684, 686. The groove 682 is connected to the duct $m$ by means of a passageway 688, and the groove 680 is connected to a duct $n$, Fig. 12. The duct $n$ has a branch that is connected to the housing 700 of a side gripper retracting valve S, above a pair of valve plungers 702, 704, Figs. 48, 49, 50 and 51. Also connected to this valve are the duct $m$ and a duct $o$, the latter of which leads to the side gripper retracting pistons 352, 352, while the former is connected to a source of fluid under pressure, during the operation of the machine. When the valve plunger 622 is in the position shown in Fig. 13, the duct $n$ is connected to the exhaust pipe 634 and the valve plungers 702 and 704 of the control valve 700 are elevated to the positions shown in Figs. 48 to 51 by means of springs. Upon release of the latch member 638 and movement of the valve plunger 622 to the left, Fig. 13, the duct $n$ is cut off from the exhaust pipe 634, by spool 626, and connected to the duct $m$ which is supplied with fluid under pressure. Hence the valve plungers 702 and 704 are moved downwardly by pressure of fluid admitted above them from the duct $n$, thus connecting duct $m$ with duct $o$. The downward movement of these two valve plungers also cuts off the supply of fluid under pressure to the ducts $k$ and $l$ which are associated with the valve S, and connects these ducts to an exhaust passage 706, formed in the valve housing 700, Fig. 51, thus permitting the side gripper retracting pistons 352, 352 to rotate the side gripper operating levers in a counterclockwise direction, Fig. 4, and quickly retract the side grippers.

As the side grippers are thus retracted, the movements of the side gripper operating levers 164, 164 are cushioned and ultimately checked by means of dashpots which are similar to the dashpot provided for checking the toe gripper operating lever 160. Referring to Figs. 24 and 25, these dashpots each include a piston 740 which is elevated by means of a return spring 742. One of these dashpots, both of which are of identically the same construction, is shown in vertical section in Figs. 25 and 30 and the parts of this dashpot corresponding to like parts of the toe gripper dashpot are identified with similar reference characters, increased by two hundred. Thus the dashpot piston 740 is slidable in a cylinder bore 744 formed in a sleeve 746 which is fitted in a housing member 736, secured to a portion of the machine frame construction 18, Fig. 25. The cylinder bore is connected to an annular recess 745, formed in the outside of the sleeve 746, by means of a plurality of radial holes 747, 747 and the groove 745 is connected to a duct $i$ and to a drain passage 749, Fig. 30. These side gripper dashpots are inclined from the vertical, in the same manner as the toe gripper dashpot, so that oil, fed by gravity from the duct $i$ and into the space in the cylinder bore beneath the piston 740, will assume a level like that indicated in Fig. 30, with excess oil spilling out through one of the radial holes 747, annular groove 745 and drain passage 749. Mounted in the lower end of the piston 740 is a ball valve 748 which is normally held away from its seat, by means of a spring 750, so as to permit communication between the space beneath the piston and a pair of axially extending slots 752, 752 cut in the sleeve 746, by way of passages 754, 756 in the piston. The lower ends of these slots open into an annular groove 758 which is connected to the atmosphere, as indicated in Fig. 30, the sleeve 746 serving as an abutment for limiting the downward movement of the piston 740 by engagement with a stop pin 760, carried by the piston at the lower ends of the slots 752, 752.

Fitted into the lower part of the sleeve 746 is a conical valve member 762 having a stem 764 that extends up into the cylinder bore 744 in line with the ball valve 748. This conical valve is normally held against its seat by a spring 766 and, when opened, affords communication between two different portions of the duct *j*. During the initial downward movement of the piston 740, air is evacuated from the space beneath it and above the level of the oil, this air escaping upwardly around the ball valve 748, through passages 754, 756, slots 752 and annular groove 758, to the atmosphere. The ball valve 748 is, however, eventually closed by engagement with the valve stem 764 so that oil, and any remaining air, are trapped beneath the piston 740. This piston is fitted somewhat loosely in the cylinder bore 744 and the trapped oil and air will be forced upwardly, between the piston and cylinder bore, thus producing a dashpot, or checking, action which slows down the movement of the piston, such movement being eventually stopped by the engagement of the pin 760 with the sleeve 746 at the lower ends of the slots 752, 752. When downward movement of the piston is finally stopped, in the foregoing manner, the conical valve 762 will be moved away from its seat, see dotted lines in Fig. 30, as a result of the engagement of the ball valve 748 with the valve stem 764, thus opening up communication between the two portions of the duct *j* for a purpose which will presently appear.

At the completion of the operation of the machine, all of the various ducts through which fluid under pressure is conducted to the several control valves and operating pistons are connected to exhaust. When this occurs, the side gripper-operating levers 164, 164 are rotated in a clockwise direction, Figs. 3 and 4, and the side grippers are elevated to their starting positions, by the gripper-supporting plungers 350 and their springs 362, Fig. 31, assisted by the springs 592, 592 which surround the rods 580, 580, Fig. 24.

During the operation of the toe gripper 2 and the side grippers 4, 4 to apply a pull to the upper of a shoe supported on the shoe rest 10, in the manner explained above, these grippers are moved away from the shoe rest, in directions extending generally heightwise of the shoe, by means of the operating levers 160, 164, 164. It is, however, also desirable that each of these grippers have a compartment of movement laterally away from the shoe rest, in a direction substantially parallel to the plane of the bottom of the shoe, in order to facilitate the tensioning of the upper by the gripper pull and to avoid any tendency for the upper, as it is being tensioned, to engage and displace an insole member secured to the bottom of the last. Such lateral components of movement are imparted to the toe and side grippers of the machine in the following manner. Referring to Figs. 4 and 22, it will be remembered that the lateral, or "spread," positions of the grippers are determined by the settings of the positioning bar 424 and pads 452, 452, the toe gripper being held against a roll 422, carried by the bar 424, by means of a spring 420, Fig. 4, while the side grippers are held against the pads 452, 452 by spring pressed plungers 450, 450. The toe gripper is provided with an inclined cam surface 780 and each side gripper is provided with a similar cam surface 782, Fig. 4. As will be apparent, when these grippers are operated to apply a pull to the upper, by movements in directions heightwise on the shoe, they will also be moved laterally away from the shoe by the actions of the cam surfaces 780, 782.

After the upper has been suitably located on its last, in a manner about to be explained, and while the grippers are exerting their tensioning pull on the upper to shape it over the last, the tacking devices are advanced mechanically and, at a predetermined point in the advancing movement of each tacking device, the jaws of its cooperating gripper are opened to release the upper and the gripper is retracted by a movement downwardly and away from the bottom of the last. In order to provide ample clearance space between the advancing tacking devices and the grippers, the herein illustrated machine is provided with mechanism for causing the grippers to collapse, by movement inwardly toward the center of the last, simultaneously with their retracting movements downwardly away from the bottom of the last. Referring to Fig. 4, the gear quadrant 437 forms part of a lever 786 which is journaled on a portion of the machine frame construction 18, see Fig. 23. As will presently appear, the tacking devices are advanced and retracted by mechanism including a downwardly extending link 800, Figs. 3 and 4, that is also connected to the lever 786, see also Fig. 23. Therefore, when the tacking devices are advanced, as a result of the downward movement of the link 800, the lever 786 will be rocked in a counterclockwise direction, Fig. 4, and through the actions of pinions 434, 435 and rack teeth 439, the carriage 430 will be moved downwardly and to the right, as viewed in Fig. 4. As the carriage is moved in this direction, the positioning bar 424 and the cam member 458 are carried along with it so that the grippers may be moved inwardly, toward the center of the last, by the action of the spring 420, Fig. 4, and spring pressed plungers 450, 450, Fig. 22, to an extent permitted by the magnitude of the pull being applied to the upper by the grippers. By the time the gripper jaws are opened to release the upper, the carriage 430 will have been moved a considerable distance, downwardly and to the right from the position shown in Fig. 4. Accordingly, as soon as the grippers release the upper, they will be quickly moved inwardly toward the center of the last, by the action of spring 420 and spring pressed plungers 450, 450, this collapsing of the grippers taking place simultaneously with the retraction of the grippers away from the bottom of the shoe, in a heightwise direction.

In addition to their action for tensioning the upper, by means of pull applied in directions extending generally heightwise of the last, the side grippers 4, 4 of the herein illustrated machine are also adapted to apply a pull to the upper, at the opposite sides of the forepart, in a direction extending generally lengthwise of the last and forwardly toward the toe end of the last. Such lengthwise pulling actions of the side grippers are obtained by moving these grippers forwardly, toward the toe end of the last, by means of fluid pressure operated pistons in the following manner. Referring to Figs. 5 and 19, the casing member 270 of each of the side grippers is provided with an open-sided cylindrical groove 804 in which there is slidably mounted one part of an X-shaped connecting block 806. The other part of each of these connecting blocks is slidably mounted in a similar open-sided cylindrical groove 808, formed in a slide 810 that is fitted in a portion of the frame construction 18, Figs. 5, 6 and 7. Each of these slides is adjustably connected, by means of a screw 812, to a rack block 814 and these two rack blocks are in mesh, respectively, with gear teeth 816, 818 cut on two sleeves 820, 822, Fig. 6. The sleeves 816, 818 are rotatably mounted on a cross shaft 824, which is journaled in a part of the frame construction 18, and are provided, respectively, with another set of gear teeth 826, 828. As shown in Fig. 8, the gear teeth 826, 828 are each in mesh with a plunger 830, slidable in the machine frame, and a return member 832, which is centered by a spring 834. In alinement with each of the two plungers 830 is a piston rod 836, Fig. 5, which is formed integrally with a piston 838 that is fitted in a cylinder 840, carried by the machine frame construction 18, Fig. 8. The cylinders 840 are connected, beneath the pistons 838, by means of a cross passage 842, formed in a part of the machine frame, Fig. 5, and this cross passage is connected with a duct *p*, Figs. 4, 48, 49, 50 and 53, to which fluid under pressure is admitted at a predetermined time during the operation of the machine and while the side grippers are exerting a heightwise pull on the upper gripped between their closed jaws.

When fluid under pressure is thus admitted to the duct *p* and thence through this cross passage 842, to the cylinders 840, the pistons 838 will be elevated, as viewed in Fig. 5. Upon engagement of the cylinder rods 836 with the plungers 830, the continued movement of the pistons will rotate the sleeves 820, 822 which, in turn, will drive the rack blocks 814 in a direction so as to move the slides 810, and the side grippers which are attached thereto, upwardly as viewed in Fig. 5. As a result of this movement of the side grippers, the upper will be subjected to a pull, extending in a direction lengthwise of the last and toward the toe end of the last, the magnitude of which will be determined by the intensity of the pressure of the fluid admitted to the duct *p*. Therefore, by varying the intensity of the pressure of the fluid which is caused to act upon the pistons 838, the magnitude of this lengthwise pull, or so-called "forward drag" action, may be changed to accommodate different operating conditions. When, at the completion of the operation of the machine, the duct *p* is connected to exhaust, the side grippers will be returned to the positions shown in Fig. 5 by the action of the centering springs 834, Fig. 8.

As has already been suggested, the herein illustrated machine is adapted to come to a stop with the toe and side grippers exerting their respective pulls on the upper of a shoe supported on the shoe rest. Before the machine is again started to complete its operation on the shoe, during which the margin of the upper is secured to the shoe bottom by the tacking devices, the operator may inspect the upper to see whether it is properly positioned on its last and, if necessary, can correct the position of the upper by manual manipulation of the toe gripper 2 and side grippers 4, 4. Such corrections of the position of the upper on its last include adjustment of the position of the throat opening, laterally of the last, varying the location of the tip line of the upper, lengthwise of the last, and changing the angular disposition of the tip line of the upper, relatively to the forepart of the last. In order to facilitate the manual manipulation of the grippers, when making the aforementioned corrections, the machine is provided with controlling devices for relieving, or entirely discontinuing, the pressure of fluid acting on certain of the operating pistons associated with the toe and side grippers, as will be explained below. These controlling devices are arranged to restore the pressure of the fluid acting on these pistons prior to the starting of the machine a second time.

The position of the throat opening of an upper, laterally of its last, is effected by manually manipulating the side grippers 4, 4 so as to slide the upper over the last and such sliding of the upper over the last is produced by equal and opposite movements of the side grippers in directions extending generally heightwise of the last. Referring to Figs. 24 and 25, it will be recalled that the side gripper operating levers 164, 164 are actuated by means of a pair of pull rods 580, 580 which are connected to an equalizing lever 584. As has already been explained, this equalizing lever is splined on a shaft 586 which is operatively connected to the side gripper pull pistons 588 and 598. Formed integrally with this shaft is an arm 850 which extends upwardly, in front of a cross slide 852, mounted on a part of the cylinder 590, Fig. 32, and which carries a roller 854 that fits in a slot 856, cut in this slide, see also Fig. 24. The cross slide 852 is connected to a hand lever 890, Figs. 1 and 41, by means of a series of links 892, 894, 896 and 898, and levers 900, 902 and 904, Figs. 41 and 45, in such a way that when the hand lever is oscillated, the cross slide will be reciprocated toward and away from the mid-position shown in Fig. 24, as indicated by the double arrow. As a result of such reciprocation of the cross slide 852, the arm 850 will be oscillated so that the side grippers 4, 4 are moved alternately and in opposite directions toward and away from the bottom of the last, by the actions of the rods 580, 580 and the gripper-operating levers 164, 164, Fig. 24. The cylinder 590 carries a pair of fluid pressure operated locking pistons 906, 906 which bear against the cross slide 852, Fig. 33. Fluid under pressure is admitted to the space behind these locking pistons from a cross passage 908 which is in communication with a part of the duct *m*, referred to above, see Figs. 48, 49, and 50, that is connected to a source of fluid under pressure when the machine is started. The pistons 906, 906 tend to cramp the cross slide 852 against its bearing on the cylinder 590 and thus hold the side grippers in the positions to which they are moved by the hand lever 890.

It will frequently happen, although the throat opening of the upper may be incorrectly positioned, laterally of the last, that the upper adjacent to the tip line is in the desired lateral location. Under such conditions, the position of the throat opening must be corrected without at the same time displacing the upper laterally adjacent to the tip line. To this end, the herein illustrated machine is provided with mechanism for locking the set of jaws of each side gripper, which engage the upper in the vicinity of the tip line, while leaving the other set of jaws on each of the side grippers, which engage the upper in a location rearwardly of the tip line, free for movement to slide the upper over the last, in the manner just explained. Referring to Figs. 19 and 20, the left-hand set of gripper jaws, associated with the gripper carrier 278, is the set which engages the upper in the vicinity of the tip line, this set of gripper jaws being shown as uppermost and nearer the shoe-supporting finger 36 in Figs. 2 and 5. The carrier 278 of each of the side grippers is provided with a downwardly extending portion 910 to which there is connected a link 912, Fig. 19. Each of these two links is, in turn, connected to the upper end of a rod 914 that is slidable in a bore 916, formed in a portion of the housing member 536, previously referred to, see Figs. 26 and 27. Near their lower ends, these rods are provided with V-shaped grooves 918, Fig. 28, in which are fitted the complementally shaped ends of a pair of locking plungers 920 which are connected to a pair of articulated toggle links 922, 922. Mounted in a cylinder bore 924, formed in a portion of the housing 536, are a pair of pistons 926, 928, which are arranged above and below the toggle links as shown in Fig. 27. The space above the piston 926 is connected to a duct *q*, while the space beneath the piston 928 is in communication with a duct *r*. When the parts are in the positions shown in Fig. 27, the piston 928 is elevated, by a coil spring 930 and fluid under pressure admitted beneath it from duct *r* and the rods 914, and hence the gripper carriers 278, which are attached thereto, are free to move up and down when the side grippers are operated to slide the upper over the last. However, when the duct *r* is connected to exhaust and fluid under pressure is admitted above the piston 926, through the duct *q*, the toggle links 922, 922 will be straightened thus locking the rods 914 and hence the gripper carriers 278 in the housing 536 which is secured to a part of the machine frame construction 18. Now, when the side grippers are operated to slide the upper over the last, the carriers 278 and associated gripper jaws will be held stationary while the other gripper carriers 280, Figs. 19 and 20, and their associated gripper jaws will be moved up and down, such movement being permitted through the action of the equalizing levers 286. Accordingly, the throat opening may be adjusted, relatively to the last, without displacement of the upper at the tip line. As will appear below, a tip lock control valve D is provided for regulating the flow of fluid under pressure to, and exhaust from, the ducts *q* and *r*.

The excess weight of the gripper carriers 278, links 912 and rods 914, over the weight of the other gripper carriers 280, is counterbalanced in the following manner. Referring to Fig. 27, each of the rods 914 is provided with an offset portion 932 which rests on the upper end of a sleeve 934. Each of these sleeves is supported by a compression spring 936 and a rod 938 that extends upwardly through the upper end of the sleeve and the offset portion 932 of the rod 914. The sleeves 934 are slidable freely in bores 940 formed in the housing 536, Fig. 27, and each of the rods 938 is formed with a hook portion 942, Fig. 29. The hook portion of each of the rods 938 projects over a pin 944, carried by the bifurcated end of an arm 946, Figs. 23, 27 and 29. Each of the arms 946 is connected to the end of one of the side gripper-operating levers 164 by means of a link 948, Figs. 3, 4, 23, 26, 27 and 29. With the arrangement just described, when the rods 914 are unlocked, so that both sets of gripper jaws on each of the side grippers are free to be moved up and down for sliding the upper over the last, the excess weight of the gripper carriers 278, links 912 and rods 914 is counterbalanced by the springs 936 since the aforementioned parts are, in effect, suspended from the ends of the gripper-operating levers by means of these springs, the hooked ends 942 of the rods 938, pins 944, arms 946 and links 948. However, when the rods 914 are locked against movement, by means of the locking plungers 920, 920, in the manner explained above, the side grippers may still be operated to cause the gripper jaws which are associated with the carriers 280 to slide the upper over the last, inasmuch as the gripper-operating levers are permitted to move in either direction by compression of the springs 936 or by movement of the hooked ends 942 of the rods 938 upwardly and away from the pins 944 on the arms 946.

In addition to the manipulation of the side grippers for adjusting the position of the throat opening of the upper, by equal and opposite movements of the side grippers, or one of the sets of gripper jaws thereon, in directions heightwise of the last, the side grippers are also manipulated, by movements lengthwise of the last, to vary the location of the tip line of the upper and/or to change the angular disposition of the tip line, relatively to the forepart of the last. For thus manipulating the side grippers, the following mechanism is provided. Referring to Fig. 6, the sleeves 820, 822, which have previously been referred to, are connected respectively to the cross shaft 824 and to a hollow shaft 950, while the cross shaft 824, in turn, is connected to a shaft 952; the hollow shaft 950 and shaft 952 being journaled in a part of the machine frame construction 18 as shown. The hollow shaft 950 is provided with gear teeth 954 that mesh with a pinion member 956, Fig. 6, and abuts at one end against a sleeve 958 that is pinned to the shaft 952. This sleeve member is provided with gear teeth 960 which mesh with an idler gear 962 and a pinion member 964, Figs. 6 and 9, while the idler gear 962 also meshes with a second pinion member 966. The pinion member 964 is keyed to a countershaft 968, journaled in a part of the machine frame construction, Fig. 10, and the pinion 966 is rotatably mounted on this countershaft. The pinion member 956 is rotatably mounted on a sleeve 970, provided with a radial flange 972 and this sleeve is secured to the countershaft 968 by means of a screw 974 which passes through a hub member 976, mounted on the sleeve. Pivoted on this hub member and urged to the position shown in Fig. 10 by means of a spring-pressed plunger 978, is a lever arm 980. This lever arm is connected to a pin 982, slidable in the hub member 976, which is adapted to be moved into a hole 984 in the pinion member 956 when the lever 980 is rocked in a clockwise direction, against the resistance of the spring-pressed plunger 978. The pinion member 956 is connected, by means of a pin 988 which passes through an arcuate slot 990, cut in the flange 972, Fig. 11, to a second hub member 922 that is rotatably mounted on the shaft 968 between the flange 972 and the pinion member 966, Fig. 10. Pivoted on this hub member and urged to the position shown in Fig. 10 by means of a spring-pressed plunger 994 is a lever arm 996. This lever arm is connected to a pin 998, slidable in the hub member 992, which is adapted to be moved into a hole 999, formed in the pinion member 966, when the lever 996 is rocked in a clockwise direction against the resistance of the spring-pressed plunger 994.

The levers 980, 996 are located on the front of the machine and within easy reach of the operator, see Fig. 1. When these levers are in the positions shown in Fig. 10, the side grippers 4, 4 may be moved forwardly and rearwardly, independently of each other, by means of the lever arms 980, 996, the former effecting movement of the gripper which is on the left in Figs. 2 and 5, through the shaft 968, pinion 964 and gear teeth 960 on the sleeve 958, while the latter effects movement of the other side gripper through pin 988, pinion 956 and gear teeth 954 on the hollow shaft 950. When the lever arm 980 is rocked in a clockwise direction, Fig. 10, it may be used alone for effecting simultaneous forward or rearward movement of the side grippers since the hub member 976 will now be connected to the pinion 956 by the pin 982. On the other hand, if the lever arm 996 is rocked in a clockwise direction, Fig. 10, it may be used alone for moving the side grippers simultaneously in opposite directions, forwardly and rearwardly of the last, through the action of the pinion member 956, for one of the grippers, and the action of the pinion 966, which will be connected to the hub member 992 by pin 998, idler 962 and gear teeth 960 on sleeve 958. Thus by suitably manipulating the lever arms 980 and 996, the side grippers 4, 4 may be operated in any desired manner to effect movement of the upper, by the side grippers, to change the position of the tip line either forwardly or rearwardly of the last, or angularly with respect to the last.

Figures 9, 10, 11:
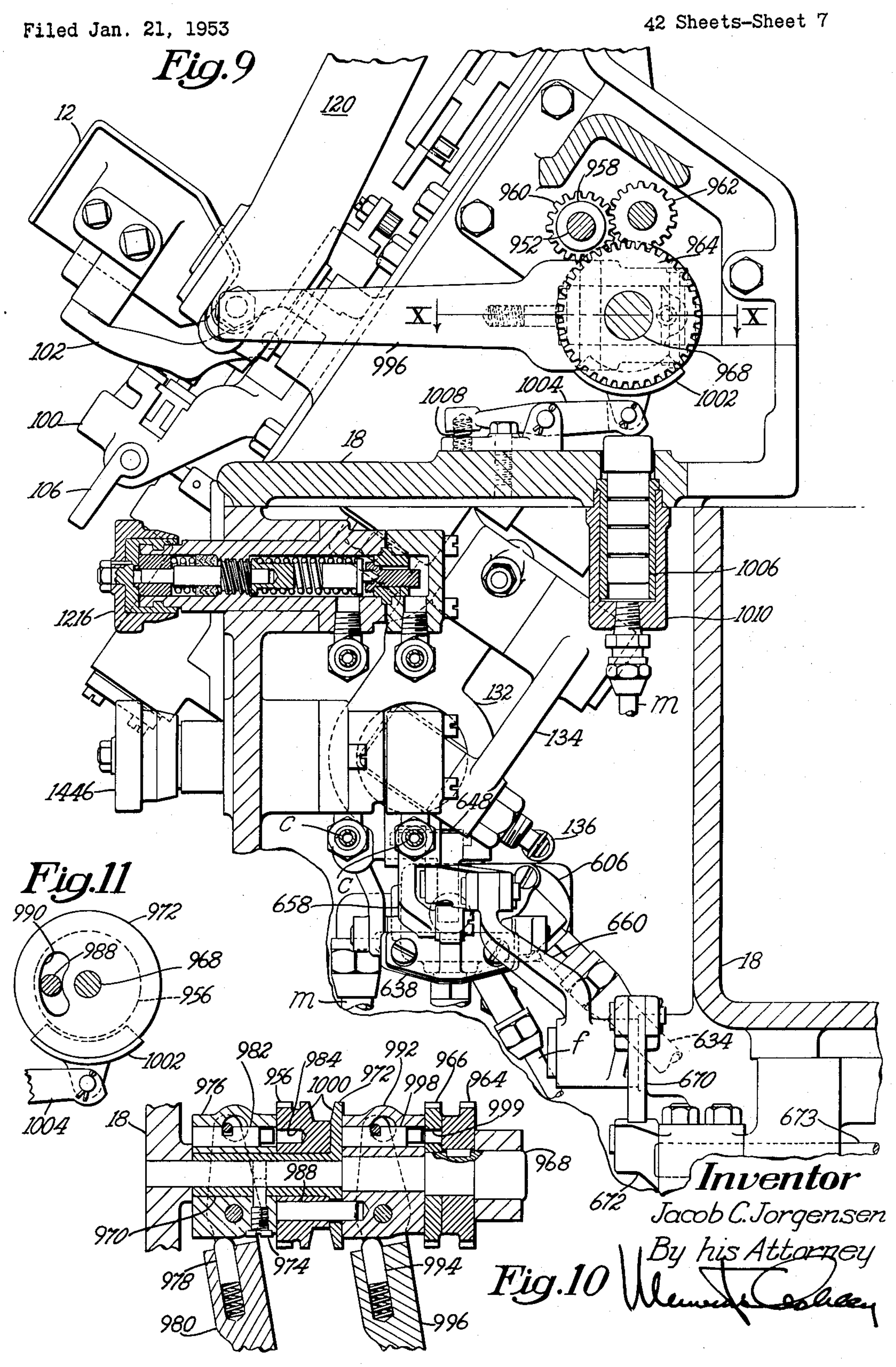
Fig. 9 is a view of a portion of the machine at an enlarged scale and in vertical section substantially on line IX—IX of Fig. 2 and looking in the direction of the arrows.
Fig. 10 is a view in horizontal section substantially on line X—X of Fig. 9 and looking in the direction of the arrows.
Fig. 11 is a view in side elevation of a detail of construction of the portion of the machine which is illustrated in Figs. 9 and 10.

For holding these levers, and hence the side grippers and upper, in any position to which they may be moved by the operator, the following arrangement is provided. Referring to Fig. 10, the pinion member 956 and flange 972 of the sleeve 970 are provided with oppositely facing inclined surfaces 1000 to form a V-groove. Fitted in this V-groove is a V-shaped friction block 1002 which is carried by one end of a lever 1004, Fig. 11. This lever is pivoted on a part of the machine frame construction 18, Fig. 9, so that the end to which the friction block 1002 is attached is directly over a piston 1006. A coil spring 1008, acting on the opposite end of this lever, tends to swing it in a direction to withdraw the friction block 1002 out of the V-groove, formed by the pinion 956 and flange 972, and to push the piston 1006 downwardly in its cylinder 1010. The cylinder 1010 is in communication with another part of the duct *m*, referred to above, and as has already been explained, fluid under pressure is supplied to the duct *m* as soon as the machine is started. The fluid under pressure acting on the piston 1006 urges the block 1002 into frictional engagement with the inclined surfaces 1000 on the pinion member 956 and flange 972, thus holding the sleeve 950 and shaft 952, and the side grippers which are operatively connected therewith in the positions to which these parts are moved by the hand levers 980, 996. However, the action of the friction block 1002 is not sufficient to prevent movement of the side grippers by the forward drag pistons 838, 838. Thus, when the machine is again started these pistons will move the side grippers forwardly from the positions in which they were placed by the operator.

In order to facilitate, and also to assist in, the positioning of the upper on its last by manipulation of the side grippers 4, 4 in the manner just described, the toe gripper 2 of the herein illustrated machine is arranged for manual manipulation by the operator. Referring to Figs. 4 and 23, it will be remembered that the toe gripper operating lever 160 is secured to the shaft 162 which is journaled in a part of the machine frame construction. The shaft 162 is also connected to a shaft 1020 that extends into a housing member 1022, secured to the machine frame, and carries an exterior clutch member 1024, Fig. 42. Fitted into the shaft 1020 is another shaft 1026 having an axial bore 1028 and a hub portion 1030 which serves as an interior clutch member. The shaft 1026 has a part that extends out beyond the machine frame and pivoted on a member 1031, secured to this part of the shaft 1026, is a hand lever 1032. The hub portion 1030 is traversed by a diametrical bore 1034, Fig. 43, which intersects the bore 1028, and fitted in the last-named bore is a sleeve 1036, Fig. 42. This sleeve is provided with a pair of diametrically opposed ports 1038 which communicate with the diametrical bore 1034 and another set of ports 1040 that are in register with an annular groove 1042, formed in the shaft 1026. Slidable in the bore 1034 are a pair of pistons 1044 which carry wedge plungers 1046, Fig. 43, that engage a series of rollers 1048. These rollers are arranged between the clutch members 1024 and 1030, in the manner shown in Fig. 43, and are interposed between the wedge plungers 1046 and a pair of wedge blocks 1050, secured to the interior clutch member 1030. When the pistons 1044 are moved outwardly, against the resistance of spring-pressed return plungers 1052, Fig. 43, by fluid under pressure admitted into the bore 1034 between these pistons, the series of rollers 1048 will be expanded by the action of the wedge plungers 1046 and the wedge blocks 1050 so as to connect the shafts 1020 and 1026 together.

Slidable in the sleeve 1036 and also in the bore 1028 of shaft 1026 is a valve plunger 1054 that is provided with three spools 1056, 1058 and 1060, and a pair of guide portions 1062. A coil spring 1064 normally urges the valve plunger to the position shown in Fig. 42 with the left-hand end of the valve plunger bearing against a control member 1066. This control member is slidably mounted in the member 1031, to which the hand lever 1032 is pivoted, and is provided with a cam portion 1068. When the valve plunger 1054 is in this position, the space in the bore 1034 between the pistons 1044 is connected to the space between the valve spools 1056 and 1058, which space is in turn connected to a port 1070 that leads to exhaust. Hence, the wedge plungers 1046 will be retracted by spring plungers 1052 to release the rollers 1048 and disconnect the shafts 1020 and 1026. However, when the control member 1066 is moved downwardly, in a manner about to be explained, the spring 1064 will shift the valve plunger 1054 over to the left, Fig. 42, as permitted by the cam surface 1068, until the space in the bore 1034, between the pistons 1044, is connected to the space between the valve spools 1058 and 1060. This last-named space is in communication with the annular groove 1042 which is connected by a flexible pipe 1043, Fig. 43, to a part of the duct *m*, Figs. 48, 49, 50 and 57, which, as has already been explained, is supplied with fluid under pressure as soon as the machine is started. Hence, when the control member 1066 is moved downwardly and the valve plunger 1054 shifted to the left, Fig. 42, fluid under pressure will be admitted to the space in bore 1034 between the pistons 1044 and the shaft 1026 connected to the shaft 1020.

For thus operating the control member 1066, it is connected, by means of a link 1072, to a rod 1074 that is mounted in the hand lever 1032 and urged to the position shown in Fig. 42 by means of a coil spring 1076. This rod is also connected to a hand grip 1078 that is pivoted on the hand lever 1032, Figs. 41 and 42. With the arrangement just described, when the hand grip 1078 is squeezed, the shaft 1026 will be connected to the shaft 1020, and hence to the shaft 162 to which the toe gripper operating lever 160 is connected, so that the toe gripper operating lever may be oscillated, to move the toe gripper up or down, in directions extending heightwise of the last, by means of the hand lever 1032. As will be explained below, the machine is provided with a toe gripper manual control valve C, Figs. 48, 49, 50 and 57, which may be operated to connect the toe gripper pulling cylinders 534, Fig. 27, to exhaust when it is desired to move the toe gripper up or down in the foregoing manner. As will be apparent from an inspection of Figs. 1, 3, 4 and 41, upward movement of the hand lever 1032, Fig. 41, will swing the operating lever 160 in a counterclockwise direction, Figs. 3 and 4, and thus lower the toe gripper, while downward movement of the hand lever will elevate the toe gripper. The hand lever 1032 is normally held in the position shown in Fig. 41 in the following manner. The member 1031 has a portion that extends beneath a lever 1080 which is pivoted on the machine frame construction, Fig. 41. This lever is urged to the position shown, and against a stop screw 1082, by means of a coil spring 1084. Thus, downward movement of the hand lever 1032, to elevate the toe gripper, must be effected against the resistance of the spring 1084, while upward movement thereof, to lower the toe gripper, is unrestricted.

One of the objects of moving the toe gripper up or down is to cause the toe gripper jaws 174, 176, Figs. 15 and 16, to grip the upper in a different location. For this purpose, it is necessary that the gripper jaws release the upper before the gripper is moved by the hand lever 1032. To this end, the aforementioned control valve C is not only adapted to connect the toe gripper pulling cylinders to exhaust but also to relieve the pressure of the fluid supplied to the duct *d*, which leads to the toe gripper closing cylinder 206, Fig. 14, and thus cause the toe gripper jaws to open. This control valve is located adjacent to the hand lever 1032, Fig. 42, and is provided with a stem 1090, Fig. 44. As will be explained below, when this valve stem is moved downwardly, the toe gripper pulling cylinders will be connected to exhaust and the pressure of fluid supplied to the duct *d* will be relieved to cause the gripper jaws to open. The valve stem 1090 is connected to a bell-crank lever 1092, by means of links 1094, and one arm of this bell-crank lever is in alinement with a plunger 1096, slidable in a part of the machine frame, Figs. 42 and 44. The hand lever 1032 is provided with an arcuate extension 1098 which terminates, at each end, in a flange 1100 and one end of the plunger 1096 is in line with this arcuate extension. Accordingly, when the hand lever 1032 is swung in a clockwise direction, see arrow Fig. 42, and toward the side of the machine, the plunger 1096 will be pushed inwardly against the bell-crank lever 1092 and the valve plunger 1090 moved downwardly so as to cause the toe gripper jaws to be opened to release the upper and the toe gripper pulling cylinders connected to exhaust. The plunger 1096 also serves as a stop to limit movement of the hand lever 1032, and hence of the toe gripper, by engagement with the flanges 1100 on the arcuate extension 1098 of the lever 1032.

*Fluid pressure system*

In the foregoing description, references have been made to various pistons that are operated by fluid under pressure and also to several valves by means of which the operation of these pistons are controlled. The system for supplying fluid under pressure to these pistons and valves, the valves themselves as well as other valves forming a part of this system, will now be described.

This fluid pressure system as a whole is diagrammatically illustrated in Figs. 48 to 50 of the drawings, while the operating pistons and certain of the control valves are shown diagrammatically and in detail in other figures of the drawings that will be referred to below. The source of fluid under pressure is a pump 1102, Figs. 41, 48 to 50 and 58, that is connected to a sump, formed in the lower part of the machine frame construction 18, by means of an intake pipe 1104, Fig. 41, and which delivers fluid, such as oil, under pressure, to a manifold 1106, Fig. 59. This pump is driven from a motor 1108, by means of a belt 1110, Fig. 41, pulley 1112 and gears 1114, 1116, Fig 64, the motor 1108 being under the control of a main switch 1118, mounted on the front of the machine, Fig. 1. The manifold 1106 is in communication with a treadle-operated control valve, indicated generally by the reference character A, Fig. 59, and with a relief valve 1120, Figs. 58 and 48 to 50, which is set to open when the pressure of the fluid in the manifold reaches approximately two hundred pounds per square inch. The valve A is provided with two valve plungers 1122 and 1124, Fig. 59, which, as will be explained below, are actuated by means of mechanism associated with a main treadle 1126, mounted in the lower part of the front of the machine, Figs. 1, 41 and 58. This treadle mechanism is so arranged that when the treadle 1126 is first depressed, the valve plunger 1122 will be shifted over to the left, Fig. 59 and upwardly, Figs. 48 to 50, against the resistance of a return spring 1123, and held in this operative position upon release of the treadle, while a second depression of the treadle will shift the valve plunger 1124 in the same direction in which plunger 1122 was shifted, against the resistance of a return spring 1125, and hold it in this operative position until both of these valve plungers are released for return to the positions shown in Fig. 59, at a later time in the operation of the machine.

Referring to Fig. 59, the valve A is provided with four ports 1127, 1128, 1130 and 1132, adjacent to the plunger 1122, the port 1127 communicating with the manifold 1106, while the ports 1130, 1132 lead to exhaust. The port 1128 is connected to the duct *m*, referred to above, and also leads over to the valve plunger 1124. With the valve plunger 1122 in the position shown in Fig. 59, the port 1128, duct *m*, port 1127 and manifold 1106 are connected to exhaust through the ports 1130 and 1132. The pump 1108 now runs idly, building up the pressure of the fluid in the manifold only to a relatively low intensity that is sufficient to actuate a shut-off valve 1131 against the resistance of a relatively light spring 1133. This shut-off valve controls the flow of fluid to a gravity feed tank 1135 through a duct *a'*, Figs. 48 to 50, and connected to this tank are the ducts *i*, referred to above. When the valve plunger 1122 is shifted over to the left, Fig. 59, and upwardly to the position in which it is shown in Figs. 48 and 49, the port 1128 is connected to the port 1127 and these two ports are cut off from the exhaust ports 1130, 1132. The pump 1102 now forces oil through the manifold 1106 and valve A into the duct *m* until the pressure of the oil in the manifold and in the duct *m* builds up to the value for which the relief valve 1120 is set. As will be seen in Figs. 48 to 50, the duct *m* is provided with a number of branches which are connected to various control valves and operating pistons in the following manner. It has already been explained that the duct *m* is connected directly to the valve casing 606, Figs. 12 and 54, also referred to as the side gripper release valve B; to the valve housing 700, Fig. 51, also referred to as the side gripper retracting valve S; to the spaces behind the locking pistons 906, 906, Fig. 33 and locking piston 1006, Fig. 9; and to the flexible pipe 1043, Fig. 43. The duct *m* is also connected to the toe gripper manual control valve C, Fig. 57, to the tip lock control valve D, Fig. 52, to a flow control and timing valve E, to an oil trapping valve G, Fig. 54, to a gripper pressure control valve I, Fig. 55, and to a pull sequence valve J, Fig. 56.

Figure 54:
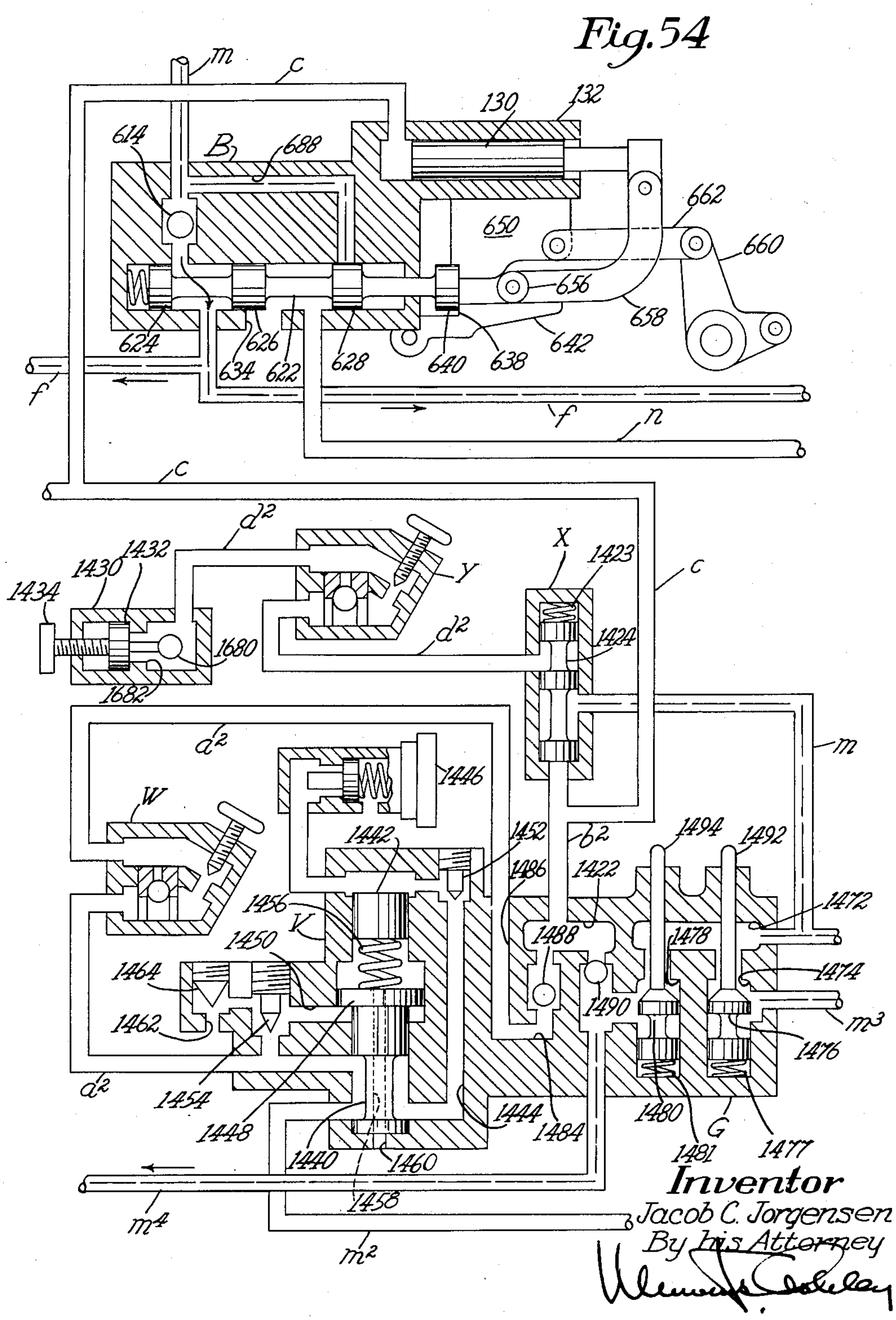

As has already been explained, the valve B is provided with a valve plunger 622 and, when the machine is started, by the first depression of the treadle 1126, this valve plunger is in the position shown in Figs. 13, 48 and 54, so that fluid under pressure is admitted to the duct *f* from the duct *m*. The duct *f* leads to the side gripper-closing pistons 302, Figs. 19 and 20, and also through a shoe rest expander valve F, to the duct *a* which leads to the shoe rest expander piston 56, Figs. 4 and 53. The valve C is provided with a valve plunger 1136 which is in the position shown in Figs. 48 and 57 when the machine is started so that a branch of the duct *m* is connected to the duct *d* which leads to the toe-gripper-closing piston 208, Fig. 14. A duct $m^4$, which leads from the oil-trapping valve G, Fig. 54, is connected to the duct *b* which leads to the heel-rest-operating piston 112, Figs. 4, 48, 49, 50 and 53. The valve E has one valve plunger 1137 which is arranged to be elevated, as shown in Figs. 49 and 53, by fluid under pressure from a part of the duct *m* so as to disconnect the duct *f* from an exhaust port 1139 in the valve E and to connect the duct *f* to the duct *m*. With the arrangement so far described, when the treadle 1126 is first depressed the following actions will occur almost simultaneously; the jaws of the toe and side grippers will be closed on the upper of a shoe placed on the shoe rest 10, the shoe-rest fingers 34, 34 will be expanded by the piston 56, and the heel rest 12 will be moved upwardly and into engagement with the heel end of the shoe by the piston 112. Such movement of the heel rest is governed by a throttle, or needle valve H, also referred to as the heel rest throttle valve, in the duct *b*, Fig. 53, so that displacement of the shoe by the heel rest may be easily prevented by holding the shoe firmly against the fingers 34, 34 and 36 of the shoe rest, before the grippers are operated to pull the upper. Fluid under pressure will also be supplied through duct *m* to the tip lock control valve D, Fig. 52, and to the valve E to elevate the plunger 1137, thus disconnecting the duct *f* from exhaust and connecting it to the duct *m*.

When the foregoing actions have been completed, the toe gripper 2 and side grippers 4, 4 are operated to pull the upper over its last in the following manner. A branch of the duct *m* is connected to the gripper pressure control valve I, Fig. 55, which is provided with a first valve plunger 1138 for regulating the pressure of fluid admitted to a duct *t* and a second valve plunger 1140 for regulating the pressure of fluid admitted to a duct *v*. Another branch of the duct *m* leads to the pull sequence valve J, Fig. 56. The duct *t* leads to a toe gripper control valve K, while the duct *v* leads to a side gripper control valve L, Fig. 56. The valve K is provided with a valve plunger 1142 which, when elevated from the position shown in Figs. 48 and 56 to the position shown in Fig. 49 against the resistance of a return spring, is adapted to connect the duct *t* to a duct *s*. The duct *s* leads to the toe gripper manual control valve C, previously referred to, where it is connected to the duct *h*, which leads to the toe-gripper-pulling pistons 532, when the valve plunger 1136 of the valve C is in the position shown in Figs. 48 and 57. The valve L is provided with a valve plunger 1144, which, when elevated from the position shown in Figs. 48 and 56, to the position shown in Fig. 49, against the resistance of a return spring, is adapted to connect the duct *v* to a pair of ducts *u* and *w*. The duct *u* leads to a side-gripper manual control valve R, Figs. 34 and 55, which has a plunger 1146 that is normally held in the position shown in Figs. 34, 48, 49, 50 and 55, and so as to connect the duct *u* to the duct *k*, which leads to the side-gripper main pulling piston 598, by means of a return spring 1148.

The valves K and L are operated by fluid under pressure from the duct *m* under the control of the pull sequence valve J. This valve comprises a housing 1150, Figs. 56 and 61, 62 and 63, provided with a pair of parallel passageways 1152, 1154 that are connected together by transverse bores 1156, 1158, in which are located oppositely opening check valves 1160, 1162, Fig. 62. The passageway 1152 terminates in a bore 1164 in which there is fitted a sleeve 1166 that is provided with spaced ports 1168, 1170 and 1172, Fig. 63. The ports 1168 are in communication with the bore 1156, between the check valves, the ports 1172 are in communication with the bore 1158, between the check valves, while the ports 1170 are in communication with the passageway 1152 to which the duct *m* is connected. A duct *x* is connected to the bore 1158, between the check valves, and this duct has two branches, one of which leads to the lower end of the valve K, below the plunger 1142, while the other is connected to this valve above the duct *t*, Figs. 48, 49, 50 and 56. A duct *x'*, which is connected to the right-hand end of the passageway 1154, leads to the upper part of the valve K. A duct *y* is connected to the bore 1156, between the check valves, and this duct has a branch which leads to the lower end of the valve L, below the plunger 1144, and another branch that is connected to the upper part of that valve, Fig. 56. Connected to the left-hand end of the passageway 1154 of the valve J is a duct *x''* which leads to the duct *g*, previously referred to as leading to the pistons 354 which lower the gripper-supporting plungers 350, by way of a check valve 1145 in the valve L. Fitted in the sleeve 1166 is a valve plunger 1174, Fig. 63, that is connected to a lever arm 1176, secured to a shaft 1178, Fig. 61. This shaft extends out through the front of the machine frame construction, Fig. 65, and is provided with an operating handle 1180 in which is mounted a spring-pressed plunger 1182. This plunger is adapted to enter any one of three holes 1184, formed in the front of the machine frame, so as to hold the valve plunger 1174 either in the mid-position shown in Figs. 62 and 63, or to the right or to the left of this mid-position.

When this valve plunger is in its mid-position, the ports 1170 are connected to the ports 1168 and 1172 so that fluid under pressure will be admitted at once to the bores 1156 and 1158 and thence to the ducts *x* and *y*. The fluid under pressure thus admitted to these ducts will elevate the valve plungers 1142 and 1144 of valves K and L at substantially the same time, the exact speed of movement of these plungers being determined by the setting of throttle, or needle, valves M and N, also referred to, respectively, as toe gripper and side gripper throttle valves, located respectively, in the ducts *x* and *y*, Figs. 48, 49, 50 and 56. As has already been explained, when these valve plungers are elevated, the duct *t* is connected to the duct *s*, which in turn, through valve C, is connected to the duct *h* that leads to the toe-gripper pulling pistons, and the duct *v* is connected to the ducts *u* and *w*, the former of which is connected, through valve R, to the duct *k* that leads to the side gripper main pulling piston. Accordingly, when the valve plunger 1174 is in its mid-position, the toe gripper 2 and side grippers 4, 4, will be operated to apply their pulls to the upper at substantially the same time subject, of course, to slight variation by the throttle valves M and N.

If it is desired to have the toe gripper operate before the side grippers, the handle 1180 is moved downwardly to shift the valve plunger 1174 over to the right to the position shown in Figs. 48, 49, 50 and 56. Now, the ports 1168 are covered so that fluid under pressure from the duct *m* is admitted only to the bore 1158 and to the duct *x*. The fluid under pressure in the duct *x* elevates the plunger 1142 of valve K, thus causing the toe gripper to be operated. The elevation of this plunger also connects the duct *x'* to the duct *x*. Fluid under pressure, therefore, flows into the passageway 1154 and, by elevating a check valve 1160, to the duct *y* so that the valve plunger 1144 of valve L is then elevated to cause the side grippers to be operated. On the other hand, if the handle 1180 is moved upwardly and the valve plunger 1174 shifted over to the left, from the mid-position shown in Fig. 63, the side grippers will be operated before the toe gripper. With the valve plunger in such position, the ports 1172 are covered so that fluid under pressure is admitted only to the bore 1156 and thence to the duct *y*. The fluid under pressure in the duct *y* elevates the plunger 1144 of valve L, thus causing the side grippers to operate. The elevation of the plunger 1144 also connects the duct *y* to the duct *x''* so that fluid under pressure flows into the passageway 1154 and, by lifting a check valve 1160, to the duct *x* so that the plunger 1142 of the valve K is elevated to cause the toe gripper to be operated.

Before either the toe gripper 2 or side grippers 4, 4 can be operated, the gripper-supporting plungers 350, Figs. 3, 4 and 23, must be released by the downward movement of the pistons 354, one of which is shown in Fig. 31, by fluid under pressure admitted to the duct *g*. This is accomplished in the following manner. When the valve plunger 1142 of the valve K is elevated and the duct *x'* connected to the duct *x*, fluid under pressure flows through the passageway 1154 in the valve J to the duct *x''*, and thence past the check valve 1145 in the valve L to the duct *g*. Similarly, when the valve plunger 1144 of the valve L is elevated, the duct *y* is connected to the duct *g* through this same check valve. Accordingly, regardless of which of the valve plungers 1142 or 1144 is elevated first, or if these two valve plungers should be elevated at the same time, fluid under pressure from the duct *m* will be immediately admitted to the duct *g* and the pistons 354 moved downwardly to release the gripper-supporting plungers 350.

The speed at which the toe and side grippers are operated, to apply their respective pulls to the upper, may be regulated in order to accommodate varying operating conditions, by means of throttle, or needle valves O and P, also referred to, respectively, as toe and side gripper speed throttle valves, located in the ducts *t* and *v*, see Figs. 48, 49, 50, 55 and 56. As has already been suggested, the magnitudes of the pulls that are applied by the toe gripper 2 and side grippers 4, 4 are determined by the pressure of the fluid acting, respectively, on the toe-gripper pulling pistons 532, which are connected to the duct *t*, and on the side-gripper main pulling piston 598, which is connected to the duct *v*. The pressure of fluid which is admitted to these ducts is controlled, respectively, by the valve plungers 1138 and 1140 of the pressure control valve I, Fig. 55. Referring first to the valve plunger 1138, this plunger is held in the position shown in Figs. 48 and 55, to connect the duct *t* to the duct *m*, by means of pressure of fluid acting on a piston 1188. Fluid under pressure is conducted to the space above this piston by passageways 1190, 1192, formed in the valve I, and the pressure of the fluid in this space is regulated by means of a relief valve 1194 that is located on the front of the machine within easy reach of the operator, see Figs. 1 and 2. The plunger 1138 is provided with an enlarged head 1196 having a lower surface of substantially the same area as the area of the upper surface of the piston 1188. The space beneath the head 1196 is connected to the duct *t* by means of a passageway 1198 and needle valves 1200 and 1202 are located in the passageways 1192 and 1198. The space between the piston 1188 and the head 1196 of the valve plunger 1138 is drained to the sump by means of a passageway 1204 in the plunger and a port 1206 in the valve I and a relatively light compression spring 1208 is interposed between the piston 1188 and the plunger 1138. The toe-gripper pulling pistons 532 are fitted so as to permit a definite but small leakage of fluid when the toe gripper is being operated and the valve plunger 1138 is actuated to maintain the pressure of fluid in the duct *t*, and hence in the ducts *s* and *h*, substantially constant in the following manner.

When the pressure of the fluid in the duct *t*, and also beneath the head 1196, increases above the pressure of the fluid in the space above the piston 1188, which pressure is controlled by the relief valve 1194, the plunger 1138 will be elevated to shut off the duct *t* from the duct *m*, either partially or completely, against the resistance of the piston 1188, the spring 1208 being compressed so that piston 1188 engages the plunger 1138. On the other hand, when the pressure of the fluid in the duct *t* and beneath the head 1196 drops, as a result of leakage around the toe-gripper pulling pistons, or from any other cause, the plunger 1138 will be moved downwardly by the piston 1188 to reestablish communication between the duct *t* and the duct *m*, sudden drops in the pressure of the fluid in the duct *t* being taken care of by a quick downward movement of the plunger 1138 by the spring 1208. Eventually, the plunger 1138 will reach a position, as shown in Fig. 49, where the flow of fluid into the duct *t* from the duct *m* is just sufficient to take care of the leakage and to maintain the pressure of the fluid in the duct *t* substantially the same as the pressure of the fluid in the space above the piston 1188. Thus, the magnitude of the pull that is applied to the upper by the toe gripper may be increased or decreased by changing the setting of the relief valve 1194, to an upper limit determined by the setting of the relief valve 1120. During the aforementioned operation of the plunger 1138, its movements are smoothed out by the actions of the needle valves 1200 and 1202.

The other valve plunger 1140 of the valve I, which regulates the pressure of the fluid in the duct *v*, operates in the same manner as the valve plunger 1138. Thus, this plunger is held in the position shown in Figs. 48 and 55, to connect the duct *m* to the duct *v*, by means of fluid under pressure acting on a piston 1210; fluid under pressure being conducted to the space above this piston from the passageway 1190 by a passageway 1214 and pressure of the fluid in this space being regulated by a relief valve 1216, located on the front of the machine, see Figs. 1 and 2. The valve plunger 1140 also has a head 1218 and the space beneath this head is connected to the duct *v* by means of a passageway 1220 in the valve I. Needle valves 1222 and 1224 are located, respectively, in the passageways 1214 and 1220 and a compression spring 1226 is interposed between the piston 1210 and the valve plunger 1140. The space between the piston 1210 and the head 1218 of the valve plunger 1140 is drained to the sump by passageways 1228, 1230 formed in the valve plunger 1140 and valve I. The side-gripper main pulling pistons 588 and 598 are fitted so as to permit a definite but small amount of leakage of fluid when the side grippers are operated and the valve plunger 1140 is shifted up and down, in the same way as plunger 1138, so as to maintain the pressure of fluid in the duct *v* the same as the pressure of the fluid in the space above the piston 1210. Accordingly, the magnitude of the pulls applied by the side grippers may be increased or decreased by changing the setting of the relief valve 1216.

Immediately after they have been operated to apply a pull to the upper, in a direction extending heightwise of the last, the side grippers are also moved forwardly, by the so-called forward drag pistons 838, Figs. 5, 8, 48, 49, 50 and 53, so as to apply a pull on the upper extending generally lengthwise of the last, in the following manner. The duct *p* which leads to the pistons 838, is connected to a forward drag control valve T, Figs. 48, 49, 50 and 53, and this valve is connected to the flow control and timing valve E by means of a duct *e'*. The valve T is provided with a control plunger 1232 which is normally urged to the right, Fig. 48, by a spring 1234, and a pressure-regulator valve 1236 that acts against the resistance of a spring 1238, Fig. 53. The tension of the spring 1238 may be varied by means of an adjusting screw 1240 which is located on the front of the machine, Fig. 1. A branch of the duct *w*, which, it will be recalled, is connected to the duct *v*, when the valve plunger 1144 of the valve L is elevated, is connected to the flow control and timing valve E beneath a second valve plunger 1242, located adjacent to the valve plunger 1137 of the valve E, referred to above, see Fig. 53. Another branch of the duct *w* is connected to a chamber 1244, formed in the lower part of the valve R, Figs. 34 and 55, when its valve plunger 1146 is in the position shown in Fig. 55. Also connected to this chamber is a duct *f'* which leads to the valve T at the right-hand end of the plunger 1232, Fig. 53. When the side grippers have been operated, the fluid under pressure controlled by the plunger 1140 of the valve I, will be admitted to the duct *w* and, through chamber 1244, to the duct *f'*. The plunger 1242 of valve E will now be elevated by the pressure of fluid in duct *w*, to connect a branch of the duct *m* to the duct *e'*, through a passageway 1246 in the valve E and the valve plunger 1232 of the valve T will be moved to the position in which it is shown in Figs. 49 and 53, by the pressure of fluid in duct *f'*. When this valve plunger is in this position, the duct *e'* is connected to the duct *p*, which leads to the pistons 838, through the pressure-regulator valve 1236, and is cut off from an exhaust opening 1248, Fig. 53. The pistons 838 will now move the side grippers forwardly at a speed which is regulated by a throttle, or needle valve U, also referred to as the forward drag throttle valve, in the duct *e'*, thus causing the side grippers to exert a pull on the upper in a direction lengthwise of the last, the magnitude of this pull being determined by the setting of the pressure-regulator valve 1236 by the screw 1240 and indicated by a pressure gage 1249 (Fig. 1). The duct *e'* is also connected to a duct *z*, Figs. 48, 49, 50 and 53, which leads to a treadle-interlock piston 1250, see also Fig. 58, the operation of which will be described below.

(a) *Dwell or inspection period*

The machine comes to a stop, after the first depression of the treadle 1126, with the toe gripper 2 and the side grippers 4, 4 exterting their respective pulls on the upper of the shoe which is supported on the fingers 34, 34, 36 of the shoe rest 10 and by the heel rest 12. Before the treadle is again depressed, the operator may inspect the shoe to see whether the upper is correctly located on its last. As has already been explained, during this inspection period, the operator can correct the position of the upper on its last by manual manipulation of the toe and/or side grippers by means of the hand levers 890, 980, 996 and 1032, see Fig. 1. The operator will also observe whether the magnitude of the pulls being exerted by the toe gripper and/or the side grippers are sufficient to stretch the upper over, and to pull it down to the last in all locations. Therefore, he may wish to increase the pressure of the fluid which is acting on the toe-gripper pulling pistons 532 and/or the side gripper main pulling piston 598. While it would be possible, of course, to accomplish this by changing the settings of the relief valves 1194 and 1216, such increased pulls will probably be required only occasionally in working on a large number of shoes of the same general type. To avoid the necessity for adjusting the relief valves 1194 and 1216 each time a particular shoe is encountered which needs a stronger pull, the subject machine is provided with mechanism which permits the operator to increase the pressure of the fluid acting on the toe-gripper pulling piston and/or the side-gripper main pulling pistons without changing the settings of these relief valves. This mechanism is arranged to maintain such increased pressure of the fluid only during the subsequent operation of the machine on that particular shoe, after the treadle 1126 has been depressed the second time, and then to be released automatically so that when the next shoe is placed in the machine its upper will, in the first instance, be subject to pulls by the toe and side grippers of magnitudes determined by the settings of relief valves 1194 and 1216. Hence, these relief valves may be initially set to provide toe-and-side gripper pulls of magnitudes deemed appropriate for the type of upper materials being handled, and any increased pulls, which may be required for a particular shoe, obtained by use of this mechanism.

Referring to Figs. 34, 35, 36, 48, 49, 50 and 55, there is secured to the machine frame construction a housing 1260 in which are slidably mounted a pair of plungers 1262, 1264. These plungers are urged upwardly, to the extent permitted by stop collars 1266, 1268 by means of compression springs 1270, 1272, Fig. 35. The plunger 1262 is formed with an elongated angular notch 1274 and a portion of reduced diameter 1276, Fig. 55, while the plunger 1264 is provided with a similar notch 1278 and a reduced portion 1280, Figs. 34 and 55. Pivotally mounted on a shaft 1282, supported on a part of the machine frame adjacent to the housing 1260, are a pair of hand levers 1284, 1286, Figs. 34, 35 and 36. The hand lever 1284 is directly above the upper end of the plunger 1262 so that this plunger may be moved downwardly by swinging the hand lever in a clockwise direction as viewed in Fig. 55. Similarly, the hand lever 1286 is directly above the plunger 1264 which may be moved downwardly by swinging this hand lever in a clockwise direction, Fig. 55. The housing 1260 is formed with a pair of exhaust ports 1290, 1292 which are associated, respectively, with the plungers 1262 and 1264, and pipes 1294, 1296 lead from the passageways 1198, 1220 of the valve I to these plungers, see Fig. 55. With this arrangement, when the plunger 1262, for example, is moved downwardly by means of the hand lever 1284, a measured quantity of pressure fluid will be bled off from the passageway 1198 through the pipe 1294, angular notch 1274 and exhaust port 1290. The pipe 1294 is connected to the passageway 1198 on the side of needle valve 1202 which is adjacent to the space beneath the head 1196 of the plunger 1138. Thus, the pressure of the fluid acting on this head will be reduced proportionately to the quantity of pressure fluid that is bled off and the valve plunger 1138 will not be elevated to shut off duct *t* from duct *m* until the pressure of fluid in the duct *t* has increased sufficiently to offset the effect of the loss of pressure resulting from the bleeding of pressure fluid in the manner just explained. Because of the angular shape of the notch 1274, the quantity of pressure fluid that is bled off from the passageway 1198, and hence the resulting increase of the pressure of fluid in the duct *t*, will be increased as the plunger 1262 is moved downwardly. In a like manner, the pressure of the fluid in duct *v* will be increased as the plunger 1264 is move downwardly by the hand lever 1286. In order that the operator may have some idea of the magnitudes of the pulls being exerted by the toe and side grippers, both before and after the pressure of the fluid in ducts *t* and *v* have been increased, these ducts are connected, respectively, to pressure gages 1298 and 1300, mounted on the upper part of the machine, see Fig. 1.

Figure 55:
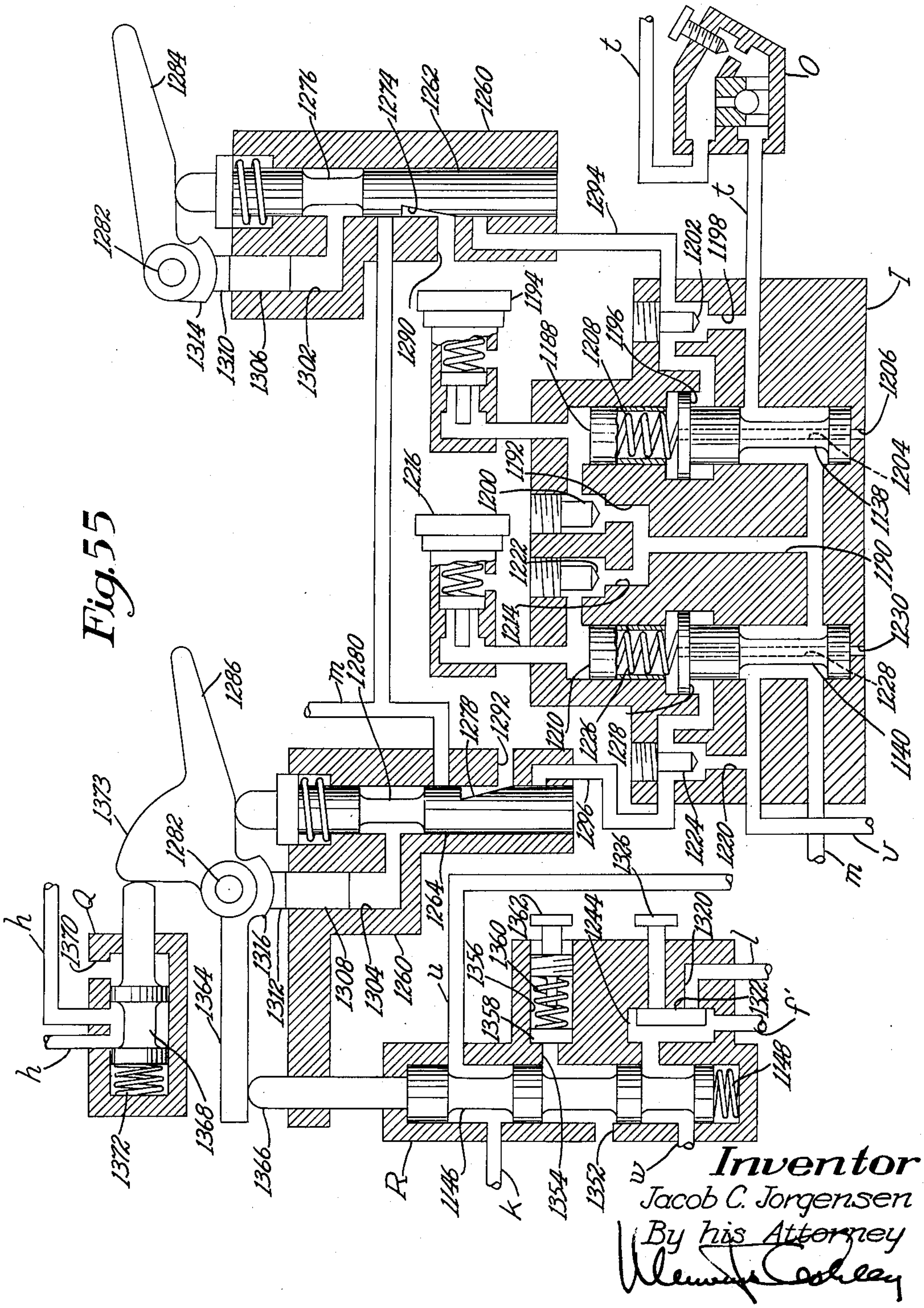
Figure 56:
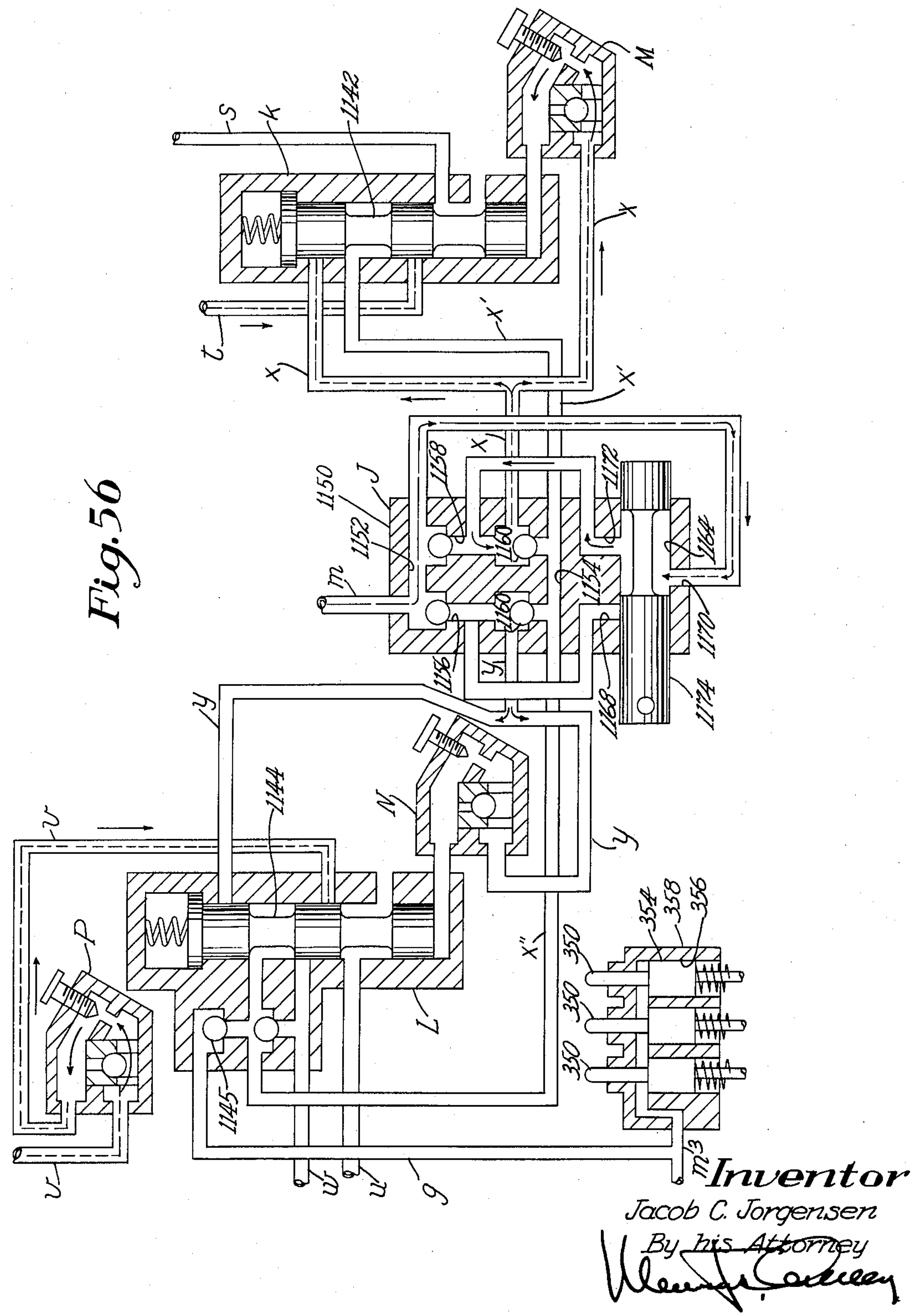

The increased pressures of the fluid in ducts *t* and *v*, and the resulting increased pulls applied to the upper by the toe and side grippers, are maintained only during the subsequent operation of the machine on that particular shoe. Referring to Figs. 34, 35 and 55, the duct *m* is connected to the housing 1260 adjacent to the reduced portions 1276, 1280 of the plungers 1262, 1264. The housing 1260 is provided with two cylinders 1302, 1304 in which there are fitted pistons 1306, 1308, Fig. 36. Supported on these pistons are a pair of wedge-shaped friction blocks 1310, 1312 which are adapted to cooperate with ribs 1314, 1316 formed, respectively, on the hand levers 1284, 1286, these friction blocks being carried by arms 1318 that are pivoted to the machine frame, as will be seen in Fig. 34. When the plungers 1262, 1264 are moved downwardly far enough to connect the pipes 1294, 1296 to the exhaust ports 1290, 1292, through the angular notches 1274, 1278, fluid under pressure will be admitted from the duct *m* to the cylinders 1302, 1304 beneath the pistons 1306, 1308. The plungers 1262, 1264 will now be locked against upward movement by their return springs 1270, 1272 by the actions of the friction blocks 1310, 1312 on the hand levers 1284, 1286. However, the action of these friction blocks is not strong enough to prevent further downward movement of the plungers 1262, 1264 by the operator to increase the pressures of the fluid in ducts *t* and *v*. The hand levers and plungers are released for return to the positions shown in Fig. 55 by means of springs 1270, 1272, when the duct *m* is connected to exhaust which occurs near the completion of the operation of the machine as will presently appear.

In addition to the increase in the pressure of the fluid in ducts *v*, *u* and *k*, Figs. 48, 49, 50 and 55, and the resulting increase in the magnitude of the side gripper pull, which may be obtained when the plunger 1264 is moved downwardly by the hand lever 1286, the magnitude of the side-gripper pull may also be increased by admitting fluid under pressure from the duct *w* to the duct *l* which leads to the space above the auxiliary side-gripper pulling piston 588, Fig. 24. Referring to Fig. 55, it has been pointed out that the duct *w* is connected to the chamber 1244 which is formed in the valve R. A passageway 1320 leads from the chamber 1244 to the duct *l*, Figs. 34, 38 and 39, and mounted in this chamber is a valve member 1322 which is of segmental shape as shown in Figs. 38 and 39. This valve member is connected to a shaft 1324 which extends outwardly to the front of the machine frame 18 where it is provided with an operating knob 1326, see Fig. 1. A coil spring 1328 is arranged to hold this valve member against a side wall 1330 of the chamber 1244, Fig. 34. The valve member 1322 may be rotated by the operating knob 1326 from the position shown in Figs. 34, 38 and 39, in which the passageway 1320 is opened to connect the duct *l* to the chamber 1244, to a position illustrated in Fig. 55, in which the passageway 1320 is closed, and a spring-pressed plunger 1332 is arranged to engage recesses 1333, Fig. 34 formed in the knob 1326 for holding the valve member in either one of these two positions. The valve member 1322 is provided with an elongated arcuate recess 1334, Figs. 38 and 39, which is always in communication with an exhaust passage 1336, formed in the valve R, so that the pressure of the fluid in the chamber 1244 assists the spring 1328 in holding the valve member against the surface 1330. It has already been explained that the area of the auxiliary piston 588 is substantially the same as the area of the piston 598, see also Fig. 25, and that the pressure of fluid in the duct *w* is the same as the pressure of the fluid in the duct *u*, inasmuch as both of these ducts are connected to the duct *v* when the plunger 1144 of the valve L, is elevated, as shown in Fig. 49. Therefore, when the operator moves the valve member 1322 to the position shown in Figs. 34, 38 and 39, fluid under pressure will be admitted to the spaces above both of the pistons 588 and 598 so that the magnitude of the side-gripper pull is doubled.

*Manipulation of grippers*

In the foregoing description it has been explained how the operator could correct the location of the upper, relatively to its last, by manual manipulations of the toe and side grippers which are effected by the hand levers 890, 980, 996 and 1032, Fig. 1. At that time, some reference was made to controlling devices for relieving, or entirely discontinuing, the pressure of fluid acting on certain of the operating pistons associated with the toe and side grippers. Mention was also made of mechanism for locking one set of the gripper jaws on each side gripper to the frame of the machine during manual manipulation of the side grippers. These controlling devices and the means for controlling the aforementioned locking mechanism will now be described.

Referring first to the toe gripper 2, when this gripper is manually manipulated in it is desirable that the pressure of the fluid acting on the gripper-closing piston 208, see Fig. 14, be relieved and that the supply of fluid under pressure to the toe-gripper pulling pistons 532, Fig. 27, be discontinued. For this purpose, the valve stem 1090 is formed integrally with the valve plunger 1136 of the toe gripper manual control valve C and this valve is provided with an exhaust port 1340 and another port 1342 which leads to an expansion chamber 1344, Fig. 57. Mounted in this expansion chamber is a piston 1346 that is urged to the position shown in Fig. 57 by means of a coil spring 1348 the tension of which may be varied by means of a hand screw 1350, located on the front of the machine, see Fig. 1. The aforementioned ports are so arranged and the valve plunger 1136 is so constructed that, when this plunger is moved downwardly from the position shown in Fig. 57, by means of the hand lever 1032, against the resistance of a return spring 1351, the duct *d* which leads to the toe-gripper closing piston will be connected to the expansion chamber 1344 while the duct *h* which leads to the toe-gripper pulling pistons will be shut off from the duct *s* and connected to the exhaust port 1340. The toe-gripper jaws 174, 176 will now be opened, to a greater or lesser extent, depending on the setting of the spring 1348, as the spring 226 forces the piston 208 upwardly, Fig. 14, and the toe gripper will be free for movement, by means of the hand lever 1032, when this hand lever is connected to the shaft 1020 by the squeezing of the hand grip 1078, as explained above, the toe-gripper pulling pistons 532 moving freely in their cylinders 534 which are connected to exhaust.

To facilitate the manual manipulation of the side grippers 4, 4, the pressure of the fluid acting on the main side-gripper pulling piston 598 is relieved and the supply of fluid under pressure to the forward drag pistons 838, and also to the auxiliary side-gripper pulling piston 588, when this piston is being used, is shut off and these pistons connected to exhaust, in the following manner. The side gripper manual control valve R is provided with an exhaust port 1352 and a second port 1354 which is in communication with an expansion chamber 1356, see Figs. 34 and 55. Mounted in this chamber is a piston 1358 which is held in the position shown in Figs. 34 and 55 by a spring 1360 the tension of which may be varied by means of a screw 1361 and a hand knob 1362, located on the front of the machine, Fig. 1. The aforementioned ports are so arranged, and the valve plunger 1146 is so constructed that, when this plunger is moved downwardly, in a manner about to be explained, the duct *k* which leads to the piston 598, is connected to the chamber 1356, while the chamber 1244 is disconnected from the duct *w* and connected to the exhaust port 1352. Now, the pressure of fluid acting on the piston 598 will be relieved to the extent permitted by the spring 1360 and the cylinder 590, Fig. 25, connected to exhaust, through the chamber 1244 and the duct *l*. The duct *f'*, which is connected to the chamber 1244, will also be connected to exhaust so that the valve member 1232 of the forward drag control valve T will be moved to the right, Fig. 53, by the spring 1234. The duct *p* will now be shut off from the duct *e'* and connected to the exhaust port 1248 of the valve T. Accordingly, the pull exerted by the side grippers in a direction extending lengthwise of the last will be discontinued entirely and the pull exerted by these grippers in a direction heightwise of the last reduced to a point that the side grippers may be manually manipulated, by means of the hand levers 890, 980 and 986, to correct the position of the upper on its last. For thus moving the valve plunger 1146 downwardly, against the resistance of its return spring 1148, the following arrangement is provided. The hand lever 1286, which is associated with the valve plunger 1264, is provided with a rearwardly extending arm 1364 that engages the upper end of a rod 1366, secured to the valve plunger 1146, Fig. 34. Thus, by lifting the hand lever 1286, i. e., swinging it in a counterclockwise direction, the valve plunger 1146 may be moved downwardly.

During the manual manipulation of the side grippers to correct the position of the upper, it is sometimes desirable, in addition to discontinuing the forward drag pull and relieving the heightwise pull of the side grippers, to discontinue the pulling action of the toe gripper without, however, releasing the grip of the toe gripper jaws on the upper. For this purpose, there is interposed in the duct *h*, which leads from the valve C to the toe-gripper pulling pistons 532, a toe gripper pull stop valve Q, see Figs. 34, 48, 49, 50 and 55. This valve is provided with a valve plunger 1368 and an exhaust port 1370. The valve plunger 1368 is normally held in the position shown in Figs. 34 and 55, by means of a coil spring 1372, so as to connect adjacent portions of the duct *h*. However, when this plunger is moved to the left, Figs. 34 and 55, one part of the duct *h*, which leads from the valve C, is shut off, while the other part of this duct, which leads to the toe-gripper pulling pistons 532, is connected to the exhaust port 1370. Rotatable on one end of the shaft 1282 is a bell-crank lever 1373 having one arm that is in line with an extension of the valve plunger 1368 and another arm that carries a pin 1374, see Figs. 34 and 35. This bell-crank lever is held in the position shown in Fig. 34 with one arm in engagement with the valve plunger 1368 by means of a relatively light coil spring 1376 which is not strong enough to move this plunger to the left against the resistance of the spring 1372. Pivotally mounted on the hand lever 1286 is a latch member 1378 and this latch member is held out of engagement with the pin 1374, Fig. 34, by means of a ball detent 1380, Fig. 35, which is adapted to engage one of two holes 1382 formed in the latch member, Fig. 34. If the latch member is rotated in a clockwise direction, by means of a handle 1379, Fig. 34, until the detent enters the other of these two holes, it will engage the pin 1374 on the bell-crank lever 1373. Now, when the hand lever 1286 is lifted to move the valve plunger 1146 of the valve R downwardly, for discontinuing the forward drag pull and relieving the heightwise pull of the side grippers, the valve plunger 1368 of the valve Q will be moved to the left, Fig. 34, by the bell-crank lever 1373, so as to connect that part of duct *h* which leads to the toe-gripper pulling pistons to exhaust and thereby discontinue the pulling action of the toe gripper.

As has already been explained, the machine is provided with fluid-pressure-operated mechanism for locking one of the two sets of gripper jaws on each of the side grippers to the frame of the machine when it is desired to slide the upper over the last, by oscillating the hand lever 890, Fig. 1, without disturbing the position of the upper adjacent to its tip line. This locking mechanism has also been described in detail and it has been pointed out how this locking mechanism is actuated, when fluid under pressure is admitted to the duct *q* and moved to an unlocked position when fluid under pressure is admitted to the duct *r*, Figs. 27, 48, 49, 50 and 52. The admission of fluid under pressure, and exhaust from, these ducts, are controlled by the tip lock control valve D, Figs. 48, 49, 50 and 52, to which reference has previously been made. The valve D is provided with three valve plungers 1381, 1383 and 1385, Fig. 52, the first of which directly controls the flow of fluid under pressure to, and exhaust from, the ducts *q* and *r*, and three exhaust ports 1386, 1388 and 1390. The duct *m*, to which fluid under pressure is admitted when the treadle 1126 is first depressed, is connected to a passageway 1392 that leads to the valve plungers 1381, 1383 and, through a throttle valve 1394, to a second passageway 1396 which leads to the valve plunger 1383. The space beneath the valve plunger 1381 is connected to passageways 1398 and 1400, the passageway 1398 leading to the valve plunger 1383 and the passageway 1400 having two branches which lead to the third valve plunger 1385. The duct *n*, previously referred to, is also provided with two branches which lead to this valve plunger. The plunger 1381 is connected by means of a bell-crank lever 1402 and Bowden wire 1404 to an operating lever 1406, Fig. 3, that is located on the front of the machine within reach of an operator, see Fig. 1.

As soon as the pressure of the fluid has built up in the duct *m*, after the first depression of the treadle, if the valve plunger 1381 has not been previously returned to the position shown in Fig. 52, by means of the operating lever 1406, it is moved to this position by fluid under pressure admitted beneath it through passageways 1392, 1398 and valve plunger 1383. When the valve plunger 1381 is in this position the duct *q* is connected to the exhaust port 1386 while fluid under pressure is admitted to the duct *r* through passageway 1392, so that the locking mechanism is released. Shortly after this occurs, the plunger 1383 is elevated, as shown in Fig. 49, by fluid under pressure from passageway 1396 and duct *m*, through the throttle valve 1394. When this plunger is elevated, it shuts off the passageway 1398, opens a port of the passageway 1396 to the passageway 1392, and connects one branch of the passageway 1400 to the exhaust port 1390 through a passageway 1408. Now, the valve plunger 1381 may be moved downwardly by means of the operating lever 1406 so as to connect the duct *r* to the exhaust port 1388 and admit fluid under pressure to the duct *q* from a branch 1410 of the passageway 1392, thus causing the locking mechanism to be moved to locking position. Unless manually returned by the operator, the valve plunger 1380 remains in this lowered position until fluid under pressure is admitted to the duct *n* at a later point in the operation of the machine, through the side gripper release valve B in a manner that has already been described. Fluid under pressure in one branch of the duct *n* will now elevate the third valve plunger 1385, thus disconnecting one branch of the passageway 1400 from the exhaust port 1390 and connecting its other branch to the other branch of the duct *n*. The plunger 1381 will now be returned to the position shown in Fig. 52, by fluid under pressure admitted beneath it, from the duct *n* and passageway 1400, and the locking mechanism released.

*Second treadling of machine*

After the operator has correctly positioned the upper on its last and made certain that the upper is properly stretched over, and down to, the last, the machine is again started by a second depression of the treadle 1126. As a result of this second depression of the treadle, the valve plunger 1124 of the treadle-operated control valve A will be shifted over to the left, Fig. 59, and latched in this position by means of mechanism associated with the treadle. A duct $m^2$, connected to this valve, will now be shut off from an exhaust port 1420, formed in the valve A, Fig. 59, and connected to the manifold 1106, through ports 1127 and 1128. This duct is connected to a side clamp pressure control valve V, Figs. 48, 49, 50 and 54, which regulates the pressure of fluid admitted to the duct *c*, previously described as leading to the clamp arm operating piston 130, Fig. 12. This control valve discharges into a duct $a^2$ which is connected to a chamber 1422, formed in the oil trapping valve G, Fig. 54, and the duct *c* is also connected to a duct $b^2$ that leads from this chamber, Figs. 48, 49, 50 and 54. The duct $b^2$ is connected to the space beneath the valve plunger 1424 of a clutch control valve X, while a branch of the duct *c* is connected to the space beneath a valve plunger 1426 in the shoe rest expander valve F, Figs. 48, 49, 50 and 53. A duct $d^2$ leads from the valve X to a cylinder 1430 in which there is fitted a piston 1432 that carries a clutch tripping plunger 1434, Figs. 64 and 54. Thus, as soon as the side clamps 14, 14, Figs. 1 and 2, have moved into engagement with the opposite sides of the forepart of a shoe by the piston 130, which operates the arms 120, 124, Figs. 1, 2 and 12, the pressure of the fluid will build up in the ducts $a^2$ and $b^2$ and *c* to a value determined by the valve V as will presently be explained.

The pressure of the fluid in the duct *c* will elevate the valve plunger 1426 of the valve F, against the resistance of a return spring 1425, Fig. 53, thus connecting the duct *a* to exhaust and allowing the shoe rest expander piston 56 to return to the position in which it is shown in Fig. 4, while the pressure of fluid in the duct $b^2$ will elevate the valve plunger 1424 of valve X, against the resistance of a return spring 1423, Fig. 54, thus connecting the duct $d^2$ to a branch of the duct *m* and causing the piston 1432 to be moved to the left, Figs. 64 and 54. As a result of such movement of this piston, and the plunger 1434 which is carried thereby, a clutch will be tripped and the main drive shaft 666, previously referred to, will be rotated one full turn and brought to a stop in a manner to be described below. During this rotation of the main shaft, the tacking devices 6, 8, 8 are operated mechanically, the toe and side grippers are released, retracted and collapsed, as has already been explained, the tip locking mechanism is automatically released and the valve G is operated to trap oil in certain ducts in a manner about to be described.

Referring first to the operation of the side clamps and to the construction and operation of the valve V, this valve is provided with a valve plunger 1440 which controls the flow of fluid under pressure from the duct $m^2$ to the duct $a^2$. This valve plunger is held in the position shown in Fig. 54 by means of the pressure of fluid acting on a piston 1442, fluid under pressure being conducted to the space above this piston through a passageway 1444 and the pressure of the fluid in this space being regulated by means of a relief valve 1446, located on the front of the machine, Fig. 1. The valve plunger 1440 is provided with a head 1448 and the space beneath this head is connected to the duct $a^2$ by means of a passageway 1450. Needle valves 1452 and 1454 are located, respectively, in the passageways 1444 and 1450, and a compression spring 1456 is interposed between the piston 1442 and the head of the valve plunger 1440. The space between the piston and valve plunger is drained to the sump by passages 1458 and 1460 formed in the plunger and casing of valve V, and the space beneath the head 1448 of the valve plunger 1440 is connected to an exhaust port 1462 that is controlled by a needle valve 1464. The side clamp operating piston 130 is fitted in its cylinder 132 so as to permit a small but definite leakage of fluid around it when the side clamps are being held against a shoe and the valve plunger 1440 operates, in the same general manner as the valve plungers 1138 and 1140, of the valve I, to maintain the pressure of fluid in the duct $a^2$ at a value that is determined in part by the setting of the relief valve 1446 and in part by the adjustment of the needle valve 1464. As will be apparent, if the exhaust port 1462 is entirely closed by this needle valve, the pressure of the fluid in duct $a^2$ will be determined wholly by the setting of the relief valve 1446. Hence, by opening this exhaust port more or less, by means of this needle valve, a certain amount of fluid under pressure may be bled off from the space beneath the head 1448 of plunger 1440, and the pressure of the fluid in the duct $a^2$ maintained at a value which is higher than that for which the relief valve 1446 is set. Thus, this needle valve functions in a manner similar to that of the plungers 1262 and 1264, associated with the valve I, but is adjusted initially when the machine is set up, instead of during the operation of the machine. Thereafter, the force with which the side clamps are held against the shoe, as determined by valve V and indicated on a pressure gage 1447 (Fig. 1), is varied by means of the relief valve 1446. The speed at which the side clamps are moved toward, and into engagement with, a shoe is determined by a needle, or throttle valve W, also referred to as the side clamp speed control valve, interposed in the duct $a^2$ and a similar needle, or throttle valve Y, also referred to as the clutch trip speed control valve, is located in the duct $d^2$ for regulating the speed of movement of the clutch tripping piston 1432, Fig. 54.

The oil trapping valve G is mounted in the lower part of the machine frame construction 18 and is adapted to support the side clamp pressure control valve V, Fig. 41. This valve, which is shown in detail in Figs. 46 and 47 and diagrammatically in Fig. 54, in addition to the chamber 1422 that has already been referred to, is provided with a second chamber 1472. Adjacent to the chamber 1472, the valve G is provided with a third chamber 1474 to which a duct $m^3$, which leads to the gripper supporting pistons 354 is connected, Figs. 48, 49 and 50, and a fourth chamber 1478 to which a duct $m^4$ is connected which leads to the duct $b$, heel rest piston 112 and to the flow control and timing valve E, Fig. 53. A valve 1476 is adapted, when held open against the resistance of a spring 1477, to afford communication between the chamber 1474 and the chamber 1472, and a similar valve 1480 is adapted, when held open against the resistance of a spring 1481, to afford communication between the chamber 1478 and chamber 1472. The duct $a^2$ is connected to the chamber 1422 by means of passageways 1484 and 1486 while a check valve 1488 is arranged to prevent flow of fluid under pressure from this chamber back to duct $a^2$. The chamber 1422 is also in communication with the chamber 1478 but a check valve 1490 prevents flow of fluid from the chamber 1478 into the chamber 1422. With the arrangement just described, when the valve 1476 is elevated by means of its return spring 1477, fluid under pressure will be trapped in the duct $m^3$ and above the pistons 354, Figs. 50 and 56, by means of this valve and the check valve 1145 of the valve L, and when the valve 1480 is elevated, by its spring 1481, fluid under pressure will be trapped in the duct $m^4$, which leads to the duct $b$ and heel rest piston 112 and to the valve E, by means of the valve 1480 and the check valve 1490, and in the ducts $b^2$ and $c$, by this valve and the check valve 1488, Fig. 54.

The oil trapping valves are operated in the following manner. The valve 1476 has a stem that engages a push rod 1492 while the valve 1480 has a stem that engages a push rod 1494, Figs. 47 and 54. These push rods engage, respectively, adjusting screws 1496 and 1498 carried by a pair of bell-crank levers 1500, 1502 which are pivotally mounted on the valve G. These bell-crank levers are provided, respectively, with cam rolls 1504, 1506 that fit in cam grooves 1508, 1510 formed in a cam 1512 that is secured to the main drive shaft 666. These cam tracks are so shaped that, during the rotation of the main drive shaft, the valves 1476 and 1480 are closed and opened in predetermined time relation as will be explained below.

*Mechanical cycle*

Immediately after the clutch has been tripped and as soon as the main drive shaft 666 starts to rotate, the overlaying and fastening-inserting, or tacking devices 6, 8, 8, Figs. 1 and 2, begin to move inwardly toward the shoe and, shortly thereafter, the valves 1476 and 1480 of the oil trapping valves G are closed. As these tacking devices approach the shoe, the jaws of the grippers are opened and the grippers are quickly retracted and collapsed, in the manner explained above; the toe gripper jaws being opened by the engagement of the toe-tacking device 6 with the latch release lever 252, Figs. 15 and 16, while the side gripper jaws are opened when the latch member 638, Fig. 12, is tripped by the action of cam 678, Fig. 46, to release the valve plunger 622 of side gripper release valve B for movement to the left from the position shown in Fig. 13, and to the right as viewed in Fig. 54. When this valve plunger is moved in this manner and to the position shown in Fig. 50, the duct $f$ is connected to exhaust and fluid under pressure is admitted to the duct $n$ from a part of the duct $m$. Hence, the side gripper retracting valve S, Fig. 51, is operated in a manner already described to shut off those parts of the ducts $k$ and $l$ which lead from the valve R and to connect those parts of these ducts which are connected to the side gripper-pulling pistons 588, 598, Fig. 51, to exhaust, thus causing the side grippers to be quickly retracted by the pistons 352. It will be recalled that the toe gripper is retracted by its retracting piston 352, Fig. 57, when fluid under pressure from the duct $d$ is admitted to the duct $e$, as a result of movement of the gripper-closing piston 208, Figs. 14 and 18. As has already been pointed out, a part of the duct $n$ is provided with two branches that are connected to the tip lock control valve D, Fig. 52. Fluid under pressure from one of these branches is admitted beneath the valve plunger 1385 so that this plunger is elevated from the position shown in Fig. 50. The passageway 1400 will now be shut off from the exhaust port 1390 and connected to the other branch of the duct $n$. Accordingly, if the valve plunger 1381 had been moved downwardly, from the position shown in Fig. 52, to operate the tip locking mechanism, this plunger will be returned to the position shown in Fig. 52 and the tip-locking mechanism released.

The toe gripper 2 and side grippers 4, 4 will have been opened and fully retracted during the first half-turn of the main drive shaft 666, the exact time when this happens, depending, of course, on the size of the shoe and, considering a full rotation of this shaft as covering 360°, the opening and retraction of the grippers will occur somewhere between 30° and 130° thereof. When these grippers have been retracted, the valves 562, 762 and 762 will be opened by the action of the dash-pot pistons 540, 740 and 740, Figs. 26, 30 and 50, so that the several parts of the duct $j$ will be connected together. As will be seen in Figs. 48, 49 and 50, the duct $j$ leads from a branch of the duct $m$ to a duct $g^2$. The duct $g^2$ is connected to a cylinder 1518 in which there is fitted a knock-off piston 1521, see also Fig. 58. As will be explained below, when fluid under pressure is admitted to the duct $g^2$, this piston will be operated to release latch members which hold the valve plungers 1122, 1124 of the treadle-operated control valve A, Fig. 59, in the positions to which they had been moved by the treadle 1126. Therefore, these valve plungers will be returned, by the springs 1123, 1125, to the positions shown in Figs. 59 and 48 and the ducts $m$ and $m^2$ connected to the exhaust ports 1130 and 1420. The various valve plungers of valves D, E, I, K, L, S and T will now be returned to the positions shown in Fig. 48 and the several parts of ducts $m$, $m^2$, $m^3$ and $m^4$ drained to exhaust through suitable check valves in the aforementioned valves, except as prevented by the closed oil trapping valves 1476 and 1480 of the oil trapping valve G, Figs. 50 and 54. Thus, fluid under pressure will now be trapped in the duct $m^3$, which leads to the gripper support pistons 354, in the duct $m^4$ which leads to the heel rest piston 112 and in the ducts $b^2$ and $c$ which lead to the side clamp operating piston 130.

The machine is also provided with mechanism for releasing the valve plungers 1122, 1124 of the valve A, for return by their springs 1123, 1125 in the event that one or more of the three grippers is, in some way, prevented from being fully retracted. Referring to Figs. 45, 48, 49, 50, a branch of the duct $m$ and the duct $g^2$ are connected to a valve 1513. This valve has a valve plunger 1514 which is normally elevated, to the position shown in Fig. 45 and so as to shut off communication between the duct $m$ and the duct $g^2$, by means of a spring 1515. The valve plunger 1514 is connected, by means of a link 1516, to a bell-crank lever 1517 which carries a cam roll 1511. Secured to the main drive shaft 666 is a cam 1519 that is formed with a peripheral cam surface having a lift portion 1523. When this lift portion of the cam 1519 engages the cam roll 1511, the valve plunger 1514 will be moved downwardly to connect the duct $g^2$ to the duct *m* and thus cause the knock-off piston 1521 to be operated. The lift portion 1523 is so located that the aforementioned action occurs when the main drive shaft has rotated approximately 150° and just before the tacking devices are operated.

The tacking devices 6, 8, 8 will have been operated, in a manner to be explained, and will start to move outwardly when the main drive shaft has rotated approximately 170°. Shortly thereafter, the valve 1480 of the oil trapping valve G, Fig. 54, will begin to open, thus connecting duct $m^4$ and ducts $a^2$, $b^2$ and *c* to exhaust so that the heel rest 12 will be released and the side clamps 14, 14 retracted, by the time the main drive shaft has rotated 210°. Next, the valve 1476 of the oil trapping valve G starts to open, thus connecting duct $m^3$, which leads to the pistons 354, to exhaust and the toe and side grippers will be elevated to their starting positions, by means of the springs 362 and gripper-supporting plungers 350, Fig. 31, when the main shaft has rotated 330°. During the remaining 30° of rotation of the main drive shaft, the clutch is disengaged and the brake is applied, in a manner to be disclosed below, thus completing the mechanical cycle of the machine.

*Treadle mechanism*

As has already been suggested above, the valve plungers 1122, 1124 of the treadle-operated control valve A, Figs. 59, 48, 49 and 50, are operated by mechanism that is associated with the treadle 1126, Figs. 1, 41 and 58. Referring to Fig. 58, this treadle is pivotally supported in the lower part of the machine frame construction 18 and is provided with an arm 1520. This arm engages one end of a lever 1522, also pivoted on the machine frame, and secured to the other end of this lever is a push rod 1524. This rod extends through an opening formed in a bracket member 1527 and a coil spring 1526, surrounding the rod, tends to hold the parts in the positions shown in Fig. 58, and as determined by a stop screw 1528 threaded into the arm 1520 of the treadle. The push rod 1524 is connected to an operating block 1530 that is slidably mounted on a box-like supporting member 1532 which is associated with the machine frame 18, Fig. 58. Also mounted on this supporting member are a pair of valve-operating slides 1534, 1536, Figs. 59 and 60, which are in alinement, respectively, with the valve plungers 1122 and 1124, see Fig. 59. The operating block 1530 is formed with an ear 1538 which engages a lateral projection 1540, formed on the operating slide 1534, and this slide has an upwardly extending latch finger 1542, Figs. 59 and 60. The other operating slide 1536 is also provided with a lateral projection 1544 and an upwardly extending latch finger 1546, Figs. 58, 59 and 60. Pivotally mounted on a shaft 1548, carried on the supporting member 1532, are a pair of latch arms 1550, 1552 which are adapted to cooperate, respectively, with the latch fingers 1542 and 1546 on the two operating slides. The latch arm 1552 is shown in Fig. 58 and coil springs 1554 and 1556 are provided, Fig. 60, for urging these latch arms toward the latch fingers 1542 and 1546 as illustrated in Fig. 58. Carried by the operating block 1530 is a latch member 1558 which is normally held in the position shown in Fig. 58, by means of a coil spring 1560, and pivoted on this latch member is an arm 1562. The treadle interlock piston 1250, to which reference has previously been made, is formed with a cam portion 1564 against which a rounded end of the arm 1562 is held by means of a spring 1566. The interlock piston is urged to the position shown in Fig. 58 by means of a coil spring 1568 which surrounds a stop rod 1570 that is threaded into the supporting member 1532 and provided with a lock nut 1572, Figs. 58 and 60.

With the arrangement so far described, when the treadle 1126 is depressed the first time, the operating block 1530 will be moved over to the left, Fig. 59, carrying with it the valve-operating slide 1534 and the valve plunger 1122 of the valve A. The latch arm 1550 will now latch over the latch finger 1542 so as to hold the operating slide 1534 and the valve plunger 1122 in the positions to which they were moved by the first depression of the treadle when the treadle is released. As has already been pointed out, when the valve plunger 1122 is thus moved to the left, fluid under pressure is admitted to the duct *m*, and its various branches, and certain actions take place before the machine comes to a stop with the grippers exerting their respective pulls on the upper of a shoe. It will be also recalled that the last of these actions to occur is the application of the so-called forward drag pull to the upper by the side grippers. As soon as this happens, fluid under pressure will be admitted to the duct *z* so that the treadle interlock piston 1250 is moved over to the left, Fig. 58. As a result of such movement of this piston, the latch member 1558 will be swung into a position to engage the projection 1544 on the valve-operating slide 1536. Now, when the treadle 1126 is depressed a second time, the valve plunger 1124 of the valve A will be moved to the left, Fig. 59, and latched in this position by the engagement of latch arm 1552 with the latch finger 1546. As will be apparent, such movement of the valve plunger 1124 cannot be effected unless and until all of the several actions attendant upon the first depression of the treadle have been completed.

It has been pointed out above that the valve plungers 1122 and 1124 are released for return to the positions shown in Figs. 59 and 48, by the springs 1123 and 1125, at an intermediate point in the mechanical cycle of the machine, when fluid under pressure is admitted behind the knock-off piston 1521, Fig. 58, through duct $g^2$. The cylinder 1518 in which this piston is fitted is mounted on an upstanding part of the supporting member 1532, Figs. 58 and 60, and the piston 1521 is in engagement with a latch-release lever 1574. This latch release lever is pivotally mounted on the shaft 1548 and has a crossbar 1576 which extends in front of the two latch arms 1550, 1552, Fig. 60. Thus, when the knock-off piston 1521 is moved to the left, Fig. 58, by fluid under pressure admitted to the cylinder 1518 through the duct $g^2$, both of the latch arms 1550 and 1552 will be rotated in a counterclockwise direction to release the valve-operating slides 1534 and 1536 so that the valve plungers 1122 and 1124 may be returned to the positions shown in Figs. 59 and 48. The aforementioned movement of the knock-off piston is limited by a ball check valve 1578 that is eventually urged against a seat 1580, formed in the cylinder 1518, by means of a relatively light spring 1582, Fig. 58.

In addition to the arrangement which has just been described, the machine is also provided with mechanism for releasing the valve plunger 1122, for return to the position shown in Fig. 59, after the treadle has been depressed for the first time and prior to the initiation of the mechanical cycle of the machine by a second depression of the treadle. For this purpose, there is provided an auxiliary treadle 1584 which is pivotally mounted on the machine frame construction 18, just above the treadle 1126, Figs. 1, 41 and 58. This treadle is connected to a U-shaped lever 1586, that is supported on a bracket member 1588 associated with the machine frame, by means of a link 1590, Fig. 58. This lever, in turn, is connected to another U-shaped lever 1592 by means of a pair of links 1594, Fig. 60. The last-mentioned lever is carried by the shaft 1548 and has a crossbar 1596 that extends in front of the latch arms 1550 and 1552. A coil spring 1598, connected to the link 1590 and to the bracket member 1527, normally holds the treadle 1584 and the U-shaped levers 1586 and 1592 in the positions shown in Fig. 58, as determined by a stop screw 1593. As will be apparent, when the auxiliary treadle 1584 is depressed, the latch arm 1550 will be rotated in a counterclockwise direction so as to release the valve-operating slide 1534 and thus permit the valve plunger 1122 to be returned to the position shown in Fig. 59, by its spring 1123. Hence, if the operator is not satisfied with the manner in which the shoe is located in the machine, or the way in which the upper is engaged by the grippers, he can restore the machine to its starting condition by depressing the treadle 1584.

*Clutch and brake mechanism*

The clutch and brake mechanism, by means of which the main drive shaft 666, see Figs. 45 and 46, is automatically started, rotated a complete turn and then brought to a stop, to perform the mechanical actions of the machine, is shown more particularly in Figs. 41 and 64 of the drawings. Secured to the main drive shaft 666 is a worm wheel 1600 that meshes with a worm 1602 keyed to a countershaft 1604. This countershaft is journaled in bearings, associated with the machine frame construction 18 and housing portions 1606, 1608 formed integrally therewith, Fig. 64. Rotatable on a sleeve 1609, which is secured to one end of the countershaft, is a pulley 1610 that is driven from the motor 1108 by means of belts 1612, Fig. 41, and formed with a conical clutch surface 1614, Fig. 64. Slidably mounted on a part of this sleeve is a clutch member 1616, having a clutch surface 1618 that is complemental to the surface 1614 on the pulley 1610, and this clutch member is arranged to drive the sleeve 1609 and the shaft 1604 through lugs 1620, formed on the sleeve. This clutch member has an elongated hub 1622 that is provided with an annular groove 1624 for receiving blocks 1625 carried by a clutch yoke 1626. This clutch yoke has a hub portion from which there extends an arm 1628. Supported in webs extending from the housing portion 1608 is a shaft 1630 that has an eccentric middle portion 1632 on which the hub portion of the clutch yoke is rotatably mounted. The arm 1628 is connected, by means of a link 1634, to a lever arm 1636 that is pivoted on a shaft 1638 which is fixed in a supporting member 1640, associated with the machine frame construction, see Figs. 45 and 46. Also pivoted on the shaft 1638 is a second lever arm 1641 that carries a roll 1642 which is held in engagement with a cam 1644, secured to the main drive shaft, by means of a coil spring 1643.

Pivotally mounted on the end of the lever arm 1641 is a latch member 1646 that is urged into a position to engage a latch plate 1648, secured to the end of the lever arm 1636, by means of a spring-pressed plunger 1650, Fig. 64. Extending downwardly from this latch member is an arm 1652 to which is connected an operating link 1654. This link is formed with a hooked end 1656 and is urged yieldingly against a supporting roller 1658, carried by an ear 1659 that is secured to the lever arm 1641, and to a position to be engaged by the clutch operating plunger 1434, by means of a spring-pressed plunger 1660. Secured to the end of the lever arm 1636 is a rod 1662 that is connected to another lever arm 1664, carried by a shaft 1666 which is journaled in and extends outwardly through a portion of the machine frame 18. Pinned to this shaft is an arm 1668 that is adjustably connected to one end of a lever 1670, also mounted on the shaft 1666, Fig. 41. The other end of the lever 1670 is connected to a brake band 1672 which surrounds a brake drum 1674, secured to the countershaft 1604, Fig. 41.

When the various parts of the clutch mechanism are in the positions in which they are shown in Fig. 64, the clutch member 1616 will be held away from the pulley 1610, against the resistance of a clutch spring 1676, and the brake band 1672 will be drawn around the drum 1674, by the action of the cam 1644, the lever arm 1641, latch member 1646, lever arm 1636, link 1634, rod 1662 and a coil spring 1663, associated with this rod. Upon the admission of fluid under pressure to the duct $d^2$ and behind the piston 1432, the clutch operating plunger 1434, which is connected to this piston, will be moved over to the left, Fig. 64, against the resistance of a return spring 1678 and to the extent determined by the seating of a ball valve 1680, carried by this piston, against a seat 1682 associated with the cylinder 1430, see also Fig. 54. Such movement of the plunger 1434 will disengage the latch member 1646 from the latch plate 1648 thus releasing the arm 1636 from the arm 1641, so that the clutch member 1616 can be moved into engagement with the clutch surface 1614 on the pulley 1610, by spring 1676, and the arm 1636 rotated, in a counterclockwise direction to elevate the rod 1662 and release the brake band 1672. The main drive shaft 666 will now start to rotate, being driven through the worm 1602 and worm wheel 1600. The cam 1644 is so shaped that, as the main drive shaft rotates, the lever arm 1641 can be elevated by its spring 1643 and, as this arm is thus elevated, the hooked end 1656 of the link 1654 will be moved out of engagement with the clutch operating plunger 1434. The spring-pressed plunger 1650 will now hold the latch member 1646 against the latch plate 1648 and, before the main drive shaft has rotated a half a turn, will cause this latch member to latch over the latch plate. The lever arms 1641 and 1636 are eventually returned to the positions shown in Fig. 64, by the action of the cam 1644, thus disengaging the clutch member 1616 from the pulley 1610 and setting the brake band 1672, to bring the main drive shaft to a stop when this shaft has rotated a complete turn, the clutch being disengaged and the brake applied during the last 30° of rotation of the main drive shaft, as explained above.

It will be recalled that the duct $d^2$, which leads to the cylinder 1430, is connected to the duct *m*, through valve X, Fig. 54, and, during the mechanical cycle of the machine, the duct *m* is connected to exhaust by the action of the knock-off piston 1521, either as a result of the retraction of the grippers or the operation of valve 1513, at least by the time the main drive shaft has rotated 150°. Therefore, when the lever arms 1641 and 1636 are returned to the positions shown in Fig. 64, by cam 1644, the piston 1432 will have been returned by the spring 1678 so that the plunger 1434 is in a location to be reengaged by the hooked end 1656 of the link 1654. It will be understood if, for any reason, this plunger has not been brought back to the position shown in Fig. 64, when the lever arms 1641 and 1636 are moved downwardly, that the spring pressed plunger 1660 will yield upwardly to prevent damage to the parts and to permit the return of the plunger 1434 by the spring 1678. To facilitate such late return of the plunger 1434, the hooked end 1656 is provided with an inclined surface 1657 so that it may be cammed upwardly by this plunger.

In order to make it possible to turn the main drive shaft 666 by hand, for the purpose of making certain adjustments, and, at the same time, to prevent the engagement of the clutch and resulting power rotation of the main drive shaft after a second depression of the treadle 1126, the machine is provided with a safety mechanism now to be described. Keyed to the end of the shaft 1630 is a bell-crank lever 1681 having two arms 1683 and 1685, Figs. 64 and 65. Connected to the arm 1683 is a link 1686, in one end of which there is a slot 1688, Fig. 64. This link is connected to an arm 1690 of a bell-crank lever 1692, which has two other arms 1694 and 1696, by means of a pin 1698 which enters the slot 1688. The arm 1694 of this bell-crank lever, which is pivotally mounted on the housing portion 1606, engages the inner end of a hand plunger 1700, mounted in the machine frame 18, Fig. 41, while the arm 1696 carries a pin 1702. This pin is received in a slot 1704, formed in a link 1706 that is connected to one arm of a bell-crank lever 1708. The other arm of this bell-crank lever, which is pivoted on the lever arm 1641, is connected to the arm 1652 which, as already explained, is associated with the latch 1646. The arm 1685 of the bell-crank lever 1681 is connected to a hand lever 1710, mounted on the outside of the machine frame, Figs. 1 and 65, by means of links 1712, 1714, bell-crank lever 1716 and lever arm 1718, Fig. 65. This hand lever is provided with a spring-pressed plunger 1720 and a hand grip 1722 by means of which the spring-pressed plunger may be withdrawn from one of two holes 1724 in a boss 1726, formed on the machine frame 18.

With the hand lever 1710 in the position shown in Fig. 65, the machine is set for mechanical operation and the clutch will be automatically engaged, and the brake released, when the latch member 1646 is tripped by the action of the plunger 1434. During such tripping of the latch member 1646, the link 1706 is free to move upwardly because of the lost motion action of slot 1704 and pin 1702. However, since the pin 1698 is at the right-hand end of the slot 1688, Fig. 64, and, as the hand lever 1710 is held against movement by the spring-pressed plunger 1720, Fig. 65, the clutch cannot be engaged by means of the hand plunger 1700. On the other hand, if the spring-pressed plunger 1720 is withdrawn, by means of hand grip 1722, and the hand lever 1710 rocked in a clockwise direction, Fig. 65, until this plunger enters the other hole 1724, to hold this hand lever in the position shown in Fig. 1, the machine will be set for manual operation. As a result of such movement of the hand lever 1710, the shaft 1630 will be turned, approximately 90° in a clockwise direction, and, because of the action of the eccentric mid-portion 1632 thereof, the clutch yoke 1626 and arm 1628 will be shifted over to the right, Fig. 64. Now, when the latch member 1646 is tripped, upward movement of the arm 1636 will be arrested, by means of an adjustable stop screw 1730, before the clutch member 1616 has moved into engagement with the clutch surface on the pulley 1610. The arm 1636 will, however, move upwardly far enough to loosen the brake band 1672 so that the main drive shaft 666 can be rotated by means of a hand wheel 1732, secured to the countershaft 1604. Also, when the hand lever 1710 is in the manual operating position shown in Fig. 1, the latch member 1646 may be tripped, by means of the hand plunger 1700 to permit the main drive shaft to be rotated by means of the hand wheel 1732. Thus, when the hand lever is in the manual operating position, the latch member may be tripped, by means of the hand plunger 1700, to permit manual rotation of the main drive shaft in the manner just explained. It will be noted that such manual rotation of the main drive shaft can be effected although the motor 1108 has not been started to drive the pump 1102 and built up pressure in the fluid-pressure system or, if the motor is running, before the treadle 1126 has been depressed. Also, it will be impossible for the mechanical cycle to be accidentally started, by an inadvertent depression of the treadle a second time, while the operator is making adjustments that may involve the manual rotation of the main drive shaft.

*The tacking devices*

As has been suggested above, during the mechanical cycle of the machine, the overlaying and fastening-inserting, or tacking devices 6, 8 and 8 are moved inwardly over the bottom of the shoe and operated to drive tacks for securing the upper in the position to which it has been pulled by the grippers. The toe-tacking device 6 is of the same general construction as the two side tacking devices 8, 8, with the exception that the toe-tacking device is arranged to drive only a single tack, while the side-tacking devices are adapted to drive three tacks. Because of this similarity, and since the two tacking devices are of identical construction, with certain of their parts reversed to accommodate operation on the opposite sides of a shoe, only one of these side-tacking devices is shown in detail, it being understood that the following detailed description thereof applies equally well to all three of these devices, except where otherwise noted. Also, the corresponding parts of these three tacking devices, where they appear in the drawings, for example in Figs. 1, 2, 3 and 4, will be identified with the same reference characters.

Referring particularly to Figs. 66–73, the side tacking device which appears on the left-hand side of the machine, as viewed in Figs. 1 and 2, will be described in detail. This tacking device is associated with and supported on a pair of bracket members 1800, 1802 that are secured to a part of the machine frame construction 18 by means of bolts 1804, Figs. 66–69. This tacking device is shown in side elevation in Fig. 66 and in front elevation in Fig. 67, while Figs. 68 and 69 are, respectively, oppositely facing views in side elevation of portions of the tacking device which are mounted on the bracket members 1800, 1802, and Figs. 70–73 are detailed views in section, as indicated. The operating elements of each tacking device include an overlaying member, or wiper 1806 that is provided with a rounded leading edge 1808, Figs. 66 and 68, and traversed by three slots 1810 through which tacks are driven by means of tack drivers 1812, Fig. 67. In each of the side tacking devices there are three of these tack drivers, Fig. 67, while the toe tacking device has but a single tack driver and the wiper 1806 thereof is correspondingly narrower, see Figs. 1, 2, 3 and 4. The wiper 1806 is adjustably secured, together with a stop member 1814, to a supporting block 1816, by means of a clamp nut 1818 and bolt 1820, Fig. 70. This supporting block is pinned to a lower member 1822 and this whole assembly is rotatably mounted on the outer end of an arm 1824 by means of cooperating arcuately shaped ribs 1826 and grooves 1828, Figs. 70 and 71. A spring-pressed plunger 1830, mounted in the outer end of the arm 1824, is provided with a wedge-shaped nose 1832 which is adapted to engage a pair of rollers 1834, 1834, carried in the member 1822, and thus hold the assembly in the mid-position shown in Fig. 71.

The arm 1824 is pivotally connected to the upper end of a second vertically disposed arm 1836 which is rotatably mounted, at its lower end, on a stud 1838 carried by the bracket member 1800, Figs. 66, 67 and 68. Secured to the arm 1836 is a housing member 1840, Figs. 66, 68 and 73, in which there is slidably mounted a plunger 1842, Fig. 73. Connected to the lower end of this plunger, by means of a T-slot, is a trunnion block 1844 through which there passes a trunnion shaft 1846. This shaft also passes through the bifurcated end of one arm 1848 of a bell-crank lever 1850 that has two other arms 1852 and 1854 and is rotatably mounted on the stud 1838, Figs. 66 and 68. The plunger 1842 is urged downwardly, to hold the block 1844 yieldingly against an adjustable stop screw 1856, threaded in an offset portion 1858 of the housing 1840, by means of a compression spring 1860, Fig. 73, which bears, at its upper end, against an adjusting cap 1862, threaded onto the upper part of the housing, Figs. 66 and 68. Mounted in the offset portion 1858 of the housing 1840 is a plunger 1864 having a wedge-shaped end 1866 that is urged into a correspondingly shaped notch 1868, formed in the plunger 1842, by means of a compression spring 1870 which is seated against an adjusting screw 1872, Fig. 73. The tacking device is moved inwardly toward and into engagement with the shoe by means of mechanism that will be described below and including an operating link 1874 that is connected to the arm 1854 of the bell-crank lever 1850, Figs. 66, 67 and 68.

Formed integrally with the bracket member 1800 is an upwardly extending portion 1876 in which there is a cylinder bore 1878, Figs. 66, 67, 68 and 72. Slidable in this bore is a hollow piston 1880 which carries, at its upper end, a horizontally disposed platform 1882. Secured to this platform is an elongated open-sided housing member 1884 having a laterally extending flange 1886. This flange and the oppositely disposed portion of the platform are shaped to form a closed cam track 1888, Figs. 66, 67, 68 and 72. The platform 1882 and piston 1880 are held against rotation by means of an upstanding member 1883, secured on the bracket 1800, Fig. 66, and provided with guide surfaces 1885, 1885, disposed at right angles, Fig. 2, which cooperate with similar surfaces 1887, 1887 formed on the platform. The arm 1824 has a downwardly extending web 1892 in which there is secured a stud 1894, Figs. 67 and 68, and rotatably mounted on one end of this stud is a rectangular shaped cam block 1896 which is received within the cam track 1888, Fig. 72. Keyed to one side of this block is a finger 1898 that is held in place by means of a screw 1900, threaded into the end of the stud 1894. Passing through a clearance hole 1902, in a laterally extending part of the platform 1882, is an adjusting screw 1904 that is threaded into a sleeve 1905, which rests on the platform, and also into a block 1906 having a rib 1908 that rides in a groove 1910, formed in the housing 1876, Fig. 67. This adjusting screw has a lower end that is secured in forwardly extending webs 1912, 1912, formed on the bracket member 1800 and is held against axial movement relatively thereto and for rotation thereon by means of thrust washers 1914, 1914 and nut 1916, Figs. 66 and 67. A compression spring 1918, which surrounds the adjusting screw 1904, is interposed between the lower surface of the platform 1882 and the upper surface of the block 1906. As will be apparent from Fig. 67, the platform 1882 is yieldingly supported by the spring 1918 and at a height determined by the position of the sleeve 1905, and the following arrangement is provided for varying the tension of this spring and for changing the heightwise position of the sleeve.

At its upper end the adjusting screw 1904 is keyed to the inside of the hub of an adjusting wheel 1920 which, in turn, is keyed to a second sleeve 1922, Fig. 67, that is held down on the sleeve 1905 by means of spring clips 1924, 1924, Fig. 66. At its lower end, the hub of the adjusting wheel 1920 is provided with a flange 1926 that engages a notch 1928 formed in a locking pin 1930. This pin is slidable in a bore in the sleeve 1905 and has upper and lower ends 1932, 1934 which are in alinement, respectively, with holes 1936 and 1938 formed in the sleeve 1922 and in the upper surface of the platform 1882. When the adjusting wheel is in the position shown in Fig. 67, as determined by the engagement of a ball detent 1940 with the uppermost of two grooves 1942, 1942 formed in its hub, the lower end 1934 of the pin 1930 will project into one of the holes 1938 in the platform 1882. Now, if the wheel 1920 is rotated, the adjusting screw 1904 will be rotated relatively to the sleeve 1905, which is held against rotation by the pin 1930, and also with respect to the block 1906 which is held against rotation by the groove 1910. Since the threaded portions of this screw are of the same pitch and hand, the effect of such rotation of the hand wheel will be to raise, or lower, the platform 1882 and the block 1906 without varying the tension of the spring 1918. On the other hand, if the adjusting wheel 1920 is pulled upwardly, until the detent 1940 enters the lowermost of the grooves 1942, the lower end of the pin 1930 will be withdrawn from the hole 1938 and the upper end 1932 of this pin will be projected into a hole 1936 in the sleeve 1922. Now, when the adjusting wheel is turned, the sleeves 1905 and 1922 and the adjusting screw 1904 will be rotated as a unit. As a result of this rotation of the sleeves 1905 and 1922 and the adjusting screw 1904, the block 1906 will be moved upwardly or downwardly to increase or decrease the tension of the spring 1918. Hence, the tension of this spring may be varied in the manner just described without changing the heightwise position of the platform 1882 or the heightwise position of the platform may be changed without varying the tension of the spring. A similar arrangement is provided for adjusting the tension of the spring 1918 and for changing the heightwise position of the platform 1882, associated with the toe-tacking device 6, by means of a hand wheel 1920, Figs. 1 and 3.

As suggested above, the tacking device is operated by mechanism including the link 1874 and the arrangement is such that when this link is moved downwardly, in a manner to be described, the arm 1836 is swung in a clockwise direction, Fig. 66 (counterclockwise direction, Fig. 68) through the action of the arm 1848 of the bell-crank lever 1850. During this swinging movement of the arm 1836, the block 1896 travels along the cam track 1888 and this cam track is so shaped that the flat operating surface of the overlaying member, or wiper 1806, of the tacking device is maintained substantially in the angular position, i. e., substantially parallel to the bottom of the shoe, as it approaches, and finally engages, the upper, and wipes it in over the bottom of the shoe. The extent of movement of the tacking device is determined by the stop member 1814 which, in the case of the side tacking devices 8, 8 engage abutment members, not shown, which are secured to the side clamps 14, 14, while the stop member 1814 of the toe-tacking device 6 engages the toe end of the shoe in the usual manner. To prevent marring of the upper at the toe end of the shoe, the stop member 1814 of the toe tacking device is preferably provided with a resilient rubber facing 1815, Figs. 2 and 3. After the inward movement of the tacking device has been terminated, and as the link 1874 continues to move downwardly, the bell-crank lever 1850 is permitted to rotate, for a purpose that will presently appear, in the following manner. Referring to Fig. 73, it will be seen that the wedge-shaped end 1866 of the plunger 1864 and the groove 1868 each have a much sharper inclination on their lower sides. Thus, when movement of the tacking device is arrested, the plunger 1864 will be cammed out of the groove 1868 so that the plunger 1842, to which the arm 1848 is connected, is released for upward movement against the resistance of spring 1860. The strength of this spring is just sufficient to hold the tacking device firmly in position during the subsequent operation of the tack drivers 1812 which occurs as the bell-crank lever 1850 is rotated by the downwardly moving link 1874. Also, when this link is moved upwardly to rotate the bell-crank lever 1850 in the opposite direction, the tacking device will be held in position by this spring until the plunger 1864 again enters the groove 1868 whereupon the tacking device will be retracted as the link 1874 completes its upward movement.

The tack drivers 1812 are fixed to a crosshead 1946 which is slidable in a guideway 1948 formed in downwardly extending portions 1949, 1949 of the member 1822, Figs. 67 and 70. This crosshead is provided with an opening 1950 in which is fitted the rounded end 1952 of a driver-operating lever 1954, Fig. 70, that is rotatably supported on the stud 1894, referred to above, see Fig. 68. This lever carries a cam roll 1956 which is fited in a cam track 1958 formed in the upper part of a driver-operating member 1960 which is slidably mounted in an upwardly extending portion of the bracket 1802, Figs. 67 and 69. At its lower end, the driver-operating member 1960 has a laterally extending ear 1962 which is recessed to provide a seat for a driver-operating spring 1964 and this spring bears against an adjusting screw 1966, supported in a post 1968 that is associated with the bracket 1802, Figs. 67 and 69. A spring-pressed latch plunger 1970, mounted in a boss 1972 on the bracket 1802, is shaped to engage the lower edge of the driver-operating member 1960 and to hold it in the cocked position shown in Fig. 69. This latch plunger is formed with a projection 1974 which extends out through a slot 1976, in the boss 1972, and in line with one end of a lever 1978 which is pivoted on the boss 1972. This lever is connected, by means of a link 1980, to a bell-crank lever 1982 that is rotatable on a shaft 1984, carried by the bracket 1802, Figs. 66 and 69, and this bell-crank lever, in turn, is adjustably connected, by means of a screw 1986, to a triangular shaped lever 1988. This triangular lever is adjustably connected, by means of a pin 1990, and eccentric bushing 1992, to a link 1994 which extends from the arm 1852 of the bell-crank lever 1850, Figs. 66 and 68, and is provided with a rounded nose 1996, Figs. 66 and 69.

When the tacking device is moved inwardly, as a result of the downward movement of the link 1874, the roll 1956 on the driver-operating lever 1954, will travel along the cam track 1958 and the link 1994 will be moved to the left, Figs. 66 and 69. The cam track 1958 is so shaped that the driver-operating lever will be rocked, in a counterclockwise direction, Fig. 66, first quickly, and then gradually, for a purpose that will presently appear. As the link 1994 travels to the left, Figs. 66 and 69, the triangular lever 1988 and bell-crank lever 1982 will be rotated in a clockwise direction so that the nose 1996 on lever 1988 is withdrawn from the lower end of the driver-operating member and, eventually, the spring-pressed latch plunger 1970 is retracted from engagement with the driver-operating member 1960. The drivers 1812 will now be operated, through the action of the lever 1954, as the driver-operating member 1960 is projected downwardly by the spring 1964. The driver-operating member is finally brought to a stop by means of a stop plate 1998 which is carried by an arm 2000. This arm is rotatably mounted on the shaft 1984 and is provided with a recess 2002 in which is fitted the end of an adjusting screw 2004 which threaded through a part of the bracket 1802, Fig. 69. During the retraction of the tacking device, after the operation of the tack drivers, and as a result of the upward movement of the operating link 1874, Fig. 66, the link 1994 is moved to the right, Figs. 66 and 69. Now, the bell-crank lever 1982 and triangular lever 1988 will be rotated in a counterclockwise direction until the driver-operating member is returned to the position in which it is shown in Fig. 69 and the lever 1978 withdrawn from the projection 1974 so that the spring-pressed latching plunger 1970 may reengage the lower end of the driver-operating member 1960.

As the rounded leading edge 1808 of the wiper 1806 comes into engagement with the upper, at the edge of a shoe, during the inward movement of the tacking device, the supporting bolck 1816 can rotate, against the resistance of the plunger 1830, Fig. 71, to aline the edge of the wiper with the edge of the shoe and, as the inward movement of the tacking device continues, the arm 1824 and tacking device can yield downwardly against the resistance of spring 1918. However, at the conclusion of the inward movement of the tacking device and just before the drivers 1812 are operated, to drive tacks through the upper and into the bottom of the shoe, the tacking device is rigidly locked in the following manner. Referring to Fig. 72, the hollow piston 1880 is traversed by two radial ports 2006, 2008 and fitted in this piston is a valve plunger 2010. Formed integrally with this plunger are a conical valve 2012, guide webs 2014 and a head 2016 having an offset portion 2018 . A coil spring 2020 is interposed between the lower part of the cylinder 1878 and the conical valve 2012 and the housing 1876 is provided with inlet and outlet passageways 2022 and 2024 for maintaining a quantity of oil in the cylinder bore 1878 and hollow piston 1880 to the level indicated by the broken line, Fig. 72, the passageway 2022 being connected to the gravity tank 1135, Figs. 48, 49 and 50, by means of a pipe 2026, Figs. 48, 49 and 50. Secured to the head 2016 of the valve plunger 2010 is a pin 2028 which extends out through a slot 2030, formed in the piston 1880, Fig. 68. Mounted on the platform 1882 and extending downwardly therefrom is a bracket member 2032 and journaled at the lower end of this bracket is a shaft 2034 which is formed integrally with a bell-crank lever having upwardly and rearwardly extending arms 2036 and 2038, Fig. 68. The arm 2036 has a hooked end 2040 which is normally held in engagement with the pin 2028 by means of a coil spring 2042 which is stretched between the arm 2038 and a hook 2044, secured to the bracket 2032.

When the tacking device is in its rearward position and before the beginning of the mechanical cycle of the machine, the valve plunger 2010 is held in the position shown in Fig. 72 by means of the arm 2036, the hooked end of which is in engagement with the pin 2028, and also by reason of the fact that the finger 1898 bears against an arcuate surface 2046 formed on the offset portion 2018 of the head 2016, Fig. 72. Now, as the tacking device is moved toward the shoe, to the right as viewed in Figs. 66 and 72 and to the left as viewed in Fig. 68, this finger will pass beyond the arcuate surface 2046 at least by the time the wiper 1806 has come into engagement with the edge of the shoe, so that the valve plunger is held in the position shown in Fig. 72 only by the hooked end 2040 of the arm 2036. Secured to the shaft 2034 is an arm 2048, Figs. 66, 67 and 68, which extends downwardly in line with the projection 1974 on the latch plunger 1970, Fig. 69, and the arrangement is such that, just before the driver-operating member 1960 is released by the latch plunger 1970, the hooked end 2040 of arm 2036 is moved out of engagement with the pin 2028. When the valve plunger 2010 is thus released, the conical valve 2012 will be moved upwardly, by the spring 2020, against a seat 2050, formed in the lower end of the hollow piston 1880. The oil trapped beneath this piston now rigidly locks the arm 1824, and hence the tacking device which is carried thereby, against movement away from the bottom of the shoe, during the operation of the tack drivers 1812. Thereafter, while the tacking device is being retracted, by movement to the left, Figs. 66 and 72, and to the right, Fig. 68, the valve plunger 2010 is depressed, and the conical valve 2012 moved away from the seat 2050, by the engagement of the finger 1898 with an inclined cam surface 2052, formed on the offset portion 2018 of the head 2016, so that the hooked end 2040 of arm 2036 will again engage the pin 2028 when the driver-operating member 1960 is latched in the position shown in Fig. 69 by the plunger 1970.

The tack drivers 1812 project into driver passages 2060, formed in the supporting block 1816, Figs. 46 and 70, and the upper ends of these passages are closed by means of gate members, or tack fingers, 2061, Figs. 66, 67, 68 and 70, of conventional construction which yieldingly open to permit passage of the tack drivers when the tacks are being driven. Intersecting each of these driver passages is a downwardly inclined tack-feeding passageway 2062 to which a rigid tack tube 2064 is connected, Figs. 67 and 70. These rigid tubes are mounted on a header block 2068, Figs. 67 and 68, which is removably supported on one of the downwardly extending portions 1949 of the member 1822 in the following manner. This header block has a downwardly extending slotted flange 2070 and pivoted on one of the downwardly extending portions 1949 of the member 1822 is a rod 2072 on which is mounted a spring-pressed binding sleeve 2074, Fig. 67. This sleeve is provided with finger grips 2076, Figs. 67 and 68, by means of which it may be pulled to the right, Fig. 67, and together with the rod 2072, swung downwardly to release the header block 2068. The rigid tack tubes 2064 extend somewhat beyond the header block where they are connected to flexible tack tubes 2078 which lead from the tack-supplying device 16, Fig. 1.

As will be apparent from an inspection of Fig. 2, the toe tacking device moves along a path that is generally parallel to the longitudinal axis of the forepart of a shoe mounted on the shoe rest 10, while the two side-tacking devices 8, 8 move along paths that are inclined downwardly and inwardly toward this axis. Each of these tacking devices is operated by means of a link 1874 and these three operating links are actuated simultaneously in the following manner. Referring to Fig. 23, it will be recalled that the link 800, see Figs. 3 and 4, is connected to the lever 786. Pivotally mounted on a part of the machine frame construction 18 is a bell-crank lever which has four arms 2080, 2082, 2084 and 2086. Connected to the arms 2080, 2082 and 2084 of this bell-crank lever are the three operating links 1874 for the two side tacking devices 8, 8 and the toe tacking device 6, Fig. 23, and a link 2088 extends between the arm 2086 of this bell-crank lever and the lever 786 to which the link 800 is connected, Fig. 4. At its lower end, the link 800 is connected, by means of a swivel block 2090, to an arm 2092 which is pivoted on a shaft 2094, carried by the supporting member 1640, Fig. 45. On this arm there is a cam roll 2096 which fits in a cam groove 2098, formed in the cam 1519 which, as already described, is secured to the main drive shaft 666. This cam track is so shaped that, during the rotation of this shaft which, as previously explained, is automatically started as a result of the second depression of the treadle 1126, the tacking devices are moved inwardly, toward and over the bottom of the shoe; the tacking devices are operated to drive tacks through the upper and into the shoe bottom, after the upper has been released by the grippers 2, 4, 4 and wiped in over the bottom of the shoe by the wipers 1806; and the tacking devices retracted to their original positions, as illustrated by the side tacking device shown in Fig. 66, see also Figs. 1–4.

As previously explained, the length of the driving stroke of the drivers 1812 is determined by the adjusted position of the stop plate 1998. It will be observed, however, that regardless of the thickness of the upper materials, the tacks will always be driven with their heads located a predetermined distance from the surface of these materials. In this connection, it is noted that as the tacking device 8 and arm 1824 yield downwardly, during the inward movement of the tacking device, the driver operating lever 1954 will be rotated, in a clockwise direction, Fig. 66, since its left-hand end is held stationary by cam track 1958, while the stud 1894, on which this lever is pivoted, moves downwardly with the arm 1824. Hence, prior to the tripping of the latch plunger 1970, the drivers are positioned in accordance with the thickness of the upper materials and, thereafter, they are actuated through an operating stroke of a definite length, as determined by the setting of stop plate 1998.

*Tack supply mechanism*

The mechanism for supplying tacks to the single tack driver 1812 of the toe tacking devices 6 and to the three tack drivers 1812 of each of the two side tacking devices 8, indicated generally by the reference character 16, Fig. 1, is mounted on the top of the machine frame construction 18 and is shown in detail in Figs. 74 to 80 of the drawings. Referring particularly to Figs. 74, 75 and 76, this mechanism is associated with a fabricated housing assembly 2100 which, at its upper portion, is shaped to provide a tack pot, or hopper, 2102 having oppositely inclined bottom walls 2104, 2106 and hinged access doors 2108, 2110, Fig. 76. Extending into the tack pot are seven raceways 2112, one of which appears in Fig. 76, each of these raceways being associated with one of the seven flexible tack-feeding tubes 2078, referred to above. Tacks are elevated from the lower part of the tack pot and delivered to these raceways by means of an elevator 2114, sweep arm 2116 and a grooved tack-distributing plate 2118 in a manner that will presently appear. These seven raceways terminate, at their lower ends, adjacent to a block 2120. Associated with this block is a tack-separating mechanism similar to that disclosed in United States Letters Patent No. 2,047,205, issued on July 14, 1936, in the name of Jacob C. Jorgensen, and including a tack separator plate 2122, a removable cover 2124 and a plurality of tack-retracting fingers 2126, Fig. 76, adapted to be operated by means of a hand wheel 2128, Fig. 74, in the manner explained in that patent. The tack-separating plate 2122 is mounted on a slide which is arranged to be reciprocated, by means including a lever 2130, Fig. 76, to separate tacks from the lower ends of the seven raceways and deliver them to seven passageways 2132, formed in a part of the housing assembly 2100, Figs. 74 and 76. Located within the tack pot 2102 and arranged to cooperate with the upper ends of the raceways 2112 and raceway covers 2133, is a tack clearer 2134 which is similar to that described in United States Letters Patent No. 1,107,337, issued August 18, 1914, in the name of Ronald F. McFeely. This tack clearer is supported on a shaft 2136 that extends out through the housing assembly where it is provided with a hand wheel 2138, Figs. 74 and 77.

The passageways 2132 are connected with tubes 2140 of transparent material which extend across an opening 2142 formed in the upper part of a block 2144 that is secured to the housing assembly by means of thumb screws 2146. Slidable in a slot 2148, formed in the block 2144, is a gate member 2150 which is traversed by seven passageways 2152, Fig. 74. When the gate member is moved to the right from the position shown in Fig. 76, the passageways 2152 connect the tubes 2140, and hence the passageways 2132, to seven other passageways 2154, formed in the lower part of the block 2144 and in communication with the seven flexible tack tubes 2078. It will be appreciated, from an examination of Figs. 67 and 70 that the flexible tubes 2078 extend downwardly from the block 2144 while the rigid tack tubes 2064 curve upwardly to the driver passages 2060. It is, therefore, necessary to provide some force, in addition to gravity, for causing the tacks to travel through the tubes 2078, 2064 and into the driver passages 2060. This additional force is provided as a blast of air which is admitted to the passageways 2154, when the gate member 2150 is in the position shown in Fig. 76, in the following manner. The gate member has in its lower face an elongated groove 2156 that overlies the upper ends of the passageways 2154 and a plurality of notches 2158 formed in the block 2144, Fig. 76. These notches, in turn, are in communication with a manifold 2160, formed in a cylinder member 2162 that is mounted on the housing assembly 2100, through suitable passageways 2164 in the block 2144 and cylinder member. This manifold is connected to a cylinder bore 2166 in which there is fitted a piston 2168. At an appropriate time, and when the gate member 2150 has been returned to the position shown in Fig. 76, after the delivery of a tack into each of the tubes 2078, this piston is operated to force a blast of air down through these tubes so as to elevate the previously delivered tacks up through the rigid tubes 2064 and into the driver passages 2060.

The several operating elements of the tack supply mechanism are driven from the main drive shaft 666 of the machine by means of a vertically extending shaft 2170, Figs. 3 and 75. At its lower end, this shaft is connected, by means of a universal joint 2171, Fig. 3, to a bevel gear 2172 which meshes with a bevel gear 2174, keyed to the main drive shaft, Figs. 41 and 45, while, at its upper end, the shaft 2170 is connected by means of a universal joint 2173, to a bevel gear 2176 which meshes with another bevel gear 2178, Fig. 75. The gear 2178 is secured to a countershaft 2180 which, in turn, is connected to a second countershaft 2182 by means of an angularly adjustable coupling 2184. The shaft 2182 drives a third countershaft 2186, Fig. 77, through bevel gears 2188, 2190, 2192, 2194, and shaft 2195, Figs. 75 and 77. The lever 2130, which operates the tack separator plate 2122, carries a roll 2131 and is actuated by means of a barrel cam 2196, splined on the shaft 2186. This cam is adjustable axially along the shaft 2186 by means of a roller 2198 which engages an annular groove 2200 thereon, Fig. 77. The gate member 2150 is reciprocated in time relation to the action of the tack separator plate 2122 by means of a face cam 2202, secured to the shaft 2186 and having a cam track 2204, Fig. 76. Fitted in this cam groove is a roll 2206, carried by an arm 2208 that is secured to a cross shaft 2210, journaled in the housing 2100. Loosely mounted on this shaft is a second arm 2212, Fig. 77, which is connected to the gate member 2150 and these two arms have interfitted portions that are separated by a spring 2214, the arrangement being such that movement of the gate member to the right, Fig. 76, is effected positively while the gate member is returned through the action of the spring 2214. Thus, if a tack or tacks should become lodged between the passageways 2152 in the gate member and passageways 2154, or tubes 2140, this spring will yield to prevent damage to the parts.

The piston 2168 is operated in the following manner to introduce a blast of compressed air into the passageways 2154 and tack tubes 2078 as a result of the first depression of the treadle 1126. Mounted in the head of this piston is a latch plug 2220 which, at times, is engaged by a latch member 2222, pivotally mounted on a slide 2224, Fig. 74. This slide is supported in a guideway 2226, formed in a portion of the housing 2100, Figs. 74 and 76, and is connected to a crank 2228, secured to the shaft 2182, by means of a connecting rod 2230, Fig. 74. The latch member 2222 is held in engagement with the plug 2220 by means of a spring-pressed plunger 2232 and bearing against another part of the latch member is a piston rod 2234, carried by a piston 2236. This piston is fitted into a cylinder bore 2238, formed in a portion of the housing, and branch of the duct *m* is connected to this cylinder bore, Figs. 48, 49 and 50. At the conclusion of an operating cycle of the machine, the parts assume the positions shown in Fig. 74 with the duct *m* connected to exhaust, Fig. 50, and with the piston 2168 retracted, against the resistance of a compression spring 2240, by the crank 2228, connecting rod 2230, slide 2224 and latch member 2222. The piston 2236 is also retracted, to permit the latch member to engage the plug 2220 by means of a spring 2242. Now, when the treadle 1126 is again depressed for the first time, at the beginning of the next operation of the machine, fluid under pressure will be supplied to the duct *m* and its various branches, including the branch that is connected to the cylinder bore 2238. Thus, the piston 2236 will be moved to the left, Fig. 74, to trip the latch member 2222 and release the piston 2168 which will be quickly urged to the left by the spring 2240 to force a blast of compressed air into the tack tubes 2078. The tacks, which were fed into these tubes during the previous operation of the machine, will now be blown up through the upwardly curving tubes 2064 and into driver passages 2060, Fig. 70, by this blast of air and, after it ceases, will be dropped head down upon the drivers in position to be driven during the mechanical cycle of the machine which follows. During this mechanical cycle, the shaft 2182 is rotated one complete turn thus causing the slide 2224 and the latch member 2222, carried thereby, to move first to the left, far enough for the latch member to engage the plug 2220, and then return to the position shown in Fig. 74. It will be recalled that at an intermediate point in the mechanical cycle, the valve plungers 1122 and 1124, Figs. 48, 49 and 50, are released, or knocked off, so that the duct *m* is connected to exhaust. This occurs before the slide 2224 starts to return to the position shown in Fig. 74 and therefore the piston rod 2234 is retracted from the latch member 2222 to permit the latch 2222 to catch on the plug 2220. As the piston 2168 is moved to the right, by the returning slide 2224, Fig. 74, a new charge of air is drawn into the cylinder 2166 through the tack tubes 2078 and driver passages 2060. As has already been explained, the cam track 1958, Fig. 69, is so shaped that, during the mechanical cycle of the machine, the tack driver-operating lever is rocked, in a clockwise direction, Fig. 66, first quickly and then gradually. During the first quick movement of this lever the tack drivers 1812 are moved upwardly to cover the tack-feeding passageways 2062, Fig. 70 and thereby prevent accidental displacement of the tacks back into the passageways 2062. Thereafter the tack drivers move slowly until latch 1970 is tripped, whereupon they are quickly projected upwardly to drive the tacks.

Tacks from the lower part of the tack pot 2112 are elevated by the elevator 2114 into a position to be delivered onto the tack distributing plate 2118 by the sweep arm 2116, during each mechanical cycle of the machine. Secured to the shaft 2180, Figs. 75 and 78, is an eccentric 2250 on which is mounted a strap 2252. Formed integrally with this trap is a triangularly shaped arm 2254 that is connected to one arm of a bell-crank lever 2256, journaled on a stud 2258, Fig. 78. Also journaled on this stud, which is mounted on a part of the housing assembly 2100, is an arm 2260 that is provided with a quadrant portion 2262 and a stop abutment 2264 adapted to cooperate with an adjustable stop screw 2265. The other arm of the bellcrank lever 2256 carries a spring-pressed plunger 2266 having a wedge-shaped end 2268 that is adapted to enter a correspondingly shaped recess 2270, formed in the quadrant portion 2262, Fig. 79. The arm 2260 is connected to a link 2272 associated with the elevator 2114, Figs. 76 and 78. As will be apparent, with the mechanism so far described, the elevator will be moved up to the position shown by a broken line, Fig. 76, and then returned to the position shown in solid lines, by the action of the eccentric 2250 as shaft 2180 is rotated a single turn during each mechanical cycle of the machine.

The sweep arm 2116 is secured to a shaft 2274, Fig. 76, which is journaled in a portion of the housing assembly 2100 and carries a gear quadrant 2276, located within the housing, Fig. 75. This gear quadrant is in mesh with gear teeth 2280, cut on an arm 2282. This arm is rotatable on a stud 2284 mounted on a side plate 2286, Fig. 75, that is associated with the housing assembly, Fig. 74. The arm 2282 and sweep arm 2116 are held in the positions shown in Fig. 75, and against the resistance of a coil spring 2288, which tends to rotate the arm 2282 in a counterclockwise direction and the sweep arm 2116 in a clockwise direction, by means of a latch member 2290. This latch member has a hooked end 2292 which is adapted to engage a projection 2294, formed on the arm 2282, and is pivoted on a portion of the housing assembly. A spring-pressed plunger 2296 engages the lower portion of the latch member and tends to hold the latch member in the position shown in Fig. 75. Just as the elevator 2114 reaches its upper position, see broken line in Fig. 76, the latch member 2290 is tripped and the sweep arm is rotated quickly in a clockwise direction, by the action of spring 2288, so as to sweep the load of tacks, carried up by the elevator, onto the distributing plate 2118. For thus tripping the latch member, the following arrangement is provided.

Rotatable freely on the shaft 2180 is a bell-crank lever 2298, one arm of which is connected to the bell-crank lever 2256, by means of a link 2300, Fig. 78. The other arm of the bell-crank lever 2298 carries a roll 2302 which is received between a pair of ears 2304, Fig. 78, formed on a block 2306, Fig. 75. This block is secured to a slide 2308 which is mounted for vertical movement in the housing assembly 2100. The slide 2308, in turn, is connected to a second slide 2310 which is also mounted for vertical movement in the housing assembly. Carried by the slide 2310 is a roll 2312 that is adapted to engage an inclined surface 2314, formed on the latch member 2290. With this arrangement, when the slides 2308, 2310 are elevated, by the action of the eccentric 2250, the latch member will be tripped to release the arm 2282. This arm will now be rotated to operate the sweep arm 2116, as already explained, upwardly movement of the arm 2282 being limited by the engagement of the projection 2294 thereon with an offset portion 2316 on the upper end of the slide 2310. When the slides 2308, 2310 are moved downwardly, during the last 180° rotation of the shaft 2180 and eccentric 2250, the arm 2282, sweep arm 2116 and latch member 2290 will be returned to the positions shown in Fig. 75.

The shaft 2136 on which the tack clearer 2134 is mounted, Fig. 76, is driven from the shaft 2186, Fig. 77, in the following manner. Secured to the left-hand end of the shaft 2186 is a spur gear 2320 which meshes with a gear 2322 and secured to the shaft 2136 is a spur gear 2324 which meshes with a gear 2326. Adjacent to the gear 2326 is a disk member 2328 which has a thickened zone 2330 that is cut away at 2332 to receive the hub 2334 of the gear 2326, Fig. 80. This hub and the gears 2322 and 2326 are rotatable freely on a stud 2336, associated with the housing assembly, and secured to the gear 2322, by means of pins 2338, are a pair of diametrically disposed abutment members 2340. Interposed between these abutment members and the edges of recesses 2342, cut in the periphery of the disk member 2328, are compression springs 2343. The hub 2334 is provided with three recesses 2344, having inclined ends 2346, and pivotally mounted on the thickened zone 2330 of the disk member 2328 are a pair of spring-pressed detents 2348 having inclined ends 2350 which are complemental to the ends 2346 of the recesses 2344. With this arrangement, the gear 2324, and hence the tack clearer 2134, are yieldingly driven from the gear 2320 through the action of the gears 2322 and 2326, and springs 2343. Thus, if the tack clearer 2134 meets with an obstruction such, for example, as a tack lodged in one of the raceways 2112, the springs 2343 will yield, see Fig. 80, to permit the gear 2322 to rotate relatively to the gear 2326. As these springs yield, the force exerted by the clearer on the lodged tack gradually increases, usually to a point sufficient to free the tack. However, when the available amount of lost motion between the gears 2322 and 2326, determined by the engagement of the abutment members 2340 with the ends of the recesses 2342, is taken up, the pawl 2348 which happens to be in engagement with the ends of one of the notches 2344, will be cammed out of this notch thus allowing further relative rotation of the gear 2322 until the other pawl comes into engagement with another of these three notches. As a result of the successive engagements of these pawls with the recesses on the hub 2334, a jarring action will be imparted to the tack clearer which eventually will clear the tack or at least allow the gear 2322 to continue to rotate relatively to the gear 2326 without damage to the parts. The clearer 2134 may also be rotated, in the direction of the arrow, Fig. 76, to clear the tacks by means of the hand wheel 2138, Figs. 74 and 77, since the pawl 2348 will be easily lifted out of the recesses 2344 when the hub 2334 is driven in a clockwise direction by the gear 2324.

*Outline of operation of machine*

The manners in which the several operating elements of the machine function have been pointed out, more or less completely, in the above detailed description. However, to facilitate a clearer understanding of their cooperative actions, the operation of the machine as a whole will now be briefly outlined. Referring particularly to Fig. 1 of the drawings, before starting to pull over a run of shoes, the operator will adjust the heightwise and widthwise locations of the toe and side grippers 2, 4, 4 and vary the angular positions of the side grippers, by suitable manipulation of the hand wheels 412, 470 and 492. Also, he will, if necessary, by manipulation of hand wheels 1920, make suitable adjustments of the heightwise positions of the toe and side-tacking devices 6, 8, 8 relatively to the shoe support 10 and, if desired, vary the tensions of the springs 1918 (Fig. 67) which control the wiping pressure, to accommodate the particular last bottom curvature and upper material thickness of the work to be handled. Finally, he will set the relief valves 1194, 1216, associated with the gripper pressure control valve I (Fig. 55) and the relief valve 1446, associated with the side clamp pressure control valve V (Fig. 54) to provide what he considers to be the safe minimum intensity of toe and side gripper pull and the desired force of action of the side clamps 14, 14, and he will adjust the tension of the spring 1238 of the forward drag control valve T (Fig. 53), by means of the hand knob 1240 (Fig. 1), to provide the desired intensity of the forward drag pull to be applied by the side grippers. Also, the hand lever 1180, associated with the pull sequence valve J (Fig. 56), will be set in position to give the desired sequence of operation of the toe and side grippers and, if thought necessary, suitable adjustments of the several following needle valves will be made: heel rest throttle valve H (Fig. 53); forward drag throttle valve U (Fig. 53); clutch trip speed control valve Y (Fig. 54); toe gripper speed throttle valve O (Fig. 56); side gripper speed throttle valve P (Fig. 56); toe gripper and side gripper control throttle valves M and N (Fig. 56); and side clamp speed control valve W (Fig. 54). However, once these several needle valves have been suitably adjusted it will usually not be necessary to change their respective settings except to accommodate unusual conditions. Hence, if desired, these needle valves which are shown as installed on the front portion of the machine, may be located within the frame construction 18 and made accessible by means of a removable cover plate or door.

After closing the main switch 1118, the operator will place a shoe on the shoe support 10 with the bottom face of its insole pressed against the fingers 34, 34, 36 (Figs. 2, 4 and 5), and will insert the marginal portions of the upper materials between the opened jaws of the toe and side grippers. Next, the operator will locate the last in a lengthwise direction by bringing the toe end of the last into engagement with the inner jaw of the toe gripper (Fig. 4) and will aline the center line of the forepart of the last with the longitudinal center line of the shoe rest. Now, while holding the last in this position with his hand, the operator will depress the starting treadle 1126 to initiate the first stage of the operating cycle. Immediately upon the depression of this treadle, the valve member 1122 of the treadle operated control valve A (Figs. 48, 49, 50, 58 and 59) will be moved to and latched in the open position in which it is shown in Fig. 48 and the following actions will occur without delay; the jaws of the grippers will close on the upper materials previously inserted between them; the fingers 34, 34 of the shoe rest will expand to positions closely adjacent to the marginal edges of the insole on the opposite sides of the toe end of the last; the valve plunger 1381 of the tip lock control valve D (Fig. 52) will be returned to a release position, if it had been inadvertently shifted to locking position after the conclusion of the preceding cycle of operation of the machine; the piston 2236 will be operated to trip the latch 2222 thus causing the air-blast piston 2168, Fig. 74, to blow a set of tacks, previously separated and delivered into the tack tubes 2078, up into the driver passages 2060, Fig. 70, of the overlaying and tacking devices 6, 8, 8 and fluid under pump pressure, controlled by the relief valve 1120, Figs. 48, 49 and 50, will be admitted behind the throat-straightening lock pistons 906, 906 and behind the tip-straightening lock piston 1006. Also, the heel rest 12 will commence to move upwardly toward the heel end of the shoe at a relatively slow speed as determined by the setting of the heel rest throttle valve H. Fig. 48 illustrates the various ducts, or conduits, to which operating fluid under pump pressure is admitted at once upon the initial depression of the starting treadle.

Almost immediately thereafter, the toe gripper control valve K and the side gripper control valve L (Fig. 56) are operated, in the sequence determined by the previous setting of the pull sequence valve J and at speeds governed, respectively, by the toe gripper control throttle valve M and side gripper control throttle valve N. Thus, the toe and side grippers are moved downwardly, at speeds determined, respectively, by the toe gripper and side gripper speed throttle valves O and P, to apply their pull on the upper materials seized by their respective jaws. Before this happens, the gripper-supporting plungers 350 are depressed in response to the admittance through duct *g* to the cylinder 356 (Figs. 31 and 56) of operating fluid under reduced pressure as controlled by one or the other of the valve plungers 1138 or 1140 of the pressure control valve I. The operator continues to hold the shoe with its insole pressed against the fingers 34, 34, 36 of the shoe rest 10 so that it may not be displaced by the heel rest 12 as it is brought into engagement with the heel end of the last. As will be apparent from Fig. 4, the piston 112, which operates the heel rest, is of small diameter and, inasmuch as the rate of movement of the heel rest is relatively slow, the operator has no difficulty in thus holding the shoe in place until the full force of the pull of the grippers has been applied to the upper materials. As soon as the full force of the pull of the side grippers has been applied, the valve plunger 1242 of the flow control and timing valve E (Fig. 53) is elevated so that operating fluid under pump pressure is admitted to the conduit *e'*. Also, operating fluid under reduced pressure is admitted, through the conduit *f'* to the righthand end of the valve plunger 1232 of the forward drag control valve T (Fig. 53) and moves this valve plunger to the left. Now, fluid under a pressure which is governed by the valve plunger 1236 and the setting of the spring 1238 is admitted behind the pistons 838 (Figs. 5 and 8) so that the side grippers are operated to apply their lengthwise, or forward drag, pull on the upper materials. The rate of movement of the side grippers in thus applying their lengthwise pull on the upper materials is governed by the setting of the forward drag throttle valve U (Fig. 53). Such movement of the valve plunger 1232 to the left also admit fluid under pump pressure behind the treadle interlock piston 1250 (Fig. 58), thus putting the treadle operated control valve A (Figs. 48, 49, 50, 58 and 59) in condition for operation by a second depression of the starting treadle 1126. Fig. 49 illustrates the fluid-pressure system after the toe and side grippers have been operated to exert their heightwise pulls and after the grippers have been operated to apply their lengthwise pulls on the upper materials. This completes the first stage of the cycle of operation of the machine.

Figure 57:
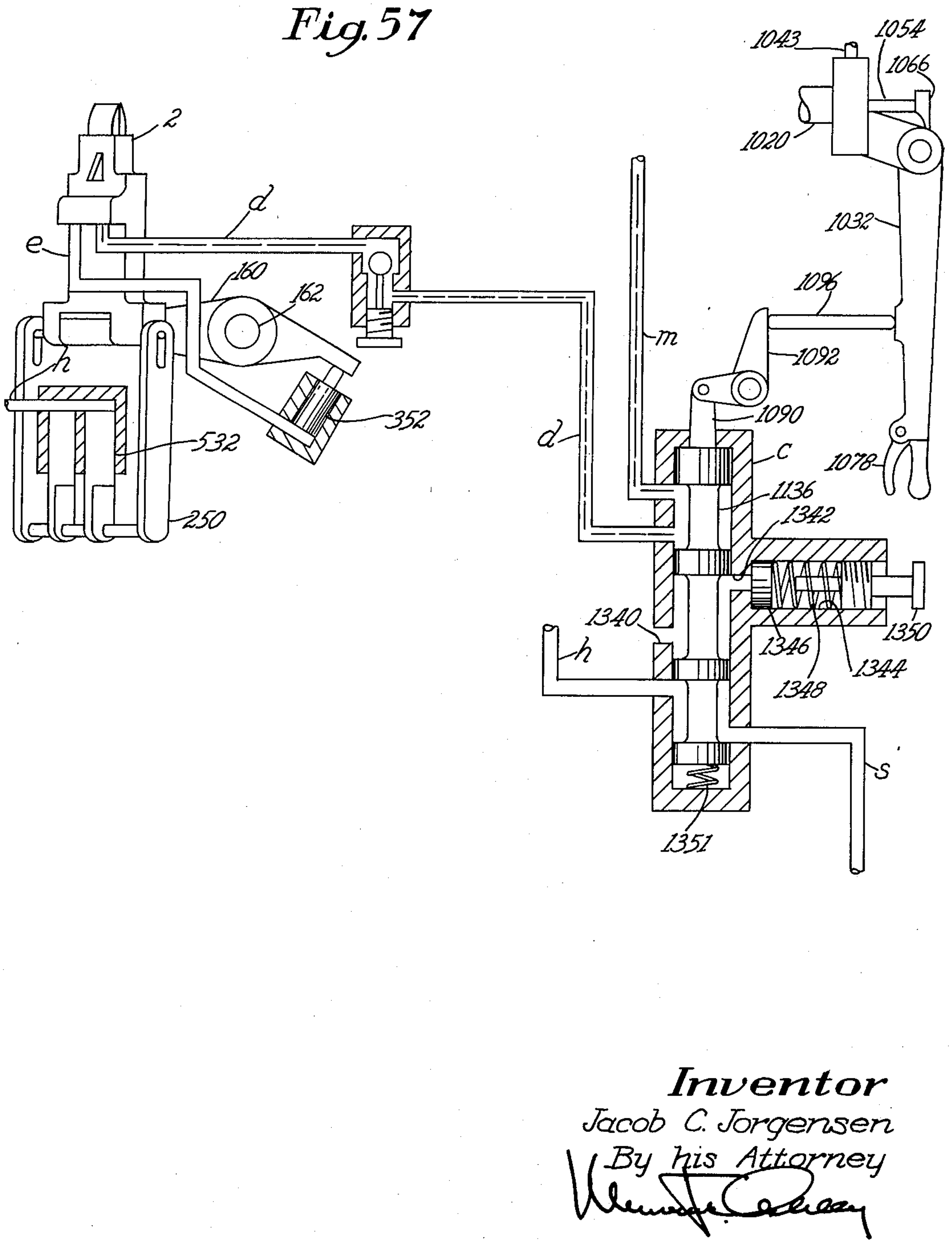

The operator now inspects the upper materials, which are held under tension by the several grippers, and makes whatever adjustment of the position of the upper materials, relatively to the last, he may desire by manipulating the hand levers 890, 980, 996 and 1032. Also, he inspects the upper materials to see if they are properly pulled "down to the wood" and, if necessary, increases the force of the pull of the toe and/or side grippers by depressing one or both of the hand levers 1284, 1286, Figs. 1 and 55, or, by operating the knob 1326, he may double the force of the side gripper pull. Thus, by means of the hand lever 890, the operator may slide the upper materials laterally over the last to center the throat opening and, to facilitate such movement of the upper materials, the operator may temporarily decrease the force of the side gripper pull and entirely eliminate the forward drag pull of these grippers by elevating the hand lever 1286 which is associated with the side gripper manual control valve R (Figs. 34 and 55) and, if the latch member 1378, Fig. 34, has previously been moved to its operative position, such elevation of this hand lever will also eliminate the pull of the toe gripper through the action of the toe gripper pull stop valve Q (Figs. 34 and 55). The jaws of the toe gripper 2 may be opened and the toe gripper bodily shifted to obtain a new grip on the upper materials by suitable manipulation of the hand lever 1032 and operation of the toe gripper manual control valve C (Fig. 57). If it is necessary to change the lengthwise or angular position of the tip line of the upper, relatively to the last, the operator may relieve the force of the side gripper pull, by elevating the hand lever 1286, and then shift the upper materials lengthwise and angularly on the last by suitable manipulation of the hand levers 980, 996 (Figs. 1, 2 and 10). It may be that the throat opening has to be centered without at the same time disturbing the position of the upper materials adjacent to the tip line. In such case, the operator may cause the tip lock control valve D (Fig. 52) to function by means of the hand lever 1406 (Fig. 1) and, with the tip line jaws of the two side grippers locked against movement, he may manipulate the hand lever 890 to center the throat opening. After these various manipulative movements of the upper materials have been completed, the hand levers 1284, 1286 are returned to positions for restoring the desired force of pull of the toe and side grippers and the upper materials will then be in proper condition for the overlaying and fastener-inserting operation which is effected during the second stage of the operating cycle and in response to a second depression of the starting treadle.

When the starting treadle is depressed a second time, the valve plunger 1124 of the treadle operated control valve A is shifted upwardly, Fig. 49, and latched in a position in which fluid under pump pressure is admitted to the conduit $m^2$ and operating fluid under a reduced pressure, controlled by the side clamp pressure control valve V is now admitted behind the side clamp operating piston 130, Fig. 12, causing the side clamps 14, 14 to be moved inwardly into pressing engagement with the upper materials on the opposite sides of the forepart of the last. As the pressure of the operating fluid builds up in the conduit *c*, in response to this action of the side clamp members, the valve plunger 1426 of the shoe rest expander valve F (Fig. 53) is elevated to exhaust position thus releasing the expansible fingers 34, 34 which, however, are held in their expanded positions by the force of the pull now being applied to the upper materials. Also, the valve plunger 1424 of the clutch control valve X (Fig. 54) is moved upwardly to admit operating fluid from the conduit *c* to a conduit $d^2$ thus causing the tripping of the clutch 1616 by the clutch piston 1430 (Fig. 64) and commencing the second and mechanical stage of the cycle of the machine.

As a result of the tripping of the clutch, the main drive shaft 666 (Figs. 45 and 46) is caused to rotate through a complete turn and then is brought to a stop and, during such rotation of this shaft, the following mechanical actions take place in the order mentioned. First, the toe tacking unit 6 and the two side tacking units 8, 8 commence to move inwardly under the action of the cam track 2098, formed on cam 1519 (Fig. 45) and the two oil trapping valves 1476, 1480 (Figs. 47 and 54) are closed through the actions of cam tracks 1508, 1510, thus trapping operating fluid behind the heel-rest piston 112 and behind the side clamp operating piston 130 and also above the gripper-supporting pistons 354. Next, and before the main shaft 666 has rotated a half turn, the toe and side grippers will have been released, retracted, and collapsed, the toe gripper being released in response to the tripping of the latch 252 (Figs. 15 and 16) by the incoming toe-tacking device, and the side grippers being released through the action of the cam 676 (Fig. 46) and the side gripper release valve B (Figs. 13 and 54), and retracted through the action of the side gripper retracting valve S (Fig. 51). The release of the toe gripper automatically admits operating fluid to the toe gripper retracting piston 352, while the side gripper retracting valve S admits operating fluid to the two side gripper retracting pistons 352, 352. The exact time at which the side grippers are released is, of course, determined by the amount of inward movement of the side clamps 14, 14 which position the roll 656 relatively to the cam 650 and the latch 642 (Figs. 12 and 54). As the several grippers are thus retracted their movements are checked by the dashpot pistons 540, 740, 740 (Figs. 25, 26 and 30) and the conical valves 562 and 762 are opened to admit operating fluid to the hydraulic knock-off piston 1521 (Fig. 58) which is operated to release the two valve members 1122, 1124 for return to their initial positions. The several ducts, or conduits, are now connected to exhaust except those in which fluid is trapped by the two oil trapping valves 1476, 1480. Fig. 50 illustrates the condition of the fluid-pressure system after these two valves have been thus returned to their initial positions. In the event that any one of the several grippers is not fully retracted and the hydraulic knock-off piston thus not operated in the manner just described, by the time the main drive shaft 666 has rotated approximately 150°, the cam rise 1523 on the cam 1519 will operate the valve 1513 (Fig. 45) thereby admitting operating fluid to the knock-off piston 1521 and accomplishing this same result.

As the main shaft continues to rotate, the inward movements of the overlaying and tacking devices 6, 8, 8 are eventually terminated, the side devices 8, 8 by engagement with stops on the clamp arms 14, 14 and the toe device 6 by engagement of the stop 1815 with the toe end of the shoe. Thereafter, the continued downward movement of the three operating links 1874 (Figs. 23 and 68) trips the latch plungers 1970 and causes operation of the tack drivers 1812. During the overlaying actions of the several wipers 1806 (Fig. 70), the overlaying and tacking devices were free to yield, in a direction extending heightwise of the shoe support 10, under the action of the springs 1918 (Fig. 67), and thus were caused to press the lasting margin of the stock yieldingly against the insole with a predetermined force. However, when the latch plungers 1970 are tripped, the valve members 2012 (Fig. 72) are released and closed by their springs 2020, thereby locking the several overlaying devices unyieldingly against movement heightwise of the shoe during the subsequent operation of the tack drivers. Immediately after the tacks have been driven and just before the main shaft has rotated 180°, the overlaying devices commence to move outwardly and, shortly thereafter, the gate member 2150 of the tack distributing mechanism (Fig. 76) is operated to drop a set of tacks separated during the previous cycle of operations of the machine, into the tack tubes 2078.

Now, as the main shaft 666 continues its rotation, the oil trapping valve 1480 is first opened to release the heel rest 12 and the side clamps 14, 14, the side clamps being opened by means of the spring 136 (Fig. 12) and the heel rest returned to its idle position under the action of gravity (Fig. 2). Next, the oil trapping valve 1476 is opened, thus releasing the gripper-supporting pistons 354 for elevation by their springs 362 (Fig. 31) to return the several grippers to their initial heightwise positions. Just before the oil-trapping valve 1476 is opened, the tack-distributing mechanism (Figs. 71 to 79) is operated to separate another set of tacks and to drop them down onto the gate member 2150 where they are retained within the transparent tubes 2140 in direct view of the operator (Fig. 74) until the next cycle of operation of the machine. Eventually, when the main shaft has rotated through a complete turn, the clutch 1616 is released and the brake 1672 is set (Fig. 64), thus completing the mechanical portion of the operating cycle with all of the various pressure lines connected to exhaust and all of the various operating elements returned to their initial positions.

Having thus described my invention, what I claim as new and desire to secure by Letters Patent of the United States is:

1. In a machine for shaping uppers over lasts, gripping means for seizing the upper materials of a shoe, in different locations adjacent to the toe end and opposite sides of the forepart of a last, and for exerting a pull to shape the upper materials over the last, power-operated means for actuating said gripping means, a support for the last comprising a relatively fixed abutment for engaging an insole assembled on the last in a location adjacent to the toe end of the insole, and a pair of abutments mounted for movements in opposite directions widthwise of the last, from retracted positions located inwardly from the marginal edges of the insole to extended positions located adjacent to said marginal edges at the opposite sides of the forepart of the last, spring means for holding said last-named abutments yieldingly in said retracted positions, and power-operated means for effecting movement of said abutments to said extended positions during the operation of the machine.

2. In a machine for shaping uppers over lasts, gripping means for seizing the upper materials of a shoe, in different locations adjacent to the toe end and opposite sides of the forepart of a last, and for exerting a pull to shape the upper materials over the last, power-operated means for actuating said gripping means, a support for the last comprising a relatively fixed abutment for engaging an insole assembled on the last in a location adjacent to the toe end of the insole, and a pair of abutments, mounted for movements in opposite directions widthwise of the last from retracted positions located inwardly from the marginal edges of the insole to extended positions located adjacent to said marginal edges at the opposite sides of the forepart of the last, spring means for holding said last-named abutments yieldingly in said retracted positions, and fluid-pressure-operated means for effecting movement of said abutments to said extended positions during the operation of the machine.

3. In a machine for shaping uppers over lasts, gripping means for seizing the upper materials of a shoe, in different locations adjacent to the toe end and opposite sides of the forepart of a last, and for exerting a pull to shape the upper materials over the last, power-operated means for actuating said gripping means, a support for the last comprising a relatively fixed abutment for engaging an insole assembled on the last in a location adjacent to the toe end of the insole, and a pair of abutments, mounted for movements in opposite directions widthwise of the last from retracted positions located inwardly from the marginal edges of the insole to extended positions located adjacent to said marginal edges at the opposite sides of the forepart of the last, spring means for holding said last-named abutments yieldingly in said retracted positions, and power-operated means for effecting movement of said abutments to said extended positions during the operation of the machine and prior to the actuation of the gripping means to exert their pull on the upper materials.

4. In a machine for shaping uppers over lasts, gripping means for seizing the upper materials of a shoe, in different locations adjacent to the toe end and opposite sides of the forepart of a last, and for exerting a pull to shape the upper materials over the last, power-operated means for actuating said gripping means, a support for the last comprising a relatively fixed abutment for engaging an insole assembled on the last in a location adjacent to the toe end of the insole, and a pair of abutments, mounted for movements in opposite directions widthwise of the last from retracted positions located inwardly from the marginal edges of the insole to extended positions located adjacent to said marginal edges at the opposite sides of the forepart of the last, spring means for holding said last-named abutments yieldingly in said retracted positions, and fluid-pressure-operated means for effecting movement of said abutments to said extended positions during the operation of the machine and prior to the actuation of the gripping means to exert their pull on the upper materials.

5. In a machine for shaping uppers over lasts, gripping means for seizing the upper materials of a shoe, in different locations adjacent to the toe end and opposite sides of the forepart of a last, and for exerting a pull to shape the upper materials over the last, fluid-pressure-operated means for actuating said gripping means, a support for the last comprising a relatively fixed abutment for engaging an insole assembled on the last in a location adjacent to the toe end of the insole, and a pair of abutments mounted for movements in opposite directions widthwise of the last from retracted positions located inwardly from the marginal edges of the insole to extended positions located adjacent to said marginal edges at the opposite sides of the forepart of the last, spring means for holding said last-named abutments yieldingly in said retracted positions, and power-operated means for effecting movement of said abutments to said extended positions during the operation of the machine.

6. In a machine for shaping uppers over lasts, gripping means for seizing the upper materials of a shoe, in different locations adjacent to the toe end and opposite sides of the forepart of a last, and for exerting a pull to shape the upper materials over the last, fluid-pressure-operated means for actuating said gripping means, a support for the last comprising a relatively fixed abutment for engaging an insole assembled on the last in a location adjacent to the toe end of the insole, and a pair of abutments mounted for movements in opposite directions widthwise of the last from retracted positions located inwardly from the marginal edges of the insole to extended positions located adjacent to said marginal edges at the opposite sides of the forepart of the last, spring means for holding said last-named abutments yieldingly in said retracted positions, and power-operated means for effecting movement of said abutments to said extended positions during the operation of the machine and prior to the actuation of the gripping means to exert their pull on the upper materials.

7. In a machine for shaping uppers over lasts, gripping means for seizing the upper materials of a shoe, in different locations adjacent to the toe end and the opposite sides of the forepart of a last, and for exerting a pull thereon to shape the upper materials over the last, power-operated means for actuating said gripping means, a support for the last comprising an abutment for engaging an insole assembled on the last in a location adjacent to the toe end of the insole, and a pair of abutments mounted for movement in opposite directions widthwise of the last from retracted positions located inwardly from the marginal edges of the insole to extended positions located adjacent to said marginal edges at the opposite sides of the forepart of the last, said gripping means including two grippers arranged, respectively, at the opposite sides of the support, means for adjusting said two grippers toward and away from said support to accommodate lasts of different widths, spring means for holding said abutments yieldingly in said retracted positions, power-operated means for effecting movement of said abutments to said extended positions during the operation of the machine, and stop means actuated by said gripper-adjusting means for limiting such movement of said abutments.

8. In a machine for shaping uppers over lasts, gripping means for seizing the upper materials of a shoe, in different locations adjacent to the toe end and the opposite sides of the forepart of a last, and for exerting a pull thereon to shape the upper materials over the last, power-operated means for actuating said gripping means, a support for the last comprising an abutment for engaging an insole assembled on the last in a location adjacent to the toe end of the insole, and a pair of abutments mounted for movements in opposite directions widthwise of the last from retracted positions located inwardly from the marginal edges of the insole to extended positions located adjacent to said marginal edges at the opposite sides of the forepart of the last, said gripping means including two grippers arranged, respectively, at the opposite sides of the support, means for adjusting said two grippers toward and away from said support to accommodate lasts of different widths, spring means for holding said abutments yieldingly in said retracted positions, fluid-pressure means for effecting movement of said abutments to said extended positions during the operation of the machine, and stop means actuated by said gripper-adjusting means for limiting such movement of said abutments.

9. In a machine for shaping uppers over lasts, gripping means for seizing the upper materials of a shoe, in different locations adjacent to the toe end and the opposite sides of the forepart of a last, and for exerting a pull thereon to shape the upper materials over the last, power-operated means for actuating said gripping means, a support for the last comprising an abutment for engaging an insole assembled on the last in a location adjacent to the toe end of the insole, and a pair of abutments mounted for movements in opposite directions widthwise of the last from retracted positions located inwardly from the marginal edges of the insole to extended positions located adjacent to said marginal edges at the opposite sides of the forepart of the last, said gripping means including two grippers arranged, respectively, at the opposite sides of the support, means for adjusting said two grippers toward and away from said support to accommodate lasts of different widths, spring means for holding said abutments yieldingly in said retracted positions, power-operated means for effecting movement of said abutments to said extended positions during the operation of the machine and prior to the actuation of the gripping means to exert their pull on the upper materials, and stop means actuated by said gripper-adjusting means for limiting such movement of said abutments.

10. In a machine for shaping uppers over lasts, gripping means for seizing the upper materials of a shoe, in different locations adjacent to the toe end and the opposite sides of the forepart of a last, and for exerting a pull thereon to shape the upper materials over the last, power-operated means for actuating said gripping means, a support for the last comprising an abutment for engaging an insole assembled on the last in a location adjacent to the toe end of the insole, and a pair of abutments mounted for movements in opposite directions widthwise of the last from retracted positions located inwardly from the marginal edges of the insole to extended positions located adjacent to said marginal edges at the opposite sides of the forepart of the last, said gripping means including two grippers arranged, respectively, at the opposite sides of the support, means for adjusting said two grippers toward and away from said support to accommodate lasts of different widths, spring means for holding said abutments yieldingly in said retracted positions, fluid-pressure-operated means for effecting movement of said abutments to said extended positions during the operation of the machine and prior to the actuation of the gripping means to exert their pull on the upper materials, and stop means actuated by said gripper-adjusting means for limiting such movement of said abutments.

11. In a machine for shaping uppers over lasts, gripping means for seizing the upper materials of a shoe, in different locations adjacent to the toe end and opposite sides of the forepart of a last, and for exerting a pull thereon to shape the upper materials over the last, fluid-pressure-operated means for actuating said gripping means, a support for the last comprising an abutment for engaging an insole assembled on the last in a location adjacent to the toe end of the insole, and a pair of abutments mounted for movements in opposite directions widthwise of the last from retracted positions located inwardly from the marginal edges of the insole to extended positions located adjacent to said marginal edges at the opposite sides of the forepart of the last, said gripping means including two grippers arranged, respectively at the opposite sides of the support, means for adjusting said two grippers toward and away from said support to accommodate lasts of different widths, spring means for holding said abutments yieldingly in said retracted positions, power-operated means for effecting movement of said abutments to said extended positions during the operation of the machine, and stop means actuated by said gripper-adjusting means for limiting such movement of said abutments.

12. In a machine for shaping uppers over lasts, gripping means for seizing the upper materials of a shoe, in different locations adjacent to the toe end and opposite sides of the forepart of a last, and for exerting a pull thereon to shape the upper materials over the last, fluid-pressure-operated means for actuating said gripping means, a support for the last comprising an abutment for engaging an insole assembled on the last in a location adjacent to the toe end of the insole, and a pair of abutments mounted for movements in opposite directions widthwise of the last from retracted positions located inwardly from the marginal edges of the insole to extended positions located adjacent to said marginal edges at the opposite sides of the forepart of the last, said gripping means including two grippers arranged, respectively, at the opposite sides of the support, means for adjusting said two grippers toward and away from said support to accommodate lasts of different widths, spring means for holding said abutments yieldingly in said retracted positions, power-operated means for effecting movement of said abutments to said extended positions during the operation of the machine and prior to the actuation of the gripping means, to exert their pull on the upper materials, and stop means actuated by said gripper-adiustming means for limiting such movement of said abutments.

13. In a machine for shaping uppers over lasts, gripping means for seizing the upper materials of a shoe, in different locations adjacent to the toe end and opposite sides of the forepart of a last, and for exerting a pull thereon to shape the upper materials over the last, fluid-pressure-operated means for actuating said gripping means, overlaying and fastening-inserting means for laying the lasting margin of the upper materials inwardly over and for securing said lasting margin of the upper materials to an insole assembled on the last, in each of said locations, power-operated means for actuating said overlaying and fastening-inserting means, a support for the shoe and its last, a heel rest for engaging the heel end portion of the shoe, and fluid-pressure operated means for moving the heel rest from a retracted position to an operative position in which it engages the heel end of the shoe on the support during the operation of said gripping means.

14. In a machine for shaping uppers over lasts, gripping means for seizing the upper materials of a shoe, in different locations adjacent to the toe end and opposite sides of the forepart of a last, and for exerting a pull thereon to shape the upper materials over the last, fluid-pressure-operated means for actuating said gripping means, overlaying and fastening-inserting means for laying the lasting margin of the upper materials inwardly over and for securing said lasting margin of the upper materials to an insole assembled on the last, in each of said locations, power-operated means for actuating said overlaying and fastening-inserting means, a support for the shoe and its last, a self-centering heel rest for engaging the heel end portion of the shoe, and fluid-pressure-operated means for moving the heel rest from a retracted position to an operative position in which it engages the heel end of the shoe on the support during the operation of said gripping means.

15. In a machine for shaping uppers over lasts, gripping means for seizing the upper materials of a shoe, in different locations adjacent to the toe end and opposite sides of the forepart of a last, and for exerting a pull thereon to shape the upper materials over the last, fluid-pressure-operated means for actuating said gripping means, overlaying and fastening-inserting means for laying the lasting margin of the upper materials inwardly over and for securing said lasting margin of the upper materials to an insole assembled on the last, in each of said locations, power-operated means for actuating said overlaying and fastening-inserting means, a support for the shoe and its last, a heel rest for engaging the heel end portion of the shoe, fluid-pressure-operated means for moving the heel rest from a retracted position to an operative position in which it engages the heel end of the shoe on the support during the operation of said gripping means, and means for trapping fluid in said last-mentioned fluid-pressure-operated means during the operation of said overlaying and fastening-inserting means.

16. In a machine for shaping uppers over lasts, gripping means for seizing the upper materials of a shoe, in different locations adjacent to the toe end and opposite sides of the forepart of a last, and for exerting a pull thereon to shape the upper materials over the last, fluid-pressure-operated means for actuating said gripping means, overlaying and fastening-inserting means for laying the lasting margin of the upper materials inwardly over and for securing said lasting margin of the upper materials to an insole assembled on the last, in each of said locations, power-operated means for actuating said overlaying and fastening-inserting means, a support for the shoe and its last, a self-centering heel rest for engaging the heel end portion of the shoe, fluid-pressure-operated means for moving the heel rest from a retracted position to an operative position in which it engages the heel end of the shoe on the support during the operation of said gripping means, and means for trapping fluid in said last-mentioned fluid-pressure-operated means during the operation of said overlaying and fastening-inserting means.

17. In a machine for shaping uppers over lasts, gripping means for seizing the upper materials of a shoe, in different locations adjacent to the toe end and opposite sides of the forepart of a last, and for exerting a pull thereon to shape the upper materials over the last, power-operated means for actuating said gripping means, overlaying and fastening-inserting means for laying the lasting margin of the upper materials inwardly over, and for securing said lasting margin of the upper materials to, an insole assembled on the last, in each of said locations, a pair of members mounted for movement into engagement with the upper materials on the opposite sides of the forepart of the shoe for clamping said upper materials against the last and for supporting the shoe and its last during the operation of said overlaying and fastening-inserting means, fluid-pressure-operated means for thus moving said members yieldingly into engagement with the upper materials, and means for trapping operating fluid in said fluid-pressure-operated means to hold said members rigidly in place during the operation of said overlaying and fastening-inserting means.

18. In a machine for shaping uppers over lasts, gripping means for seizing the upper materials of a shoe, in different locations adjacent to the toe end and opposite sides of the forepart of a last, and for exerting a pull thereon to shape the upper materials over the last, power-operated means for actuating said gripping means, overlaying and fastening-inserting means for laying the lasting margin of the upper materials inwardly over, and for securing said lasting margin of the upper materials to, an insole assembled on the last, in each of said locations, a pair of members mounted for movement into engagement with the upper materials on the opposite sides of the forepart of the shoe for clamping said upper materials against the last and for supporting the shoe and its last during the operation of said overlaying and fastening-inserting means, and fluid-pressure-operated means for thus moving said members yieldingly into engagement with the upper materials.

19. In a machine for shaping uppers over lasts, gripping means for seizing the upper materials of a shoe, in different locations adjacent to the toe end and opposite sides of the forepart of a last, and for exerting a pull thereon to shape the upper materials over the last, power-operated means for actuating said gripping means, overlaying and fastening-inserting means for laying the lasting margin of the upper materials inwardly over, and for securing said lasting margin of the upper materials to, an insole assembled on the last, in each of said locations, a pair of members mounted for movement into engagement with the upper materials on the opposite sides of the forepart of the shoe for clamping said upper materials against the last and for supporting the shoe and its last during the operation of said overlaying and fastening-inserting means, and fluid-pressure-operated means for thus moving said members yieldingly, under a variably predetermined pressure, into engagement with the upper materials.

20. In a machine for shaping uppers over lasts, gripping means for seizing the upper materials of a shoe, in different locations adjacent to the toe end and opposite sides of the forepart of a last, and for exerting a pull thereon to shape the upper materials over the last, power-operated means for actuating said gripping means, overlaying and fastening-inserting means for laying the lasting margin of the upper materials inwardly over, and for securing said lasting margin of the upper materials to, an insole assembled on the last in each of said locations, a pair of members mounted for movement into engagement with the upper materials on the opposite sides of the forepart of the shoe for clamping said upper materials against the last and for supporting the shoe and its last during the operation of said overlaying and fastening-inserting means, fluid-pressure-operated means for thus moving said members yieldingly, under a variably predetermined pressure, into engagement with the upper materials, and means for trapping operating fluid in said fluid-pressure-operated means to hold said members rigidly in place during the operation of said overlaying and fastening-inserting means.

21. In a machine for shaping uppers over lasts, gripping means for seizing the upper materials of a shoe, in different locations adjacent to the toe end and opposite sides of the forepart of a last, and for exerting a pull thereon to shape the upper materials over the last, power-operated means for actuating said gripping means, overlaying and fastening-inserting means for laying the lasting margin of the upper materials inwardly over, and for securing said lasting margin of the upper materials to, an insole assembled on the last, in each of said locations, a pair of members mounted for movement into engagement with the upper materials on the opposite sides of the forepart of the shoe for clamping said upper materials against the last and for supporting the shoe and its last during the operation of said overlaying and fastening-inserting means, a fluid-pressure-operated piston for thus moving said members yieldingly into engagement with the upper materials, means for supplying fluid under pressure to said piston, and means for trapping operating fluid behind said piston to hold said members rigidly in place during the operation of said overlaying and fastening-inserting means.

22. In a machine for shaping uppers over lasts, gripping means for seizing the upper materials of a shoe, in different locations adjacent to the toe end and opposite sides of the forepart of a last, and for exerting a pull thereon to shape the upper materials over the last, power-operated means for actuating said gripping means, overlaying and fastening-inserting means for laying the lasting margin of the upper materials inwardly over, and for securing said lasting margin of the upper materials to, an insole assembled on the last, in each of said locations, a pair of members mounted for movement into engagement with the upper materials on the opposite sides of the forepart of the shoe for clamping said upper materials against the last and for supporting the shoe and its last during the operation of said overlaying and fastening-inserting means, a fluid-pressure-operated piston for thus moving said members yieldingly into engagement with the upper materials, means for supplying fluid under a variably predetermined pressure to said piston, and means for trapping operating fluid behind said piston to hold said members rigidly in place during the operation of said overlaying and fastening-inserting means.

23. In a machine for shaping uppers over lasts, a pair of grippers for seizing the upper materials of a shoe, on the opposite sides of the forepart of a last and for exerting a pull thereon to shape the upper materials over the last, power-operated means for actuating said grippers including gripper-closing means, overlaying members movable inwardly over the bottom of the shoe for wiping the lasting margin of the upper materials inwardly over the bottom of an insole on the last, a pair of clamping members mounted for inward movements into engagement with the upper materials on the opposite sides of the forepart of the last, for clamping the upper materials against the last and for supporting the last during the operation of said overlaying members, means for controlling the operation of said gripper-closing means to cause the grippers to open and release the upper materials during the inward movement of said overlaying members, said controlling means including a primary control device, a member movable with the overlaying members, for actuating said device, and means interposed between said device and said actuating member and displaceable in response to the inward movement of said clamping members for varying the action of said controlling means in accordance with the width of the shoe as determined by the extent of inward movement of the clamping members.

24. In a machine for shaping uppers over lasts, a pair of grippers for seizing the upper materials of a shoe, on the opposite sides of the forepart of a last and for exerting a pull thereon to shape the upper materials over the last, power-operated means for actuating said grippers including gripper-closing means, overlaying members movable inwardly over the bottom of the shoe for wiping the lasting margin of the upper materials inwardly over the bottom of an insole on the last, a pair of clamping members mounted for inward movements into engagement with the upper materials on the opposite sides of the forepart of the last, for clamping the upper materials against the last and for supporting the last during the operation of said overlaying members, means for controlling the operation of said gripper-closing means to cause the grippers to open and release the upper materials during the inward movement of said overlaying members, said controlling means including a latch, a cam movable with the overlaying members for actuating said latch, and means interposed between said latch and said cam and displaceable in response to the inward movement of said clamping members for varying the action of said controlling means in accordance with the width of the shoe as determined by the extent of inward movement of the clamping members.

25. In a machine for shaping uppers over lasts, a pair of grippers for seizing the upper materials of a shoe, on the opposite sides of the forepart of a last and for exerting a pull thereon to shape the upper materials over the last, power-operated means for actuating said grippers including fluid-pressure-operated gripper-closing means, overlaying members movable inwardly over the bottom of the shoe for wiping the lasting margin of the upper materials inwardly over the bottom of an insole on the last, a pair of clamping members mounted for inward movements into engagement with the upper materials on the opposite sides of the forepart of the last, for clamping the upper materials against the last and for supporting the last during the operation of said overlaying members, means for controlling the operation of said gripper-closing means to cause the grippers to open and release the upper materials during the inward movement of said overlaying members, said controlling means including a primary control device, a member movable with the overlaying members, for actuating said device, and means interposed between said device and said actuating member and displaceable in response to the inward movement of said clamping members for varying the action of said controlling means in accordance with the width of the shoe as determined by the extent of inward movement of the clamping members.

26. In a machine for shaping uppers over lasts, a pair of grippers for seizing the upper materials of a shoe, on the opposite sides of the forepart of a last and for exerting a pull thereon to shape the upper materials over the last, power-operated means for actuating said grippers including fluid-pressure-operated gripper-closing means, overlaying members movable inwardly over the bottom of the shoe for wiping the lasting margin of the upper materials inwardly over the bottom of an insole on the last, a pair of clamping members mounted for inward movements into engagement with the upper materials on the opposite sides of the forepart of the last, for clamping the upper materials against the last and for supporting the last during the operation of said overlaying members, means for controlling the operation of said gripper-closing means to cause the grippers to open and release the upper materials during the inward movement of said overlaying members, said controlling means including a latch, a cam movable with the overlaying members for actuating said latch, and means interposed between said latch and said cam and displaceable in response to the inward movement of said clamping members for varying the action of said controlling means in accordance with the width of the shoe as determined by the extent of inward movement of the clamping members.

27. In a machine for shaping uppers over lasts, a pair of grippers for seizing the upper materials of a shoe, on the opposite sides of the forepart of a last and for exerting a pull thereon to shape the upper materials over the last, power-operated means for actuating said grippers including fluid-pressure-operated gripper-closing means, overlaying members movable inwardly over the bottom of the shoe for wiping the lasting margin of the upper materials inwardly over the bottom of an insole on the last, a pair of clamping members mounted for inward movements into engagement with the upper materials on the opposite sides of the forepart of the last, for clamping the upper materials against the last and for supporting the last during the operation of said overlaying members, means for controlling the operation of said gripper-closing means to cause the grippers to open and release the upper materials during the inward movement of said overlaying members, said controlling means including a valve, a member movable with the overlaying members for actuating said valve, and means interposed between said valve and said actuating member and displaceable in response to the inward movement of said clamping members, for varying the action of said controlling means in accordance with the width of the shoe as determined by the extent of inward movement of the clamping members.

28. In a machine for shaping uppers over lasts, a pair of grippers for seizing the upper materials of a shoe, on the opposite sides of the forepart of a last and for exerting a pull thereon to shape the upper materials over the last, power-operated means for actuating said grippers including fluid-pressure-operated gripper-closing means, overlaying members movable inwardly over the bottom of the shoe for wiping the lasting margin of the upper materials inwardly over the bottom of an insole on the last, a pair of clamping members mounted for inward movements into engagement with the upper materials on the opposite sides of the forepart of the last, for clamping the upper materials against the last and for supporting the last during the operation of said overlaying members, means for controlling the operation of said gripper-closing means to cause the grippers to open and release the upper materials during the inward movement of said overlaying members, said controlling means including a spring-operated valve, a latch, a cam movable with the overlaying members for actuating said latch, and means interposed between said latch and said cam and displaceable in response to the inward movement of said clamping members, for varying the action of said controlling means in accordance with the width of the shoe as determined by the extent of inward movement of the clamping members.

29. In a machine for shaping uppers over lasts, a plurality of grippers for seizing the upper materials of a shoe in different locations, adjacent to the toe end and opposite sides of the forepart of a last, and for exerting a pull thereon to shape the upper materials over the last, a support for the last, a gripper-operating lever connected to each of said grippers, operating means associated with each of said operating levers and its gripper and adapted to effect heightwise movement of each gripper, relatively to said support, and to rotate each lever in one direction, spring-operated means associated with each of said operating levers and adapted to rotate its associated lever in the opposite direction, and an adjustable stop associated with each of said operating levers adapted to limit movement of its associated lever in said opposite direction, thereby to determine the heightwise position of its associated gripper, relatively to said support.

30. In a machine for shaping uppers over lasts, a plurality of grippers for seizing the upper materials of a shoe in different locations, adjacent to the toe end and opposite sides of the forepart of a last, and for exerting a pull thereon to shape the upper materials over the last, a support for the last, a gripper-operating lever connected to each of said grippers, fluid-pressure operating means associated with each of said operating levers and its gripper and adapted to effect heightwise movement of each gripper, relatively to said support, and to rotate each lever in one direction, spring-operated means associated with each of said operating levers adapted to rotate its associated lever in the opposite direction, and an adjustable stop associated with each of said operating levers adapted to limit movement of its associated lever in said opposite direction, thereby to determine the heightwise position of its associated gripper, relatively to said support.

31. In a machine for shaping uppers over lasts, a plurality of grippers for seizing the upper materials of a shoe, in different locations adjacent to the toe end and opposite sides of the forepart of a last, and for exerting a pull thereon to shape the upper materials over the last, a support for the last, a gripper-operating lever connected to each of said grippers, operating means, associated with each of said operating levers and its gripper and adapted to effect heightwise movement of each gripper, relatively to said support, and to rotate each operating lever in one direction, spring-operated means associated with each of said operating levers adapted to rotate its associated lever in the opposite direction, an adjustable stop associated with each of said operating levers adapted to limit movement of its associated lever in the opposite direction, thereby to determine the heightwise position of its associated gripper, relatively to said support, and mechanism for adjusting said stops to vary the heightwise position of said grippers, relatively to the support.

32. In a machine for shaping uppers over lasts, a plurality of grippers for seizing the upper materials of a shoe, in different locations adjacent to the toe end and opposite sides of the forepart of a last, and for exerting a pull thereon to shape the upper materials over the last, a support for the last, a gripper-operating lever connected to each of said grippers, fluid-pressure operating means, associated with each of said operating levers and its gripper and adapted to effect heightwise movement of each gripper, relatively to said support, and to rotate each operating lever in one direction, spring-operated means associated with each of said operating levers adapted to rotate its associated lever in the opposite direction, an adjustable stop associated with each of said operating levers adapted to limit movement of its associated lever in the opposite direction, thereby to determine the heightwise position of its associated grippers, relatively to said support, and mechanism for adjusting said stops to vary the heightwise positions of said grippers, relatively to the support.

33. In a machine for shaping uppers over lasts, a gripper for seizing the upper materials of a shoe and for exerting a pull thereon to shape the upper materials over a last, a support for the last, a gripper-operating lever connected to said gripper, gripper-operating means associated with said lever and adapted to effect heightwise movement of the gripper, relatively to said support, and to rotate the operating lever in one direction, yieldable means for rotating said lever in the opposite direction to position the gripper, relatively to the support, prior to the operation of the gripper-operating means, and means for displacing said yieldable means to permit rotation of said operating lever and movement of the gripper by said gripper-operating means.

34. In a machine for shaping uppers over lasts, a gripper for seizing the upper materials of a shoe and for exerting a pull thereon to shape the upper materials over a last, a support for the last, a gripper-operating lever connected to said gripper, fluid-pressure-actuated gripper-operating means associated with said lever and adapted to effect heightwise movement of the gripper, relatively to said support, and to rotate the operating lever in one direction, yieldable means for rotating said lever in the opposite direction to position the gripper, relatively to the support, prior to the operation of the gripper-operating means, and means for displacing said yieldable means to permit rotation of said operating lever and movement of the gripper by said gripper-operating means.

35. In a machine for shaping uppers over lasts, a gripper for seizing the upper materials of a shoe and for exerting a pull thereon to shape the upper materials over a last, a support for the last, a gripper-operating lever connected to said gripper, gripper-operating means associated with said lever and adapted to effect heightwise movement of the gripper, relatively to said support, and to rotate the operating lever in one direction, yieldable means for rotating said lever in the opposite direction to position the gripper, relatively to the support, prior to the operation of the gripper-operating means, and fluid-pressure-operated means for displacing said yieldable means to permit rotation of said operating lever and movement of the gripper by said gripper-operating means.

36. In a machine for shaping uppers over lasts, a gripper for seizing the upper materials of a shoe and for exerting a pull thereon to shape the upper materials over a last, a support for the last, a gripper-operating lever connected to said gripper, fluid-pressure-actuated gripper-operating means associated with said lever and adapted to effect heightwise movement of the gripper, relatively to said support, and to rotate the operating lever in one direction, yieldable means for rotating said lever in the opposite direction to position the gripper, relatively to the support, prior to the operation of the gripper-operating means, and fluid-pressure-operated means for displacing said yieldable means to permit rotation of said operating lever and movement of the gripper by said gripper-operating means.

37. In a machine for shaping uppers over lasts, a support for a last, a pair of grippers for seizing the upper materials of a shoe, in different locations on the opposite sides of the forepart of a last mounted on said support, and movable, in directions extending heightwise of the support, to exert a pull on the upper materials for shaping them over the last, means for operating said grippers, each of said grippers including a casing, guide means engaging each of said gripper casings for guiding the grippers as they are operated to exert their pull, said guide means being mounted for arcuate movement about axes contained within and extending lengthwise of said gripper casings, and means for simultaneously effecting arcuate movement of said guide means to vary the angular positions of the grippers relatively to the longitudinal center line of the forepart of the last.

38. In a machine for shaping uppers over lasts, a support for a last, a pair of grippers for seizing the upper materials of a shoe, in different locations on the opposide sides of the forepart of a last mounted on said support, and movable, in directions extending heightwise of the support, to exert a pull on the upper materials for shaping them over the last, means for operating said grippers, each of said grippers including a casing and two sets of gripper jaws, guide means engaging each of said gripper casings for guiding the grippers as they are operated to exert their pull, said guide means being mounted for arcuate movement about axes contained within and extending lengthwise of said gripper casings, and means for simultaneously effecting arcuate movement of said guide means to vary the angular positions of the jaws of the grippers relatively to the longitudinal center line of the forepart of the last.

39. In a machine for shaping uppers over lasts, a support for a last, a pair of grippers for seizing the upper materials of a shoe, in different locations on the opposite sides of the forepart of a last mounted on said support, and movable, in directions extending heightwise of the support, to exert a pull on the upper materials for shaping them over the last, means for operating said grippers, each of said grippers including a casing, means for guiding said grippers as they are operated to exert their pull, said guide means each including an abutment for engaging one side of its associated gripper casing and a spring-pressed plunger, for engaging the opposite side of the gripper casing to hold it yieldingly against said abutment, mounted for arcuate movement about an axis contained within and extending lengthwise of the gripper casing, and means for simultaneously effecting arcuate movement of said spring-pressed plungers to vary the angular positions of the grippers relatively to the longitudinal center line of the forepart of the last.

40. In a machine for shaping uppers over lasts, a support for a last, a pair of grippers for seizing the upper materials of a shoe, in different locations on the opposite sides of the forepart of a last mounted on said support, and movable, in directions extending heightwise of the support, to exert a pull on the upper materials for shaping them over the last, means for operating said grippers, each of said grippers including a casing and two sets of gripper jaws, means for guiding said grippers as they are operated to exert their pull, said guide means each including an abutment for engaging one side of its associated gripper casing and a spring-pressed plunger, for engaging the opposite side of the gripper casing to hold it yieldingly against said abutment, mounted for arcuate movement about an axis contained within and extended lengthwise of the gripper casing, and means for simultaneously effecting arcuate movement of said spring-pressed plungers to vary the angular positions of the jaws of the grippers relatively to the longitudinal center line of the forepart of the last.

41. In a machine for shaping uppers over lasts, a support for a last, a pair of grippers for seizing the upper materials of a shoe, in different locations on the opposite sides of the forepart of a last mounted on said support, and movable, in directions extending heightwise of the support, to exert a pull on the upper materials for shaping them over the last, means for operating said grippers, each of said grippers including a casing, means for guiding said grippers as they are operated to exert their pull, said guide means each including an abutment for engaging one side of its associated gripper casing and a spring-pressed plunger, for engaging the opposite side of the gripper casing to hold it yieldingly against said abutment-mounted for arcuate movement about an axis contained within and extending lengthwise of the gripper casing and means for simultaneously effecting arcuate movement of said spring-pressed plungers in opposite directions to vary the angular positions of the grippers relatively to the longitudinal center line of the forepart of the last.

42. In a machine for shaping uppers over lasts, a support for a last, a pair of grippers for seizing the upper materials of a shoe, in different locations on the opposite sides of the forepart of a last mounted on said support, and movable, in directions extending heightwise of the support, to exert a pull on the upper materials for shaping them over the last, means for operating said grippers, each of said grippers including a casing and two sets of gripper jaws, means for guiding said grippers as they are operated to exert their pull, said guide means each including an abutment for engaging one side of its associated gripper casing, and a spring-pressed plunger, for engaging the opposite side of the gripper casing to hold it yieldingly against said abutment, mounted for arcuate movement about an axis contained within and extending lengthwise of the gripper casing, and means for simultaneously effecting arcuate movement of said spring-pressed plungers in opposite directions to vary the angular positions of the jaws of the grippers relatively to the longitudinal center line of the forepart of the last.

43. In a machine for shaping uppers over lasts, a support for a last, a gripper for seizing the upper materials of a shoe and movable, in a direction extending heightwise of the support, for exerting a pull to shape the upper materials over the lasts, a fluid-pressure-operated piston for imparting such heightwise movement to said gripper, a source of fluid under pressure, a pressure-reducing valve for controlling the flow of fluid under pressure from said source to said piston, said pressure-reducing valve comprising a floating valve member subjected on its opposite sides respectively to a fluid-pressure loading by pressure fluid from said source of fluid under pressure and to the pressure of the fluid acting on said piston, means for variably predetermining the intensity of said fluid-pressure loading, acting on one side of the valve member to determine the minimum force of the pull applied by said gripper, and operator-controlled means for selectively bleeding off pressure fluid acting on the opposite side of the valve member to increase the force of the pull applied by the gripper.

44. In a machine for shaping uppers over lasts, a support for a last, a gripper for seizing the upper materials of a shoe and movable, in a direction extending heightwise of the support, for exerting a pull to shape the upper materials over the last, a fluid-pressure-operated piston for imparting such heightwise movement to said gripper, a source of fluid under pressure, a pressure-reducing valve for controlling the flow of fluid under pressure from said source to said piston, said pressure-reducing valve comprising a floating valve member subjected on its opposite sides respectively to a fluid-pressure loading by pressure fluid from said source of fluid under pressure and to the pressure of the fluid acting on said piston, means for variably predetermining the intensity of said fluid-pressure loading, acting on one side of the valve member to determine the minimum force of the pull applied by said gripper, and a manually operable bleed valve for selectively reducing the pressure of the fluid acting on the opposite side of said valve member to increase the force of the pull applied by the gripper.

45. In a machine for shaping uppers over lasts, a support for a last, a gripper for seizing the upper materials of a shoe and movable, in a direction extending heightwise of the support, for exerting a pull to shape the upper materials over the last, a fluid-pressure-operated piston for imparting such heightwise movement to said gripper, a source of fluid under pressure, a pressure-reducing valve for controlling the flow of fluid under pressure from said source to said piston, said pressure-reducing valve comprising a floating valve member subjected on its opposite sides respectively to a fluid-pressure loading by pressure fluid from said source of fluid under pressure and to the pressure of the fluid acting on said piston, means for variably predetermining the intensity of said fluid-pressure loading, acting on one side of the valve member to determine the minimum force of the pull applied by said gripper, a manually displaceable bleed valve for selectively reducing the pressure of the fluid acting on the opposite side of said valve member to increase the force of the pull applied by the gripper, and means for locking said bleed valve in a selected position during the operation of the machine.

46. In a machine for shaping uppers over lasts, a support for a last, a gripper for seizing the upper materials of a shoe and movable, in a direction extending heightwise of the support, for exerting a pull to shape the upper materials over the last, a fluid-pressure-operated piston for imparting such heightwise movement to said gripper, a source of fluid under pressure, a pressure-reducing valve for controlling the flow of fluid under pressure from said source to said piston, said pressure-reducing valve comprising a floating valve member subjected on its opposite sides respectively to a fluid-pressure loading by pressure fluid from said source of fluid under pressure and to the pressure of the fluid acting on said piston, means for variably predetermining the intensity of said fluid-pressure loading, acting on one side of the valve member to determine the minimum force of the pull applied by said gripper, a manually displaceable bleed valve for selectively reducing the pressure of the fluid acting on the opposite side of said valve member to increase the force of the pull applied by the gripper, and fluid-pressure-operated means for locking said bleed valve in a selected position during the operation of the machine.

47. In a machine for shaping uppers over lasts, a support for a last, a gripper for seizing the upper materials of a shoe and movable, in a direction extending heightwise of the support, for exerting a pull to shape the upper materials over the last, a fluid-pressure-operated piston, loosely fitted in a power cylinder, for imparting such heightwise movement to said gripper, a source of fluid under pressure, a pressure-reducing valve for controlling the flow of fluid under pressure from said source to said cylinder, said pressure-reducing valve comprising a floating valve member subjected on its opposite sides, respectively, to a fluid-pressure loading by pressure fluid from said source of fluid under pressure and to the pressure of the fluid acting on said piston, means for variably predetermining the intensity of said fluid-pressure loading acting on one side of the valve member to determine the minimum force of the pull applied by said gripper, and operator-controlled means for selectively bleeding off pressure fluid acting on the opposite side of the valve member to increase the force of the pull applied by the gripper.

48. In a machine for shaping uppers over lasts, a support for a last, a gripper for seizing the upper materials of a shoe and movable, in a direction extending heightwise of the support, for exerting a pull to shape the upper materials over the last, a fluid-pressure-operated piston, loosely fitted in a power cylinder, for imparting such heightwise movement to said grippers, a source of fluid under pressure, a pressure-reducing valve for controlling the flow of fluid under pressure from said source to said cylinder, said pressure-reducing valve comprising a floating valve member subjected on its opposite sides, respectively, to a fluid-pressure loading by pressure fluid from said source of fluid under pressure and to the pressure of the fluid acting on said piston, means for variably predetermining the intensity of said fluid-pressure loading acting on one side of the valve member to determine the minimum force of the pull applied by said gripper, and a manually operable bleed valve for selectively reducing the pressure of the fluid acting on the opposite side of said valve member to increase the force of the pull applied by the gripper.

49. In a machine for shaping uppers over lasts, a support for a last, a gripper for seizing the upper materials of a shoe and movable, in a direction extending heightwise of the support, for exerting a pull to shape the upper materials over the last, a fluid-pressure-operated piston, loosely fitted in a power cylinder, for imparting such heightwise movement to said gripper, a source of fluid under pressure, a pressure-reducing valve for controlling the flow of fluid under pressure from said source to said cylinder, said pressure-reducing valve comprising a floating valve member subjected on its opposite sides, respectively, to a fluid-pressure loading by pressure fluid from said source of fluid under pressure and to the pressure of the fluid acting on said piston, means for variably predetermining the intensity of said fluid-pressure loading acting on one side of the valve member to determine the minimum force of the pull applied by said gripper, a manually displaceable bleed valve for selectively reducing the pressure of the fluid acting on the opposite side of said valve member to increase the force of the pull applied by the gripper, and means for locking said bleed valve in a selected position during the operation of the machine.

50. In a machine for shaping uppers over lasts, a support for a last, a gripper for seizing the upper materials of a shoe and movable, in a direction extending heightwise of the support, for exerting a pull to shape the upper materials over the last, a fluid-pressure-operated piston, loosely fitted in a power cylinder, for imparting such heightwise movement to said gripper, a source of fluid under pressure, a pressure-reducing valve for controlling the flow of fluid under pressure from said source to said cylinder, said pressure-reducing valve comprising a floating valve member subjected on its opposite sides, respectively, to a fluid-pressure loading by pressure fluid from said source of fluid under pressure and to the pressure of the fluid acting on said piston, means for variably predetermining the intensity of said fluid-pressure loading acting on one side of the valve member to determine the minimum force of the pull applied by said gripper, a manually displaceable bleed valve for selectively reducing the pressure of the fluid acting on the opposite side of said valve member to increase the force of the pull applied by the gripper, and fluid-pressure-operated means for locking said bleed valve in a selected position during the operation of the machine.

51. In a machine for shaping uppers over lasts, a support for a last, a gripper for seizing the upper materials of a shoe, in a location adjacent to the toe end of a last mounted on said support, a pair of grippers for seizing the upper materials of the shoe, in different locations on the opposite sides of the forepart of the last, said grippers being movable, in directions extending heightwise of said support, to exert pulls on the upper materials to shape the upper materials over the last, a fluid-pressure-operated piston for thus moving the first-named gripper, a fluid-pressure-operated piston for thus moving said pair of grippers, a source of fluid under pressure, two pressure-reducing valves for controlling, respectively, the flow of pressure fluid from said source to said pistons, said pressure-reducing valves each comprising a floating valve member subjected on its opposite sides, respectively, to a fluid-pressure loading by pressure fluid from said source of fluid under pressure, and to the pressure of the fluid acting on its associated piston, means for variably predetermining the intensity of said fluid-pressure loadings acting on one side of the respective valve members to determine the minimum force of the pull applied by the grippers controlled by the respective valve members, and operator-controlled means for selectively bleeding off pressure-fluid acting on the opposite side of each of the valve members to increase the force of the pull applied by the gripper, or grippers, controlled thereby.

52. In a machine for shaping uppers over lasts, a support for a last, a gripper for seizing the upper materials of a shoe, in a location adjacent to the toe end of a last mounted on said support, a pair of grippers for seizing the upper materials of the shoe, in different locations on the opposite sides of the forepart of the last, said grippers being movable, in directions extending heightwise of said support, to exert pulls on the upper materials to shape the upper materials over the last, a fluid-pressure-operated piston for thus moving the first-named gripper, a fluid-pressure-operated piston for thus moving said pair of grippers, a source of fluid under pressure, two pressure-reducing valves for controlling, respectively, the flow of pressure fluid from said source to said pistons, said pressure-reducing valves each comprising a floating valve member subjected on its opposite sides, respectively, to a fluid-pressure loading by pressure fluid from said source of fluid under pressure and to the pressure of the fluid acting on its associated piston, means for variably predetermining the intensity of said fluid-pressure loadings acting on one side of the respective valve members to determine the minimum force of the pull applied by the gripper controlled by the respective valve member, and two manually operable bleed valves for selectively reducing the pressure of the fluid acting on the opposite side of said valve members, respectively, to increase the force of the pull applied by the gripper, or grippers, controlled thereby.

53. In a machine for shaping uppers over lasts, a support for a last, a gripper for seizing the upper materials of a shoe, in a location adjacent to the toe end of a last mounted on said support, a pair of grippers for seizing the upper materials of the shoe, in different locations on the opposite sides of the forepart of the last, said grippers being movable, in directions extending heightwise of said support, to exert pulls on the upper materials to shape the upper materials over the last, a fluid-pressure-operated piston for thus moving the first-named gripper, a fluid-pressure-operated piston for thus moving said pair of grippers, a source of fluid under pressure, two pressure-reducing valves for controlling, respectively, the flow of pressure fluid from said source to said pistons, said pressure-reducing valves each comprising a floating valve member subjected on its opposite sides, respectively, to a fluid-pressure loading by pressure fluid from said source of fluid under pressure and to the pressure of the fluid acting on its associated piston, means for variably predetermining the intensity of said fluid-pressure loadings acting on one side of the respective valve members to determine the minimum force of the pull applied by the gripper controlled by the respective valve member, two manually displaceable bleed valves for selectively reducing the pressure of the fluid acting on the opposite side of said valve members, respectively, to increase the force of the pull applied by the gripper, or grippers, controlled thereby, and means for locking said bleed valves in selected positions during the operation of the machine.

54. In a machine for shaping uppers over lasts, a support for a last, a gripper for seizing the upper materials of a shoe, in a location adjacent to the toe end of a last mounted on said support, a pair of grippers for seizing the upper materials of the shoe, in different locations on the opposite sides of the forepart of the last, said grippers being movable, in directions extending heightwise of said support, to exert pulls on the upper materials to shape the upper materials over the last, a fluid-pressure-operated piston for thus moving the first-named gripper, a fluid-pressure-operated piston for thus moving said pair of grippers, a source of fluid under pressure, two pressure-reducing valves for controlling, respectively, the flow of pressure fluid from said source to said pistons, said pressure-reducing valves each comprising a floating valve member subjected on its opposite sides, respectively, to a fluid-pressure loading by pressure fluid from said source of fluid under pressure and to the pressure of the fluid acting on its associated piston, means for variably predetermining the intensity of said fluid-pressure loadings acting on one side of the respective valve members to determine the minimum force of the pull applied by the gripper controlled by the respective valve member, two manually displaceable bleed valves for selectively reducing the pressure of the fluid acting on the opposite side of said valve members, respectively, to increase the force of the pull applied by the gripper, or grippers, controlled thereby, and fluid-pressure-operated means for locking said bleed valves in selected positions during the operation of the machine.

55. In a machine for shaping uppers over lasts, a support for a last, a gripper for seizing the upper materials of a shoe, in a location adjacent to the toe end of a last mounted on said support, a pair of grippers for seizing the upper materials of the shoe, in different locations on the opposite sides of the forepart of the last, said grippers being movable, in directions extending heightwise of said support, to exert pulls on the upper materials to shape the upper materials over the last, a fluid-pressure-operated piston, loosely fitted in a power cylinder, for thus moving the first-named gripper, a fluid-pressure-operated piston, loosely fitted in a power cylinder, for thus moving said pair of grippers, a source of fluid under pressure, two pressure-reducing valves, for controlling, respectively, the flow of pressure fluid from said source to said power cylinders, said pressure-reducing valves each comprising a floating valve member subjected on its opposite sides, respectively, to a fluid-pressure loading by pressure fluid from said source of fluid under pressure and to the pressure of the fluid acting on its associated piston, means for variably predetermining the intensity of said fluid-pressure loading acting on one side of each of the valve members, respectively, to determine the minimum force of the pull applied by the gripper controlled by that valve member, and operator-controlled means for selectively bleeding off pressure-fluid acting on the opposite side of each of the valve members to increase the force of the pull applied by the gripper, or grippers, controlled thereby.

56. In a machine for shaping uppers over lasts, a support for a last, a gripper for seizing the upper materials of a shoe, in a location adjacent to the toe end of a last mounted on said support, a pair of grippers for seizing the upper materials of the shoe, in different locations on the opposite sides of the forepart of the last, said grippers being movable, in directions extending heightwise of said support, to exert pulls on the upper materials to shape the upper materials over the last, a fluid-pressure-operated piston, loosely fitted in a power cylinder, for thus moving the first-named gripper, a fluid-pressure-operated piston, loosely fitted in a power cylinder, for thus moving said pair of grippers, a source of fluid under pressure, two pressure-reducing valves, for controlling, respectively, the flow of pressure fluid from said source to said power cylinders, said pressure-reducing valves each comprising a floating valve member subjected on its opposite sides, respectively, to a fluid-pressure loading by pressure fluid from said source of fluid under pressure and to the pressure of the fluid acting on its associated piston, means for variably predetermining the intensity of said fluid-pressure loading acting on one side of each of the valve members, respectively, to determine the minimum force of the pull applied by the gripper controlled by that valve member, and two manually operable bleed valves for selectively reducing the pressure of the fluid acting on the opposite side of each of said valve members, respectively, to increase the force of the pull applied by the gripper, or grippers, controlled thereby.

57. In a machine for shaping uppers over lasts, a support for a last, a gripper for seizing the upper materials of a shoe, in a location adjacent to the toe end of a last mounted on said support, a pair of grippers for seizing the upper materials of the shoe, in different locations on the opposite sides of the forepart of the last, said grippers being movable, in directions extending heightwise of said support, to exert pulls on the upper materials to shape the upper materials over the last, a fluid-pressure-operated piston, loosely fitted in a power cylinder, for thus moving the first-named gripper, a fluid-pressure-operated piston, loosely fitted in a power cylinder, for thus moving said pair of grippers, a source of fluid under pressure, two pressure reducing valves, for controlling, respectively, the flow of pressure fluid from said source to said power cylinders, said pressure-reducing valves each comprising a floating valve member subjected on its opposite sides, respectively, to a fluid-pressure loading by pressure fluid from said source of fluid under pressure and to the pressure of the fluid acting on its associated piston, means for variably predetermining the intensity of said fluid-pressure loading acting on one side of each of the valve members, respectively, to determine the minimum force of the pull applied by the gripper controlled by that valve member, two manually displaceable bleed valves for selectively reducing the pressure of the fluid acting on the opposite side of each of said valve members, respectively, to increase the force of the pull applied by the gripper, or grippers, controlled thereby, and means for locking said bleed valves in selected positions during the operation of the machine.

58. In a machine for shaping uppers over lasts, a support for a last, a gripper for seizing the upper materials of a shoe, in a location adjacent to the toe end of a last mounted on said support, a pair of grippers for seizing the upper materials of the shoe, in different locations on the opposite sides of the forepart of the last, said grippers being movable, in directions extending heightwise of said support, to exert pulls on the upper materials to shape the upper materials over the last, a fluid-pressure-operated piston, loosely fitted in a power cylinder, for thus moving the first-named gripper, a fluid-pressure-operated piston, loosely fitted in a power cylinder, for thus moving said pair of grippers, a source of fluid under pressure, two pressure-reducing valves, for controlling, respectively, the flow of pressure fluid from said source to said power cylinders, said pressure-reducing valves each comprising a floating valve member subjected on its opposite sides, respectively, to a fluid-pressure loading by pressure fluid from said source of fluid under pressure and to the pressure of the fluid acting on its associated piston, means for variably predetermining the intensity of said fluid-pressure loading acting on one side of each of the valve members, respectively, to determine the minimum force of the pull applied by the gripper controlled by that valve member, two manually displaceable bleed valves for selectively reducing the pressure of the fluid acting on the opposite side of each of said valve members, respectively, to increase the force of the pull applied by the gripper, or grippers, controlled thereby, and fluid-pressure-operated means for locking said bleed valves in selected positions during the operation of the machine.

59. In a machine for shaping uppers over lasts, a support for a last, a gripper for seizing the upper materials of a shoe and movable, in a direction extending heightwise of the support, for exerting a pull thereon to shape the upper materials over a last mounted on said support, a fluid-pressure-operated piston for thus moving the gripper to exert a pull on the upper materials, a source of fluid under pressure, a valve for controlling the flow of pressure fluid from said source to the piston, a second fluid-pressure-operated piston adapted to exert an additional pulling force on said gripper, and a manually operable valve for selectively admitting pressure fluid from said source to the second piston for increasing the force of the pull applied by said gripper.

60. In a machine for shaping uppers over lasts, a support for a last, a gripper for seizing the upper materials of a shoe and movable, in a direction extending heightwise of the support, for exerting a pull thereon to shape the upper materials over a last mounted on said support, a fluid-pressure-operated piston for thus moving the gripper to exert a pull on the upper materials, a source of fluid under pressure, a pressure-reducing valve, a valve for controlling the flow of pressure fluid from said pressure-reducing valve to the piston, a second fluid-pressure-operated piston adapted to exert an additional pulling force on said gripper, and a manually operable valve for selectively admitting pressure fluid from said pressure-reducing valve to the second piston for increasing the force of the pull applied by said gripper.

61. In a machine for shaping uppers over lasts, a support for a last, a gripper for seizing the upper materials of a shoe and movable, in a direction extending heightwise of the support, for exerting a pull thereon to shape the upper materials over a last mounted on said support, fluid-pressure means for thus moving the gripper to exert a pull on the upper materials, said means comprising a source of fluid under pressure, a pair of axially alined cylinders, a piston in each cylinder, and means operatively connecting said pistons to the gripper, a valve for controlling the flow of pressure fluid from said source to one of said pistons to cause the gripper to exert a pull on the upper materials, and a second manually operable valve for selectively admitting pressure fluid from said source to said second piston for increasing the force of the pull applied by the gripper.

62. In a machine for shaping uppers over lasts, a support for a last, a gripper for seizing the upper materials of a shoe and movable, in a direction extending heightwise of the support, for exerting a pull thereon to shape the upper materials over a last mounted on said support, fluid-pressure means for thus moving the gripper to exert a pull on the upper materials, said means comprising a source of fluid under pressure, a pair of axially alined cylinders, a piston in each cylinder, and means operatively connecting said pistons to the gripper, a pressure-reducing valve, a valve for controlling the flow of pressure fluid from said pressure-reducing valve to one of said pistons to cause the gripper to exert a pull on the upper materials, and a second manually operable valve for selectively admitting pressure fluid from said reducing valve to said second piston for increasing the force of the pull applied by the gripper.

63. In a machine for shaping uppers over lasts, a support for a last, a gripper having a pair of jaws for seizing the upper materials of a shoe and movable, in a direction extending heightwise of the support, for exerting a pull to shape the upper materials over the last, means for operating the jaws of the gripper adapted to cause the jaws to close on the upper materials and then, after the gripper has been moved to apply a pull to the upper materials, to permit the jaws to open and release the upper materials, means for thus moving the gripper in a direction to apply a pull to the upper materials seized by its jaws, additional means operable independently of said gripper-moving means for imparting further movement to the gripper in the same direction, and means associated with said jaw-operating means for controlling the action of said additional gripper-moving means to cause it to operate immediately after the jaws of the gripper have been permitted to open by said jaw-operating means.

64. In a machine for shaping uppers over lasts, a support for a last, a gripper having a pair of jaws for seizing the upper materials of a shoe and movable, in a direction extending heightwise of the support, for exerting a pull to shape the upper materials over the last, means including a fluid-pressure-operated piston for operating the jaws of the gripper adapted to cause the jaws to close on the upper materials and then, after the gripper has been moved to apply a pull to the upper materials, to permit the jaws to open and release the upper materials, means for thus moving the gripper in a direction to apply a pull to the upper materials seized by its jaws, additional means operable independently of said gripper-moving means for imparting further movement to the gripper in the same direction, and means associated with said piston for controlling the action of said additional gripper-moving means to cause it to operate immediately after the jaws of the gripper have been permitted to open by said jaw-operating means.

65. In a machine for shaping uppers over lasts, a support for a last, a gripper having a pair of jaws for seizing the upper materials of a shoe and movable, in a direction extending heightwise of the support, for exerting a pull to shape the upper materials over the last, means including a fluid-pressure-operated piston for operating the jaws of the gripper adapted to cause the jaws to close on the upper materials and then, after the gripper has been moved to apply a pull to the upper materials, to permit the jaws to open and release the upper materials, means for thus moving the gripper in a direction to apply a pull to the upper materials seized by its jaws, additional fluid-pressure-operated means operable independently of said gripper-moving means for imparting further movement to the gripper in the same direction, and means associated with said piston for controlling the action of said additional gripper-moving means to cause it to operate immediately after the jaws of the gripper have been permitted to open by said jaw-operating means.

66. In a machine for shaping uppers over lasts, a support for a last, a gripper having a pair or jaws for seizing the upper materials of a shoe and movable, in a direction extending heightwise of the support, for exerting a pull to shape the upper materials over the last, means including a fluid-pressure-operated piston for operating the jaws of the gripper adapted to cause the jaws to close on the upper materials and then, after the gripper has been moved to apply a pull to the upper materials, to permit the jaws to open and release the upper materials, fluid-pressure-operated means for thus moving the gripper in a direction to apply a pull to the upper materials seized by its jaws, additional fluid-pressure-operated means operable independently of said gripper-moving means for imparting further movement to the gripper in the same direction, and means associated with said piston for controlling the action of said additional gripper-moving means to cause it to operate immediately after the jaws of the gripper have been permitted to open by said jaw-operating means.

67. In a machine for shaping uppers over lasts, a support for a last, a gripper having a pair of jaws for seizing the upper materials of a shoe and movable, in a direction extending heightwise of the support, for exerting a pull to shape the upper materials over the last, fluid-pressure-operated means for operating the jaws of the gripper adapted to cause the jaws to close on the upper materials and then, after the gripper has been moved to apply a pull to the upper materials, to permit the jaws to open and release the upper materials, a valve for controlling the operation of said jaw-operating means, means for thus moving the gripper in a direction to apply a pull to upper materials seized by its jaws, additional means operable independently of said gripper-moving means for imparting further movement to the gripper in the same direction, and means controlled by said valve for initiating action of said additional gripper-moving means immediately after the jaws of the gripper have been permitted to open by said jaw-operating means.

68. In a machine for shaping uppers over lasts, a support for a last, a gripper having a pair of jaws for seizing the upper materials of a shoe and movable, in a direction extending heightwise of the support, for exerting a pull to shape the upper materials over the last, fluid-pressure-operated means for operating the jaws of the gripper adapted to cause the jaws to close on the upper materials and then, after the gripper has been moved to apply a pull to the upper materials, to permit the jaws to open and release the upper materials, a valve for controlling the operation of said jaw-operating means, means for thus moving the gripper in a direction to apply a pull to upper materials seized by its jaws, additional fluid-pressure-operated means operable independently of said gripper-moving means for imparting further movement to the gripper in the same direction, and means controlled by said valve for initiating action of said additional gripper-moving means immediately after the jaws of the gripper have been permitted to open by said jaw-operating means.

69. In a machine for shaping uppers over lasts, a support for a last, a gripper having a pair of jaws for seizing the upper materials of a shoe and movable, in a direction extending heightwise of the support, for exerting a pull to shape the upper materials over the last, fluid-pressure-operated means for operating the jaws of the gripper adapted to cause the jaws to close on the upper materials and then, after the gripper has been moved to apply a pull to the upper materials, to permit the jaws to open and release the upper materials, a valve for controlling the operation of said jaw-operating means, fluid-pressure-operated means for thus moving the gripper in a direction to apply a pull to upper materials seized by its jaws, additional means operable independently of said gripper-moving means for imparting further movement to the gripper in the same direction, and means controlled by said valve for initiating action of said additional gripper-moving means immediately after the jaws of the gripper have been permitted to open by said jaw-operating means.

70. In a machine for shaping uppers over lasts, a support for a last, a gripper having a pair of jaws for seizing the upper materials of a shoe and movable, in a direction extending heightwise of the support, for exerting a pull to shape the upper materials over the last, fluid-pressure-operated means for operating the jaws of the gripper adapted to cause the jaws to close on the upper materials and then, after the gripper has been moved to apply a pull to the upper materials, to permit the jaws to open and release the upper materials, a valve for controlling the operation of said jaw-operating means, fluid-pressure-operated means for thus moving the gripper in a direction to apply a pull to upper materials seized by its jaws, additional fluid-pressure-operated means operable independently of said gripper-moving means for imparting further movement to the gripper in the same direction, and means controlled by said valve for initiating action of said additional gripper-moving means immediately after the jaws of the gripper have been permitted to open by said jaw-operating means.

71. In a machine for shaping uppers over lasts, a support for a last, a pair of grippers for seizing the upper materials of a shoe, in different locations on the opposite sides of the forepart of a last, and for exerting a pull thereon to shape the upper materials over the last, said grippers being mounted for movement in directions extending heightwise and lengthwise of a last on the support, power-operated means for moving the grippers in said heightwise direction, fluid-pressure-operated means for moving the grippers in said lengthwise direction, a source of fluid under pressure, and means for controlling the flow of fluid under pressure from said source to said fluid-pressure-operated means operable, in response to the operation of said grippers in the heightwise direction by said power-operated means, to cause said grippers to be moved in the lengthwise direction.

72. In a machine for shaping uppers over lasts, a support for a last, a pair of grippers for seizing the upper materials of a shoe, in different locations on the opposite sides of the forepart of a last, and for exerting a pull thereon to shape the upper materials over the last, said grippers being mounted for movement in directions extending heightwise and lengthwise of a last on the support, fluid-pressure-operated means for moving the grippers in said heightwise direction, fluid-pressure-operated means for moving the grippers in said lengthwise direction, a source of fluid under pressure, and means for controlling the flow of fluid under pressure from said source to said last-named fluid-pressure-operated means operable, in response to the operation of said grippers in the heightwise direction by said first-mentioned fluid-pressure-operated means, to cause said grippers to be moved in the lengthwise direction.

73. In a machine for shaping uppers over lasts, a support for a last, a pair of grippers for seizing the upper materials of a shoe, in different locations on the opposite sides of the forepart of a last, and for exerting a pull thereon to shape the upper materials over the last, said grippers being mounted for movement in directions extending heightwise and lengthwise of a last on the support, power-operated means for moving the grippers in said heightwise direction, fluid-pressure-operated means for moving the grippers in said lengthwise direction, a source of fluid under pressure, means for controlling the flow of fluid under pressure from said source to said fluid-pressure-operated means operable, in response to the operation of said grippers in the heightwise direction by said power-operated means, to cause said grippers to move in the lengthwise direction, and a manually adjustable pressure-regulating valve interposed between said source of fluid under pressure and said fluid-pressure-operated means for controlling the force of the pull applied to the upper by movement of the grippers in the lengthwise direction.

74. In a machine for shaping uppers over lasts, a support for a last, a pair of grippers for seizing the upper materials of a shoe, in different locations on the opposite sides of the forepart of a last, and for exerting a pull thereon to shape the upper materials over the last, said grippers being mounted for movement in directions extending heightwise and lengthwise of a last on the support, fluid-pressure-operated means for moving the grippers in said heightwise direction, fluid-pressure-operated means for moving the grippers in said lengthwise direction, a source of fluid under pressure, means for controlling the flow of fluid under pressure from said source to said last-named fluid-pressure-operated means operable, in response to the operation of said grippers in the heightwise direction by said first-mentioned fluid-pressure-operated means, to cause the grippers to move in the lengthwise direction, and a manually adjustable pressure-regulating valve interposed between said source of fluid under pressure and said last-named fluid-pressure-operated means for controlling the force of the pull applied to the upper by movement of the grippers in the lengthwise direction.

75. In a machine for shaping uppers over lasts, a support for a last, a pair of grippers for seizing the upper materials of a shoe, in different locations on the opposite sides of the forepart of a last, and for exerting a pull thereon to shape the upper materials over the last, said grippers being mounted for movement in directions extending heightwise and lengthwise of a last on the support, power-operated means for moving the grippers in said heightwise direction, fluid-pressure-operated means for moving the grippers in said lengthwise direction, and manually operable means directly connected to said grippers and operable independently of said fluid-pressure-operated means for selectively effecting movements of one or both of said grippers, in directions extending lengthwise of the last, to position the upper materials relatively to the last.

76. In a machine for shaping uppers over lasts, a support for a last, a pair of grippers for seizing the upper materials of a shoe, in different locations on the opposite sides of the forepart of a last, and for exerting a pull thereon to shape the upper materials over the last, said grippers being mounted for movement in directions extending heightwise and lengthwise of a last on the support, power-operated means for moving the grippers in said heightwise direction, fluid-pressure-operated means for moving the grippers in said lengthwise direction, manually operable means directly connected to said grippers and operable independently of said fluid-pressure-operated means for selectively effecting movement of one or both of said grippers, in directions extending lengthwise of the last, to position the upper materials, relatively to the last, and fluid-pressure-operated friction means for holding the grippers in positions to which they are moved by said manually operable means, prior to movement of said grippers in the lengthwise direction by said fluid-pressure-operated means.

77. In a machine for shaping uppers over lasts, a support for a last, a pair of grippers for seizing the upper materials of a shoe, in different locations on the opposite sides of the forepart of a last, and for exerting a pull thereon to shape the upper materials over the last, said grippers being mounted for movement in directions extending heightwise and lengthwise of a last on the support, power-operated means for moving the grippers in said heightwise direction, fluid-pressure-operated means for moving the grippers in said lengthwise direction, a source of fluid under pressure, and a manually adjustable flow-restricting valve interposed between said source of fluid under pressure and said fluid-pressure-operated means for controlling the rate of movement of the grippers in said lengthwise direction.

78. In a machine for shaping uppers over lasts, a support for a last, a pair of grippers for seizing the upper materials of a shoe, in different locations on the opposite sides of the forepart of a last, and for exerting a pull thereon to shape the upper materials over the last, said grippers being mounted for movement in directions extending heightwise and lengthwise of a last on the support, fluid-pressure-operated means for moving the grippers in said heightwise direction, fluid-pressure-operated means for moving the grippers in said lengthwise direction, a source of fluid under pressure, and a manually adjustable flow-restricting valve interposed between said source of fluid under pressure and said last-named fluid-pressure-operated means for controlling the rate of movement of the grippers in said lengthwise direction.

79. In a machine for shaping uppers over lasts, a support for a last, a pair of grippers for seizing the upper materials of a shoe, in different locations on the opposite sides of the forepart of a last, and for exerting a pull thereon to shape the upper materials over the last, fluid-pressure-operated means for moving the grippers, in directions extending heightwise of the support, to cause the grippers to exert their pull on upper materials seized thereby, and manually operated means, operable independently of said fluid-pressure-operated means and directly connected to said grippers, for effecting relative displacements of said grippers, equally and oppositely heightwise of the support, to position the upper materials laterally on the last.

80. In a machine for shaping uppers over lasts, a support for a last, a pair of grippers for seizing the upper materials of a shoe, in different locations on the opposite sides of the forepart of a last on the support, and for exerting a pull thereon to shape the upper materials over the last, fluid-pressure-operated means for moving the grippers, in directions extending heightwise of the support, to cause the grippers to exert their pull on upper materials seized thereby, manually operated means, operable independently of said fluid-pressure-operated means, for effecting relative displacement of said grippers, equally and oppositely heightwise of the support, to position the upper materials laterally on the last, and means for maintaining said grippers in the relative positions to which they are moved by said manually operated means during a subsequent operation of said fluid-pressure-operated means.

81. In a machine for shaping uppers over lasts, a support for a last, a pair of grippers for seizing the upper materials of a shoe, in different locations on the opposite sides of the forepart of a last on the support, and for exerting a pull thereon to shape the upper materials over the last, power-operated means for moving the grippers, in directions extending heightwise of the support, to cause the grippers to exert their pull on upper materials seized thereby, manually operated means, operable independently of said power-operated means, for effecting relatives displacement of said grippers, equally and oppositely heightwise of the support, to position the upper materials laterally on the last, and fluid-pressure-operated means for maintaining said grippers in the relative positions to which they are moved by said manually operated means during a subsequent movement of the grippers by said power-operated means.

82. In a machine for shaping uppers over lasts, a support for a last, a pair of grippers for seizing the upper materials of a shoe, in different locations on the opposite sides of the forepart of a last on the support, and for exerting a pull thereon to shape the upper materials over the last, fluid-pressure-operated means for moving the grippers, in a direction extending heightwise of the support, to cause the grippers to exert their pull on upper materials seized thereby, manually operated means, operable independently of said fluid-pressure-operated means, for effecting relative displacement of said grippers, equally and oppositely heightwise of the support, to position the upper materials laterally on the last, and fluid-pressure-operated means for maintaining said grippers in the relative positions to which they are moved by said manually operated means during subsequent movement of the grippers by said fluid-pressure-operated means.

83. In a machine for shaping uppers over lasts, a support for a last, a pair of grippers for seizing the upper materials of a shoe, in different locations on the opposite sides of the forepart of a last on the support, and for exerting a pull thereon to shape the upper materials over the last, a fluid-pressure-operated piston for moving the grippers, in directions extending heightwise of the support, to cause the grippers to exert their pull on upper materials seized thereby, mechanism including an equalizing lever for operatively connecting said piston to the grippers, and manually operated means for rocking said equalizing lever to effect relative displacement of the grippers, equally and oppositely in directions extending heightwise of the support, to position the upper materials laterally on the last.

84. In a machine for shaping uppers over lasts, a support for a last, a pair of grippers for seizing the upper materials of a shoe, in different locations on the opposite sides of the forepart of a last on the support, and for exerting a pull thereon to shape the upper materials over the last, a fluid-pressure-operated piston for moving the grippers, in a direction extending heightwise of the support, to cause the grippers to exert their pull on upper materials seized thereby, mechanism including an equalizing lever for operatively connecting said piston to the grippers, manually operated means for rocking said equalizing lever to effect relative displacement of the grippers, equally and oppositely in directions extending heightwise of the support, to position the upper materials laterally on the last, and fluid-pressure-operated means for locking said equalizing lever to maintain the grippers in the relative positions to which they are moved by said manually operated means during subsequent movement of said grippers by the piston.

85. In a machine for shaping uppers over lasts, a support for a last, two grippers, each including two pairs of jaws, for seizing the upper materials of a shoe, in locations at the opposite sides of the forepart of a last on the support, and movable, in directions extending heightwise of the support, to exert a pull for shaping the upper materials over the last, power-operated means for thus moving the grippers, manually operated means operable independently of said power-operated means for effecting relative displacement of the grippers, equally and oppositely heightwise of the support, to position the upper materials laterally on the last, and operator-controlled means for selectively locking one pair of jaws on each of said grippers against movement during the operation of said manually operated means.

86. In a machine for shaping uppers over lasts, a support for a last, two grippers, each including two pairs of jaws, for seizing the upper materials of a shoe, in locations at the opposite sides of the forepart of a last on the support, and movable, in directions extending heightwise of the support, to exert a pull for shaping the upper materials over the last, fluid-pressure-operated means for thus moving the grippers, manually operated means operable independently of said fluid-pressure-operated means for effecting relative displacement of the grippers, equally and oppositely heightwise of the support, to position the upper materials laterally on the last, and operator-controlled means for selectively locking one pair of jaws on each of the grippers against movement during the operation of said manually operated means.

87. In a machine for shaping uppers over lasts, a support for a last, two grippers, each including a pair of jaws for seizing the upper materials of a shoe, adjacent to the tip line, and a pair of jaws for seizing the upper materials in a location rearwardly of the tip line, and movable, in directions extending heightwise of the support, to exert a pull for shaping the upper materials over the last, power-operated means for thus moving the grippers, manually operated means operable independently of said power-operated means for effecting relative displacement of the grippers, equally and oppositely heightwise of the support, to position the upper materials laterally on the last, and operator-controlled means for selectively locking the pair of jaws on each gripper, which seize the upper materials adjacent to the tip line, against movement during the operation of said manually operated means.

88. In a machine for shaping uppers over lasts, a support for a last, two grippers, each including a pair of jaws for seizing the upper materials of a shoe adjacent to the tip line, and a pair of jaws for seizing the upper materials in a location rearwardly of the tip line, and movable, in directions extending heightwise of the support, to exert a pull for shaping the upper materials over the last, fluid-pressure-operated means for thus moving the grippers, manually operated means operable independently of said fluid-pressure-operated means for effecting relative displacement of the grippers, equally and oppositely heightwise of the support, to position the upper materials laterally on the last, and operator-controlled means for selectively locking the pair of jaws on each gripper, which seize the upper materials adjacent to the tip line, against movement during the operation of said manually operated means.

89. In a machine for shaping uppers over lasts, a support for a last, two grippers, each including two pairs of jaws, for seizing the upper materials of a shoe, in locations at the opposite sides of the forepart of a last on the support, and movable, in directions extending heightwise of the support, to exert a pull for shaping the upper materials over the last, power-operated means for thus moving the grippers, manually operated means operable independently of said power-operated means for effecting relative displacement of the grippers, equally and oppositely heightwise of the support, to position the upper materials laterally on the last, means for maintaining said grippers in the relative positions to which they are moved by said manually operated means during a subsequent operation of said power-operated means, and means for selectively locking one pair of jaws on each of the grippers against movement during the operation of said manually operated means and the subsequent movement of the grippers by said power-operated means.

90. In a machine for shaping uppers over lasts, a support for a last, two grippers, each including two pairs of jaws, for seizing the upper materials of a shoe, in locations at the opposite sides of the forepart of a last on the support, and movable, in directions extending heightwise of the support, to exert a pull for shaping the upper materials over the last, fluid-pressure-operated means for thus moving the grippers, manually operated means operable independently of said fluid-pressure-operated means for effecting relative displacement of the grippers, equally and oppositely heightwise of the support, to position the upper materials laterally on the last, means for maintaining said grippers in the relative positions to which they are moved by said manually operated means during a subsequent operation of said fluid-pressure-operated means, and means for selectively locking one pair of jaws on each of the grippers against movement during the operation of said manually operated means and the subsequent movement of the grippers by said fluid-pressure-operated means.

91. In a machine for shaping uppers over lasts, a support for a last, two grippers, each including a pair of jaws for seizing the upper materials of a shoe, adjacent to the tip line, and a pair of jaws for seizing the upper materials in a location rearwardly of the tip line, and movable, in directions extending heightwise of the support, to exert a pull for shaping the upper materials over the last, power-operated means for thus moving the grippers, manually operated means operable independently of said power-operated means for effecting relative displacement of the grippers, equally and oppositely heightwise of the support, to position the upper materials laterally on the last, means for maintaining said grippers in the relative positions to which they are moved by said manually operated means during a subsequent operation of said power-operated means, and means for selectively locking the pair of jaws on each gripper, which seize the upper materials adjacent to the tip line, against movement during the operation of said manually operated means and the subsequent movement of the grippers by said power-operated means.

92. In a machine for shaping uppers over lasts, a support for a last, two grippers, each including a pair of jaws for seizing the upper materials of a shoe, adjacent to the tip line, and a pair of jaws for seizing the upper materials in a location rearwardly of the tip line, and movable, in directions extending heightwise of the support, to exert a pull for shaping the upper materials over the last, fluid-pressure-operated means for thus moving the grippers, manually operated means operable independently of said fluid-pressure-operated means for effecting relative displacement of the grippers, equally and oppositely heightwise of the support, to position the upper materials laterally on the last, means for maintaining said grippers in the relative positions to which they are moved by said manually operated means during a subsequent operation of said fluid-pressure-operated means, and means for selectively locking the pair of jaws on each gripper, which seize the upper materials adjacent to the tip line, against movement during the operation of said manually operated means and the subsequent movement of the grippers by said fluid-pressure-operated means.

93. In a machine for shaping uppers over lasts, a gripper having a pair of jaws for seizing the upper materials of a shoe and movable to exert a pull thereon to shape the upper materials over a last, fluid-pressure-operated means for thus moving the gripper, means for operating the jaws of the gripper to cause them to close on the upper materials and to open to release the upper materials, manually operated means for moving the gripper, and operator-controlled means for simultaneously causing the jaw-operating means to effect opening of the jaws of the gripper and the fluid-pressure-operated means to relieve the pulling force on the gripper to permit movement of the gripper by said manually operated means.

94. In a machine for shaping uppers over lasts, a support for a last, a toe gripper having a pair of jaws for seizing the upper materials of a shoe, in a location adjacent to the toe end of a last on the support, and movable, in a direction extending heightwise of the support, to exert a pull thereon for shaping the upper materials over the last, a fluid-pressure-operated piston for thus moving the gripper, a source of fluid under pressure, a valve for controlling the flow of fluid under pressure from said source, to said piston, manually operated means for imparting movements to said gripper, and means under the control of an operator for simultaneously shutting off the flow of fluid under pressure from said control valve and said source to said piston and conducting pressure fluid acting on said piston to exhaust to free said gripper for movement by said manually operated means.

95. In a machine for shaping uppers over lasts, a toe gripper having a pair of jaws for seizing the upper materials of a shoe and movable to exert a pull thereon to shape the upper materials over a last, fluid-pressure-operated means for operating said gripper jaws, a fluid-pressure-operated piston for thus moving the gripper, a source of fluid under pressure, a valve for controlling the flow of fluid under pressure from said source to said piston, manually operated means for imparting movements to said gripper, and means under the control of an operator for simultaneously shutting off the flow of fluid under pressure from said control valve and said source to said piston, conducting pressure fluid acting on said piston to exhaust and for relieving the pressure of fluid acting on said jaw-operating means to cause the jaws of said gripper to open and to free said gripper for movement by said manually operated means.

96. In a machine for shaping uppers over lasts, a gripper having a pair of jaws for seizing the upper materials of a shoe and movable to exert a pull thereon to shape the upper materials over a last, fluid-pressure-operated means including a piston and a power cylinder, for thus moving the gripper, a source of fluid under pressure, a valve for controlling the flow of pressure fluid from said source to said power cylinder, a second valve interposed between said control valve and said power cylinder, said second-named valve being normally held in a position to conduct fluid under pressure from said source and said control valve to the power cylinder and being displaceable to a position to shut off the flow of fluid under pressure to said power cylinder and to connect said cylinder to exhaust, and manually operable means for displacing said second-named valve to the position in which said power cylinder is connected to exhaust and for thereafter moving the gripper selectively, in either direction, heightwise of the support.

97. In a machine for shaping uppers over lasts, a gripper having a pair of jaws for seizing the upper materials of a shoe and movable to exert a pull thereon to shape the upper materials over a last, fluid-pressure-operated means for closing the jaws of the gripper, a source of fluid under pressure, fluid-pressure-operated means, including a piston and a power cylinder, for thus moving the gripper, a second source of fluid under pressure, a valve for controlling the flow of fluid under pressure from said second source to said power cylinder, a second valve interposed between said first-named source and said jaw-closing means and between said second source and said power cylinder, said last-named valve being normally held in a position to conduct fluid under pressure from the first source to said jaw-closing means and from said second source and said control valve to the power cylinder, and being displaceable to a position to relieve the pressure of the fluid acting on said jaw-closing means and to shut off the flow of fluid under pressure to said power cylinder and connect said power cylinder to exhaust, and manually operable means for displacing said second-named valve to the position in which pressure of fluid acting on said jaw-closing means is relieved and said power cylinder is connected to exhaust and for thereafter moving the gripper selectively, in either direction, heightwise of the support.

98. In a machine for shaping uppers over lasts, a support for a last, a pair of grippers for seizing the upper materials of a shoe, in different locations at the opposite sides of the forepart of a last, and movable in directions extending heightwise of the support, to exert a pull thereon for shaping the upper materials over the last, a fluid-pressure-operated piston for thus moving the grippers, a source of fluid under pressure, a valve for controlling the flow of fluid under pressure from said source to said piston, manually operated means operable independently of said piston for effecting relative displacement of said grippers, equally and oppositely heightwise of the support, to position the upper materials laterally on the last, and operator-controlled means for relieving the pressure of the fluid on said piston to facilitate displacement of the grippers by said manually operated means.

99. In a machine for shaping uppers over lasts, a support for a last, a pair of grippers for seizing the upper materials of a shoe, in different locations at the opposite sides of the forepart of a last, and movable in directions extending heightwise of the support, to exert a pull thereon for shaping the upper materials over the last, a power cylinder, a fluid-pressure-operated piston in the cylinder for thus moving the grippers, a source of fluid under pressure, a valve for controlling the flow of fluid under pressure from said source to said cylinder, manually operated means operable independently of said piston for effecting relative displacement of said grippers, equally and oppositely heightwise of the support, to position the upper materials laterally on the last, means forming an expansion chamber, and a manually operable valve for connecting said cylinder to said expansion chamber for relieving the pressure of fluid acting on the piston to facilitate the displacement of the grippers by said manually operated means.

100. In a machine for shaping uppers over lasts, a support for a last, a pair of grippers for seizing the upper materials of a shoe, in different locations at the opposite sides of the forepart of a last, and movable in directions extending heightwise and lengthwise of the support, to exert a pull thereon for shaping the upper materials over the last, fluid-pressure-operated means for moving the grippers in said heightwise direction, fluid-pressure-operated means for moving the grippers in said lengthwise direction, manually operated means operable independently of said two fluid-pressure-operated means for selectively effecting movements of said grippers in said lengthwise and heightwise directions, to position the upper materials relatively to the last, and operator controlled means for relieving the pressure of operating fluid acting on said two fluid-pressure-operated means to facilitate said movements of the grippers by the manually operated means.

101. In a machine for shaping uppers over lasts, a support for a last, a pair of grippers for seizing the upper materials of a shoe, in different locations at the opposite sides of the forepart of a last, and movable in directions extending heightwise and lengthwise of the support, to exert a pull thereon for shaping the upper materials over the last, a fluid-pressure-operated piston for moving said grippers in said heightwise direction, a fluid-pressure-operated piston for moving the grippers in said lengthwise direction, a source of fluid under pressure, valve means for controlling the flow of fluid under pressure from said source to said pistons, manually operated means operable independently of said first-named piston for effecting relative displacements of said grippers, equally and oppositely heightwise of the support, manually operated means operable independently of said second-named piston for selectively effecting movements of one or both of said grippers in said lengthwise direction, and operator-controlled means for relieving the pressure of the fluid acting on each of said pistons, to facilitate said movements of the grippers by one or both of said manually operated means.

102. In a machine for shaping uppers over lasts, a support for a last, a pair of grippers for seizing the upper materials of a shoe, in different locations at the opposite sides of the forepart of a last, and movable in directions extending heightwise and lengthwise of the support, to exert a pull thereon for shaping the upper materials over the last, fluid-pressure-operated means for moving the grippers in said heightwise direction, fluid-pressure-operated means for moving the grippers in said lengthwise direction, manually operated means operable independently of said last-named fluid-pressure-operated means for selectively effecting movements of one or both of said grippers in said lengthwise direction, and operator-controlled means for relieving the pressure of operating fluid acting on each of said fluid-pressure-operated means to facilitate said movements of the grippers by said manually operated means.

103. In a machine for shaping uppers over lasts, a support for a last, a pair of grippers for seizing the upper materials of a shoe, in different locations at the opposite sides of the forepart of a last, and movable in directions extending heightwise and lengthwise of the support, to exert a pull thereon for shaping the upper materials over the last, a fluid-pressure-operated piston for moving the grippers in said heightwise direction, a fluid-pressure-operated piston for moving the grippers in said lengthwise direction, a source of fluid under pressure, valve means for controlling the flow of fluid under pressure from said source to said pistons, manually operated means operable independently of said first-named piston for selectively effecting relative displacements of said grippers, equally and oppositely, heightwise of the support, and operator-controlled means for relieving the pressure of the fluid acting on each of said pistons to facilitate relative displacement of the grippers by the manually operated means.

104. In a machine for shaping uppers over lasts, a support for a last, a toe gripper for seizing the upper materials of a shoe, adjacent to the toe end of a last, a pair of side grippers for seizing the upper materials, in different locations on the opposite sides of the forepart of the last, said grippers being movable in directions extending heightwise of the support to exert a pull for shaping the upper materials over the last, fluid-pressure-operated means, including a piston and a power cylinder, for thus moving the toe gripper, fluid-pressure-operated means, including a piston and a power cylinder, for thus moving the side grippers, a source of fluid under pressure, valve means for controlling the flow of fluid under pressure from said source to said two power cylinders, manually operated means operable independently of said second-named power cylinder for effecting movements of the side grippers to position the upper materials relatively to the last, and valve means under the control of an operator for decreasing the pressure of the fluid in said two power cylinders to relieve the force of the pull exerted by said toe and side grippers thereby facilitating movement of the side grippers by the manually operated means.

105. In a machine for shaping uppers over lasts, a support for a last, a toe gripper for seizing the upper materials of a shoe, adjacent to the toe end of a last, a pair of side grippers for seizing the upper materials, in different locations on the opposite sides of the forepart of the last, said grippers being movable in directions extending heightwise of the support to exert a pull for shaping the upper materials over the last, fluid-pressure-operated means, including a piston and a power cylinder, for thus moving the toe gripper, fluid-pressure-operated means, including a piston and a power cylinder, for thus moving the side grippers, a source of fluid under pressure, valve means for controlling the flow of fluid under pressure from said source to said two power cylinders, manually operated means operable independently of said second-named power cylinder for effecting movements of the side grippers to position the upper materials relatively to the last, valve means for decreasing the pressure of fluid in said first-named power cylinder, valve means for decreasing the pressure of the fluid acting in said second-named power cylinder, and a single-operator-controlled member for operating said two last-named valve means for relieving the force of the pull exerted by said toe and side grippers to facilitate movement of the side grippers by the manually operated means.

106. In a machine for shaping uppers over lasts, a support for a last, a toe gripper for seizing the upper materials of a shoe, adjacent to the toe end of a last on the support, a pair of side grippers for seizing the upper materials, in different locations on the opposite sides of the forepart of the last, said grippers benig mounted for movement in directions extending heightwise of the support, for exerting a pull on upper materials seized thereby to shape the upper materials over the last, fluid-pressure-operated means for thus moving the toe gripper, fluid-pressure-operated means for thus moving the side grippers, a source of fluid under pressure, and a manually settable valve for selectively controlling the admission of fluid under pressure from said source to each of said fluid-pressure-operated means to determine the sequence of operations of said toe and side grippers.

107. In a machine for shaping uppers over lasts, a support for a last, a toe gripper for seizing the upper materials of a shoe, adjacent to the toe end of a last on the support, a pair of side grippers for seizing the upper materials, in different locations on the opposite sides of the forepart of the last, said grippers being mounted for movement in directions extending heightwise of the support, for exerting a pull on upper materials seized thereby to shape the upper materials over the last, fluid-pressure-operated means for thus moving the toe gripper, fluid-pressure-operated means for thus moving the side grippers, a source of fluid under pressure, a valve for controlling the flow of fluid under pressure from said source to the first-named fluid-pressure-operated means, a valve for controlling the flow of fluid under pressure from said source to the second-named fluid-pressure-operated means, and manually settable means for selectively controlling the operation of said two valves to determine the sequence of operations of the toe and side grippers.

108. In a machine for shaping uppers over lasts, a support for a last, a toe gripper for seizing the upper materials of a shoe, adjacent to the toe end of a last on the support, a pair of side grippers for seizing the upper materials, in different locations on the opposite sides of the forepart of the last, said grippers being mounted for movement in directions extending heightwise of the support, for exerting a pull on upper materials seized thereby to shape the upper materials over the last, fluid-pressure-operated means for thus moving the toe gripper, fluid-pressure-operated means for thus moving the side grippers, a source of fluid under pressure, a fluid-pressure-operated valve for controlling the flow of fluid under pressure from said source to the first-named fluid-pressure-operated means, a fluid-pressure-operated valve for controlling the flow of fluid under pressure from said source to the second-named fluid-pressure-operated means, and a manually settable valve for controlling the flow of fluid under pressure from said source to said two fluid-pressure-operated valves to determine the sequence of operations of the toe and side grippers.

109. In a machine for shaping uppers over lasts, a toe gripper and a pair of side grippers for seizing the upper materials of a shoe and movable to exert a pull thereon for shaping the upper materials over a last, a fluid-pressure-operated piston for moving the toe gripper, a fluid-pressure-operated piston for moving the side grippers, a source of fluid under pressure, and two manually adjustable valves, interposed respectively between the source of fluid under pressure and said fluid-pressure-operated pistons, for independently controlling the rate of flow of fluid under pressure to each of said pistons to determine the speed of movement of the toe and side grippers, respectively.

110. In a machine for shaping uppers over lasts, a support for a last, a plurality of grippers for seizing the upper materials of a shoe, in different locations adjacent to the toe end and opposite sides of the forepart of a last, and movable, relatively to the support, for exerting a pull to shape the upper materials over the last, power-operated means for actuating the grippers, overlaying members movable inwardly over the bottom of the shoe for wiping the lasting margin of the upper materials inwardly over the bottom of an insole on the last, a pair of clamping members mounted for inward movement into engagement with the upper materials on the opposite sides of the forepart of the last, for clamping the upper materials against the last and for supporting the last during the operation of said overlaying members, fluid-pressure-operated means for thus moving the clamping members, power-operated means for operating said overlaying members including a clutch, and means for actuating said clutch to initiate operation of the overlaying members in response to the operation of said clamping members by the fluid-pressure-operated means.

111. In a machine for shaping uppers over lasts, a support for a last, a plurality of grippers for seizing the upper materials of a shoe, in different locations adjacent to the toe end and opposite sides of the forepart of a last, and movable, relatively to the support, for exerting a pull to shape the upper materials over the last, power-operated means for actuating the grippers, overlaying members movable inwardly over the bottom of the shoe for wiping the lasting margin of the upper materials inwardly over the bottom of an insole on the last, a pair of clamping members mounted for inward movement into engagement with the upper materials on the opposite sides of the forepart of the last, for clamping the upper materials against the last and for supporting the last during the operation of said overlaying members, fluid-pressure-operated means for thus moving the clamping members, power-operated means for operating said overlaying members including a clutch, and fluid-pressure-operated means for engaging said clutch to initiate operation of the overlaying members, in response to the operation of said clamping members.

112. In a machine for shaping uppers over lasts, a support for a last, a plurality of grippers for seizing the upper materials of a shoe, in different locations adjacent to the toe end and opposite sides of the forepart of a last, and movable, relatively to the support, for exerting a pull to shape the upper materials over the last, fluid-pressure-operated means for actuating the grippers, overlaying members movable inwardly over the bottom of the shoe for wiping the lasting margin of the upper materials inwardly over the bottom of an insole on the last, a pair of clamping members mounted for inward movement into engagement with the upper materials on the opposite sides of the forepart of the last, for clamping the upper materials against the last and for supporting the last during the operation of said overlaying members, fluid-pressure-operated means for thus moving the clamping members, power-operated means for actuating said overlaying members including a clutch, and means for engaging said clutch to initiate operation of the overlaying members in response to the operation of said clamping members.

113. In a machine for shaping uppers over lasts a support for a last, a plurality of grippers for seizing the upper materials of a shoe, in different locations adjacent to the toe end and opposite sides of the forepart of a last, and movable, relatively to the support, for exerting a pull to shape the upper materials over the last, fluid-pressure-operated means for actuating the grippers, overlaying members movable inwardly over the bottom of the shoe for wiping the lasting margin of the upper materials inwardly over the bottom of an insole on the last, a pair of clamping members mounted for inward movement into engagement with the upper materials on the opposite sides of the forepart of the last, for clamping the upper materials against the last and for supporting the last during the operation of said overlaying members, fluid-pressure-operated means for thus moving the clamping members, power-operated means for actuating said overlaying members including a clutch, and fluid-pressure-operated means for engaging said clutch to initiate operation of the overlaying members in response to the operation of said clamping members.

114. In a machine for shaping uppers over lasts, a support for a last, a plurality of grippers for seizing the upper materials of a shoe, in different locations adjacent to the toe end and opposite sides of the forepart of a last, and movable, relatively to the support, for exerting a pull to shape the upper materials over the last, fluid-pressure-operated means for thus moving the grippers, overlaying members movable inwardly over the bottom of the shoe for wiping the lasting margin of the upper materials inwardly over the bottom of an insole on the last, power-operated means for thus moving the overlaying members, a clutch for controlling the operating of said power-operated means, a pair of clamping members movable inwardly into engagement with the upper materials on the opposite sides of the forepart of the last, for clamping the upper materials against the last and for supporting the last during the operation of said overlaying members, fluid-pressure-operated means for thus moving the clamping members, a multiple valve for controlling the flow of fluid under pressure to said two fluid-pressure-operated means, and treadle-operated mechanism for operating said valve, successively, to admit fluid under pressure first to said fluid-pressure-operated means for moving the grippers and secondly to said fluid-pressure-operated means for moving the clamping members.

115. In a machine for shaping uppers over lasts, a support for a last, a plurality of grippers for seizing the upper materials of a shoe, in different locations adjacent to the toe end and opposite sides of the forepart of a last, and movable, relatively to the support, for exerting a pull to shape the upper materials over the last, fluid-pressure-operated means for thus moving the grippers, overlaying members movable inwardly over the bottom of the shoe for wiping the lasting margin of the upper materials inwardly over the bottom of an insole on the last, power-operated means for thus moving the overlaying members, a clutch for controlling the operation of said power-operated means, a pair of clamping members movable inwardly into engagement with the upper materials on the opposite sides of the forepart of the last, for clamping the upper materials against the last and for supporting the last during the operation of said overlaying members, fluid-pressure-operated means for thus moving the clamping members, a multiple valve for controlling the flow of fluid under pressure to said two fluid-pressure-operated means, treadle-operated mechanism for operating said valve, successively, to admit fluid under pressure first to said fluid-operated means for moving the grippers and secondly to said fluid-pressure-operated means for moving the clamping members, and means for engaging said clutch to effect operation of the overlaying members in response to movement of said clamping members into engagement with the shoe.

116. In a machine for shaping uppers over lasts, a support for a last, a plurality of grippers for seizing the upper materials of a shoe, in different locations adjacent to the toe end and opposite sides of the forepart of a last, and movable, relatively to the support, for exerting a pull to shape the upper materials over the last, fluid-pressure-operated means for thus moving the grippers, overlaying members movable inwardly over the bottom of the shoe for wiping the lasting margin of the upper materials inwardly over the bottom of an insole on the last, power-operated means for thus moving the overlaying members, a clutch for controlling the operation of said power-operated means, a pair of clamping members movable inwardly into engagement with the upper materials on the opposite sides of the forepart of the last, for clamping the upper materials against the last and for supporting the last during the operation of said overlaying members, fluid-pressure-operated means for thus moving the clamping members, a multiple valve for controlling the flow of fluid under pressure to said two fluid-pressure-operated means, treadle-operated mechanism for operating said valve, successively, to admit fluid under pressure first to said fluid-pressure-operated means for moving the grippers and secondly to said fluid-pressure-operated means for moving the clamping members, and fluid-pressure-operated means for engaging said clutch to effect operation of the overlaying members in response to movement of said clamping members into engagement with the shoe.

117. In a machine for shaping uppers over lasts, fluid-pressure-operated means for tensioning the upper materials of a shoe to shape them over a last, overlaying members for wiping the lasting margin of the upper materials inwardly over the bottom of an insole on the last, power-operated means for actuating the overlaying members, a clutch for controlling the operation of said power-operated means, a pair of clamping members movable into engagement with the upper materials on the opposite sides of the last for supporting the shoe during the operation of said overlaying members, fluid-pressure-operated means for thus moving the clamping members, a valve for controlling the flow of fluid under pressure to said two fluid-pressure-operated means, said valve including a pair of valve members operable, respectively, to admit fluid under pressure to the fluid-pressure-operated tensioning means and to the fluid-pressure-operated means for moving the clamping members, a treadle, and treadle-operated mechanism for operating said valve members in a predetermined sequence, upon successive depressions of the treadle.

118. In a machine for shaping uppers over lasts, fluid-pressure-operated means for tensioning the upper materials of a shoe to shape them over a last, overlaying members for wiping the lasting margin of the upper materials inwardly over the bottom of an insole on the last, power-operated means for actuating the overlaying members, a clutch for controlling the operation of said power-operated means, a pair of clamping members movable into engagement with the upper materials on the opposite sides of the last for supporting the shoe during the operation of said overlaying members, fluid-pressure-operated means for thus moving the clamping members, a valve for controlling the flow of fluid under pressure to said two fluid-pressure-operated means, said valve including a pair of valve members operable, respectively, to admit fluid under pressure to the fluid-pressure-operated upper-tensioning means and to the fluid-pressure-operated means for moving the clamping members, a treadle, treadle-operated mechanism for operating said valve members, in a predetermined sequence upon successive depressions of the treadle, and means for engaging said clutch to effect operation of the overlaying members by said power-operated means in response to movement of the clamping members into engagement with the upper materials on the last.

119. In a machine for shaping uppers over lasts, fluid-pressure-operated means for tensioning the upper materials of a shoe to shape them over a last, overlaying members for wiping the lasting margin of the upper materials inwardly over the bottom of an insole on the last, power-operated means for actuating the overlaying members, a clutch for controlling the operation of said power-operated means, a pair of clamping members movable into engagement with the upper materials on the opposite sides of the last for supporting the shoe during the operation of said overlying members, fluid-pressure-operated means for thus moving the clamping members, a valve for controlling the flow of fluid under pressure to said two fluid-pressure-operated means, said valve including a pair of valve members operable, respectively, to admit fluid under pressure to the fluid-pressure-operated upper-tensioning means and to the fluid-pressure-operated means for moving the clamping members, a treadle, treadle-operated mechanism for operating said valve members, in a predetermined sequence, upon successive depressions of the treadle, and fluid-pressure-operated means for engaging said clutch to effect operation of the overlaying members by said power-operated means in response to movement of the clamping members into engagement with the upper materials on the last.

120. In a machine for shaping uppers over lasts, fluid-pressure-operated means for tensioning the upper materials of a shoe to shape them over a last, overlaying members for wiping the lasting margin of the upper materials inwardly over the bottom of an insole on the last, a pair of clamping members movable into engagement with the upper materials on the opposite sides of the last for supporting the shoe during the operation of said overlaying members, fluid-pressure-operated means for thus moving the clamping members, a valve for controlling the flow of fluid under pressure to said two fluid-pressure-operated means, said valve including a first valve member, movable to an operative position for admitting fluid under pressure to the fluid-pressure-operated upper-tensioning means and a second valve member, movable to an operative position for admitting fluid under pressure to the fluid-pressure-operated means for moving the clamping members, a treadle, means operated by the treadle for moving said first-named valve to its operative position in response to an initial depression of the treadle, and means rendered effective upon the operation of said fluid-pressure-operated upper-tensioning means for moving said second-named valve member to its operative position, in response to a succeeding depression of the treadle.

121. In a machine for shaping uppers over lasts, fluid-pressure-operated means for tensioning the upper materials of a shoe to shape them over a last, overlaying members for wiping the lasting margin of the upper materials inwardly over the bottom of an insole on the last, a pair of clamping members movable into engagement with the upper materials on the opposite sides of the last for supporting the shoe during the operation of said overlaying members, fluid-pressure-operated means for thus moving the clamping members, a valve for controlling the flow of fluid under pressure to said two fluid-pressure-operated means, said valve including a first valve member, movable to an operative position for admitting fluid under pressure to the fluid-pressure-operated upper-tensioning means, and a second valve member, movable to an operative position, for admitting fluid under pressure to the fluid-pressure-operated means for moving the clamping members, a treadle, means operated by the treadle for moving said first-named valve member to its operative position in response to an initial depression of the treadle, and fluid-pressure-operated means rendered effective upon the operation of said fluid-pressure-operated upper-tensioning means for causing said second-named valve member to be moved to its operative position, in response to a succeeding depression of the treadle.

122. In a machine for shaping uppers over lasts, fluid-pressure-operated means for tensioning the upper materials of a shoe to shape them over a last, overlaying members for wiping the lasting margin of the upper materials inwardly over the bottom of an insole on the last, a pair of clamping members movable into engagement with the upper materials on the opposite sides of the last for supporting the shoe during the operation of said overlaying members, fluid-pressure-operated means for thus moving the clamping members, a valve for controlling the flow of fluid under pressure to said two fluid-pressure-operated means, said valve including a first valve member, movable to an operative position for admitting fluid under pressure to the fluid-pressure-operated upper-tensioning means, a latch for holding said valve member in its operative position, a second valve member, movable to an operative position for admitting fluid under pressure to the fluid-pressure-operated means for moving the clamping members, and a latch for holding said second valve member in its operative position, a treadle, means operated by the treadle for moving said first-named valve member to its operative position in response to an initial depression of the treadle, and means rendered effective upon the operation of said fluid-pressure-operated upper-tensioning means for moving said second-named valve member to its operative position, in response to a succeeding depression of the treadle.

123. In a machine for shaping uppers over lasts, fluid-pressure-operated means for tensioning the upper materials of a shoe to shape them over a last, overlaying members for wiping the lasting margin of the upper materials inwardly over the bottom of an insole on the last, a pair of clamping members movable into engagement with the upper materials on the opposite sides of the last for supporting the shoe during the operation of said overlaying members, fluid-pressure-operated means for thus moving the clamping members, a valve for controlling the flow of fluid under pressure to said two fluid-pressure-operated means, said valve including a first valve member, movable to an operative position for admitting fluid under pressure to the fluid-pressure-operated upper-tensioning means, a latch for holding said valve member in its operative position, a second valve member movable to an operative position for admitting fluid under pressure to the fluid-pressure-operated means for moving the clamping members, and a latch for holding said second valve member in its operative position, a treadle, means operated by the treadle for moving said first-named valve member to its operative position in response to an initial depression of the treadle, and fluid-pressure-operated means rendered effective upon the operation of said fluid-pressure-operated upper-tensioning means for causing said second-named valve member to be moved to its operative position, in response to a succeeding depression of the treadle.

124. In a machine for shaping uppers over lasts, fluid-pressure-operated means for tensioning the upper materials of a shoe to shape them over a last, overlaying members for wiping the lasting margin of the upper materials inwardly over the bottom of an insole on the last, power-operated means for actuating the overlaying members, a clutch for controlling the operation of said power-operated means, a pair of clamping members movable into engagement with the upper materials on the opposite sides of the last for supporting the shoe during the operation of said overlaying members, fluid-pressure-operated means for thus moving the clamping members, a valve for controlling the flow of fluid under pressure to said two fluid-pressure-operated means, said valve including a first valve member, movable to an operative position for admitting fluid under pressure to the fluid-pressure-operated upper-tensioning means and a second valve member, movable to an operative position for admitting fluid under pressure to the fluid-pressure-operated means for moving the clamping members, a treadle, means operated by the treadle for moving said first-named valve member to its operative position in response to an initial depression of the treadle, means rendered effective upon the operation of said fluid-pressure-operated upper-tensioning means for moving said second-named valve member to its operative position, in response to a succeeding depression of the treadle, and means for engaging said clutch to effect operation of the overlaying members by said power-operated means in response to movement of the clamping members into engagement with the upper materials on the last.

125. In a machine for shaping uppers over lasts, fluid-pressure-operated means for tensioning the upper materials of a shoe to shape them over a last, overlaying members for wiping the lasting margin of the upper materials inwardly over the bottom of an insole on the last, power-operated means for actuating the overlaying members, a clutch for controlling the operation of said power-operated means, a pair of clamping members movable into engagement with the upper materials on the opposite sides of the last for supporting the shoe during the operation of said overlaying members, fluid-pressure-operated means for thus moving the clamping members, a valve for controlling the flow of fluid under pressure to said two fluid-pressure-operated means, said valve including a first valve member, movable to an operative position for admitting fluid under pressure to the fluid-pressure-operated upper-tensioning means, and a second valve member, movable to an operative position, for admitting fluid under pressure to the fluid-pressure-operated means for moving the clamping members, a treadle, means operated by the treadle for moving said first-named valve member to its operative position, in response to an initial depression of the treadle, means rendered effective upon the operation of said fluid-pressure-operated upper-tensioning means for moving said second-named valve member to its operative position, in response to a succeeding depression of the treadle, and fluid-pressure-operated means for engaging said clutch to effect operation of the overlaying members by said power-operated means in response to movement of the clamping members into engagement with the upper materials on the last.

126. In a machine for shaping uppers over lasts, fluid-pressure-operated means for tensioning upper materials over a last, overlaying means for wiping the lasting margin of the upper materials over the bottom of an insole on the last, clamping members movable into engagement with the upper materials on the opposite sides of the last, for supporting the last during the operation of said overlaying means, fluid-pressure-operated means for thus moving the clamping members, a control valve for admitting fluid under pressure to said two fluid-pressure-operated means, said valve including a first valve member, movable to an operative position for admitting fluid under pressure to the fluid-pressure-operated upper-tensioning means and a second valve member for admitting fluid under pressure to said fluid-pressure-operated means for moving the clamping members, a treadle, means operated by the treadle for moving said first and second valve members, successively, to their operative positions in response to two successive depressions of the treadle, and another auxiliary control member, movable by an operator, for returning the first valve member from its operative position after a first depression of the treadle.

127. In a machine for shaping uppers over lasts, fluid-pressure-operated means for tensioning upper materials over a last, overlaying means for wiping the lasting margin of the upper materials over the bottom of an insole on the last, clamping members movable into engagement with the upper materials on the opposite sides of the last, for supporting the last during the operation of said overlaying means, fluid-pressure-operated means for thus moving the clamping member, a control valve for admitting fluid under pressure to said two fluid-pressure-operated means, said valve including a first valve member, movable to an operative position for admitting fluid under pressure to the fluid-pressure-operated upper-tensioning means, a latch for holding said valve member in operative position, a second valve member for admitting fluid under pressure to said fluid-pressure-operated means for moving the clamping members, and a latch for holding said second valve member in its operative position, a treadle, means operated by the treadle for moving said first and second valve members, successively, to their operative positions in response to two successive depressions of the treadle, and an auxiliary control member, movable by an operator, for tripping said first-mentioned latch to cause the first-named valve member to return from its operative position after a first depression of the treadle.

128. In a machine for shaping uppers over lasts, fluid-pressure-operated upper-tensioning means for exerting a pull on upper materials to shape them over a last, overlaying members movable inwardly over the bottom of an insole on the last, a pair of clamping members movable into engagement with the upper materials on the opposite sides of the last for supporting the shoe during the operation of said overlaying members, fluid-pressure-operated means for thus moving the clamping members, a valve for controlling the flow of fluid under pressure to said two fluid-pressure-operated means, said valve including a first valve member, movable to an operative position, for admitting fluid under pressure to the fluid-pressure-operated upper-tensioning means and a second valve member movable to an operative position for admitting fluid under pressure to the fluid-pressure-operated means for moving the clamping members, a treadle, means operated by the treadle for moving the first-named valve member to its operative position, in response to an initial depression of the treadle, means rendered effective upon the operation of the fluid-pressure-operated upper-tensioning means for moving the second-named valve member to its operative position, in response to a succeeding depression of the treadle, and an operator-controlled means for returning said first-named valve member from its operative position, after a first depression of the treadle.

129. In a machine for shaping uppers over lasts, fluid-pressure-operated upper-tensioning means for exerting a pull on upper materials to shape them over a last, overlaying members movable inwardly over the bottom of an insole on the last, a pair of clamping members movable into engagement with the upper materials on the opposite sides of the last for supporting the shoe during the operation of said overlaying members, fluid-pressure-operated means for thus moving the clamping members, a valve for controlling the flow of fluid under pressure to said two fluid-pressure-operated means, said valve including a first valve member, movable to an operative position for admitting fluid under pressure to said fluid-pressure-operated upper-tensioning means, a latch for holding said valve member in its operative position, a second valve member, movable to an operative position for admitting fluid under pressure to said fluid-pressure-operated means for moving the clamping members, and a latch for holding said second-named valve member in its operative position, a treadle, means operated by said treadle for moving the first-named valve member to its operative position, in response to an initial depression of the treadle, means rendered effective upon the operation of said fluid-pressure-operated upper-tensioning means, for moving the second-named valve member to its operative position, in response to a succeeding depression of the treadle, and operator-controlled means for tripping the first-mentioned latch to cause the first valve member to return from its operative position, after a first depression of the treadle.

130. In a machine for shaping uppers over lasts, fluid-pressure-operated means for tensioning upper materials over a last, overlaying means for wiping the lasting margin of the upper materials over the bottom of an insole on the last, power-operated means including a clutch for operating the overlaying means, a pair of clamping members movable into engagement with the upper materials on the opposite sides of the last for supporting the last, during the operation of the overlaying means, fluid-pressure-operated means for moving the clamping members, a treadle-operated valve for admitting fluid under pressure, successively, to said fluid-pressure-operated upper-tensioning means and to the fluid-pressure-operated means for moving the clamping members, means for engaging the clutch to initiate power operation of the overlaying members in response to the operation of said clamping members by the fluid-pressure-operated means, and means associated with said valve for causing it to discontinue the flow of pressure fluid to said two fluid-pressure-operated means, during the operation of said overlaying means by the power-operated means.

131. In a machine for shaping uppers over lasts, fluid-pressure-operated means for tensioning upper materials over a last, overlaying means for wiping the lasting margin of the upper materials over the bottom of an insole on the last, power-operated means including a clutch for operating the overlaying means, a pair of clamping members movable into engagement with the upper materials on the opposite sides of the last for supporting the last, during the operation of the overlaying means, fluid-pressure-operated means for moving the clamping members, a treadle-operated valve for admitting fluid under pressure, successively, to said fluid-pressure-operated upper-tensioning means and to the fluid-pressure-operated means for moving the clamping members, fluid-pressure-operated means for engaging the clutch to initiate power operation of the overlaying means in response to the operation of said clamping members by its fluid-pressure-operated means, and means associated with said valve for causing it to discontinue the flow of fluid under pressure to the fluid-pressure-operated tensioning means and to the fluid-pressure-operated means for moving the clamping members, during the operation of said overlaying means.

132. In a machine for shaping uppers over lasts, fluid-pressure-operated means for tensioning upper materials over a last, overlaying means for wiping the lasting margin of the upper materials over the bottom of an insole on a last, power-operated means including a clutch for operating the overlaying means, a pair of clamping members movable into engagement with the upper materials on the opposite sides of the last for supporting the last, during the operation of the overlaying means, fluid-pressure-operated means for moving the clamping members, a treadle-operated valve for admitting fluid under pressure, successively, to said fluid-pressure-operated upper-tensioning means and to the fluid-pressure-operated means for moving the clamping members, means for engaging the clutch to initiate power operation of the overlaying means in response to the operation of said clamping members by their fluid-pressure-operated means, and fluid-pressure-operated means associated with said valve for causing it to discontinue the flow of fluid under pressure to the fluid-pressure-operated upper-tensioning means and the fluid-pressure-operated means for moving the clamping members, during the operation of said overlaying means.

133. In a machine for shaping uppers over lasts, fluid-pressure-operated means for tensioning upper materials over a last, overlaying means for wiping the lasting margin of the upper materials over the bottom of an insole on the last, power-operated means including a clutch for operating the overlaying means, a pair of clamping members movable into engagement with the upper materials on the opposite sides of the last for supporting the last, during the operation of the overlaying means, fluid-pressure-operated means for moving the clamping members, a treadle-operated valve for admitting fluid under pressure, successively, to said fluid-pressure-operated upper-tensioning means and to the fluid-pressure-operated means for moving the clamping members, fluid-pressure-operated means for engaging the clutch to initiate power operation of the overlaying means in response to the operation of said clamping members by their fluid-pressure-operated means, and fluid-pressure-operated means associated with said valve for causing it to discontinue the flow of pressure fluid to the fluid-pressure-operated upper-tensioning means and to said fluid-pressure-operated means including a guide member for supporting each of said carriers for movement to cause its associated overlaying member to travel in a rectilinear path, substantially parallel to the plane of the bottom of the shoe on said fixed support, and manually adjustable spring means for yieldably supporting each of said guide members for movement in a direction extending heightwise of said support, whereby said overlaying members may be displaced, in a heightwise direction relatively to said support, and caused to apply a variably predetermined yielding pressure on the upper materials, as they wipe said upper materials inwardly over the insole on the last.

140. In a machine for shaping uppers over lasts, a relatively fixed support for a shoe on a last, means for tensioning the upper materials of the shoe, in different locations adjacent to the toe end and opposite sides of the forepart of a last on the upport, overlaying members for wiping the lasting margin of the upper materials inwardly over and for pressing said materials against the bottom of an insole on the last, in said locations, a carrier for each of said overlaying members, means including a guide member for supporting each of said carriers for movement to cause its associated overlaying member to travel in a rectilinear path, substantially parallel to the plane of the bottom of the shoe on said fixed support, means for yieldably supporting each of said guide members for movement in a direction extending heightwise of said support, whereby said overlaying members may be displaced, in a heightwise direction relatively to said support, and caused to apply a yielding pressure on the upper materials, as they wipe said upper materials inwardly over the insole on the last, and means for changing the position of each of said guide members to vary the location of the path of movement of its associated overlaying member in a heightwise direction, relatively to said support.

141. In a machine for shaping uppers over lasts, a relatively fixed support for a shoe on a last, means for tensioning the upper materials of the shoe, in different locations adjacent to the toe end and opposite sides of the forepart of a last on the support, overlaying members for wiping the lasting margin of the upper materials inwardly over and for pressing said materials against the bottom of an insole on the last, in said locations, a carrier for each of said overlaying members, means including a guide member for supporting each of said carriers for movement to cause its associated overlaying member to travel in a rectilinear path, substantially parallel to the plane of the bottom of the shoe on said fixed support, means for yieldably supporting each of said guide members for movement in a direction extending heightwise of said support, whereby said overlaying members may be displaced, in a heightwise direction relatively to said support, and caused to apply a yielding pressure on the upper materials, as they wipe said upper materials inwardly over the insole on the last, and manually adjustable means for changing the position of each of said guide members to vary the location of the path of movement of its associated overlaying member in a heightwise direction, relatively to said support.

142. In a machine for shaping uppers over lasts, a relatively fixed support for a shoe on a last, means for tensioning the upper materials of the shoe, in different locations adjacent to the toe end and opposite sides of the forepart of a last on the support, overlaying members for wiping the lasting margin of the upper materials inwardly over and for pressing said materials against the bottom of an insole on the last, in said locations, a carrier for each of said overlaying members, means including a guide member for supporting each of said carriers for movement to cause its associated overlaying member to travel in a rectilinear path, substantially parallel to the plane of the bottom of the shoe on said fixed support, and means including a spring and a stop member for yieldably supporting each of said guide members in a predetermined heightwise position for movement in a direction extending heightwise of said support, whereby said overlaying members may be displaced in a heightwise direction, relatively to said support, against the resistance of said springs, and caused to apply a yielding pressure on the upper materials as they wipe said materials inwardly over the insole on the last.

143. In a machine for shaping uppers over lasts, a relatively fixed support for a shoe on a last, means for tensioning the upper materials of the shoe, in different locations adjacent to the toe end and opposite sides of the forepart of a last on the support, overlaying members for wiping the lasting margin of the upper materials inwardly over and for pressing said materials against the bottom of an insole on the last, in said locations, a carrier for each of said overlaying members, means including a guide member for supporting each of said carriers for movement to cause its associated overlaying member to travel in a rectilinear path, substantially parallel to the plane of the bottom of the shoe on said fixed support, means including a spring and a stop member for yieldably supporting each of said guide members in a predetermined heightwise position for movement in a direction extending heightwise of said support, whereby said overlaying members may be displaced in a heightwise direction, relatively to said support, against the resistance of said springs, and caused to apply a yielding pressure on the upper materials as they wipe said materials inwardly over the insole on the last, and means for selectively varying the tension of each of said springs and for adjusting each of said stop members in a heightwise direction, to vary the extent of heightwise displacement of said overlaying members and to determine the force of the yielding pressure exerted on the upper materials by said overlaying members, when operating on upper materials of different thicknesses.

144. In a machine for shaping uppers over lasts, a relatively fixed support for a shoe on a last, means for tensioning the upper materials of the shoe, in a location on the last, an overlaying member for wiping the lasting margin of the upper materials inwardly over and for pressing said materials against the bottom of an insole on the last, in said location, a carrier for said overlaying member, means including a guide member for supporting said carrier for movement to cause the overlaying member to travel in a rectilinear path, substantially parallel to the plane of the bottom of the shoe on said fixed support, and manually adjustable spring means for yieldably supporting said guide member for movement in a direction extending heightwise of the support whereby the overlaying member may be displaced, in a heightwise direction relatively to the support, and caused to apply a variably predetermined yielding pressure on the upper materials, as it wipes said upper materials inwardly over the insole on the last.

145. In a machine for shaping uppers over lasts, a relatively fixed support for a shoe on a last, means for tensioning the upper materials of the shoe, in a location on the last, an overlaying member for wiping the lasting margin of the upper materials inwardly over and for pressing said materials against the bottom of an insole on the last, in said location, a carrier for said overlaying member, means including a guide member for supporting said carrier for movement to cause the overlaying member to travel in a rectilinear path, substantially parallel to the plane of the bottom of the shoe on said fixed support, means for yieldably supporting said guide member for movement in a direction extending heightwise of the support, whereby the overlaying member may be displaced, in a heightwise direction relatively to the support, and caused to apply means for moving the clamping members, during the operation of said overlaying means.

134. In a machine for shaping uppers over lasts, fluid-pressure-operated means for tensioning upper materials over a last, overlaying means for wiping the lasting margin of the upper materials over the bottom of an insole on the last, power-operated means including a clutch for operating the overlaying means, a pair of clamping members movable into engagement with the upper materials on the opposite sides of the last for supporting the last, during the operation of the overlaying means, fluid-pressure-operated means for moving the clamping members, a valve for controlling the flow of fluid under pressure to said two fluid-pressure-operated means, said valve including a first valve member, movable to an operative position for admitting fluid under pressure to the fluid-pressure-operated upper-tensioning means, a latch for holding said valve member in operative position, a second valve member, movable to an operative position, for admitting fluid under pressure to said fluid-pressure-operated means for moving the clamping members, a latch for holding said second valve member in operative position, a treadle, means operated by the treadle for moving said two valve members, successively, to their operative positions, means for engaging the clutch to initiate power operation of said overlaying means, in response to the operation of said clamping members by their fluid-pressure-operated means, and means associated with the valve for tripping said latches to cause said valve members to return from their operative positions, during the operation of said overlaying means.

135. In a machine for shaping uppers over lasts, fluid-pressure-operated means for tensioning upper materials over a last, overlaying means for wiping the lasting margin of the upper materials over the bottom of an insole on the last, power-operated means including a clutch for operating the overlaying means, a pair of clamping members movable into engagement with the upper materials on the opposite sides of the last for supporting the last, during the operation of the overlaying means, fluid-pressure-operated means for moving the clamping members, a valve for controlling the flow of fluid under pressure to said two fluid-pressure-operated means, said valve including a first valve member, movable to an operative position for admitting fluid under pressure to the fluid-pressure-operated upper-tensioning means, a latch for holding said valve member in operative position, a second valve member, movable to an operative position, for admitting fluid under pressure to said fluid-pressure-operated means for moving the clamping members, a latch for holding said second valve member in operative position, a treadle, means operated by the treadle for moving said two valve members, successively, to their operative positions, fluid-pressure-operated means for engaging the clutch to initiate power operation of said overlaying means in response to the operation of said clamping members by their fluid-pressure-operated means, and means associated with the valve for tripping said latches to cause said valve members to return from their operative positions, during the operation of said overlaying means.

136. In a machine for shaping uppers over lasts, fluid-pressure-operated means for tensioning upper materials over a last, overlaying means for wiping the lasting margin of the upper materials over the bottom of an insole on the last, power-operated means including a clutch for operating the overlaying means, a pair of clamping members movable into engagement with the upper materials on the opposite sides of the last for supporting the last, during the operation of the overlaying means, fluid-pressure-operated means for moving the clamping members, a valve for controlling the flow of fluid under pressure to said two fluid-pressure-operated means, said valve including a first valve member, movable to an operative position for admitting fluid under pressure to the fluid-pressure-operated upper-tensioning means, a latch for holding said valve member in operative position, a second valve member, movable to an operative position, for admitting fluid under pressure to said fluid-pressure-operated means for moving the clamping members, a latch for holding said second valve member in operative position, a treadle, means operated by the treadle for moving said two valve members, successively, to their operative positions, means for engaging the clutch to initiate power operation of said overlaying means in response to the operation of said clamping members by their fluid-pressure-operated means, and fluid-pressure-operated means associated with the valve for tripping said latches to cause said valve members to return from their operative positions, during the operation of said overlaying means.

137. In a machine for shaping uppers over lasts, fluid-pressure-operated means for tensioning upper materials over a last, overlaying means for wiping the lasting margin of the upper materials over the bottom of an insole on the last, power-operated means including a clutch for operating the overlaying means, a pair of clamping members movable into engagement with the upper materials on the opposite sides of the last for supporting the last, during the operation of the overlaying means, fluid-pressure-operated means for moving the clamping members, a valve for controlling the flow of fluid under pressure to said two fluid-pressure-operated means, said valve including a first valve member, movable to an operative position for admitting fluid under pressure to the fluid-pressure-operated upper-tensioning means, a latch for holding said valve member in operative position, a second valve member, movable to an operative position, for admitting fluid under pressure to said fluid-pressure-operated means for moving the clamping members, a latch for holding said second valve member in operative position, a treadle, means operated by the treadle for moving said two valve members, successively, to their operative positions, fluid-pressure-operated means for engaging the clutch to initiate power operation of said overlaying means in response to the operation of said clamping members by their fluid-pressure-operated means, and fluid-pressure-operated means associated with the valve for tripping said latches to cause said valve members to return from their operative positions, during the operation of said overlaying means.

138. In a machine for shaping uppers over lasts, a relatively fixed support for a shoe on a last, means for tensioning the upper materials of the shoe, in different locations adjacent to the toe end and opposite sides of the forepart of a last on the support, overlaying members for wiping the lasting margin of the upper materials inwardly over and for pressing said materials against the bottom of an insole on the last, in said locations, a carrier for each of said overlaying members, means including a guide member for supporting each of said carriers for movement to cause its associated overlaying member to travel in a rectilinear path, substantially parallel to the plane of the bottom of the shoe on said fixed support, and means for yieldably supporting each of said guide members for movement in a direction extending heightwise of said support whereby said overlaying members may be displaced, in a heightwise direction relatively to said support, and caused to apply a yielding pressure on the upper materials, as they wipe said upper materials inwardly over the insole on the last.

139. In a machine for shaping uppers over lasts, a relatively fixed support for a shoe on a last, means for tensioning the upper materials of the shoe, in different locations adjacent to the toe end and opposite sides of the forepart of a last on the support, overlaying members for wiping the lasting margin of the upper materials inwardly over and for pressing said materials against the bottom of an insole on the last, in said locations, a carrier for each of said overlaying members, a yielding pressure on the upper materials, as it wipes said upper materials inwardly over the insole on the last, and means for changing the position of said guide member to vary the location of the path of movement of said overlaying member in a heightwise direction relatively to said support.

146. In a machine for shaping uppers over lasts, a relatively fixed support for a shoe on a last, means for tensioning the upper materials of the shoe, in a location on the last, an overlaying member for wiping the lasting margin of the upper materials inwardly over and for pressing said materials against the bottom of an insole on the last, in said location, a carrier for said overlaying member, means including a guide member for supporting said carrier for movement to cause the overlaying member to travel in a rectilinear path, substantially parallel to the plane of the bottom of the shoe on said fixed support, means for yieldably supporting said guide member for movement in a direction extending heightwise of the support, whereby the overlaying member may be displaced, in a heightwise direction relatively to the support, and caused to apply a yielding pressure on the upper materials as it wipes said upper materials inwardly over the insole on the last, and manually adjustable means for changing the position of said guide member to vary the location of the path of movement of the overlaying member in a heightwise direction, relatively to said support.

147. In a machine for shaping uppers over lasts, a relatively fixed support for a shoe on a last, means for tensioning the upper materials of the shoe, in a location on the last, an overlaying member for wiping the lasting margin of the upper materials inwardly over and for pressing said materials against the bottom of an insole on the last, in said location, a carrier for said overlaying member, means including a guide member for supporting said carrier for movement to cause the overlaying member to travel in a rectilinear path, substantially parallel to the plane of the bottom of the shoe on said fixed support, and means including a spring and a stop member for yieldably supporting said guide member in a predetermined heightwise position for movement in a direction extending heightwise of said support, whereby the overlaying member may be displaced, in a heightwise direction relatively to said support, against the resistance of said spring, and caused to apply a yielding pressure on the upper materials, as it wipes said upper materials inwardly over the insole on the last.

148. In a machine for shaping uppers over lasts, a relatively fixed support for a shoe on a last, means for tensioning the upper materials of the shoe, in a location on the last, an overlaying member for wiping the lasting margin of the upper materials inwardly over and for pressing said materials against the bottom of an insole on the last, in said location, a carrier for said overlaying member, means including a guide member for supporting said carrier for movement to cause the overlaying member to travel in a rectilinear path, substantially parallel to the plane of the bottom of the shoe on said fixed support, means including a spring and a stop member for yieldably supporting said guide member in a predetermined heightwise position for movement in a direction extending heightwise of said support, whereby the overlaying member may be displaced, in a heightwise direction relatively to said support, against the resistance of said spring, and caused to apply a yielding pressure on the upper materials, as it wipes said upper materials inwardly over the insole on the last, and means for selectively varying the tension of said spring and for adjusting said stop member, in a heightwise direction, in order to vary the extent of heightwise displacement of said overlaying member and to determine the force of the yielding pressure exerted on the upper materials by the overlaying member, when operating on upper materials of different thicknesses.

149. In a machine for shaping uppers over lasts, a relatively fixed support for a last, means for tensioning the upper materials of a shoe, in different locations adjacent to the toe end and opposite sides of the forepart of a last on the support, overlaying members for wiping the lasting margin of the upper materials inwardly over and for pressing said means against the bottom of an insole on the last, in said locations, a fastener-inserting mechanism associated with each of said overlaying members, a carrier for each overlaying member, means including a guide member for supporting each of said carriers for movement to cause its associated overlaying member and fastener-inserting mechanism to travel in a rectilinear path, substantially parallel to the plane of the bottom of the shoe on said fixed support, means for yieldingly supporting each of said guide members for movement in a direction extending heightwise of the support, whereby said overlaying members may be displaced, in a heightwise direction relatively to the support, and caused to apply a yielding pressure on the upper materials as they wipe said materials inwardly over the insole on the last, and means for locking said guide members against movement to hold said overlaying members unyieldingly against the upper materials, during the subsequent operation of said fastener-inserting mechanisms.

150. In a machine for shaping uppers over lasts, a relatively fixed support for a last, means for tensioning the upper materials of a shoe, in different locations adjacent to the toe end and opposite sides of the forepart of a last on the support, overlaying members for wiping the lasting margin of the upper materials inwardly over and for pressing said margin against the bottom of an insole on the last, in said locations, a fastener-inserting mechanism associated with each of said overlaying members, a carrier for each overlaying member, means including a guide member for supporting each of said carriers for movement to cause its associated overlaying member and fastener-inserting mechanism to travel in a rectilinear path, substantially parallel to the plane of the bottom of the shoe on said fixed support, means for yieldingly supporting each of said guide members for movement in a direction extending heightwise of the support, whereby said overlaying members may be displaced, in a heightwise direction relatively to the support, and caused to apply a yielding pressure on the upper materials as they wipe said materials inwardly over the insole on the last, and fluid-pressure means for locking said guide members against movement to hold said overlaying members unyieldingly against the upper materials, during the subsequent operation of said fastener-inserting mechanisms.

151. In a machine for shaping uppers over lasts, a relatively fixed support for a last, means for tensioning the upper materials of a shoe, in a location on the last, an overlaying member for wiping the lasting margin of the upper materials inwardly over and for pressing said materials against the bottom of an insole on the last, in said location, a fastener-inserting mechanism associated with said overlaying member, a carrier for the overlaying member, means including a guide member for supporting said carrier for movement to cause the overlaying member and fastener-inserting mechanism to travel in a rectilinear path, substantially parallel to the plane of the bottom of the shoe on said fixed support, means for yieldably supporting said guide member for movement in a direction extending heightwise of the support, whereby said overlaying member may be displaced, in a heightwise direction relatively to the support, and caused to apply a yielding pressure on the upper materials as it wipes said materials inwardly over the insole, and means for locking said guide member against movement to hold said overlaying member unyieldingly against the upper materials, during the subsequent operation of said fastener-inserting mechanism.

152. In a machine for shaping uppers over lasts, a relatively fixed support for a last, means for tensioning the upper materials of a shoe, in a location on the last, an overlaying member for wiping the lasting margin of the upper materials inwardly over and for pressing said materials against the bottom of an insole on the last, in said location, a fastener-inserting mechanism associated with said overlaying member, a carrier for the overlaying member, means including a guide member for supporting said carrier for movement to cause the overlaying member and fastener-inserting mechanism to travel in a rectilinear path, substantially parallel to the plane of the bottom of the shoe on said fixed support, means for yieldably supporting said guide member for movement in a direction extending heightwise of the support, whereby said overlaying member may be displaced, in a heightwise direction relatively to the support, and caused to apply a yielding pressure on the upper materials as it wipes said materials inwardly over the insole, and fluid-pressure means for locking said guide member against movement to hold said overlaying member unyieldingly against the upper materials, during the subsequent operation of said fastener-inserting mechanism.

153. In a machine for shaping uppers over lasts, means for tensioning upper materials over a last, means for fastening the tensioned upper materials to an insole on the last, a fastening-distributing mechanism, means for delivering fastenings to said fastening means, including a spring-operated air blast piston arranged to be cocked during the operation of the fastening-distributing mechanism in a late stage in a cycle of operations of the machine, a control member for initiating a cycle of operations of the machine, and means operable in response to actuation of the control member for releasing said spring-operated piston at the beginning of a cycle of operations of the machine to cause it to develop a blast of air for delivering fastenings, separated during a previous cycle of operations of the machine, to said fastening means.

154. In a machine for shaping uppers over lasts, fluid-pressure-operated means for tensioning upper materials over a last, means for fastening the tensioned upper materials to an insole on the last, a fastening-distributing mechanism, means for delivering fastenings to said fastening means, including a spring-operated air blast piston arranged to be cocked during the operation of the fastening-distributing mechanism in a late stage in a cycle of operations of the machine, a valve for controlling the flow of fluid under pressure to said fluid-pressure-operated upper-tensioning means, a member for operating said valve to initiate a cycle of operations of the machine, and fluid-pressure means under the control of said valve for releasing said spring-operated piston at the beginning of a cycle of operations of the machine to cause it to develop a blast of air for delivering fastenings, separated during a previous cycle of operations of the machine, to said fastening means.

References Cited in the file of this patent

UNITED STATES PATENTS

| | | |
|---|---|---|
| 574,337 | Katzlovsky | Dec. 29, 1896 |
| 1,001,701 | Spencer | Aug. 29, 1911 |
| 1,030,264 | McFeely | June 18, 1912 |
| 1,055,016 | Brothers | Mar. 4, 1913 |
| 1,070,272 | Mackenzie | Aug. 12, 1913 |
| 1,128,723 | Roberts | Feb. 16, 1915 |
| 1,147,172 | Iffert | July 20, 1915 |
| 1,260,034 | Perri | Mar. 19, 1918 |
| 1,333,537 | Lancaster | Mar. 9, 1920 |
| 1,341,821 | Perri | June 1, 1920 |
| 1,356,538 | McFeely | Oct. 26, 1920 |
| 1,420,572 | Perri | June 20, 1922 |
| 1,426,389 | Jerram et al. | Aug. 22, 1922 |
| 1,426,390 | Jerram et al. | Aug. 22, 1922 |
| 1,496,805 | Bennion et al. | June 10, 1924 |
| 1,510,851 | Jerram et al. | Oct. 7, 1924 |
| 1,516,533 | Holmgren | Nov. 25, 1924 |
| 1,582,534 | Parks | Apr. 27, 1926 |
| 1,585,722 | Jorgensen | May 25, 1926 |
| 1,921,099 | Roberts | Aug. 8, 1933 |
| 2,225,639 | Keall et al. | Dec. 24, 1940 |
| 2,257,842 | Elliott | Oct. 7, 1941 |
| 2,305,535 | Lane | Dec. 15, 1942 |